US012617285B2

(12) United States Patent

Verhagen et al.

(10) Patent No.: US 12,617,285 B2

(45) Date of Patent: May 5, 2026

(54) VEHICLE WITH POWER DISTRIBUTION UNIT

(71) Applicant: Oshkosh Corporation, Oshkosh, WI (US)

(72) Inventors: Jeff Verhagen, Oshkosh, WI (US); Jamison Bair, Oshkosh, WI (US); Dominic Meier, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 19/003,049

(22) Filed: Dec. 27, 2024

(65) Prior Publication Data

US 2025/0214523 A1 Jul. 3, 2025

Related U.S. Application Data

(60) Provisional application No. 63/616,137, filed on Dec. 29, 2023, provisional application No. 63/615,950, (Continued)

(51) Int. Cl.
B60L 1/00 (2006.01)
B60K 1/04 (2019.01)
(Continued)

(52) U.S. Cl.
CPC ................ B60L 1/003 (2013.01); B60K 1/04 (2013.01); B60L 1/02 (2013.01); B60L 50/51 (2019.02); B60L 50/66 (2019.02); B60L 53/18 (2019.02); B60L 58/18 (2019.02); B60Q 1/2619 (2013.01); B60R 16/0238 (2013.01);
(Continued)

(58) Field of Classification Search
CPC .. B60L 1/00; B60L 1/003; B60L 58/18; B60L 50/66; B60L 50/51; B60L 53/18; B60L 1/02; B60L 2200/36; B60L 2200/40; B60L 2210/10; B60L 2210/40; B60K 1/04; B60K 2001/0438; B60Q 1/2619; B60R 16/02; B60R 16/0238; B60R 16/03; B60R 16/033; B62D 21/17; B62D 25/08; B62D 25/081; B65F 3/04; B65F 3/041; B65F 3/046; B65F 2003/0283; H02J 7/00; H02J 7/0031; H02J 2310/48; B60Y 2200/144
See application file for complete search history.

(56) References Cited

U.S. PATENT DOCUMENTS 11,958,352 B1 4/2024 Sweere et al.
2019/0360600 A1 11/2019 Jax et al.
(Continued)

*Primary Examiner* — Robert L Deberadinis
(74) *Attorney, Agent, or Firm* — FOLEY & LARDNER LLP

(57) ABSTRACT

A vehicle includes a chassis, a tractive element coupled to the chassis, a cab coupled to the chassis and configured to support an operator, a body coupled to the chassis and offset longitudinally rearward from the cab, such that a volume is defined between the cab and the body, an electric motor configured to drive the tractive element to propel the vehicle, a secondary electrical load, a battery configured to supply electrical energy, and a power distribution unit configured to direct the electrical energy from the battery to the electric motor and the secondary electrical load. The power distribution unit is positioned in the volume defined between the cab and the body.

20 Claims, 128 Drawing Sheets

Related U.S. Application Data filed on Dec. 29, 2023, provisional application No. 63/616,048, filed on Dec. 29, 2023, provisional application No. 63/616,354, filed on Dec. 29, 2023, provisional application No. 63/615,870, filed on Dec. 29, 2023, provisional application No. 63/615,906, filed on Dec. 29, 2023, provisional application No. 63/616,237, filed on Dec. 29, 2023, provisional application No. 63/616,058, filed on Dec. 29, 2023, provisional application No. 63/616,245, filed on Dec. 29, 2023, provisional application No. 63/616,345, filed on Dec. 29, 2023, provisional application No. 63/615,910, filed on Dec. 29, 2023, provisional application No. 63/616,364, filed on Dec. 29, 2023.

(51) Int. Cl.

| | |
|---|---|
| *B60L 1/02* | (2006.01) |
| *B60L 50/51* | (2019.01) |
| *B60L 50/60* | (2019.01) |
| *B60L 53/18* | (2019.01) |
| *B60L 58/18* | (2019.01) |
| *B60Q 1/26* | (2006.01) |
| *B60R 16/023* | (2006.01) |
| *B60R 16/03* | (2006.01) |
| *B60R 16/033* | (2006.01) |
| *B62D 21/17* | (2006.01) |
| *B62D 25/08* | (2006.01) |
| *B65F 3/04* | (2006.01) |
| *H02J 7/00* | (2006.01) |
| *B65F 3/02* | (2006.01) |

(52) U.S. Cl.
CPC ............ *B60R 16/03* (2013.01); *B60R 16/033* (2013.01); *B62D 21/17* (2013.01); *B62D 25/081* (2013.01); *B65F 3/041* (2013.01); *B65F 3/046* (2013.01); *H02J 7/0031* (2013.01); *B60K 2001/0438* (2013.01); *B60L 2200/36* (2013.01); *B60L 2200/40* (2013.01); *B60L 2210/10* (2013.01); *B60L 2210/40* (2013.01); *B60Y 2200/144* (2013.01); *B65F 2003/0283* (2013.01); *H02J 2310/48* (2020.01)

(56) References Cited

U.S. PATENT DOCUMENTS

| | | | |
|---|---|---|---|
| 2021/0031649 A1* | 2/2021 | Messina | ................. B60K 23/00 |
| 2021/0345062 A1 | 11/2021 | Koga et al. | |
| 2022/0096884 A1 | 3/2022 | Koga et al. | |
| 2022/0097961 A1 | 3/2022 | Koga et al. | |
| 2022/0205220 A1 | 6/2022 | Greenwell et al. | |
| 2023/0150584 A1 | 5/2023 | Zeamer et al. | |
| 2023/0312021 A1 | 10/2023 | Lemke et al. | |
| 2023/0313588 A1 | 10/2023 | Lemke et al. | |
| 2023/0415555 A1 | 12/2023 | Murphy et al. | |

* cited by examiner

4600

4602
Attach epto components to support structure to form an epto pod

4604
Insert epto pod into an interior cavity of a body assembly

4606
Couple the epto pod to the body assembly

5000

5005
Vehicle Control System

5010
Processing Circuit

5015
Processor

5020
Memory

5025
Interface

10
Vehicle

5035
Component Assembly

5030
Network

5040
Display Device

5045
Remote Database

8800

8802

Provide a chassis including an axle mount and battery mount

8804

Couple a rear axle with the axle mount

8806

Couple a wheel and tire assembly with the rear axle

8808

Couple a battery pack with the battery mount

VEHICLE WITH POWER DISTRIBUTION UNIT

CROSS-REFERENCE TO RELATED PATENT APPLICATIONS

This application (a) claims the benefit of and priority to (i) U.S. Provisional Application No. 63/616,345, filed on Dec. 29, 2023, (ii) U.S. Provisional Application No. 63/616,354, filed on Dec. 29, 2023, (iii) U.S. Provisional Application No. 63/616,364, filed on Dec. 29, 2023, (iv) U.S. Provisional Application No. 63/616,237, filed on Dec. 29, 2023, (v) U.S. Provisional Application No. 63/615,906, filed on Dec. 29, 2023, (vi) U.S. Provisional Application No. 63/616,245, filed on Dec. 29, 2023, (vii) U.S. Provisional Application No. 63/615,910, filed on Dec. 29, 2023, (viii) U.S. Provisional Application No. 63/615,870, filed on Dec. 29, 2023, (ix) U.S. Provisional Application No. 63/615,950, filed on Dec. 29, 2023, (x) U.S. Provisional Application No. 63/616,048, filed on Dec. 29, 2023, (xi) U.S. Provisional Application No. 63/616,137, filed on Dec. 29, 2023, and (xii) U.S. Provisional Application No. 63/616,058, filed on Dec. 29, 2023, and (b) is related to (i) U.S. patent application Ser. No. 19/003,049, filed Dec. 26, 2024, (ii) U.S. patent application Ser. No. 19/003,064, filed Dec. 26, 2024, (iii) U.S. patent application Ser. No. 19/003,096, filed Dec. 26, 2024, (iv) U.S. patent application Ser. No. 19/003,012, filed Dec. 26, 2024, (v) U.S. patent application Ser. No. 19/003,144, filed Dec. 26, 2024, (vi) U.S. patent application Ser. No. 19/004,153, filed Dec. 26, 2024, (vii) U.S. patent application Ser. No. 19/004,154, filed Dec. 26, 2024, (viii) U.S. patent application Ser. No. 19/003,342, filed Dec. 26, 2024, (ix) U.S. patent application Ser. No. 19/003,354, filed Dec. 26, 2024, (x) U.S. patent application Ser. No. 19/003,028, filed Dec. 26, 2024, (xi) U.S. patent application Ser. No. 19/003,247, filed Dec. 26, 2024, and (xii) U.S. patent application Ser. No. 19/003,813, filed Dec. 26, 2024, the entire disclosures of which are hereby incorporated by reference herein.

BACKGROUND

The present disclosure relates generally to vehicles. More specifically, the present disclosure relates to vehicles including electrical energy systems. An electrical energy system may include one or more batteries that supply electrical energy to power one or more motors (e.g., to propel the vehicle). The components of the electrical energy system may be electrically coupled to one another through one or more cables that extend throughout the vehicle and one or more electrical components.

SUMMARY

At least one embodiment relates to a vehicle. The vehicle includes a chassis, a tractive element coupled to the chassis, a cab coupled to the chassis and configured to support an operator, a body coupled to the chassis and offset longitudinally rearward from the cab, such that a volume is defined between the cab and the body, an electric motor configured to drive the tractive element to propel the vehicle, a secondary electrical load, a battery configured to supply electrical energy, and a power distribution unit configured to direct the electrical energy from the battery to the electric motor and the secondary electrical load. The power distribution unit is positioned in the volume defined between the cab and the body.

Another embodiment relates to a refuse vehicle. The refuse vehicle includes a chassis including a pair of frame rails each extending parallel to a longitudinal centerline of the refuse vehicle, a tractive element coupled to the chassis, a cab coupled to the chassis, a body coupled to the chassis and offset longitudinally rearward from the cab, such that a storage volume is defined between the cab and the body, an electric motor positioned between the frame rails and configured to drive the tractive element to propel the refuse vehicle, a secondary electrical load, a battery positioned between the frame rails and configured to supply electrical energy, and a power distribution unit intersected by the longitudinal centerline and configured to direct the electrical energy from the battery to the electric motor and the secondary electrical load. The body defines a refuse compartment configured to contain a volume of refuse. The power distribution unit is positioned in the storage volume defined between the cab and the body.

Another embodiment relates to a vehicle. The vehicle includes a chassis including a pair of frame rails extending longitudinally, a tractive element coupled to the chassis, a cab coupled to the chassis and configured to support an operator, a body coupled to the chassis and offset longitudinally rearward from the cab, a first electric motor configured to drive the tractive element to propel the vehicle, a secondary electrical load including at least one of a second electric motor, a power converter, or a heater, a first battery positioned between the frame rails, a second battery positioned outside of the frame rails, a housing containing the first battery and the second battery and coupling the first battery and the second battery to the chassis, a power distribution unit configured to direct electrical energy from the first battery and the second battery to the first electric motor and the secondary electrical load, an inverter electrically coupled to the power distribution unit and the first electric motor, and a cowl extending between the body and the cab and positioned above the power distribution unit. The power distribution unit is positioned forward of the body and rearward of the cab and extends laterally between the frame rails. The inverter extends laterally between the frame rails. The inverter is positioned forward of the first electric motor and rearward of the power distribution unit.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
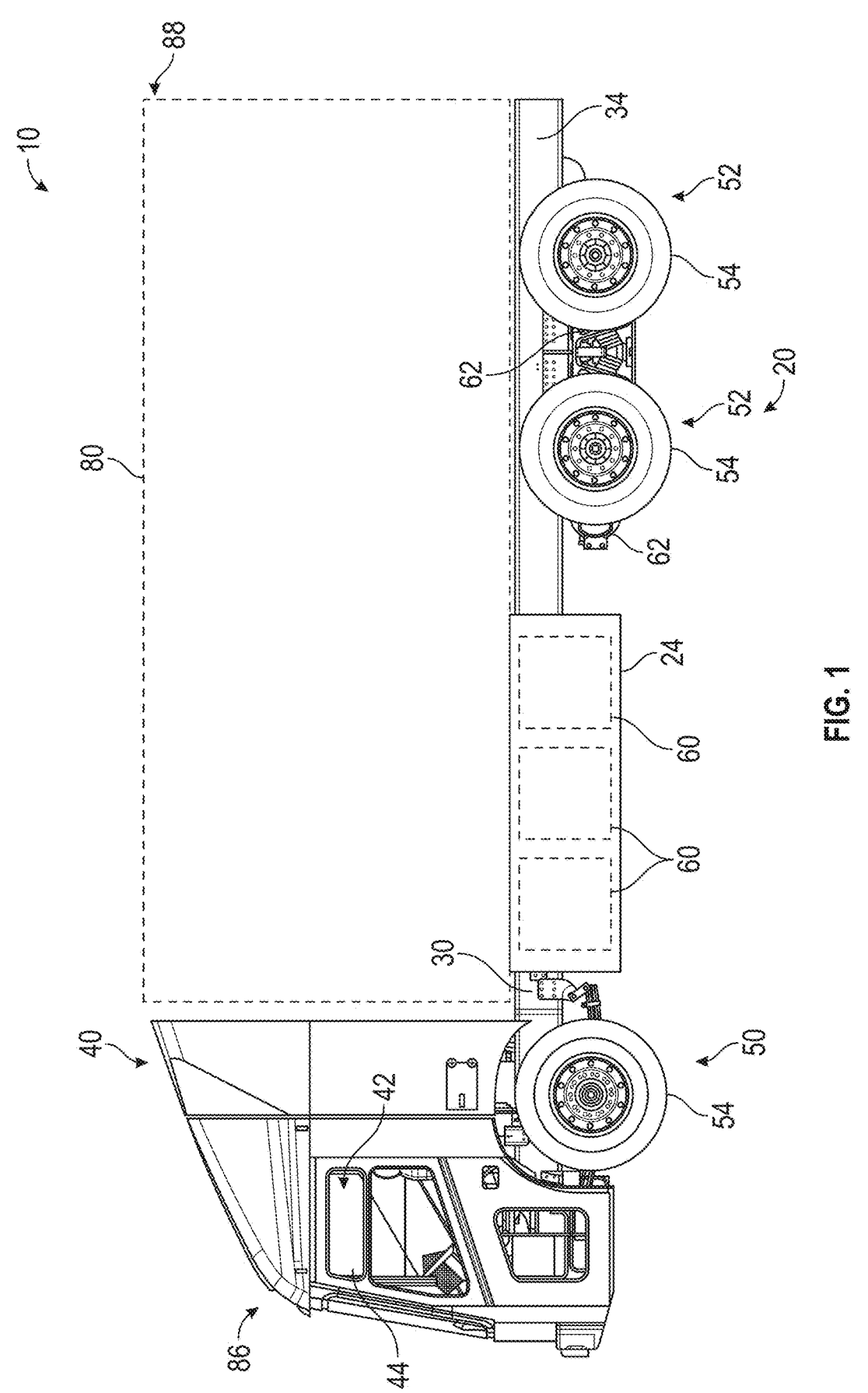
FIG. 1 is a left side view of a vehicle, according to an exemplary embodiment.
Figure 2:
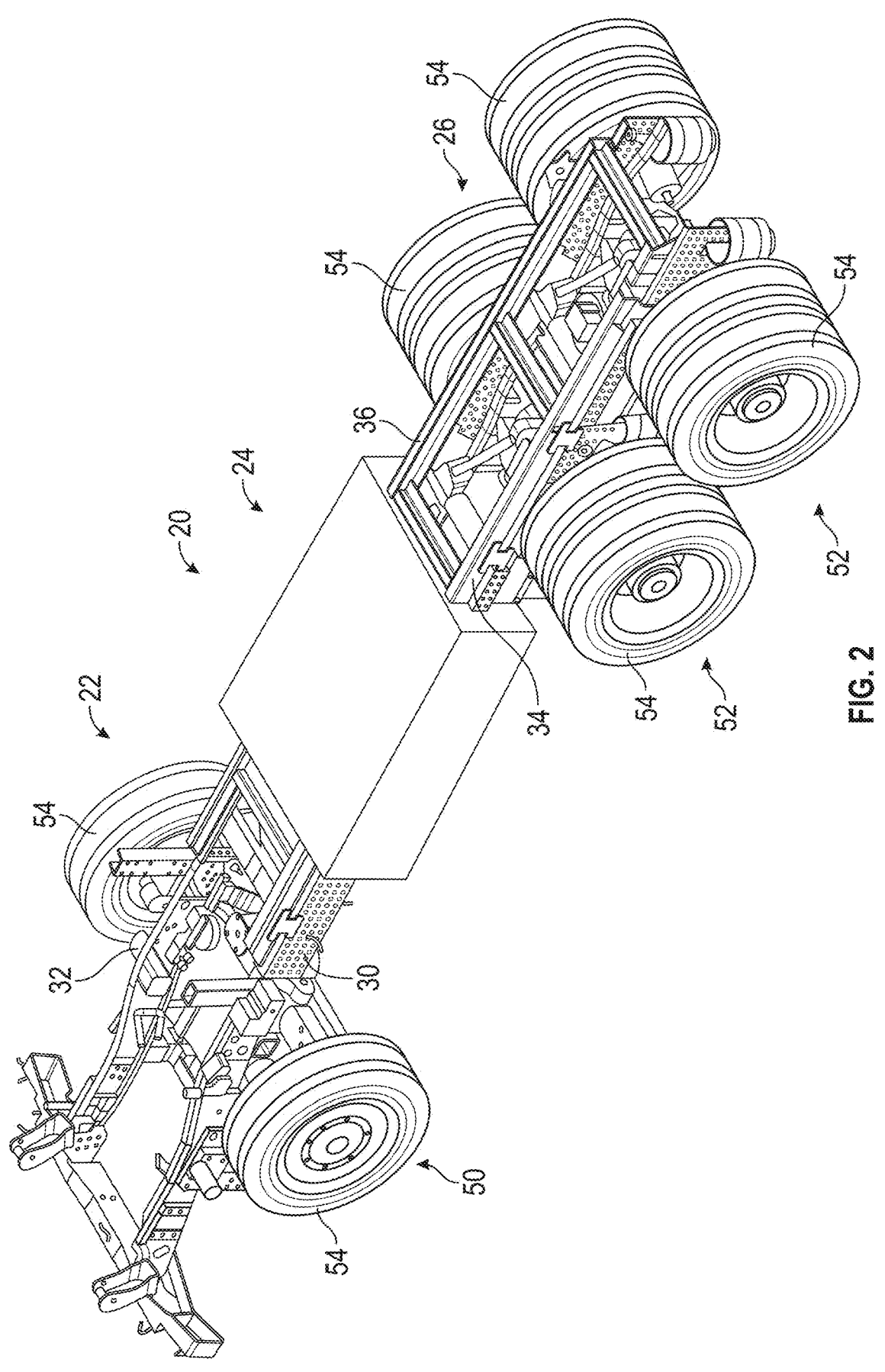
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
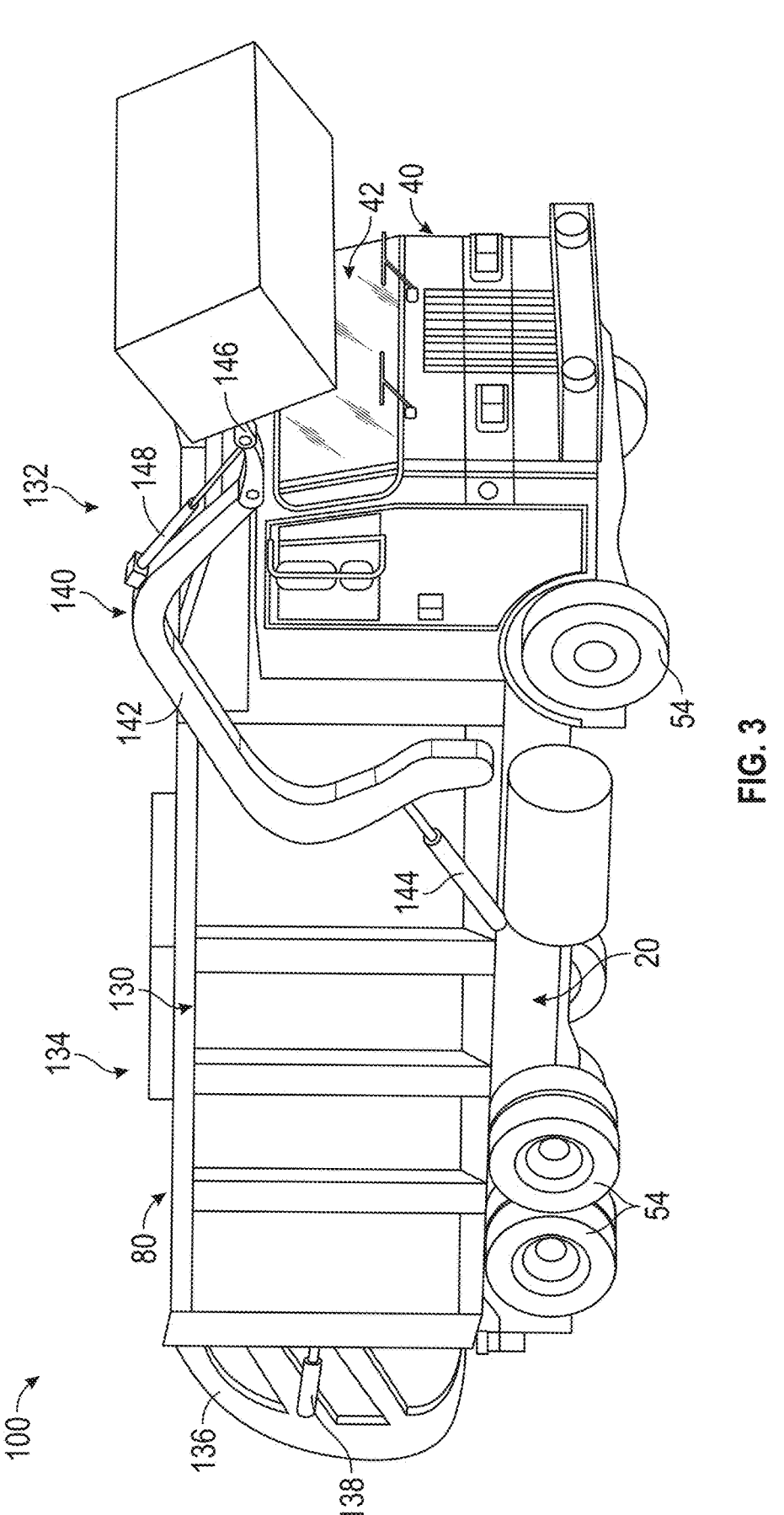
FIG. 3 is a perspective view of the vehicle of FIG. 1 configured as a front-loading refuse vehicle, according to an exemplary embodiment.
Figure 4:
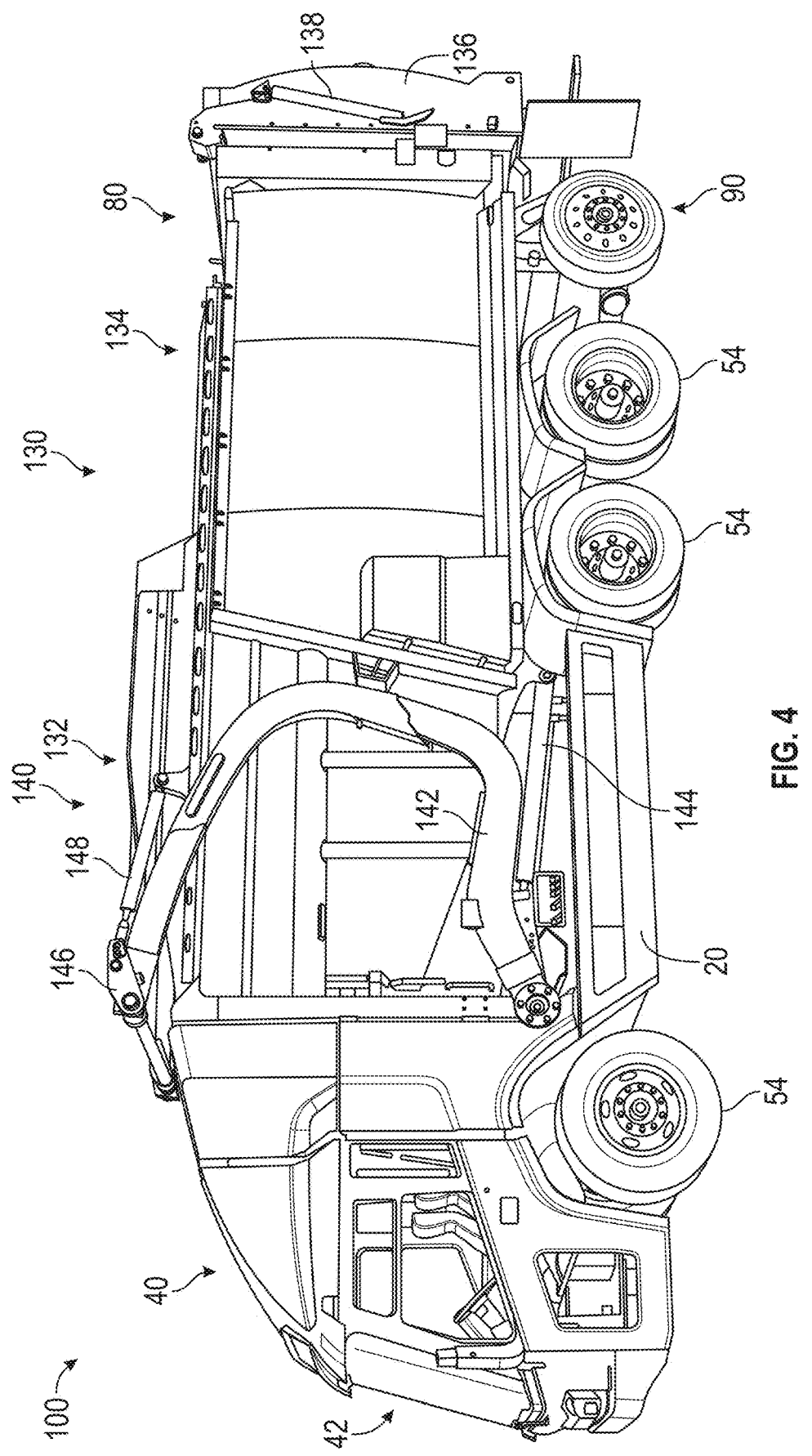
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
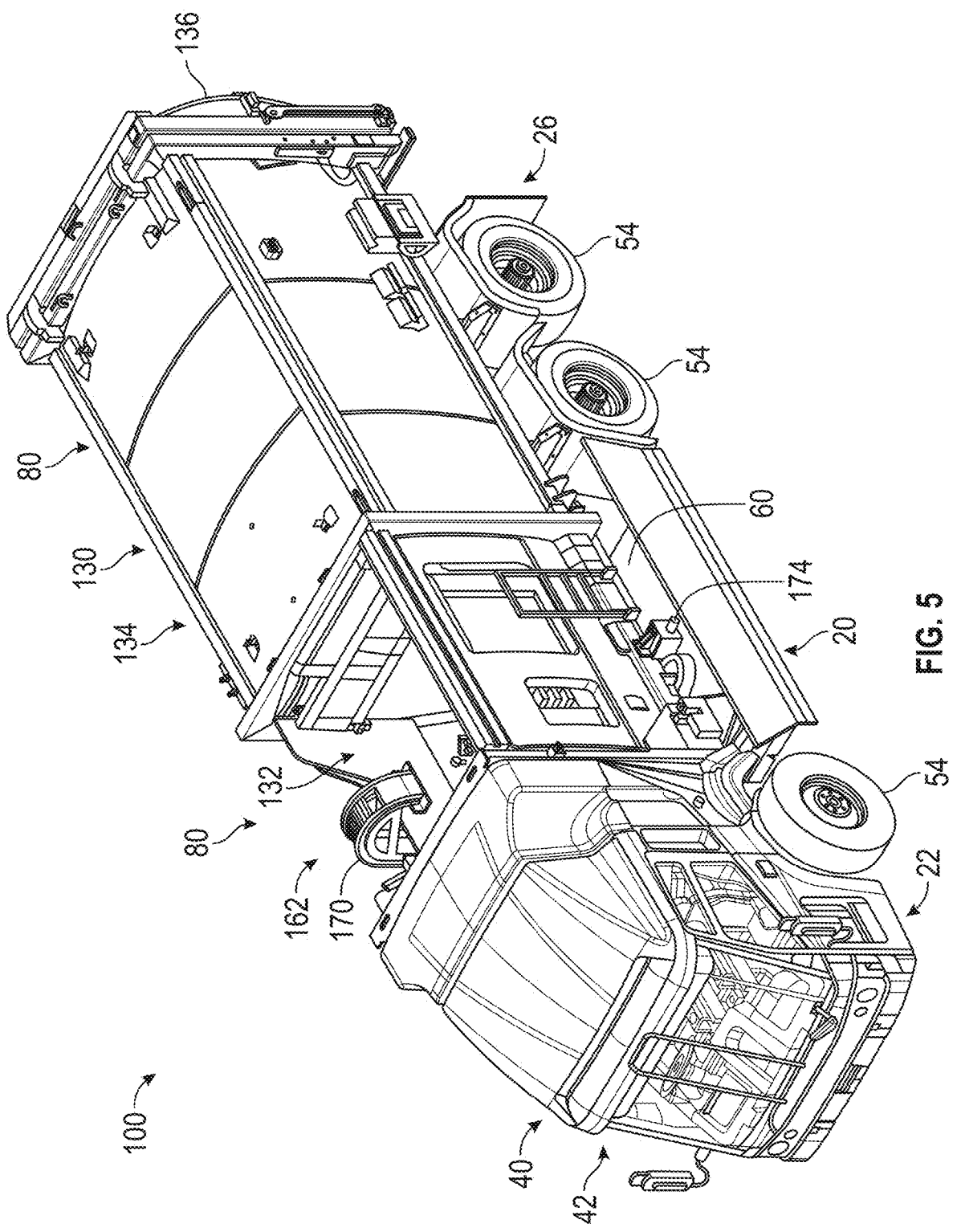
FIG. 5 is a perspective view of the vehicle of FIG. 1 configured as a side-loading refuse vehicle, according to an exemplary embodiment.
Figure 6:
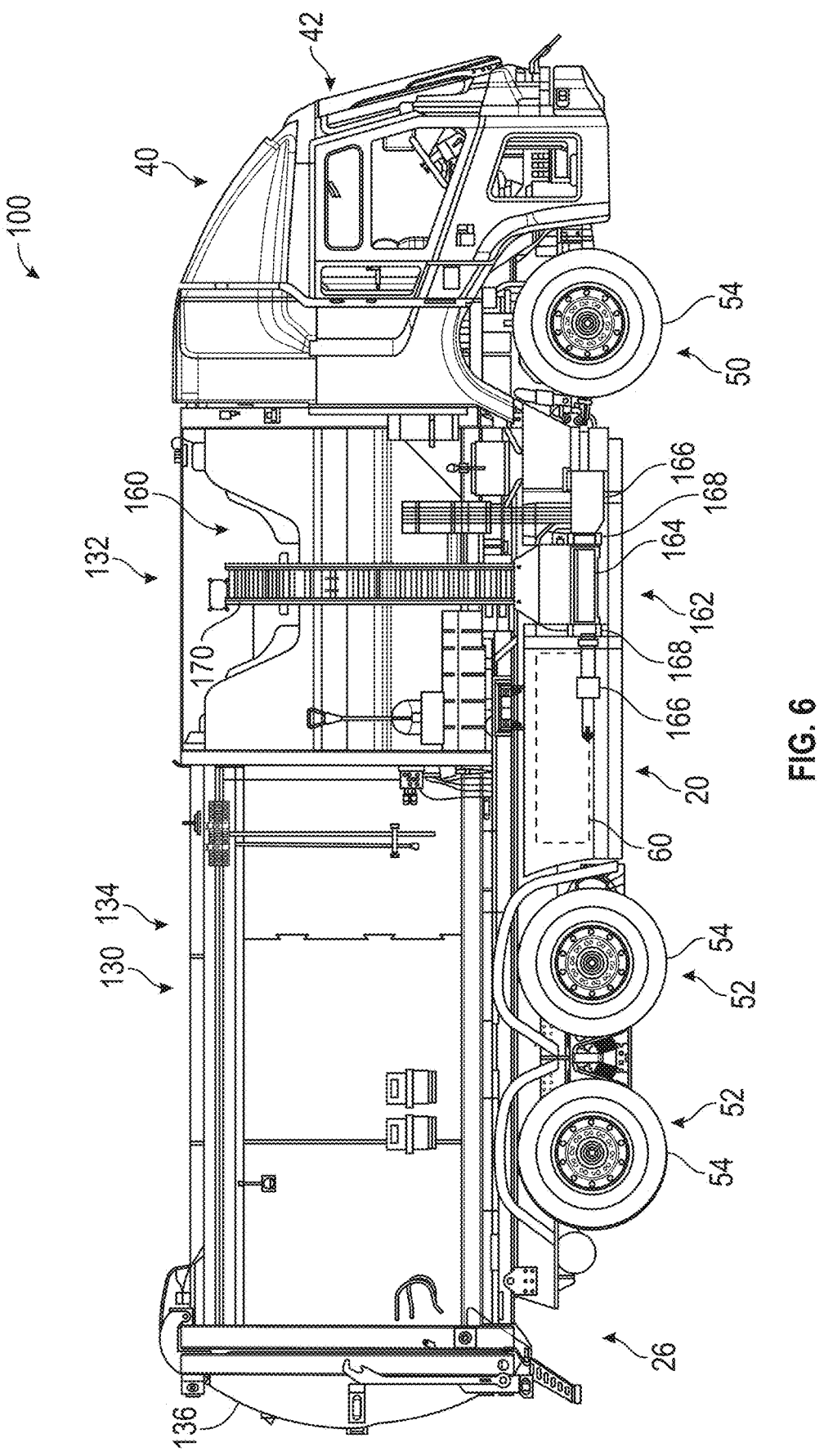
FIG. 6 is a right side view of the side-loading refuse vehicle of FIG. 5.
Figure 7:
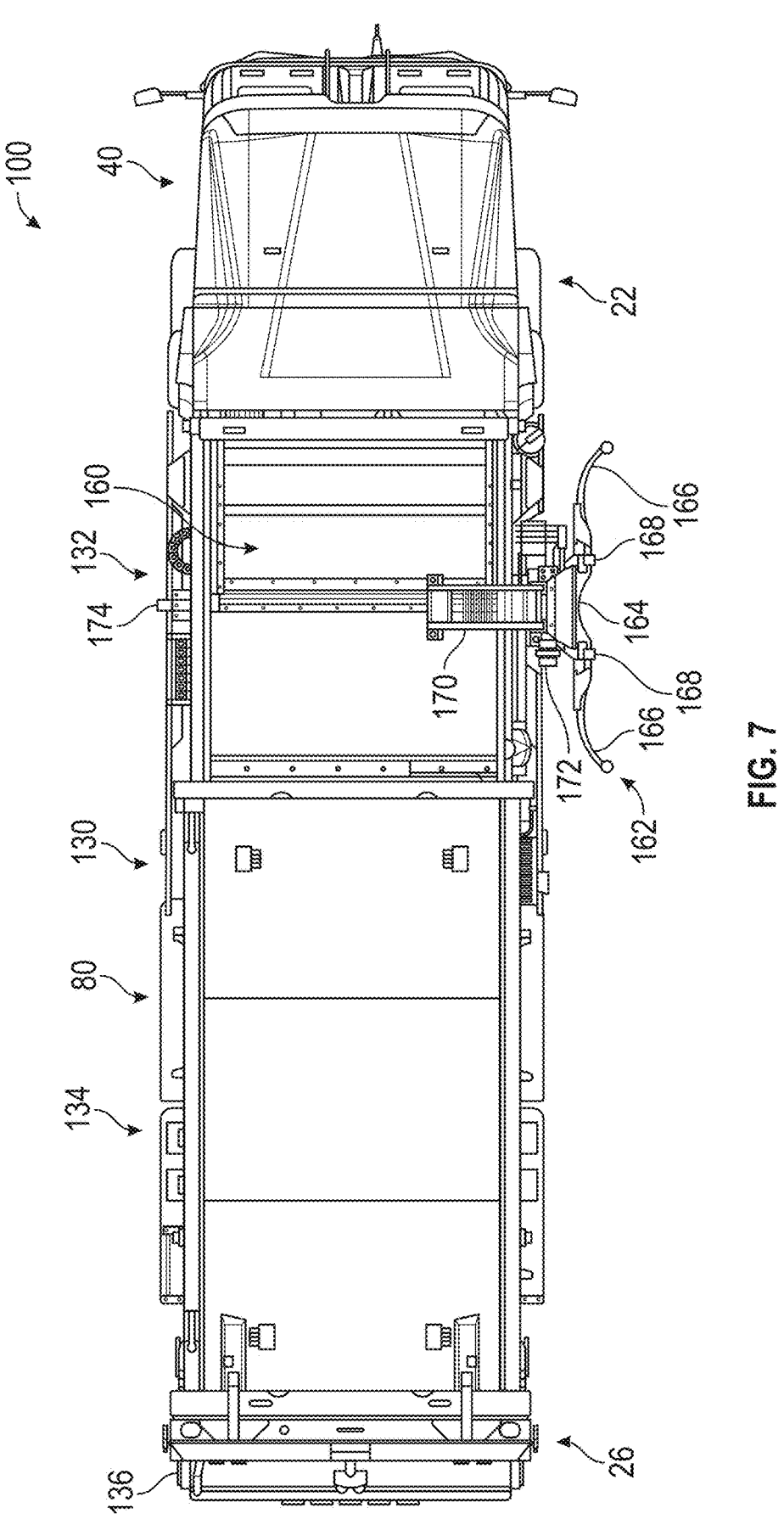
FIG. 7 is a top view of the side-loading refuse vehicle of FIG. 5.
Figure 8:
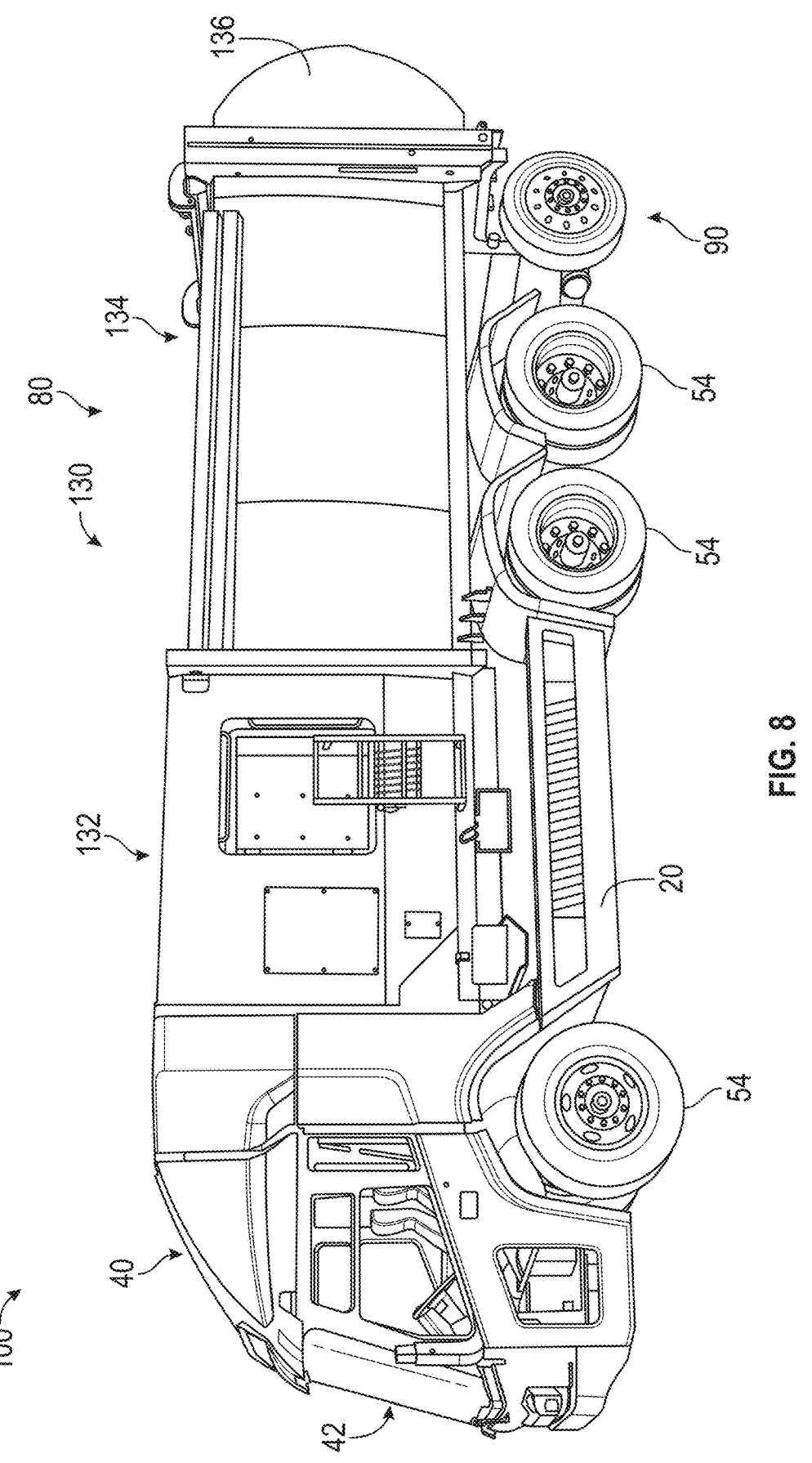
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
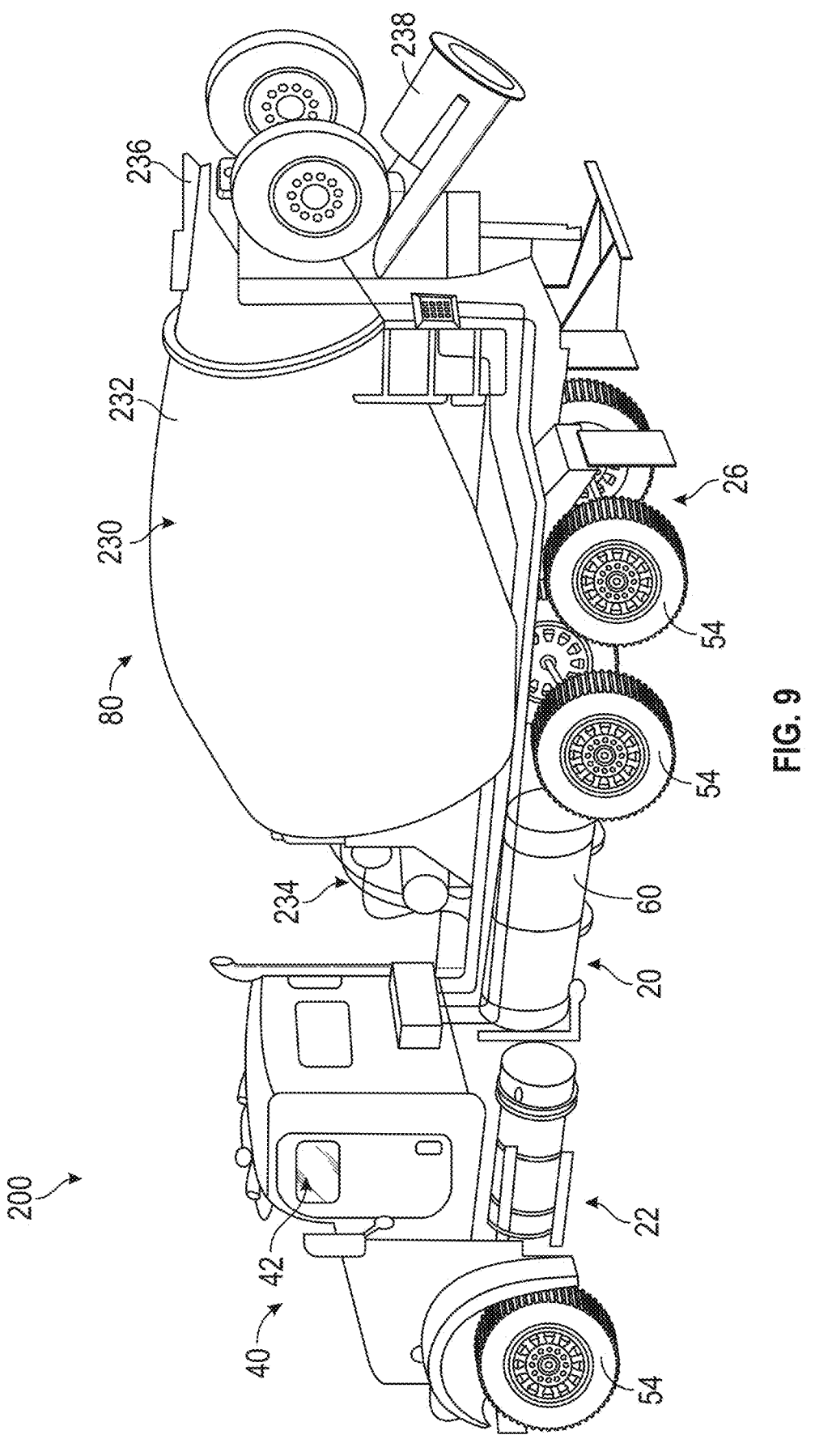
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plan extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
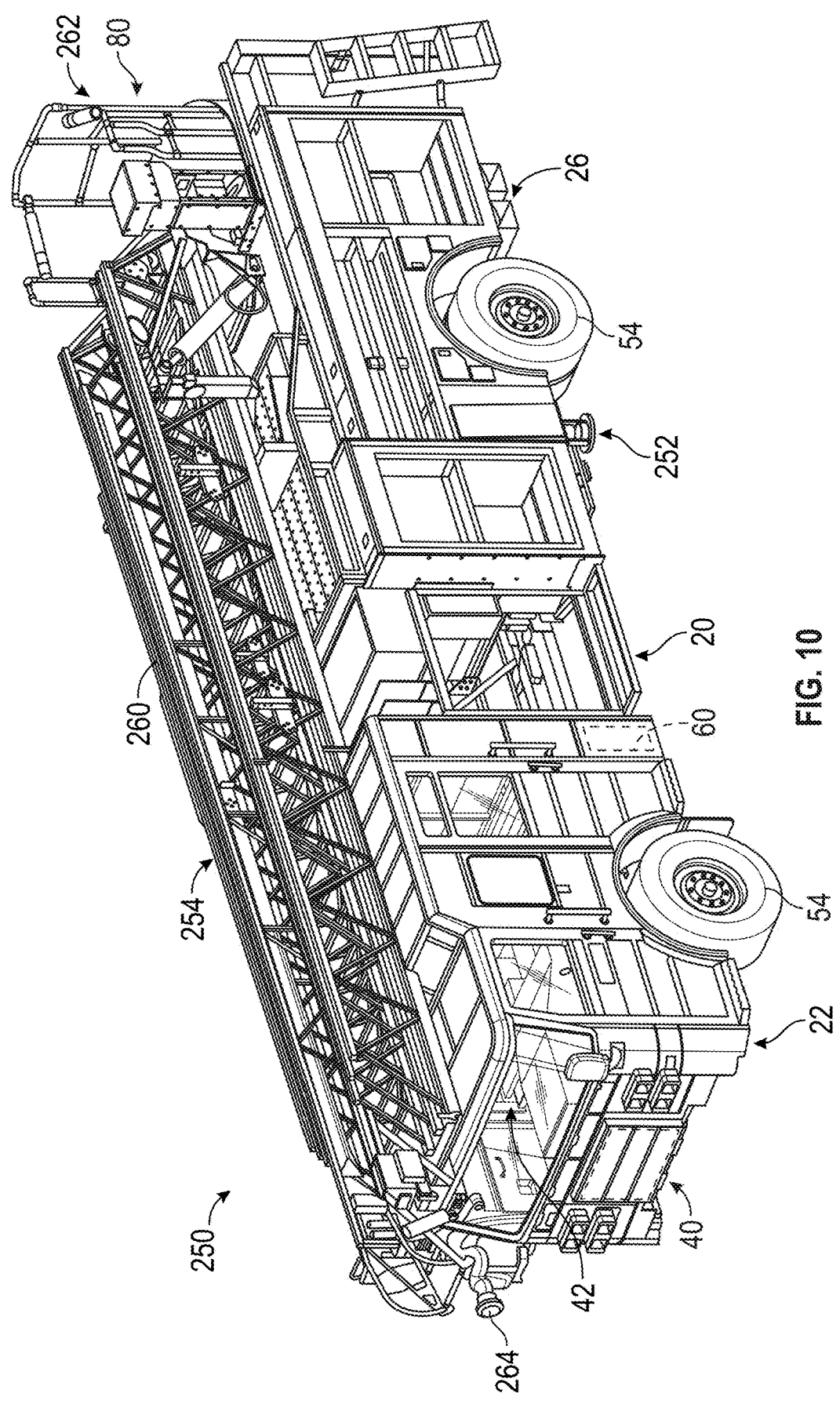
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
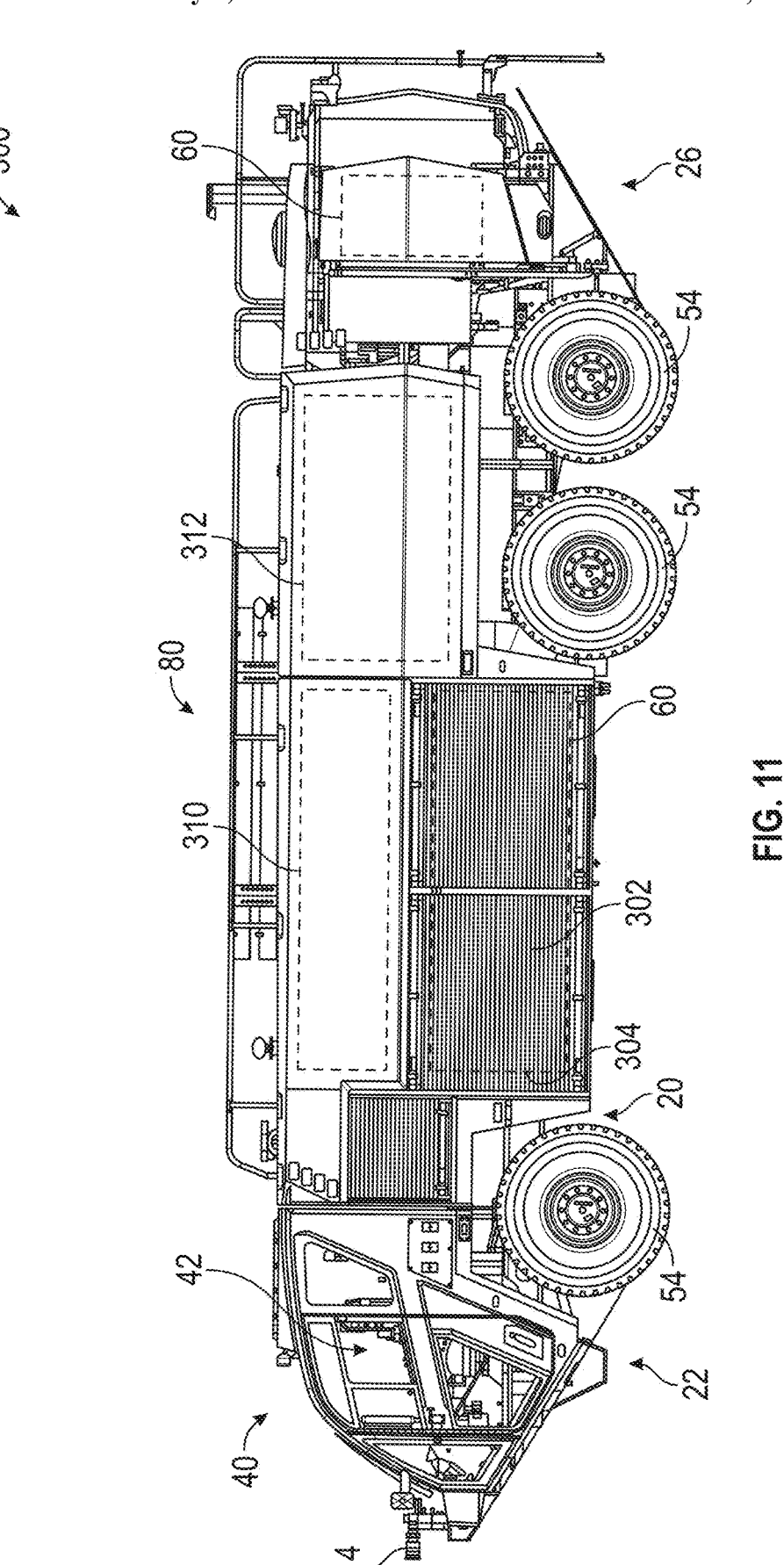
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
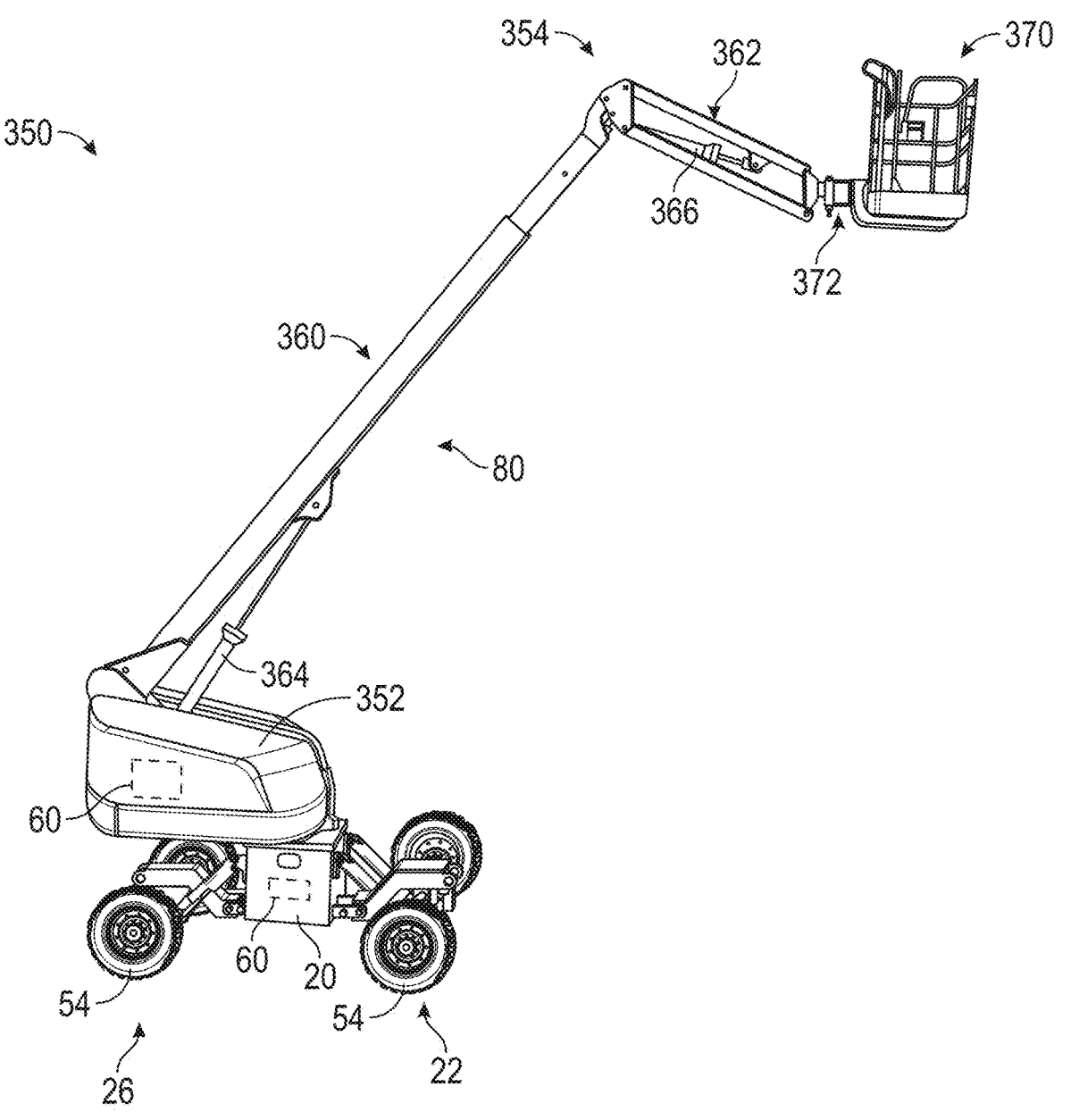
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
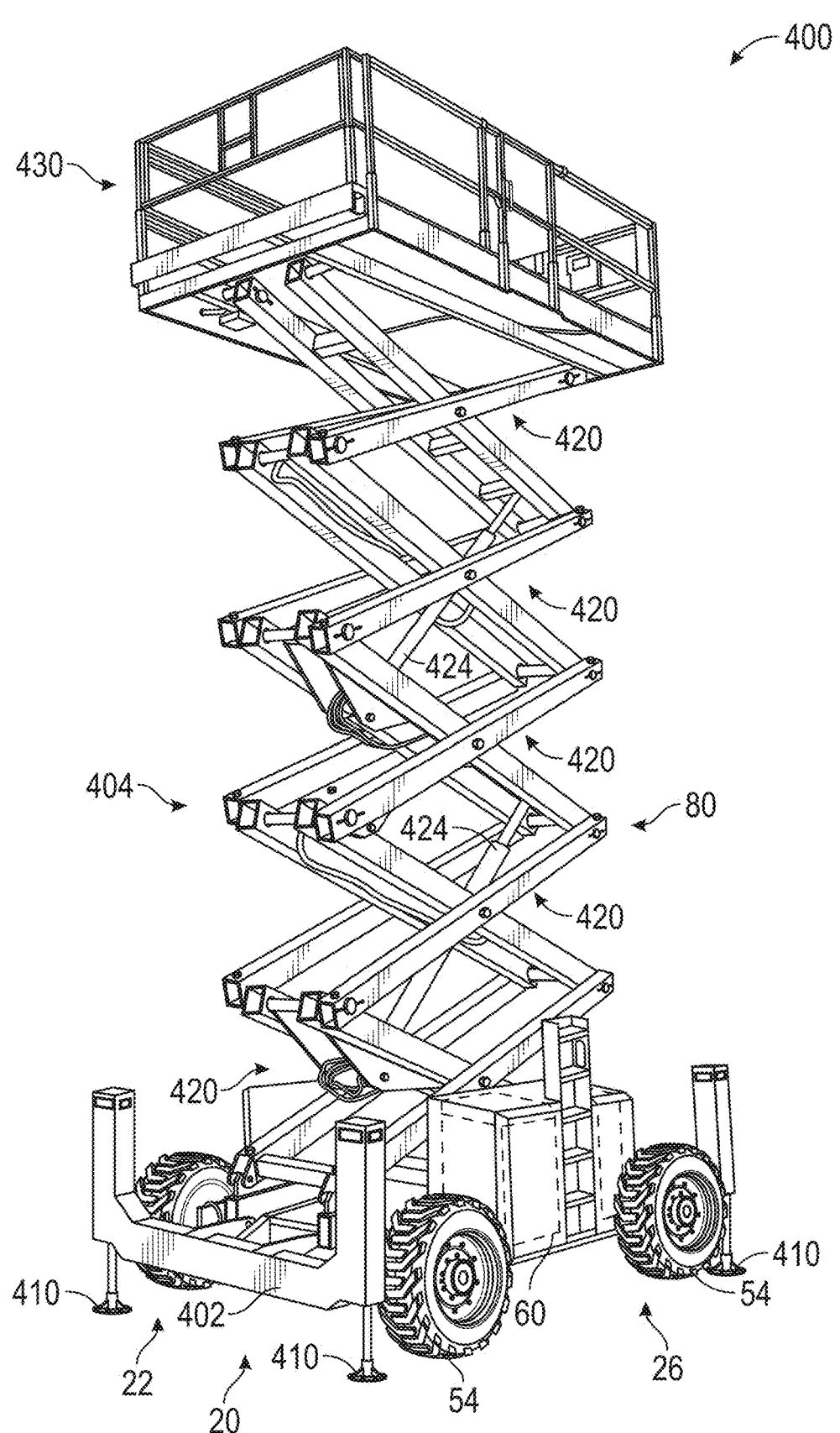
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Electrical System

Figure 14:
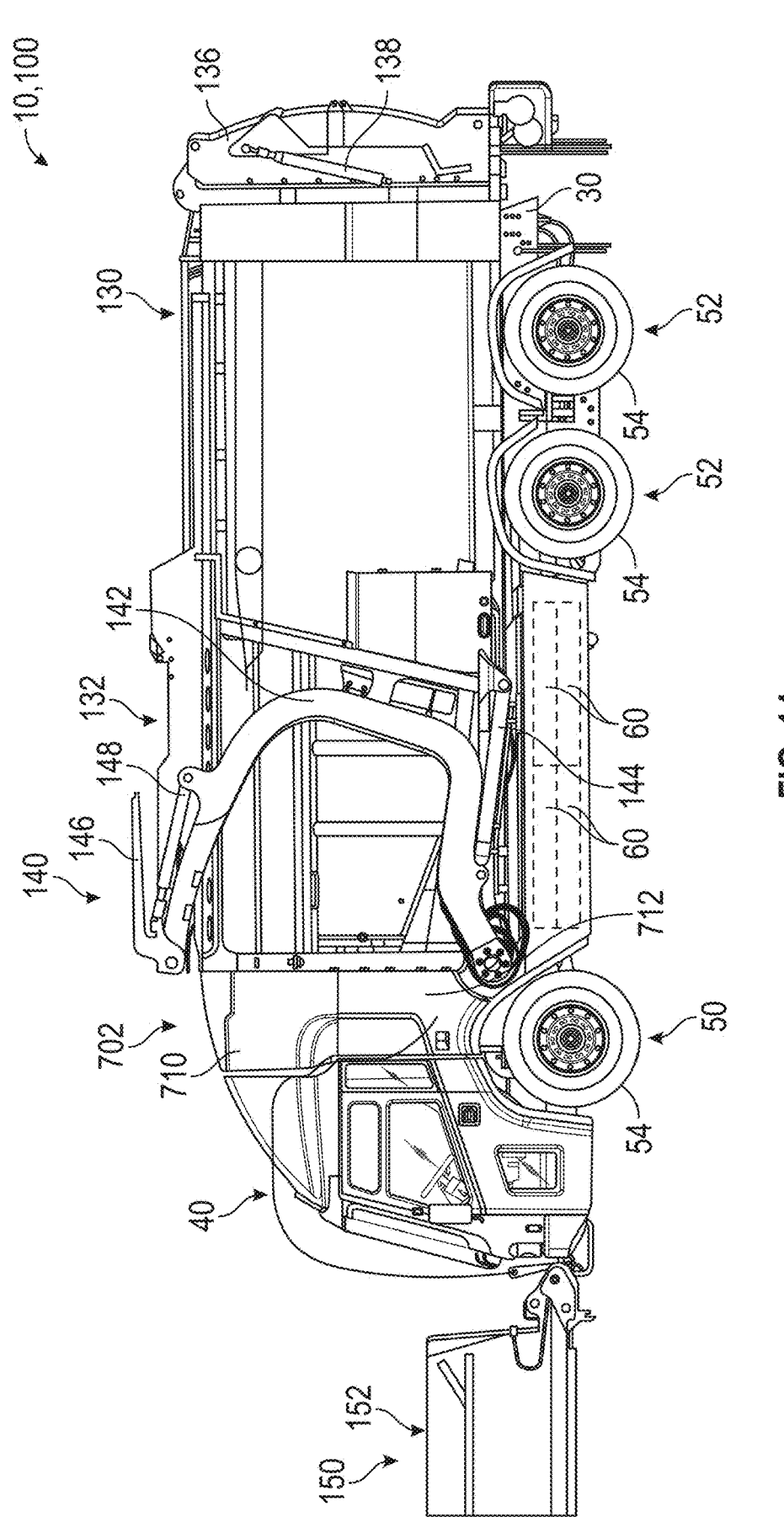
FIG. 14 is a right side view of the vehicle of FIG. 1 configured as a front-loading refuse vehicle.
Figure 15:
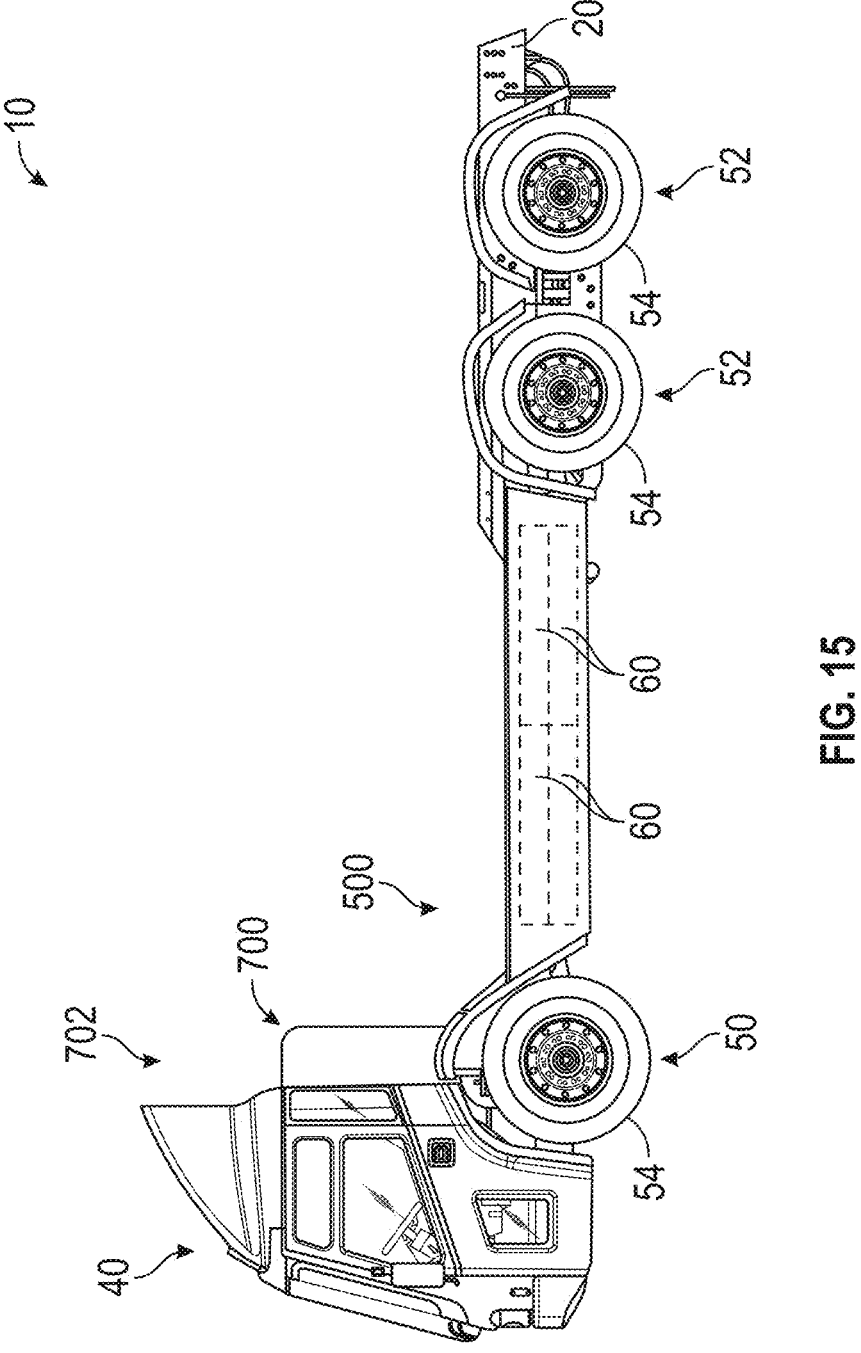
FIG. 15 is a right side view of the front-loading refuse vehicle of FIG. 14.

Referring to FIGS. 14 and 15, the vehicle 10 is shown according to an exemplary embodiment. The vehicle 10 is configured as the refuse vehicle 100, and more specifically a front-loading refuse vehicle 100. Accordingly, any description with respect to the refuse vehicle 100 of FIG. 4 may also apply to the vehicle 10 of FIGS. 14 and 15, except as otherwise specified herein. In FIG. 14, the application kit 80 includes the refuse compartment 130, the tailgate 136, and the lift assembly 140. The vehicle 10 further includes an intermediate refuse collection assembly, shown as carry can 150. In FIG. 15, the application kit 80 and the carry can 150 are omitted. The vehicle 10 of FIG. 15 may be configured as any of the vehicle 10 configurations shown and described herein (e.g., the side-loading refuse vehicle 100, a rear-loading refuse vehicle 100, the mixer truck 200, the fire fighting vehicle 250, the ARFF truck 300, the boom lift 350, the scissor lift 400, etc.).

The carry can 150 defines a refuse compartment 152 that is configured to contain a volume of refuse. The refuse compartment 152 may be used to temporarily store the refuse while multiple refuse containers (e.g., residential cans) are emptied into the refuse compartment 152. The carry can 150 may include one or more actuators (e.g., hydraulic cylinders, electric motors, etc.) that control a refuse collection assembly (e.g., an arm, a tipper, etc.) that empties the refuse containers into the refuse compartment 152. Once filled, the lift assembly 140 may lift the carry can 150 to empty the refuse into the refuse compartment 130. The carry can 150 may be supported by the lift assembly 140. In other embodiments, the carry can 150 is removed or omitted entirely.

Figure 16:
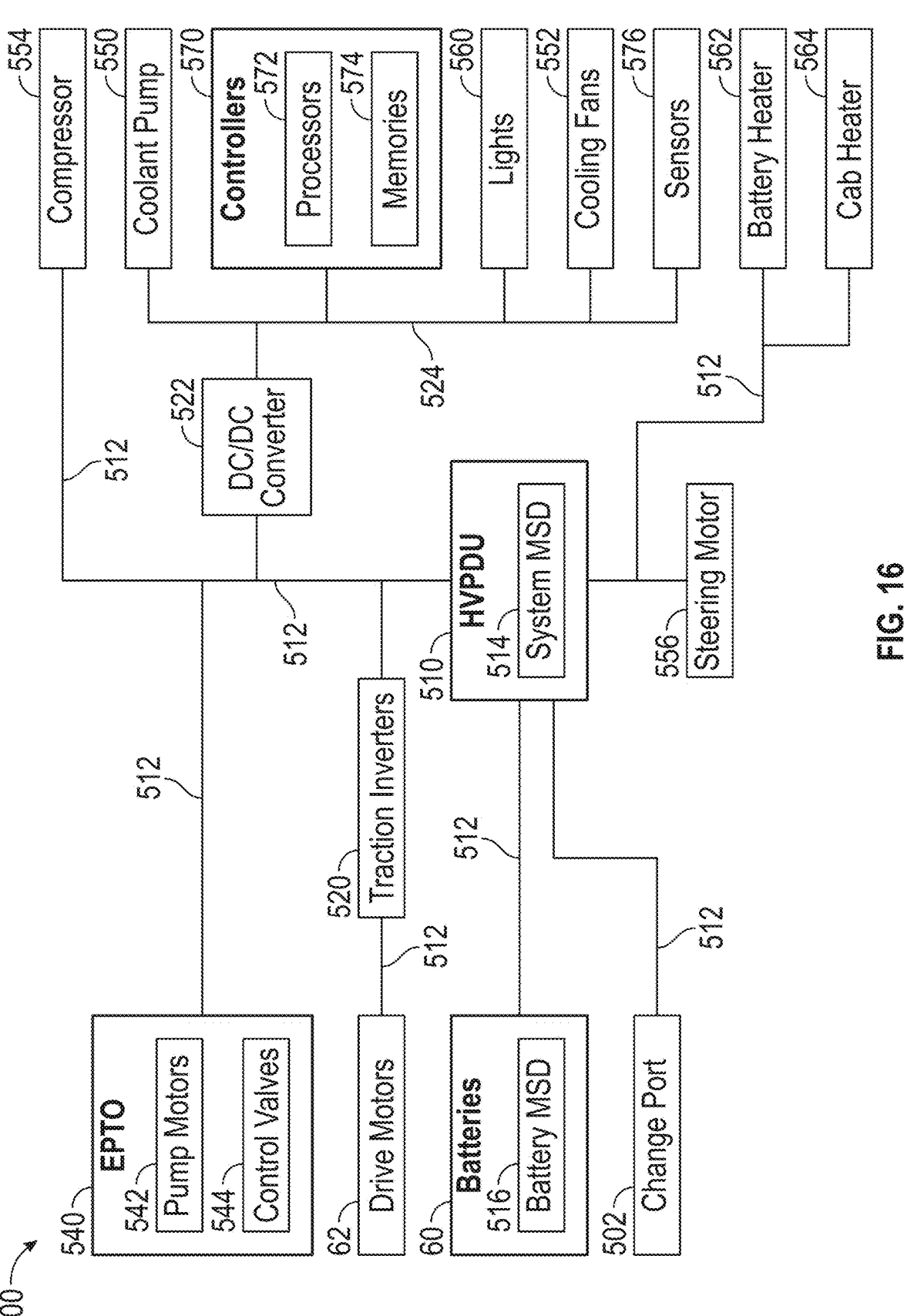
FIG. 16 is a block diagram of an electrical system of the front-loading refuse vehicle of FIG. 14, according to an exemplary embodiment.
Figure 17:
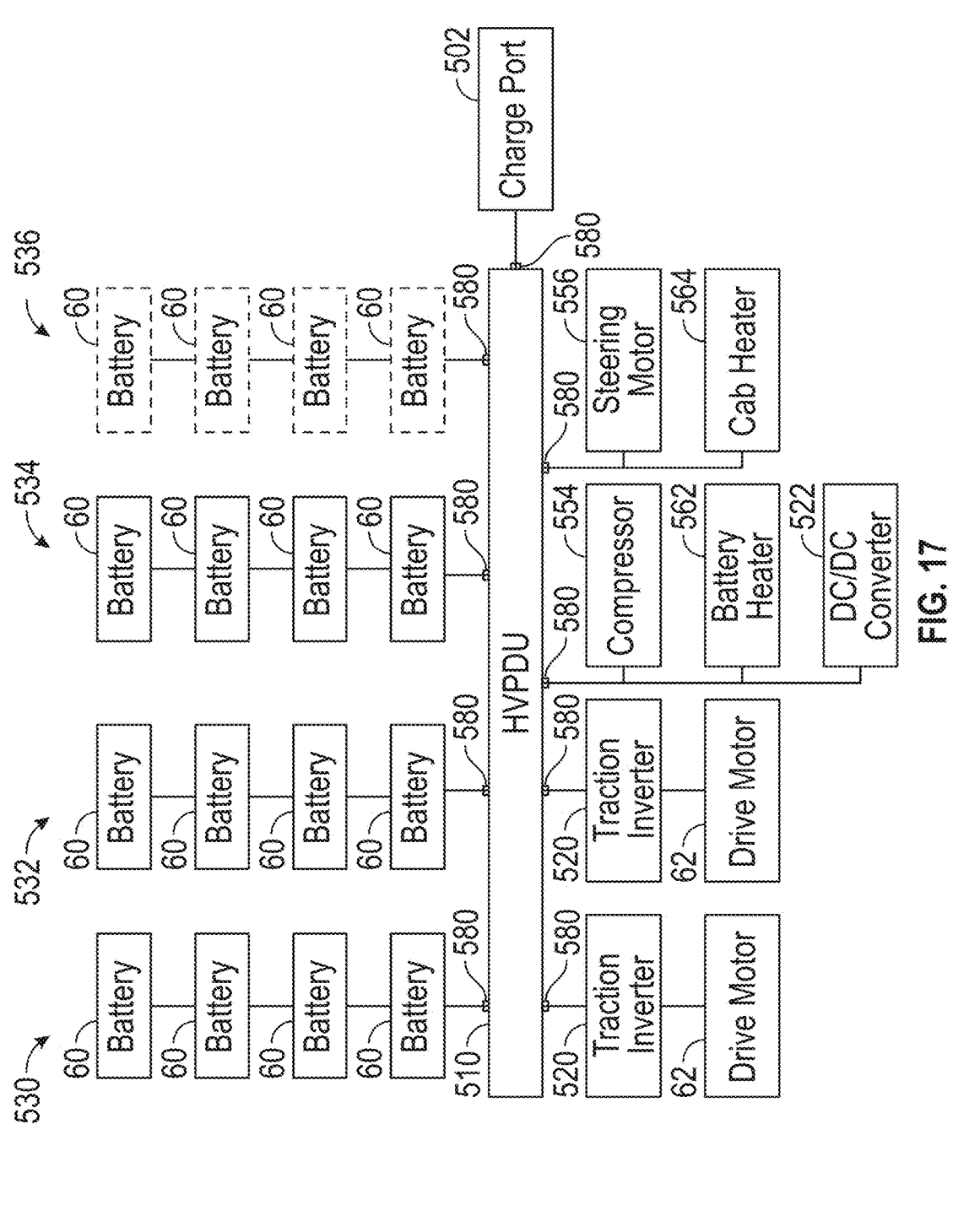
FIG. 17 is a block diagram of the electrical system of FIG. 16.

Referring to FIGS. 16 and 17, the vehicle 10 includes an electrical energy system or power distribution system, shown as electrical system 500. The electrical system 500 is configured to deliver electrical energy throughout the vehicle 10. The electrical energy delivered by the electrical system 500 may be provided by the batteries 60. Additionally or alternatively, the electrical energy delivered by the power distribution system 500 may be provided by a shore power inlet, shown as charge port 502. The charge port 502 may be selectively electrically coupled to an external energy source (e.g., a power grid, a generator, a charging station, etc.) to deliver electrical energy to the vehicle 10 to charge the batteries 60 and/or directly power one or more components of the vehicle 10.

The electrical system 500 includes a power distribution device, shown as high-voltage power distribution unit (HVPDU) 510. The HVPDU 510 is configured to control the distribution of high-voltage (e.g., 400V) electrical energy throughout the vehicle 10. The HVPDU 510 is electrically coupled to high-voltage components of the power distribution system 500 through one or more cables or wires, shown as high-voltage cables 512. The high-voltage cables 512 electrically couple the HVPDU 510 to the batteries 60, the charge port 502, and the drive motors 62. The HVPDU 510 transfers electrical energy from energy sources (e.g., the batteries 60, the charge port 502, etc.) to energy consumers (e.g., the drive motors 62, etc.). The HVPDU 510 may direct electrical energy from the charge port 502 to the batteries 60 to charge the batteries 60.

The HVPDU 510 includes a switch, contactor, or power disconnect, shown as system manual service disconnect (MSD) 514. The system MSD 514 selectively electrically couples the batteries 60 and the charge port 502 to the energy consumers downstream of the HVPDU 510. When disengaged, the system MSD 514 electrically isolates the charge port 502 and the batteries 60 from the downstream energy consumers.

Each battery 60 includes a switch, contactor, or power disconnect, shown as battery manual service disconnect (MSD) 516. The battery MSD 516 selectively electrically couples the corresponding battery 60 with the HVPDU 510. When disengaged, the battery MSD 516 electrically isolates the corresponding battery 60 from the rest of the electrical system 500.

Referring to FIG. 17, the batteries 60 are arranged to form battery subassemblies or battery strings, shown as string 530, string 532, string 534, and string 536. As shown, each string includes four batteries arranged in series, such that the total voltage of the string is the sum of the voltages of the batteries 60 within the string. The strings may be connected in parallel by the HVPDU 510. Accordingly, the addition of multiple strings may increase the available battery capacity (e.g., and the corresponding runtime) without varying the output voltage of the HVPDU 510. In some embodiments, the string 536 is removable from the vehicle 10. By way of example, the string 536 may be available as an extended range option for increasing the available operating time of the vehicle 10. A customer or other individual configuring the vehicle 10 may choose to equip the vehicle 10 with the string 536 or omit the string 536 to reduce cost and the weight of the vehicle 10. Accordingly, the vehicle 10 may operate with or without the string 536.

Referring again to FIG. 16, the HVPDU 510 is electrically coupled to the drive motors 62 by one or more power electronics or power conversion devices, shown as traction inverters 520. The traction inverters 520 may be configured to convert direct current (DC) electrical energy from the HVPDU 510 to alternating current (AC) electrical energy. The traction inverters 520 may facilitate the use of AC electrical motors as the drive motors 62.

The batteries 60, the drive motors 62, the charge port 502, and the HVPDU 510 may at least partially form a high voltage portion of the electrical system 500. A power conversion device or power conditioner, shown as DC/DC converter 522 is configured to receive high voltage electrical energy from the HVPDU 510 and provide electrical energy at a low voltage to a low voltage portion of the electrical system 500. By way of example, the low voltage portion of the electrical system 500 may operate on 24V DC electrical energy. The low voltage electrical energy may be distributed through one or more cables or wires, shown as low-voltage cables 524. In some embodiments, components shown as being part of the low voltage portion of the electrical system 500 are instead part of the high voltage portion. In some embodiments, components shown as being part of the high voltage portion of the electrical system 500 are instead part of the low voltage portion.

The electrical system 500 includes a power take off system, shown as electrical power take off (EPTO) 540. As shown, the EPTO 540 is part of the high voltage portion of the electrical system (e.g., may operate on electrical energy at the voltage delivered by the batteries 60, may operate at 400V, etc.). The EPTO 540 is configured to receive electrical energy and provide a mechanical energy output. Specifically, the EPTO 540 is configured to provide one or more flows of pressurized hydraulic fluid to power one or more actuators of the vehicle 10 (e.g., the tailgate actuators 138, the lift arm actuators 144, the articulation actuators 148, etc.). The EPTO 540 may include one or more hydraulic pumps that are driven by one or more electric motors, shown as pump motors 542, to provide the pressurized hydraulic fluid. The EPTO 540 may include one or more flow control elements, shown as control valves 544, that control the flow of hydraulic fluid (e.g., direction, flow rate, etc.) throughout the vehicle 10.

The electrical system 500 includes an actuator, shown as coolant pump 550. As shown, the coolant pump 550 is part of the low voltage portion of the electrical system 500 (e.g., may operate on 24V electrical energy from the DC/DC converter 522). The coolant pump 550 is configured to receive electrical energy and provide a flow of pressurized fluid, specifically coolant. The coolant pump 550 may circulate coolant (e.g., throughout the cooling system 600).

The electrical system 500 includes one or more electric actuators or electric fans, shown as cooling fans 552. As shown, the cooling fans 552 are part of the low voltage portion of the electrical system 500 (e.g., may operate on 24V electrical energy from the DC/DC converter 522). The cooling fans 552 are each configured to receive electrical energy and drive a flow of air. The cooling fans 552 may circulate air to cool one or more components of the vehicle 10 (e.g., the radiator 610).

The electrical system 500 includes an actuator, shown as compressor 554. As shown, the compressor 554 is part of the high voltage portion of the electrical system (e.g., may operate on electrical energy at the voltage delivered by the batteries 60, may operate at 400V, etc.). The compressor 554 is configured to receive electrical energy and provide a flow of compressed gas. In some embodiments, the compressed gas is compressed air. The compressor 554 may provide the compressed air to a braking system of the vehicle (e.g., to actuate one or more brakes).

The electrical system 500 includes an actuator or electric motor, shown as steering motor 556. As shown, the steering motor 556 is part of the high voltage portion of the electrical system (e.g., may operate on electrical energy at the voltage delivered by the batteries 60, may operate at 400V, etc.). The steering motor 556 is configured to receive electrical energy and provide a mechanical energy output (e.g., a torque, a pressurized fluid, etc.). The steering motor 556 may be configured to steer the vehicle 10 (e.g., by rotating the wheel and tire assemblies 54 of the front axle 50, by providing a flow of pressurized power steering fluid to a hydraulic motor that rotates the wheel and tire assemblies 54, etc.).

The electrical system 500 includes one or more output devices, shown as lights 560. As shown, the lights 560 are part of the low voltage portion of the electrical system 500 (e.g., may operate on 24V electrical energy). The lights 560 are configured to illuminate in response to receiving electrical energy. The lights 560 may be used to illuminate an area (e.g., headlights, fog lights, spotlights, etc.). The lights 560 may be used to convey information to individuals in the surroundings (e.g., turn signals, brake lights, reverse lights, etc.).

The electrical system 500 includes one or more output devices, shown as battery heater 562 and cab heater 564. As shown, the battery heater 562 and the cab heater 564 are part of the high voltage portion of the electrical system (e.g., may operate on electrical energy at the voltage delivered by the batteries 60, may operate at 400V, etc.). The battery heater 562 and the cab heater 564 are configured to provide thermal energy in response to receiving electrical energy. The battery heater 562 is coupled to one or more of the batteries 60 and configured to provide thermal energy to heat the one or more of the batteries 60. The cab heater 564 is coupled to the cab 40 and configured to heat the cab interior 42.

The electrical system 500 includes one or more processing circuits, shown as controllers 570, that receive electrical energy and control operation of one or more systems of the vehicle 10. As shown, the controllers 570 are part of the low voltage portion of the electrical system 500 (e.g., may operate on 24V electrical energy from the DC/DC converter 522). The controllers 570 may include one or more processors 572 and one or more memory devices, shown as memories 574. The memories 574 may contain one or more instructions that, when executed by the processors 572, cause the controllers 570 to perform one or more of the operations described herein.

The electrical system 500 includes one or more input devices, shown as sensors 576, that are powered by electrical energy from the electrical system 500. As shown, the sensors 576 are part of the low voltage portion of the electrical system 500 (e.g., may operate on 24V electrical energy). The sensors 576 may provide sensor data concerning operation of the vehicle 10 to the controllers 570. By way of example, the sensors 576 may include accelerometers, encoders, buttons, switches, potentiometers, load cells, global positioning systems, and/or other types of sensors.

Referring to FIG. 17, an arrangement of the electrical connections between the HVPDU 510 and other components of the electrical system 500 is shown according to an exemplary embodiment. Components are removably and electrically coupled to the HVPDU 510 by a series of electrical connectors 580. Each electrical connector 580 may be removed from the HVPDU 510 to disconnect the corresponding component from the HVPDU 510.

Each of the string 530, the string 532, the string 534, and the string 536 are separately coupled to the HVPDU 510 by a different electrical connector 580. The vehicle 10 includes one or more drive motors 62, and each drive motor 62 is connected to the HVPDU 510 through a traction inverter 520 and an electrical connector 580. The charge port 502 is electrically coupled to the HVPDU 510 through an electrical connector 580. The compressor 554, the battery heater 562, and the DC/DC converter 522 are all electrically connected to the HVPDU 510 through one electrical connector 580. The steering motor 556 and the cab heater 564 are electrically coupled to the HVPDU 510 through one electrical connector 580.

Figure 18:
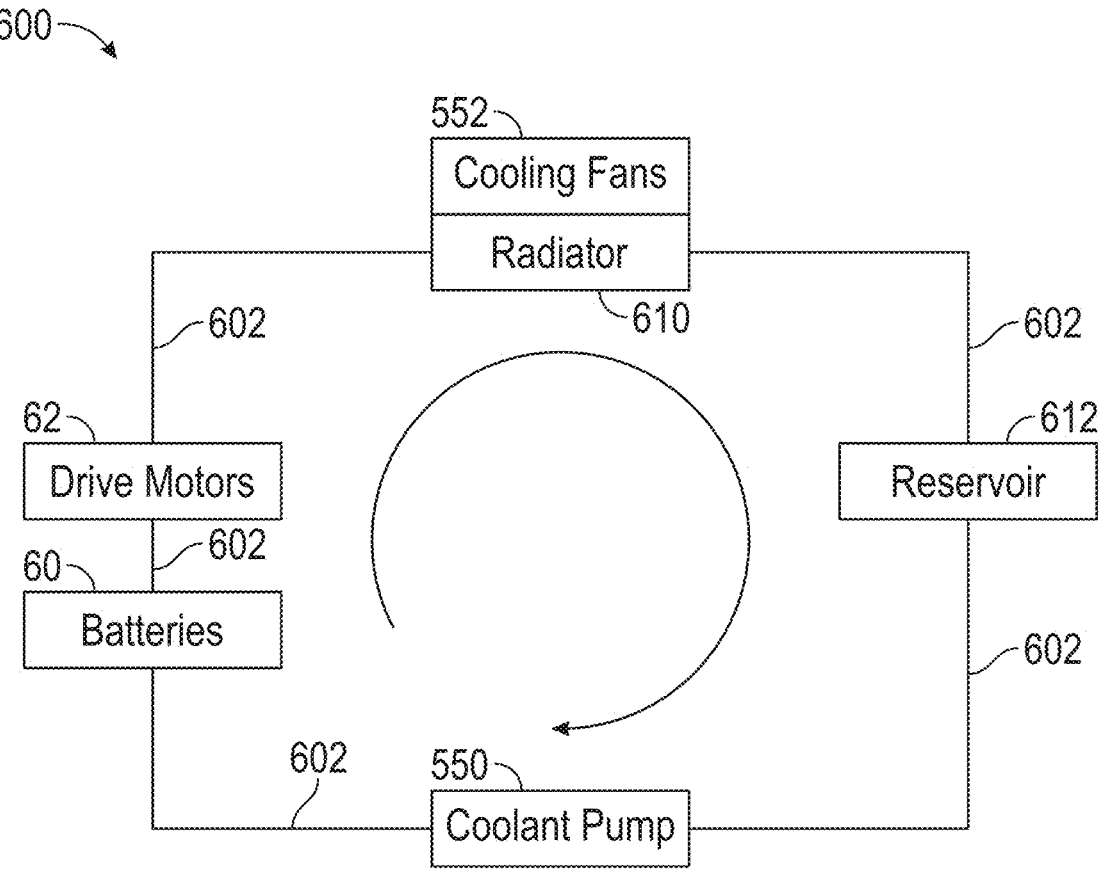
FIG. 18 is a block diagram of a cooling system of the front-loading refuse vehicle of FIG. 14, according to an exemplary embodiment.

Referring to FIG. 18, the vehicle further includes a thermal management system or coolant loop, shown as cooling system 600. The cooling system 600 is configured to discharge thermal energy from components of the vehicle 10 to the surrounding atmosphere to maintain the components at or below a desired temperature. The cooling system 600 includes the coolant pump 550 that circulates coolant throughout the cooling system 600. The coolant pump 550 is fluidly coupled to the batteries 60 and the drive motors 62 by one or more conduits (e.g., hoses, pipes, tubes, etc.), shown as coolant lines 602. As shown, the coolant lines 602 connect the drive motors 62 and the batteries 60 in series. In other embodiments, the coolant lines 602 may be arranged differently (e.g., in parallel). In some embodiments, other components of the vehicle 10 (e.g., the traction inverters 520, the DC/DC converter 522, etc.) are fluidly coupled to the cooling system 600 by the coolant lines 602.

The coolant lines 602 fluidly couple the batteries 60 and the drive motors 62 to a heat exchanger, shown as radiator 610. The radiator 610 is configured to transfer thermal energy from coolant flowing through the radiator 610 to the surrounding atmosphere. As shown, the cooling fans 552 are coupled to the radiator 610 and configured to force air through the radiator 610 to increase the rate of heat transfer through the radiator 610. The radiator 610 is fluidly coupled to the coolant pump 550 by a coolant hose 602 to form a closed loop system. In some embodiments, a low-pressure reservoir or tank, shown as reservoir 612, is fluidly coupled between the radiator 610 and the coolant pump 550. The reservoir 612 may contain excess coolant at a low pressure.

In operation, the coolant pump 550 directs coolant through the batteries 60 and the drive motors 62. The coolant receives thermal energy generated during operation of the batteries 60 and the drive motors 62, reducing the temperature of the batteries 60 and the drive motors 62. The heated coolant is directed to the radiator 610. The radiator 610 transfers the thermal energy from the coolant to the surrounding atmosphere, reducing the temperature of the coolant. Upon leaving the radiator 610, the low-temperature coolant is returned to the coolant pump 550.

Figure 19:
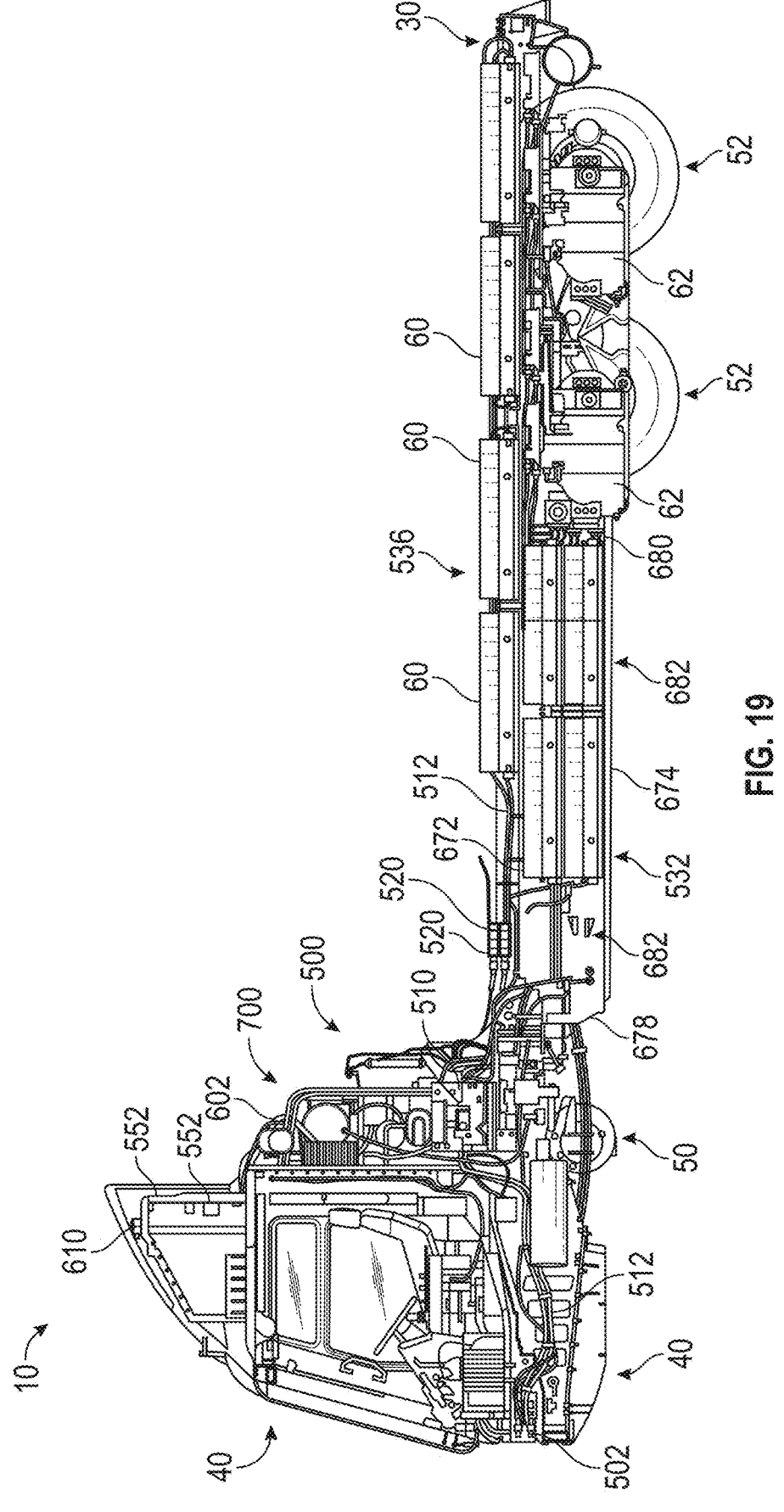
FIGS. 19 and 20 are right side section views of the front-loading refuse vehicle of FIG. 14.
Figure 20:
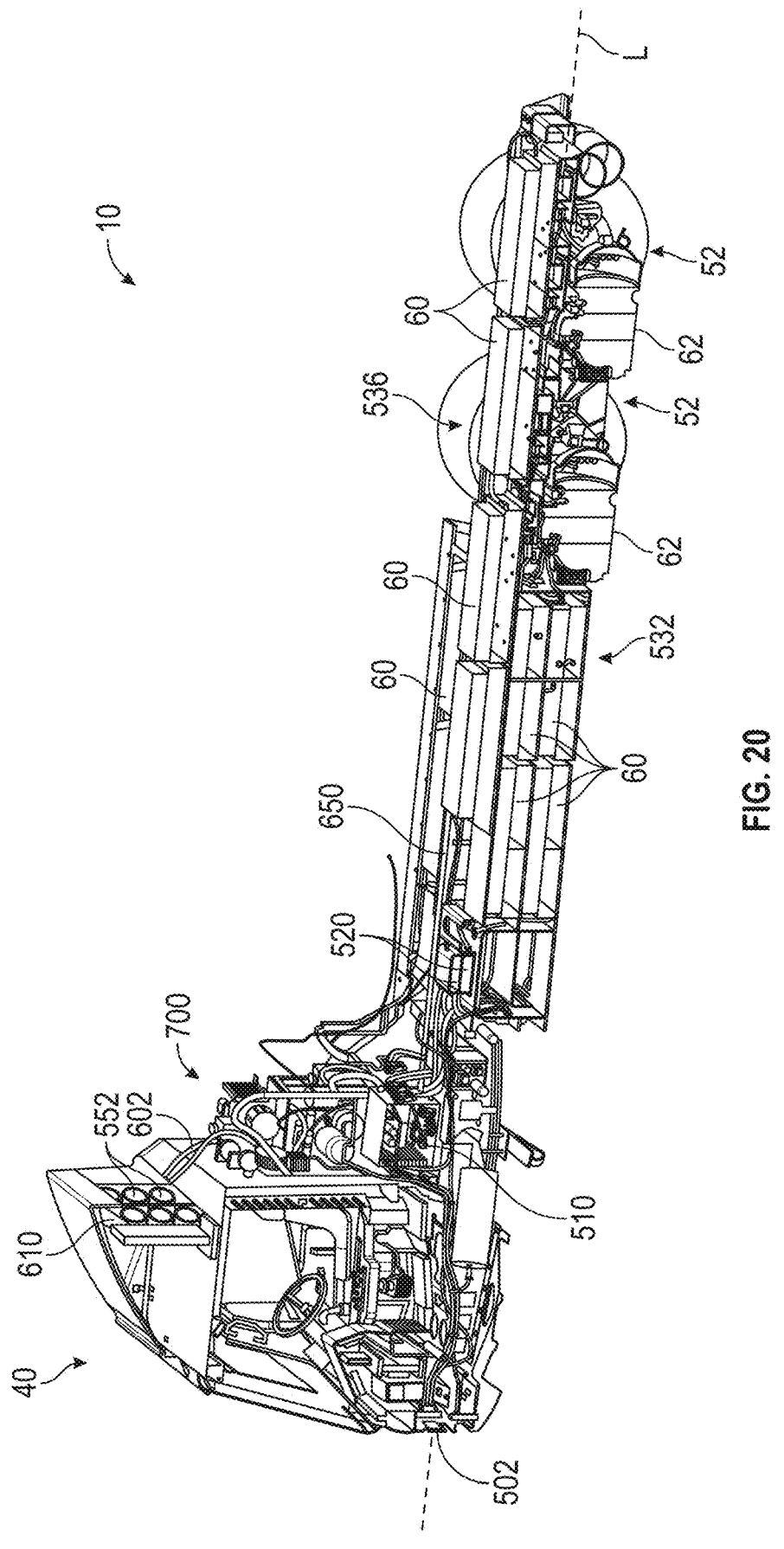
Figure 21:
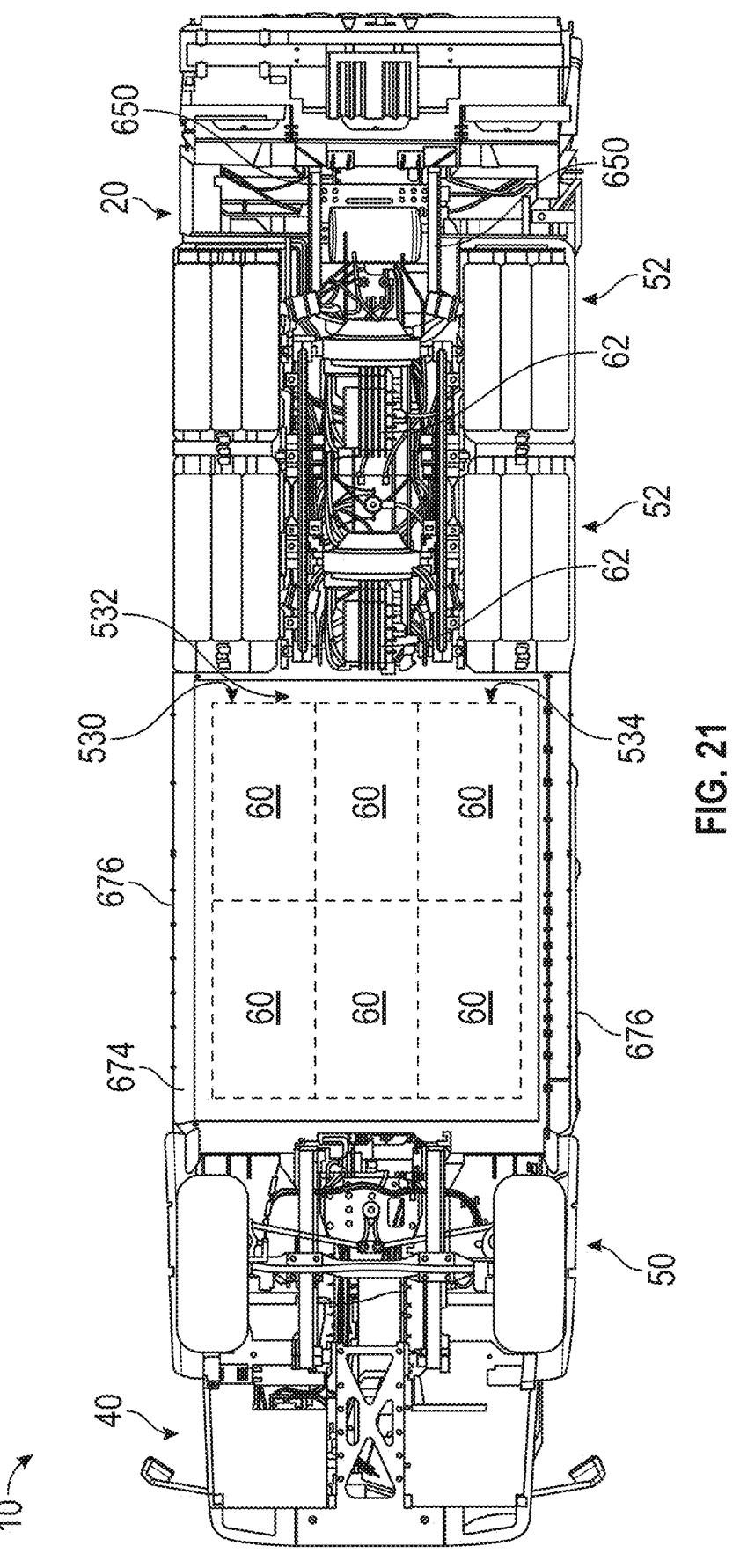
FIG. 21 is a bottom view of the front-loading refuse vehicle of FIG. 14.
Figure 22:
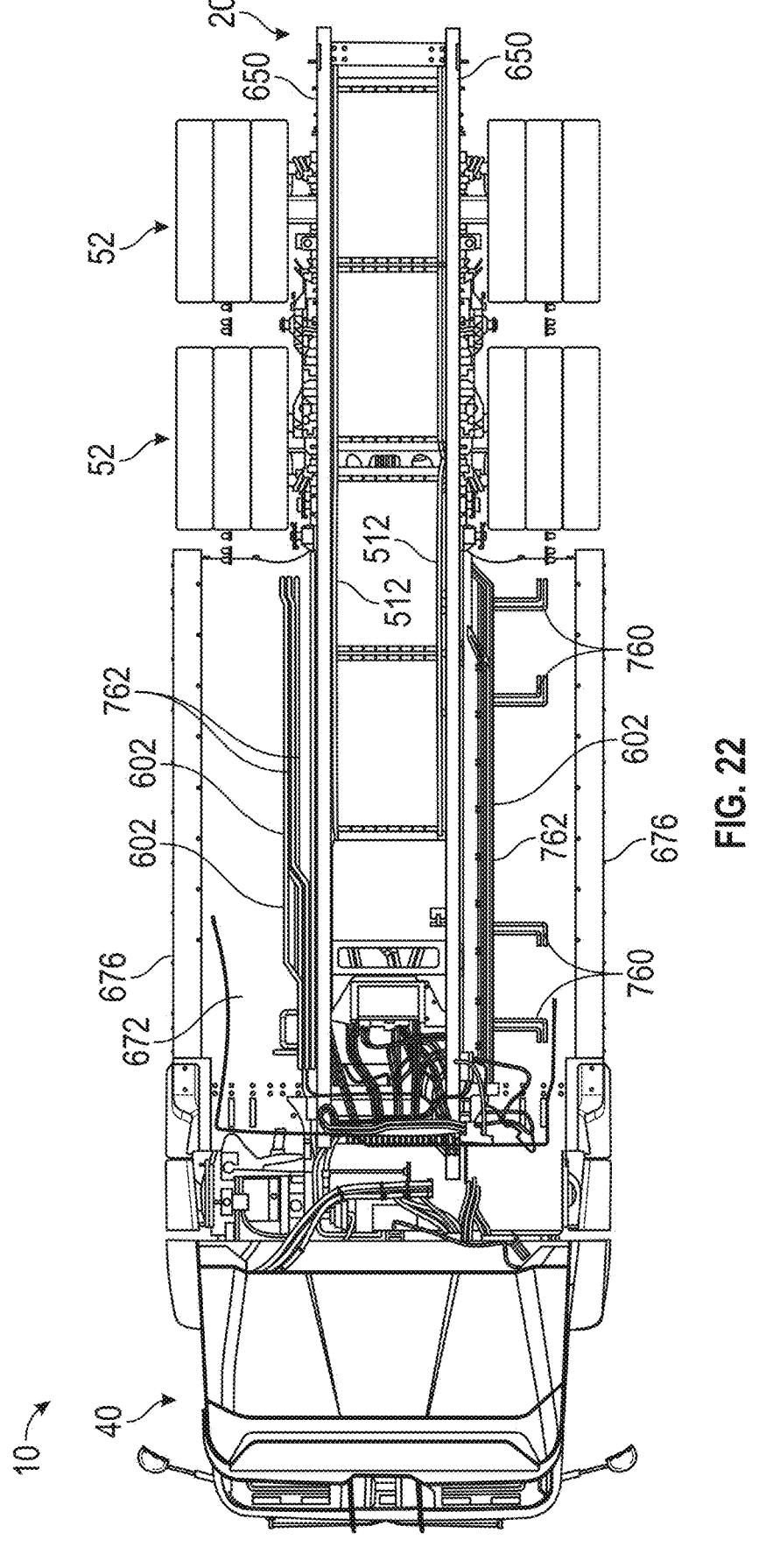
FIG. 22 is a top view of the front-loading refuse vehicle of FIG. 14.
Figure 38:
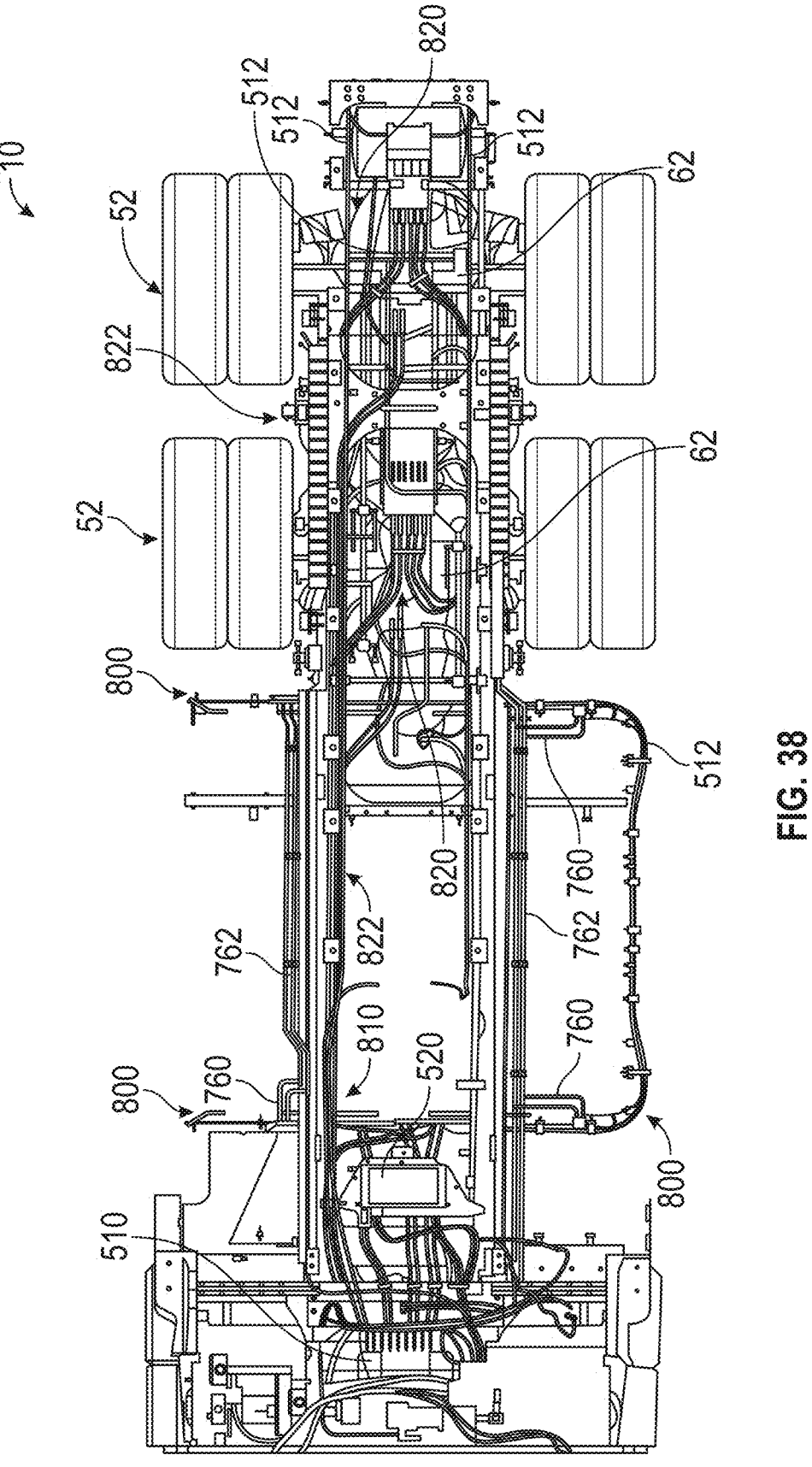
FIG. 38 is a top view of the front-loading refuse vehicle of FIG. 14 with a set of frame rails omitted.

Referring to FIGS. 19-24, the chassis 20 of the vehicle includes a pair of frame members, shown as frame rails 650, that extend longitudinally along the length of the vehicle 10. The frame rails 650 are laterally offset from one another. A front end of each frame rail 650 is fixedly coupled to the cab 40. The front axle 50 and the rear axles 52 are each coupled to the frame rails 650. As shown in FIGS. 20 and 38, the drive motors 62 of the rear axles 52 are positioned between the frame rails 650 and laterally centered within the vehicle 10 (e.g., such that the longitudinal centerline L passes through the drive motors 62. The frame rails 650 support various components of the electrical system 500.

Figure 24:
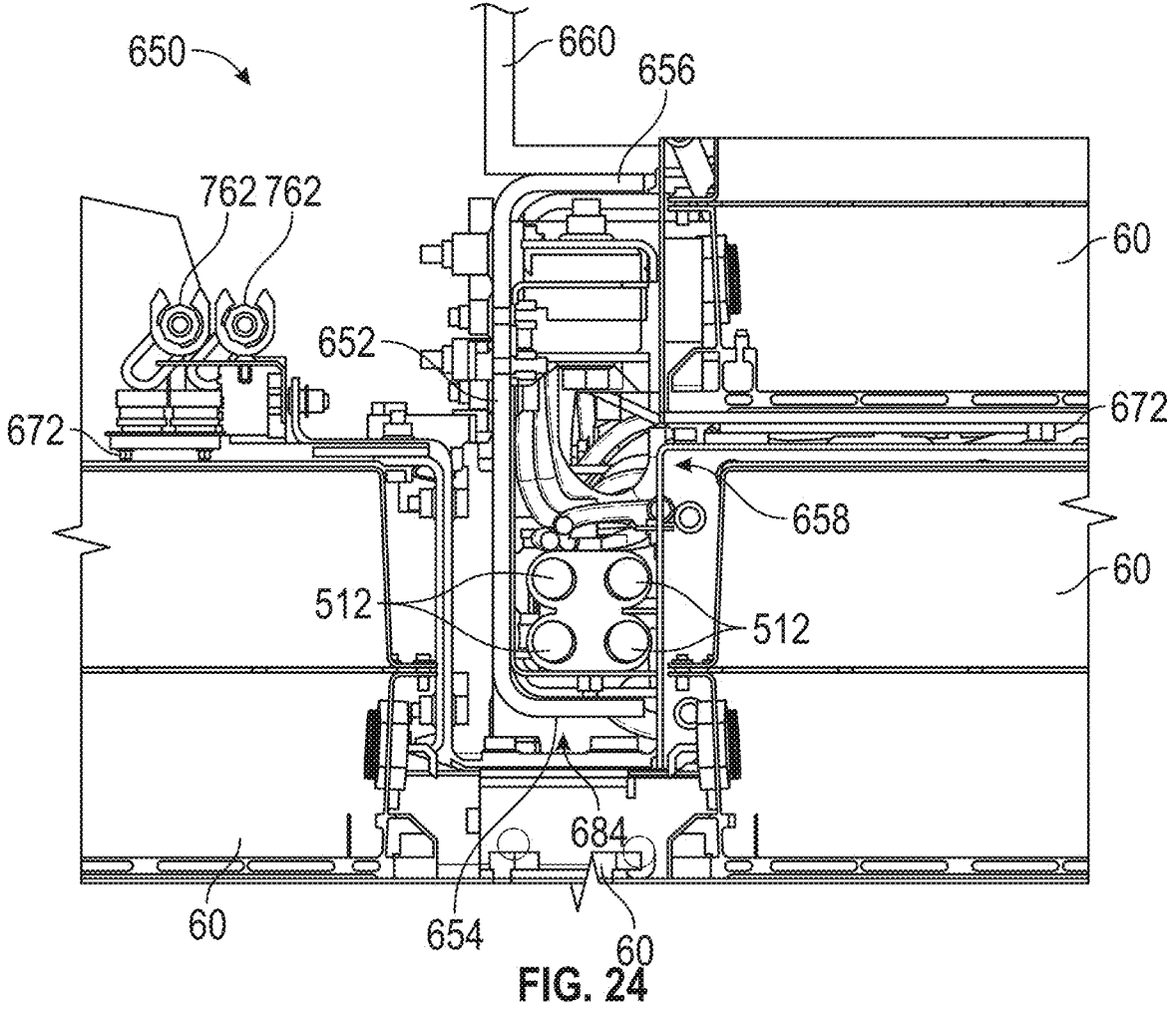
Figure 25:
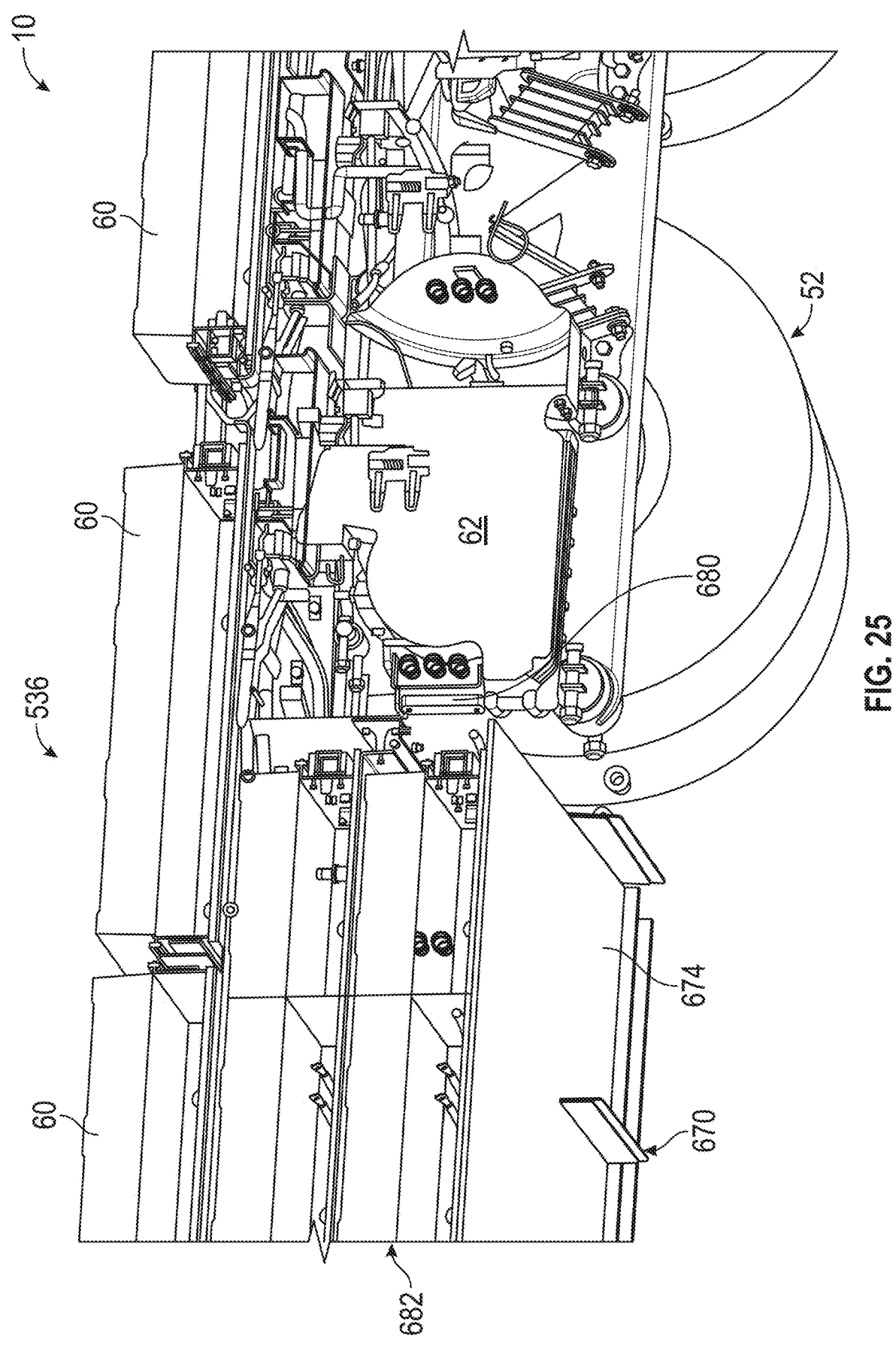
FIG. 25 is a right side section view of the front-loading refuse vehicle of FIG. 14.

The frame rails 650 are laterally offset from one another. As shown in FIG. 24, the frame rails 650 each have a C-shaped cross section. Each frame rail 650 is formed from a vertical section, shown as sidewall 652, a horizontal section or flange, shown as bottom wall 654, and a horizontal section or flange, shown as top wall 656. The bottom wall 654 and the top wall 656 are integrally formed with the sidewall 652 and extend laterally away from the sidewall 652. The top wall 656 is offset vertically above the bottom wall 656. Together, the sidewall 652, the bottom wall 654, and the top wall 656 define a volume, channel, or passage, shown as frame volume 658. The frame rails 650 are arranged symmetrically about a longitudinal centerline L (shown in FIG. 20) of the vehicle 10, such that the frame volumes 658 extend toward one another. The longitudinal centerline L may be an axis extending longitudinally and laterally centered about the vehicle 10.

Figure 23:
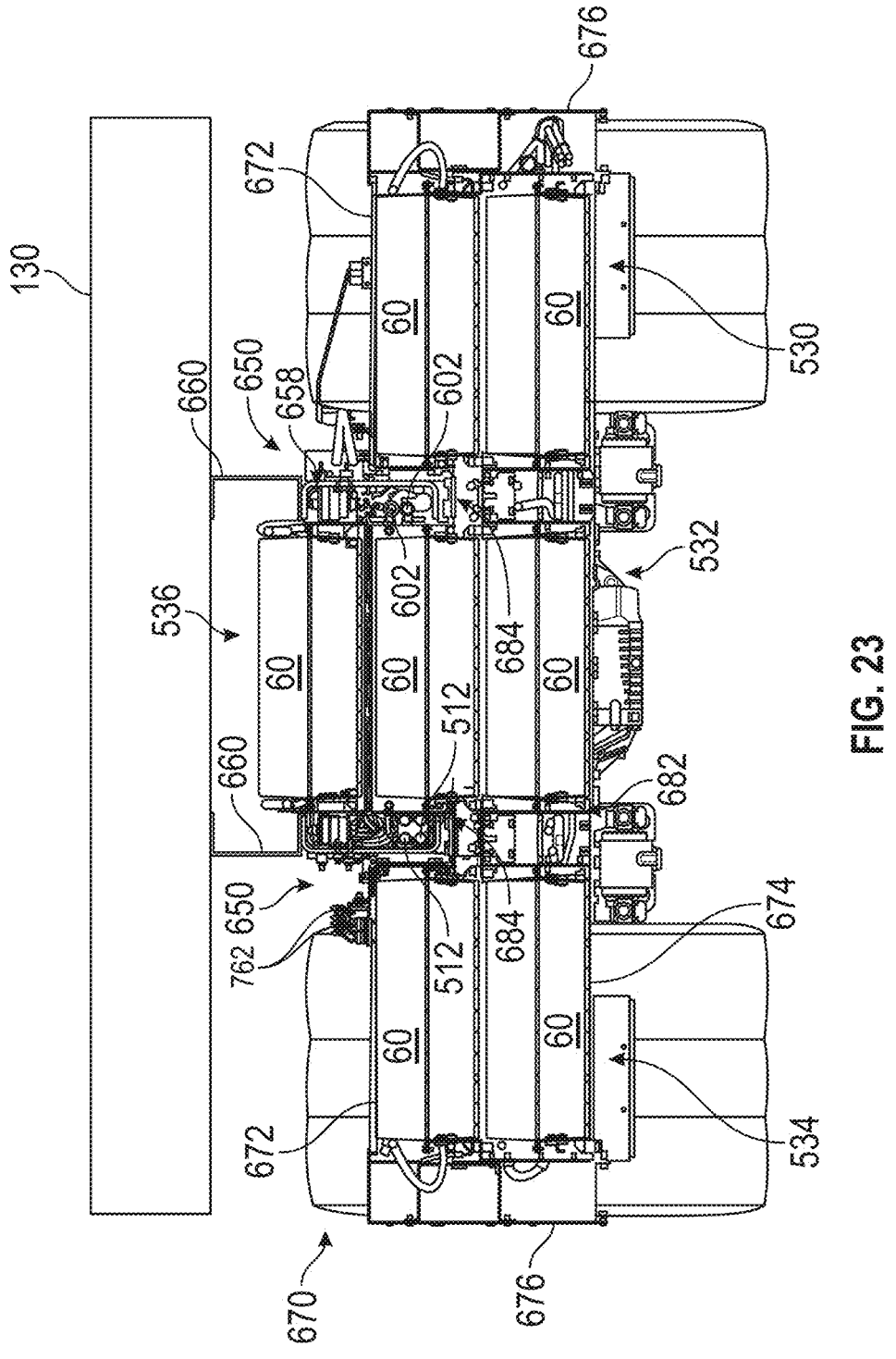
FIGS. 23 and 24 are rear section views of the front-loading refuse vehicle of FIG. 14.

As shown in FIGS. 23 and 24, the application kit 80 is supported by the frame rails 650. As shown in FIGS. 23 and 24, a pair of body frame rails 660 extend longitudinally along a bottom surface of the refuse compartment 130. The body frame rails 660 are fixedly coupled to the refuse compartment 130. The body frame rails 660 are laterally spaced apart from one another to laterally align each body frame rail 660 with one of the frame rails 650. Each body frame rail 660 rests atop one of the frame rails 650 to support the application kit 80. In other embodiments, the body frame rails 660 are coupled to the bottom side of a different type of body other than the refuse compartment 130 to support other types of application kits 80.

Referring to FIGS. 20-30, the vehicle 10 further includes an enclosure, battery housing, or battery support, shown as battery compartment 670, that supports a subset of the batteries 60. The battery compartment 670 is fixedly coupled to the frame rails 650. In some embodiments, the battery compartment 670 is removably coupled to the frame rails 650 (e.g., permitting dropping or other removal of the battery compartment 670 for maintenance). The battery compartment 670 is positioned forward of the rear axles 52 and rearward of the front axle 50. The battery compartment 670 extends below (e.g., hangs from) the frame rails 650.

Referring to FIGS. 19 and 23, the battery compartment 670 includes a series of structural members, walls, or panels that are fixedly coupled to one another to form the structure of the battery compartment 670 and support the batteries 60. One or more upper panels, shown as top panels 672, extend along the top of the battery compartment 670 and define a top surface of the battery compartment 670. One or more lower panels, shown as bottom panels 674, extend along the bottom of the battery compartment 670 and define a bottom surface of the battery compartment 670. Two or more panels, shown as side panels 676, extend along the left and right sides of the battery compartment 670 and define a left surface and a right surface of the battery compartment 670. One or more forward panels, shown as front panels 678, extend along the front of the battery compartment 670 and define a front surface of the battery compartment 670. One or more rear panels, shown as back panels 680, extend along the rear of the battery compartment 670 and define a back surface of the battery compartment 670. Together, the top panels 672, the bottom panels 674, the side panels 676, the front panels 678, and the back panels 680 define a compartment or volume, shown as battery volume 682, therebetween that contains the batteries 60 of the battery compartment 670. The panels may support the weight of the batteries 60 and couple the batteries 60 to the chassis 20. In some embodiments, the panels fully enclose the battery volume 682 (e.g., to prevent contaminants from entering the battery volume 682). In some embodiments, one or more of the panels are removable to facilitate access to the batteries 60 within the battery volume 682.

The battery compartment 670 defines a pair of recesses or channels, shown as frame recesses 684, that extend longitudinally through the battery compartment 670 and downward from the top surface of the battery compartment 670. Each frame recess 684 receives one of the frame rails 650 to couple the battery compartment 670 to the chassis 20. Each frame recess 684 is defined between two of the top panels 672.

Figure 26:
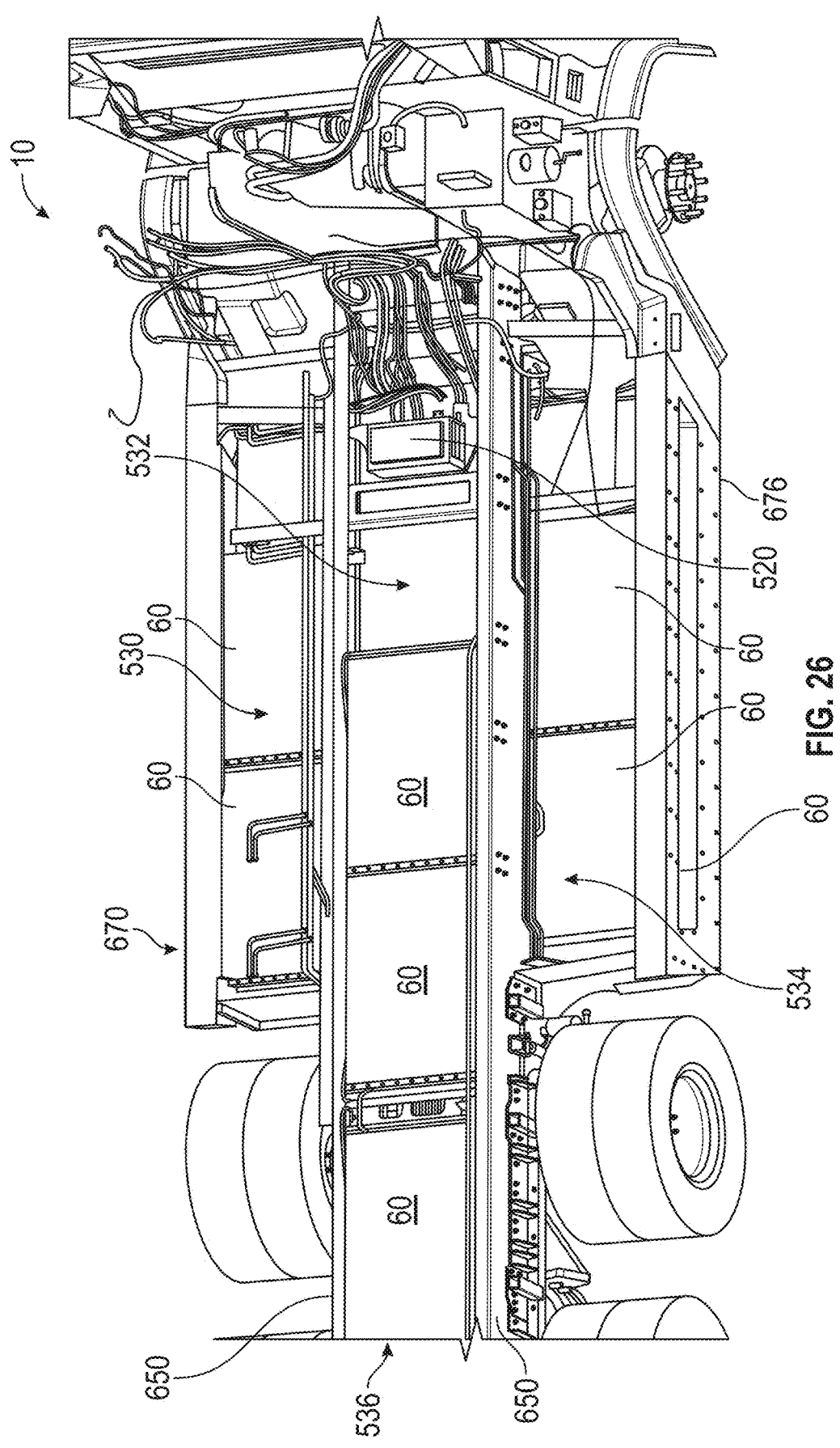
FIG. 26 is a perspective view of the front-loading refuse vehicle of FIG. 14.
Figure 27:
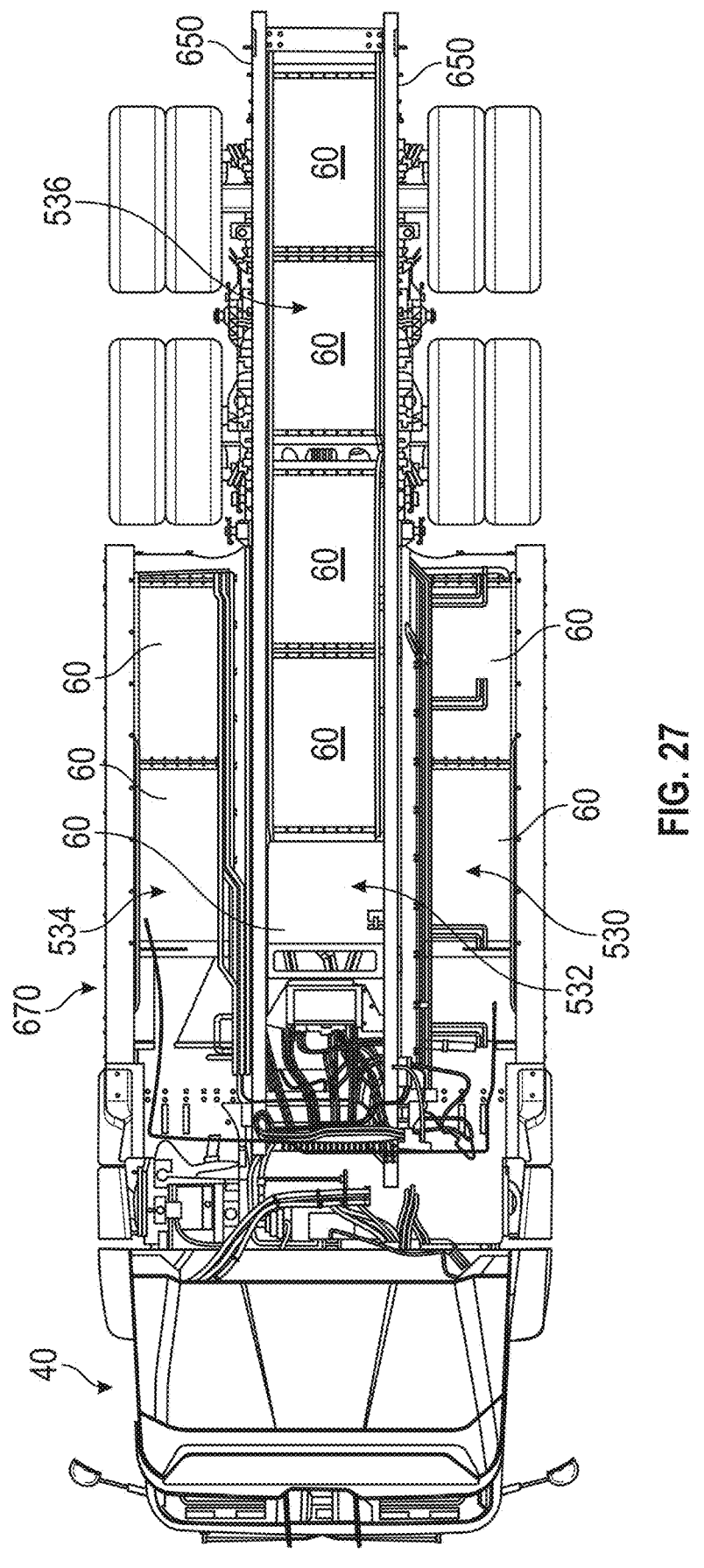
FIG. 27 is a top view of the front-loading refuse vehicle of FIG. 14.
Figure 28:
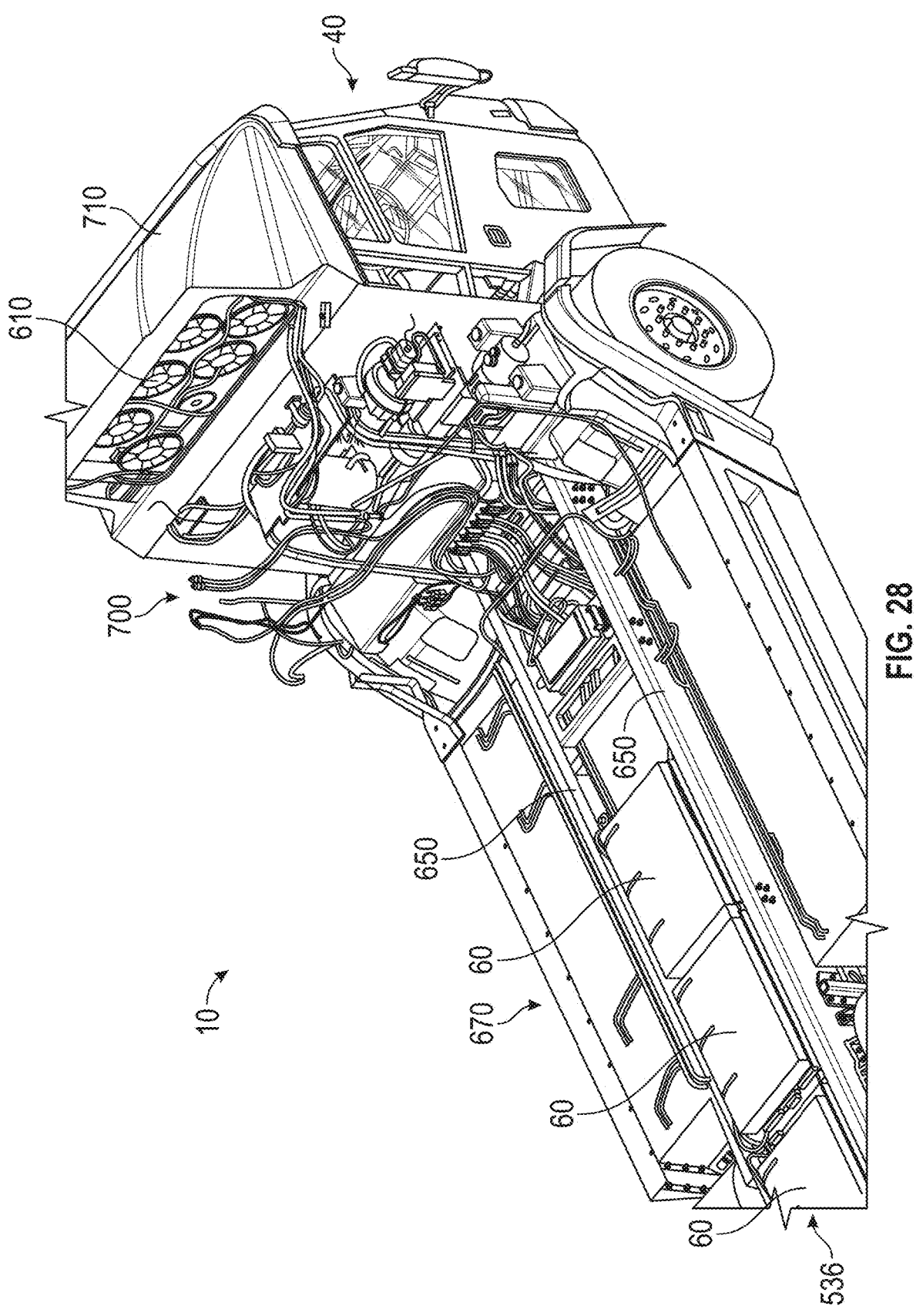
FIGS. 28-37 are perspective views of the front-loading refuse vehicle of FIG. 14.
Figure 29:
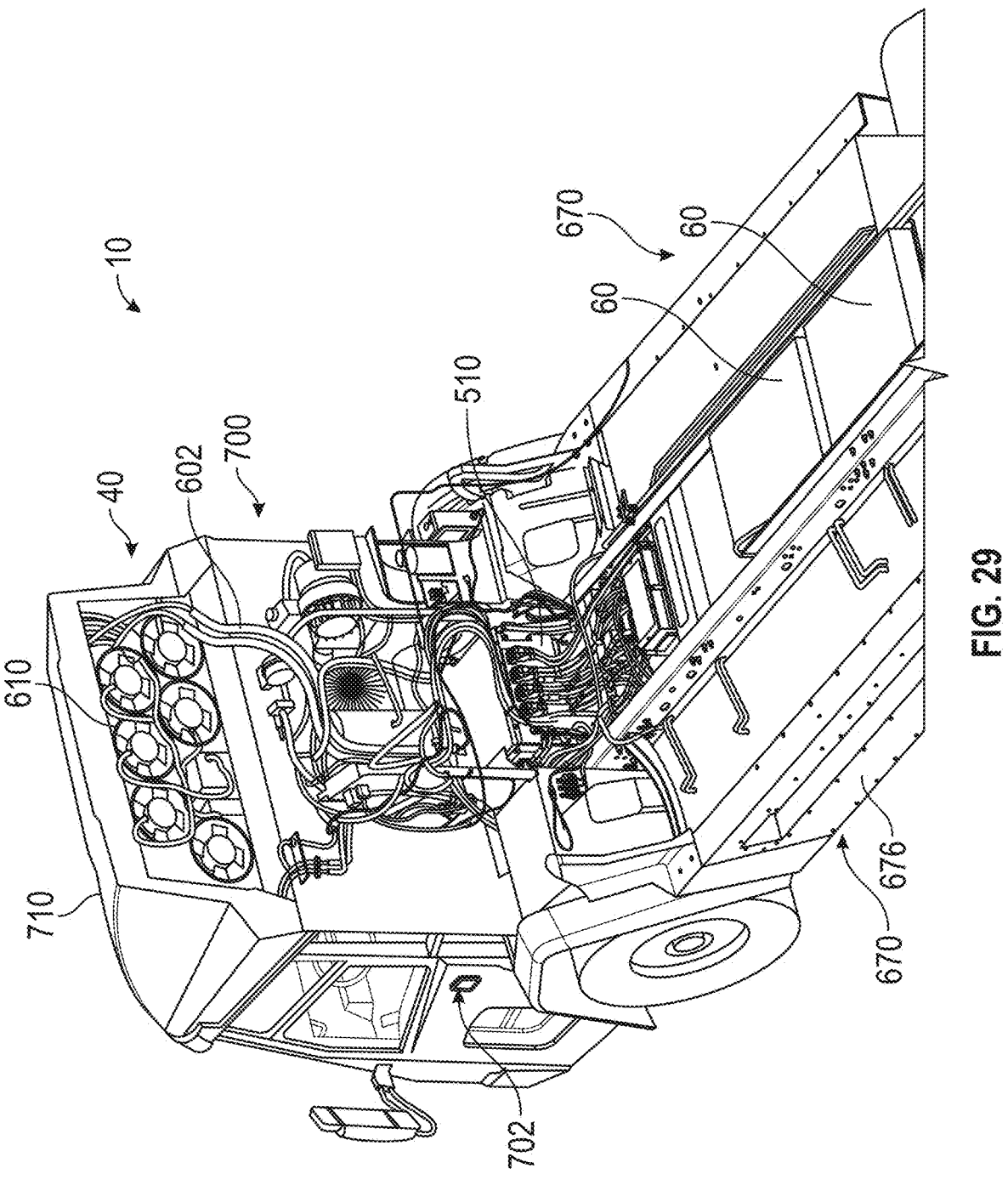
Figure 30:
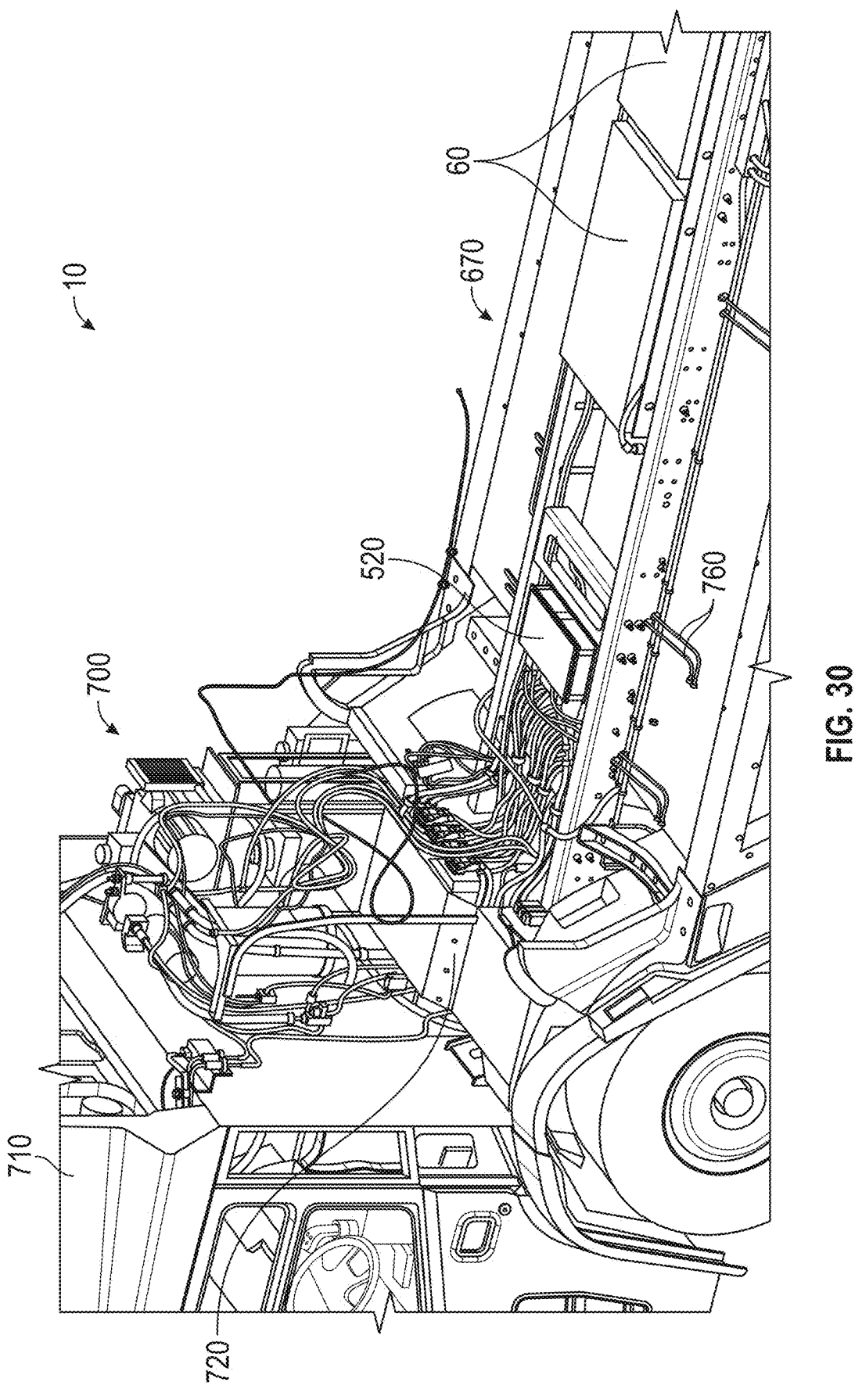
Figure 31:
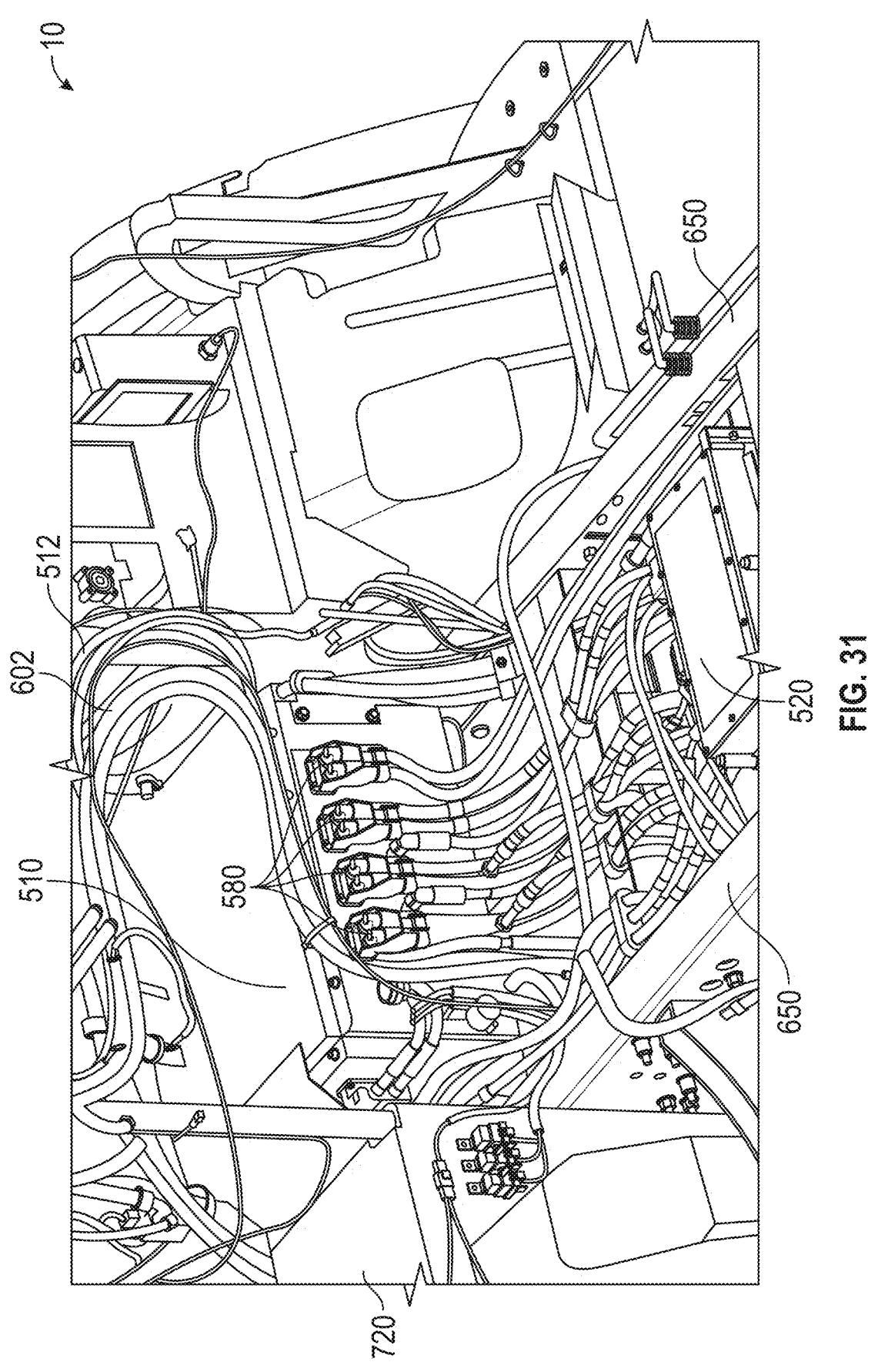

As shown in FIGS. 19-27, the battery compartment 670 contains the strings 530, 532, and 534. Each string includes four batteries 60 arranged in two rows of two. Specifically, two of the batteries 60 are placed longitudinally offset from one another, and each of those batteries 60 has another battery 60 stacked on top of it. The strings 530, 532, and 534 are laterally offset from one another. The string 530 is placed along a first lateral side of the battery compartment 670. The string 534 is placed along a second lateral side of the battery compartment 670. The string 532 is placed between the string 530 and the string 534 and between the frame rails 650, along the longitudinal centerline L of the vehicle 10. As shown, the strings 530 and 534 are separated from the string 532 by the frame rails 650. Accordingly, the battery compartment 670 contains twelve total batteries 60. FIGS. 26 and 27 illustrate the battery compartment 670 with the top panels 672 removed for ease of viewing the batteries 60.

The string 536 is arranged in a longitudinally-extending line (i.e., each battery 60 is longitudinally offset from an adjacent battery 60 along the longitudinal centerline L). The string 536 is placed between the frame rails 650 and above the battery compartment 670. A top surface of each battery 60 of the string 536 extends above the top walls 656 of the frame rails 650. A bottom surface of each battery 60 of the string 536 is positioned between the top walls 656 and the bottom walls 654. In some embodiments, the string 536 is removable, and the vehicle 10 is capable of full operation using only the batteries 60.

As shown in FIGS. 14 and 15, the vehicle 10 includes an electrical component subassembly or arrangement, shown as electrical module 700, including components of the electrical system 600. The electrical module 700 is at least partially supported by the frame rails 650 and positioned in a space or volume 702 between the cab 40 and the refuse compartment 130. The refuse compartment 130 is offset rearward of the cab 40 to define the volume 702. A shroud or cowl, shown as cowl 710, extends above the volume 702 and defines an upper boundary of the volume 702. The cowl 710 may be coupled to the refuse compartment 130 and/or the cab 40. A pair of panels, shown as doors 712, extend along the left and right sides of the volume 702 and define lateral boundaries of the volume 702. The doors 712 may be coupled to the refuse compartment 130 and/or the cab 40. The doors 712 may be movable to permit access to the volume 702.

As shown in FIGS. 14, 15, and 19, the electrical module 700 includes the HVDPU 510. The HVPDU 510 is positioned within the volume 702 and along the top of the frame rails 650. The HVPDU 510 may be laterally centered on the vehicle 10 (e.g., positioned such that the longitudinal centerline L extends through the HVPDU 510). This position may minimize the length of the high-voltage cable 512 needed to extend from the frame rails 650 to the HVPDU 510 (e.g., by minimizing lateral extension of the high-voltage cables 512). The system MSD 514 is positioned along a laterally-facing side of the HVPDU 510 and within the volume 702, such that the system MSD 514 is accessible from a driver side of the vehicle 10. A shroud or shield, shown as partition 720 extends above the HVPDU 510 and separates the HVPDU 510 from an upper portion of the volume 702. The partition 720 is removed in FIG. 32.

Figure 33:
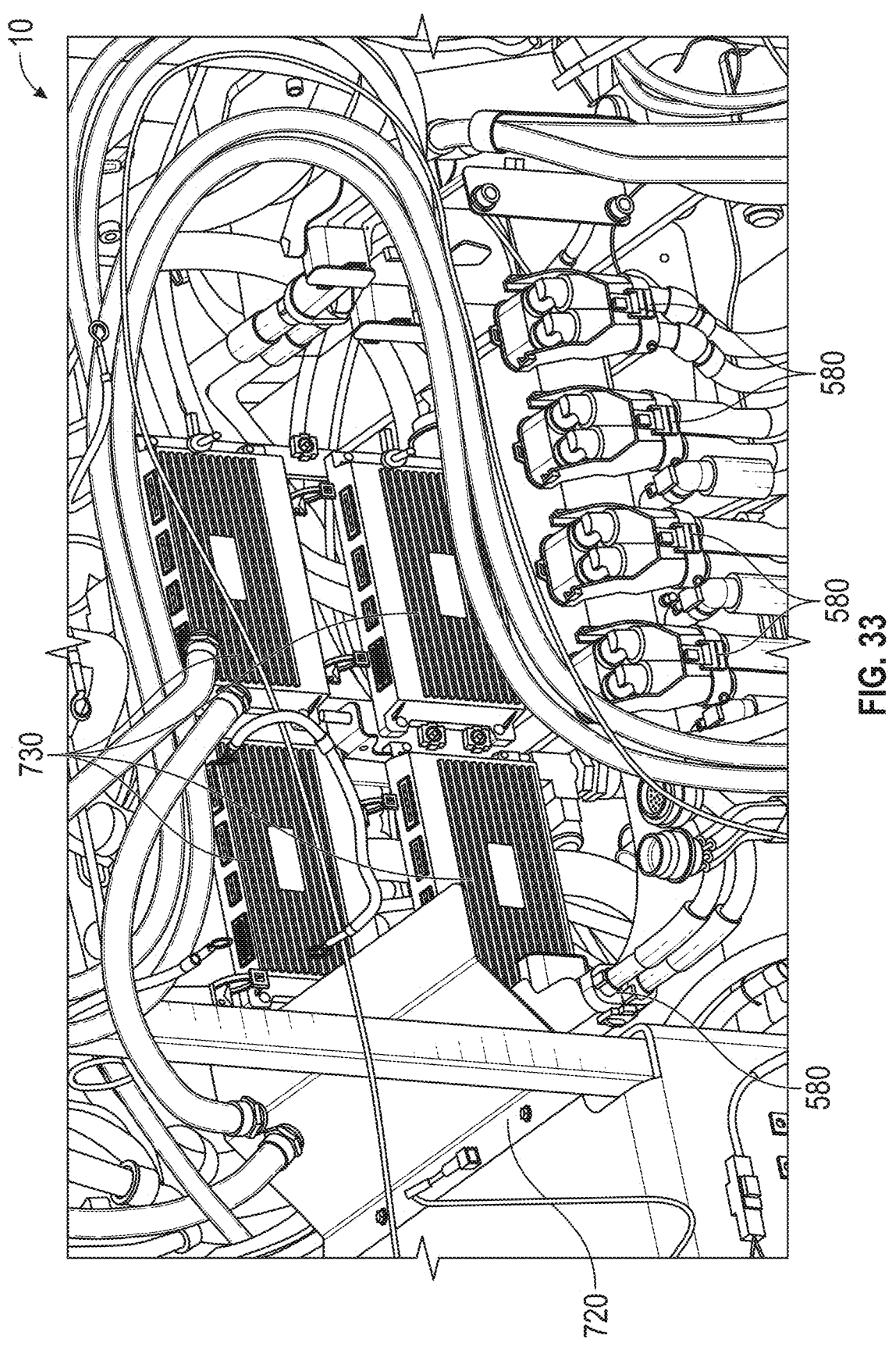

As shown in FIG. 33, a series of controllers 570, shown as battery management system (BMS) controllers 730, are positioned between the HVPDU 510 and the cab 40. Specifically, the BMS controllers 730 are arranged along a front side of the HVPDU 510. The BMS controller 730 may cooperate with the HVPDU 510 to control charging and/or discharging of the batteries 60. Each BMS controller 730 may be associated with and control one of the strings of batteries 60. In other embodiments, one BMS controller 730 controls all of the batteries 60.

Figure 34:
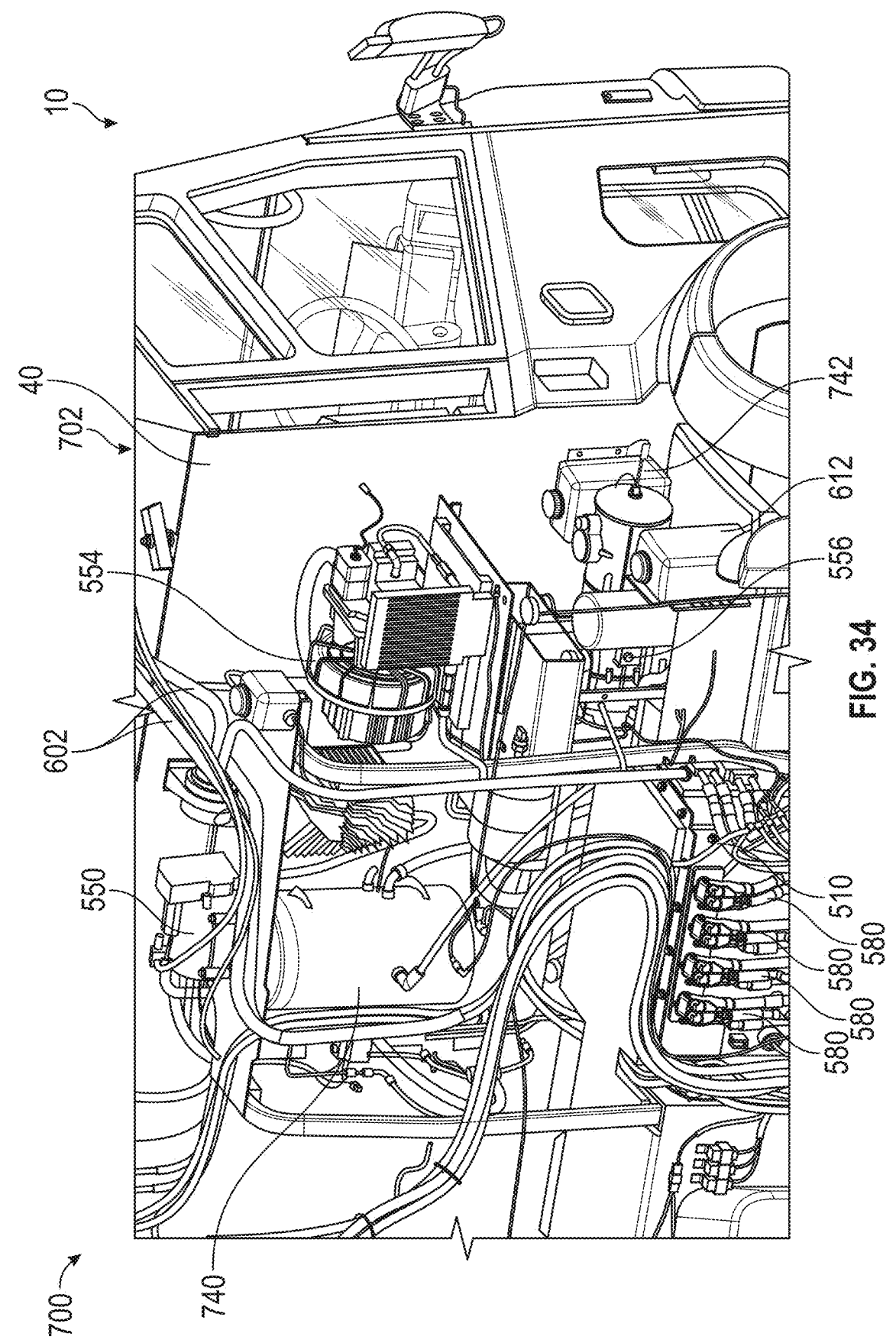
Figure 35:
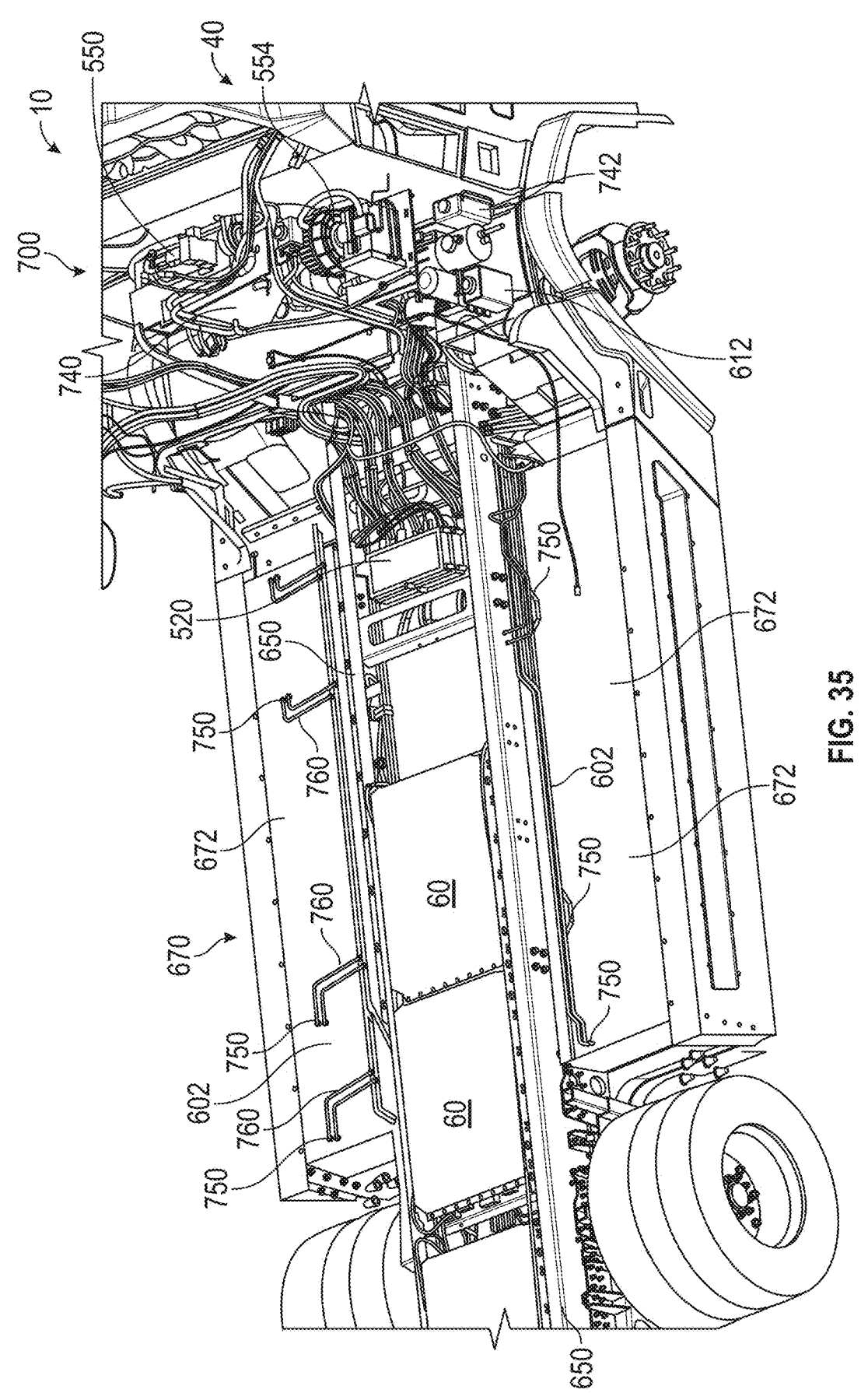
Figure 36:
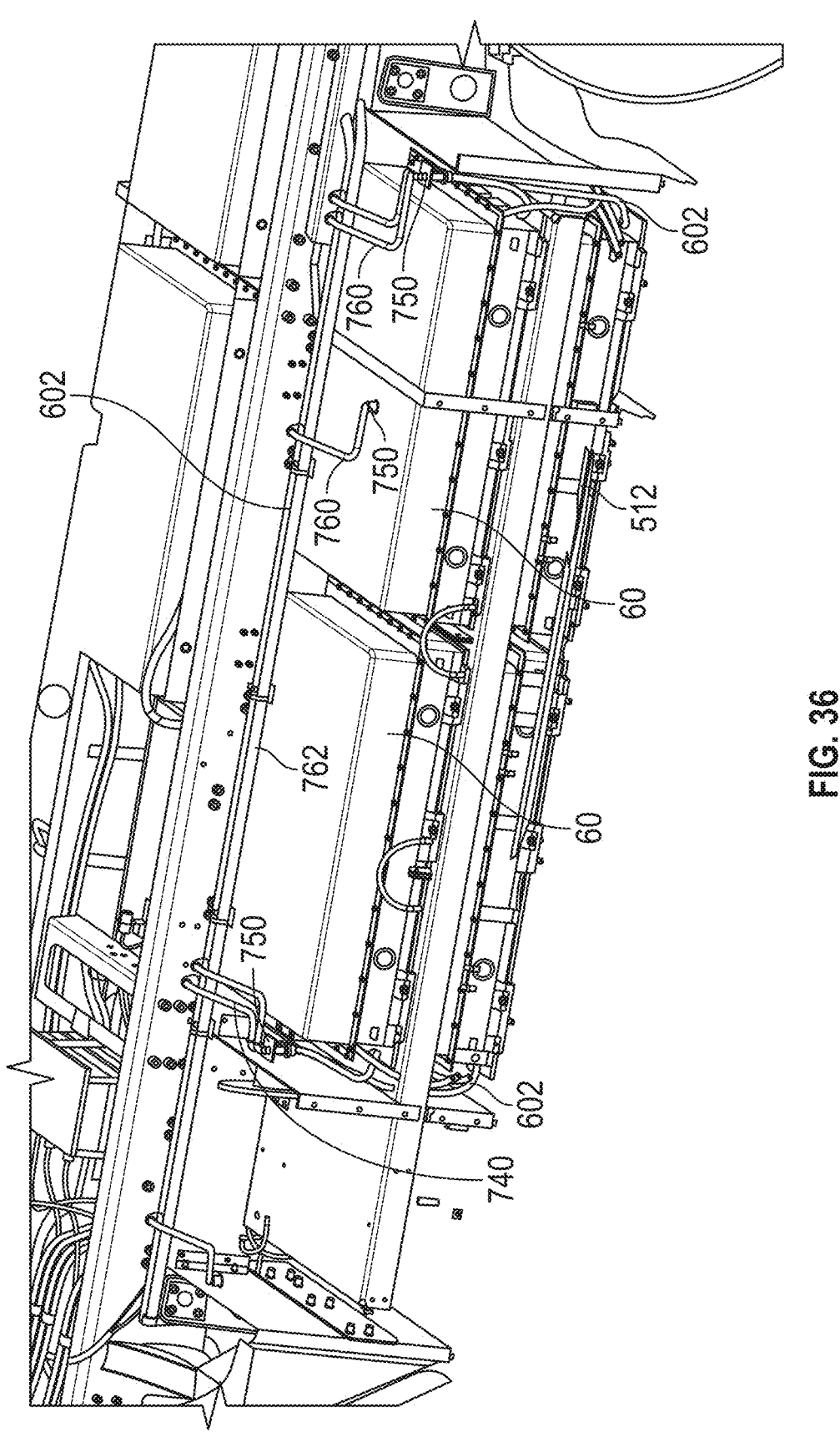

As shown in FIG. 34, the module 700 includes the coolant pump 550, the reservoir 612, and the compressor 554. In some embodiments, the module 700 includes a pressure vessel or tank, shown as accumulator 740, that stores gas pressurized by the compressor 554. The module 700 includes the steering motor 556. In some embodiments, the module 700 further includes a low-pressure reservoir or tank, shown as power steering fluid reservoir 742, that supplies power steering fluid to the steering motor 556. Accordingly, the coolant pump 550, the reservoir 612, the compressor 554, the accumulator 740, the steering motor 556, and the fluid reservoir 742 may all be positioned within the volume 702 of the module 700.

Figure 32:
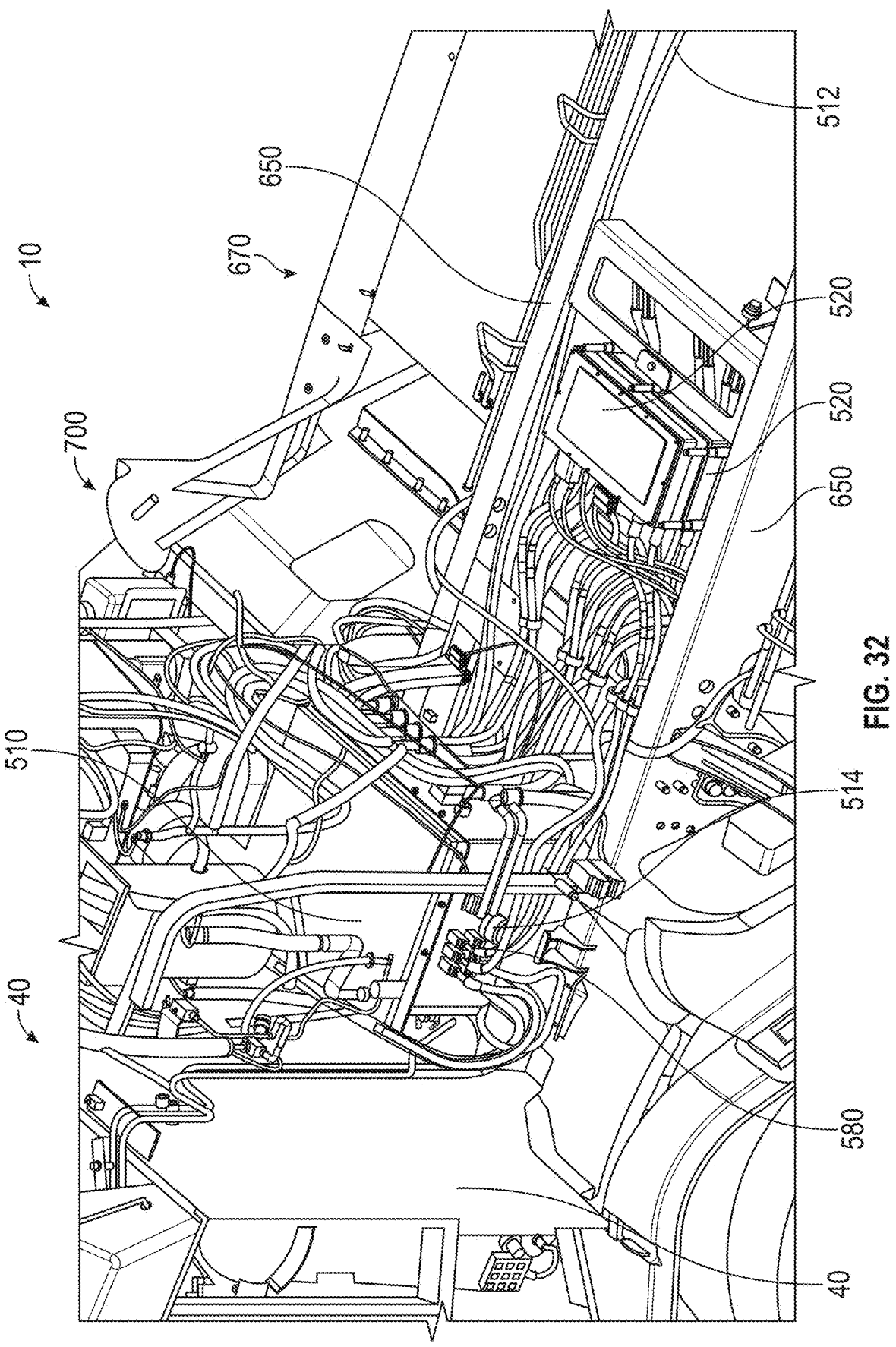

As shown in FIGS. 19, 20, and 32, a pair of the traction inverters 520 (e.g., one for each rear axles 52) are stacked upon one another and coupled to the chassis 20. The traction inverters 520 are positioned longitudinally forward of the batteries 60 and rearward of the HVPDU 510. The traction inverters 520 are positioned between the frame rails 650. The traction inverters 520 may be laterally centered (e.g., such that the traction inverters 520 are intersected by the longitudinal centerline L).

Referring to FIGS. 29 and 35-39, the routing of the coolant lines 602 is shown according to an exemplary embodiment. The radiator 610 is coupled to the cab 40. The radiator 610 is positioned above the cab 40, within the cowl 710. The coolant lines 602 extend from the batteries 60 to the radiator 610, fluidly coupling the batteries 60 (e.g., a heat exchanger within each battery 60) to the radiator 610.

A subset of the coolant lines 602 are directly fluidly coupled to one or more of the batteries 60 within the battery compartment 670. In some embodiments, the coolant lines 602 are directly coupled to each of the batteries 60 in parallel. In other embodiments, the coolant lines 602 extend between the batteries 60, fluidly coupling the batteries 60 in series (e.g., the batteries 60 of a string, all of the batteries 60, etc.). A series of fittings or connectors, shown as bulkhead fittings 750, are fixedly coupled to and extend through the top panels 672. By placing the bulkhead fittings 750 along the 672, the bulkhead fittings 750 are positioned between the battery compartment 670 and the application kit 80, protecting the bulkhead fittings 750 from above and below. Each of the bulkhead fittings 750 fluidly couples coolant lines 602 within the battery compartment 670 to coolant lines 602 above the battery compartment 670. The bulkhead fittings 750 permit fluid connection to the batteries 60 outside of the battery compartment 670. Accordingly, if any leaks in the cooling system 600 occur, they are likely to be found outside of the battery compartment 670 where the leaks are more easily accessed for identification and repair without having to disassemble the battery compartment 670.

A first portion of the coolant lines 602, shown as lateral branches 760, extend laterally inward from the bulkhead fittings 750 toward the frame rails 650. A second portion of the coolant lines 602, shown as longitudinal lines 762, extend longitudinally along the frame rails 650. The lateral branches 760 extend laterally inward to meet and are fluidly coupled with (e.g., tee off of) the longitudinal lines 762. The longitudinal lines 762 may act as a manifold, unifying the flows of coolant from several lateral branches 760. In some embodiments, one or more of the longitudinal lines 762 act as supply lines that deliver the coolant to batteries 60 through one or more of the lateral branches 760, and one or more of the longitudinal lines 762 act as return lines that return the coolant to the radiator 610. The longitudinal lines 762 extend longitudinally along (e.g., directly coupled to, adjacent to, etc.) the frame rail 650 toward the front of the vehicle 10. As shown, at least some of the longitudinal lines 762 extend longitudinally along outer surfaces of the frame rails 650 (e.g., along an outer surface of the sidewall 652 of the frame rail 650, outside of the frame volume 658, etc.). Additional coolant lines 602 extend upward, fluidly coupling the longitudinal lines 762 to the radiator 610.

Referring to FIGS. 22-24, 37, and 38, the routing of the high-voltage cables 512 is shown according to an exemplary embodiment. The high-voltage cables 512 extend generally longitudinally forward from the batteries 60 to the HVPDU 510. First portions of the high-voltage cables 512, shown as lateral portions 800, extend within the battery compartment 670. The lateral portions 800 extend from electrical connectors 802 on the batteries 60 toward the frame members 650. The lateral portions 800 may extend along interior surfaces of the panels of the battery compartment 670 (i.e., the lateral portions 800 extend between the batteries 60 and the panels). Accordingly, the panels can be removed to facilitate access to the high-voltage cables 512 within the battery compartment. Second portions of the high-voltage cables 512, shown as longitudinal portions 810, extend along the frame members 650 to the HVPDU 510. In some embodiments, each of the strings 530, 532, 534, and 536 connects to the HVPDU 510 through a different high-voltage cable 512. In some such embodiments, the electrical connectors 580 of the high-voltage cables 512 each engage with a rear side of the HVPDU 510 to minimize the lateral extension of the high-voltage cables 512 (e.g., the longitudinal portions 810 engage directly with electrical connectors on the rear side of the HVPDU 510).

Figure 37:
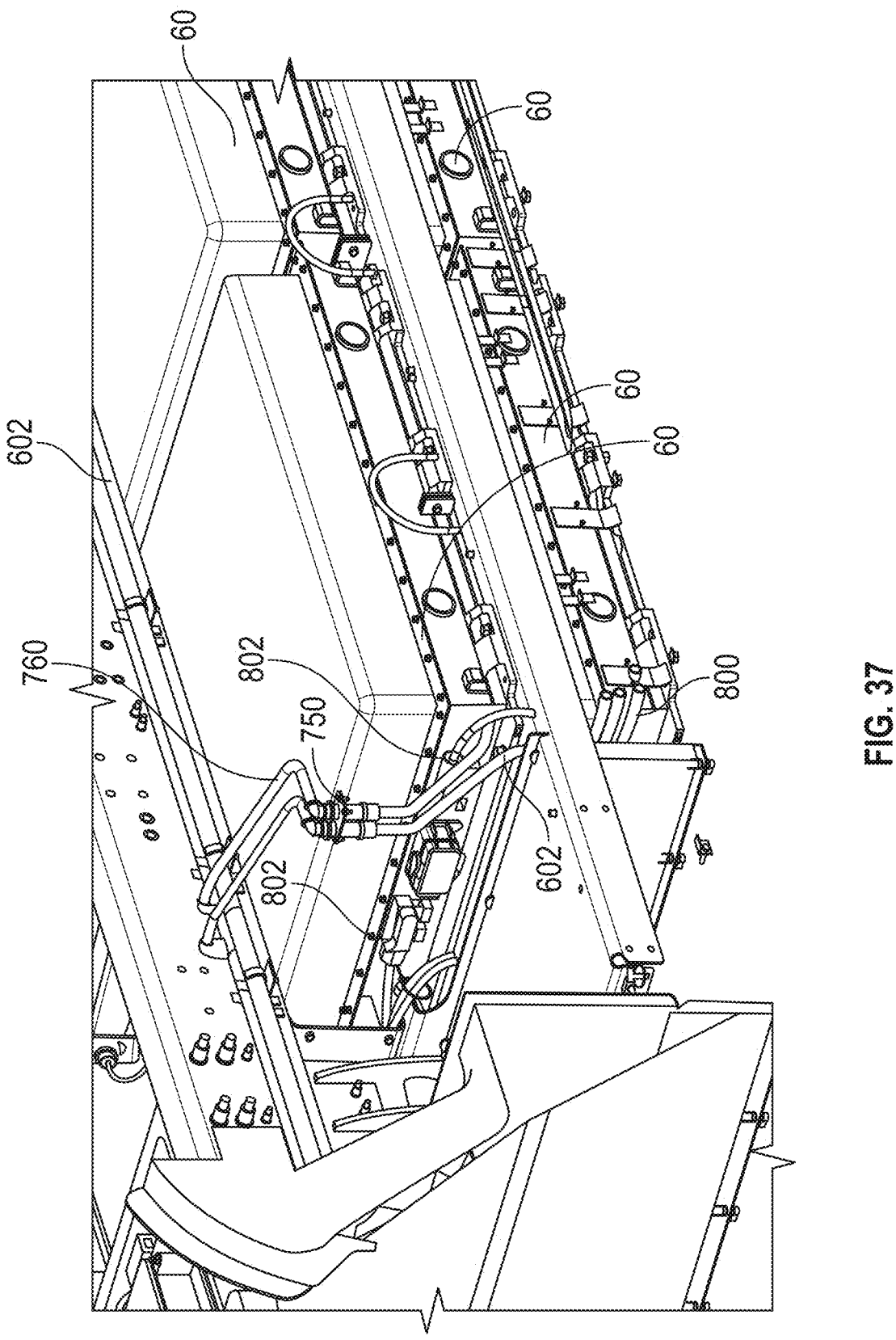

As shown in FIGS. 37 and 38, an example of how the panels may be removed to access the high-voltage cables 512 is shown. A series of high-voltage cables 512 form a loop around the string 530 of the batteries 60 within the battery compartment 670. A first set of lateral portions 800 extend forward of the batteries 60, between the batteries 60 and a front panel 678. Accordingly, the first set of lateral portions 800 may be accessed by removing the front panel 678. A second set of lateral portions 800 extend rearward of the batteries 60, between the batteries 60 and a back panel 680. Accordingly, the second set of lateral portions 800 may be accessed by removing the front panel 678. Longitudinal sections of the high-voltage cables 512 that extend between the first and second sets of the lateral portions 800 extend longitudinally along an outboard side of the batteries 60, between the batteries 60 and a side panel 676. Accordingly, the longitudinal portions may be accessed by removing the side panels 676. Depending upon which sections of the high-voltage cables 512 need to be accessed, a user may select a different panel to remove.

Similarly, the high-voltage cables 512 extend generally longitudinally rearward from the HVPDU 510 to the drive motors 62. In some embodiments, a first set of high-voltage cables 512 extend longitudinally rearward from the HVPDU 510 to the traction inverters 520. The traction inverters 520 convert DC electrical energy from the HVPDU 510 to AC electrical energy to power the drive motors 62. A second set of high-voltage cables 512 may extend rearward from the traction inverters 520 to the drive motors 62. A lateral portion 820 of each high-voltage cable 512 connected to a drive motor 62 extends laterally from the drive motor 62 to a frame rail 650. A longitudinal portion 822 of each high-voltage cable 512 connected to a drive motor 62 extends longitudinally along a frame rail 650 to the traction inverters 520. Accordingly, placing the traction inverters 520 longitudinally between the HVPDU 510 and the traction inverters 520 may minimize the length of the high-voltage cables 512.

Referring to FIGS. 23 and 24, the frame rails 650 and the batteries 60 may provide a protected enclosure for routing the high-voltage cables 512. As shown in FIG. 24, a subset of the high-voltage cables 512 are positioned within the frame volume 658. Accordingly, these high-voltage cables 512 are protected from contact with outside objects by the frame rail 650. Specifically, the sidewall 652 protects from ingress on a first lateral side (e.g., a left side). The bottom wall 654 protects from ingress from below. The top wall 656 protects from ingress from above.

The frame volume 658 opens laterally inward (i.e., toward the other frame rail 650), exposing the high-voltage cables 512. However, a subset of the batteries 60 are positioned between the frame rails 650 and extend across the frame volume 658, enclosing the frame volume 658 and protecting the high-voltage cables 512. An upper portion of the battery compartment 670 extends between the frame rails 650, covering a lower portion of the frame volume 658. Specifically, a top panel 672 and the two upper batteries 60 of the string 532 extend between the frame rails 650. The batteries 60 of the string 536 extend between the frame rails 650, covering an upper portion of the frame volume 658. Accordingly, at one or more points along the length of the chassis 20, the frame volume 658 and the high-voltage cables 512 are completely enclosed and surrounded by the sidewall 652, the bottom wall 654, a top panel 672 of the battery compartment 670, a battery 60 of the string 536, and the top wall 656. As such, the high-voltage cables 512 are protected on all sides. As shown in FIG. 23, a similar arrangement encloses and protects a set of coolant lines 602 within the frame volume 658 of the other frame rail 650. In some embodiments, any in-line connectors that connect two high-voltage cables 512 to one another are positioned above or below the frame rails 650 for ease of access.

Repositionable Body

According to an exemplary embodiment, a vehicle includes a chassis assembly and a body assembly that are operatively coupled by a harness. The harness may include hoses and/or cables. The body assembly is configured to be raised and lowered relative to the chassis assembly (e.g., for maintenance). A first bracket couples the harness to the body assembly, and a second bracket couples the harness to the chassis assembly. The first bracket limits longitudinal movement of the harness while permitting lateral movement and vertical movement of the harness. The second bracket limits longitudinal movement of the harness and downward movement of the harness while permitting upward vertical movement and lateral movement of the harness. This arrangement of the brackets permits the harness to coil and contain slack when the body assembly is in the lowered position. As the body assembly is raised, the second bracket permits the harness to move upward and remove the slack.

Figure 39:
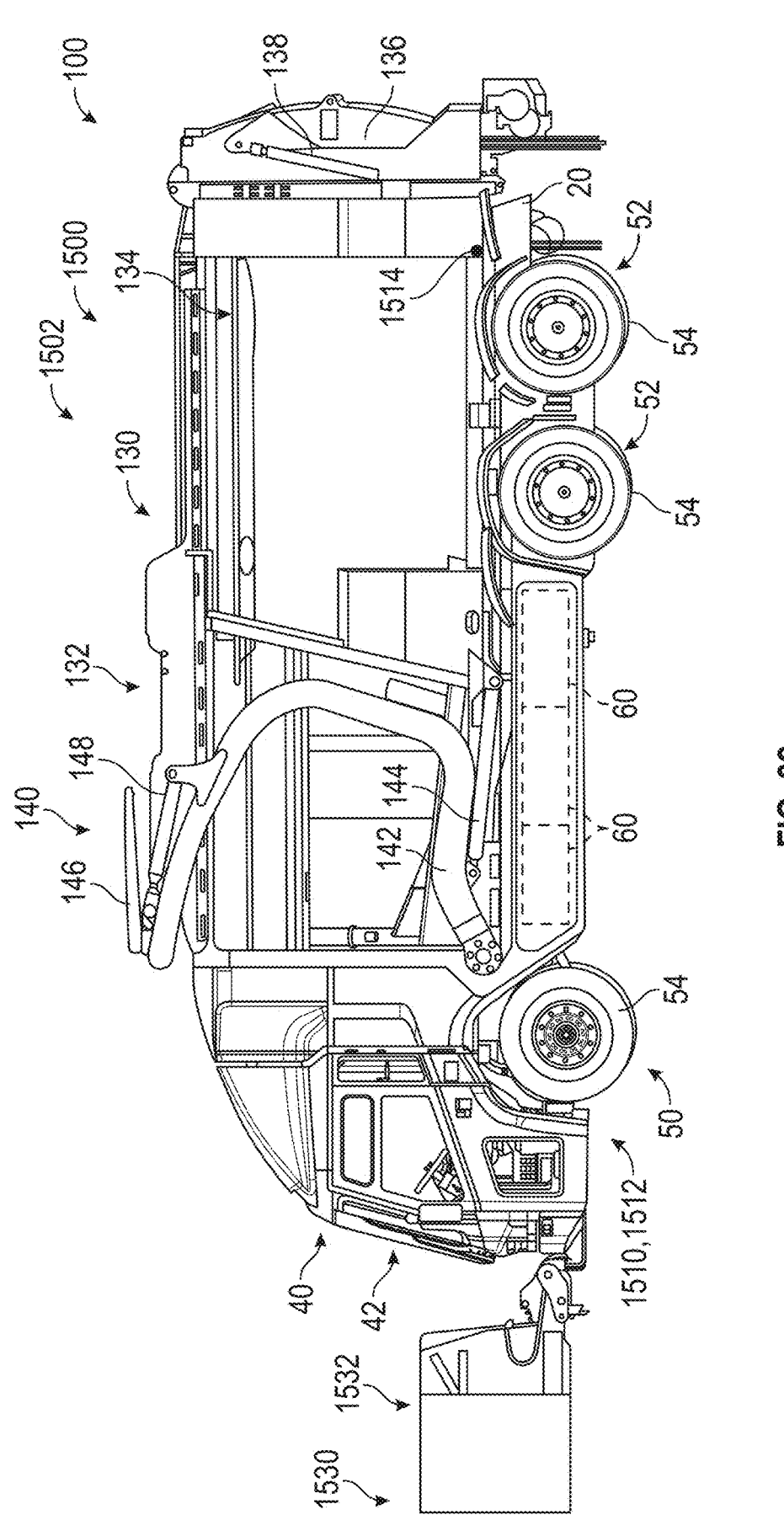
FIG. 39 is a left side view of the front-loading refuse vehicle of FIG. 4 with a body assembly in a lowered position.
Figure 40:
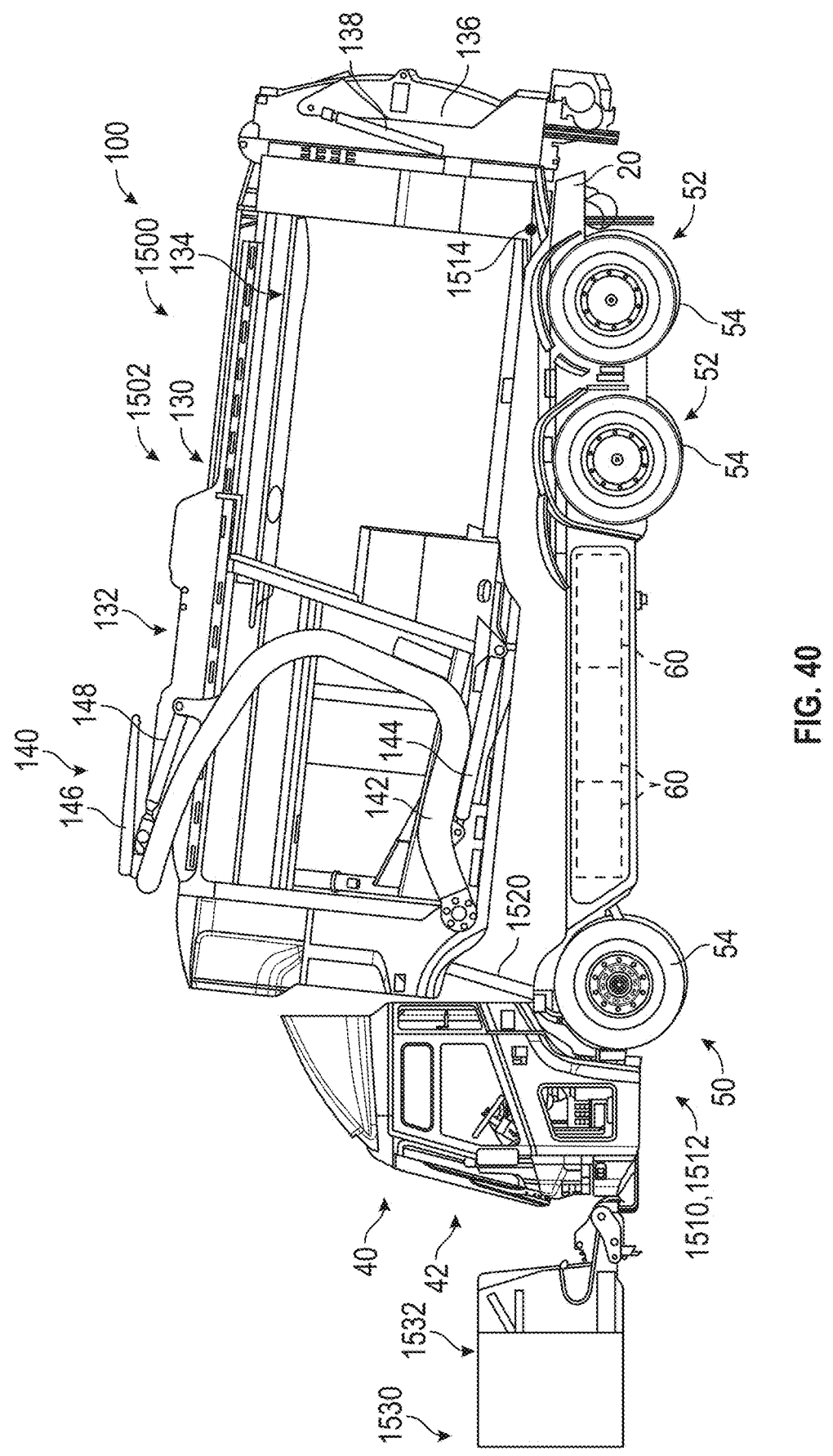
FIG. 40 is a left side view of the front-loading refuse vehicle of FIG. 4 with the body assembly in a raised position.
Figure 41:
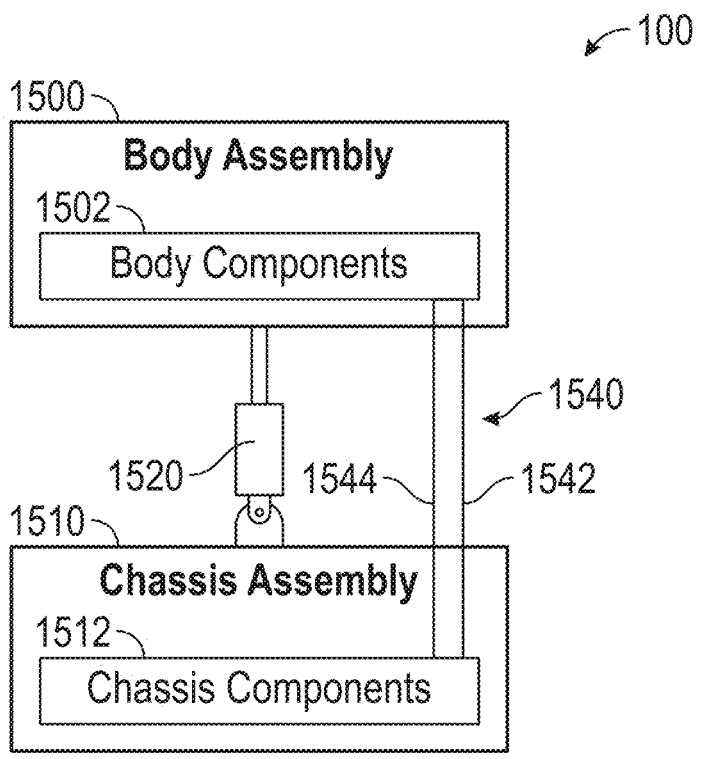
FIG. 41 is a schematic of the front-loading refuse vehicle of FIG. 4.

Referring to FIGS. 39-41, the refuse vehicle 100 is shown according to an exemplary embodiment. As shown, the refuse vehicle 100 is configured as a front-loading refuse vehicle 100. Accordingly, the refuse vehicle 100 of FIGS. 39-41 may represent the refuse vehicle 100 of FIG. 4 except as otherwise specified herein.

The refuse vehicle 100 includes a body assembly 1500 including one or more body components 1502 and a chassis assembly 1510 including one or more chassis components 1512. The body assembly 1500 is movably coupled to the chassis assembly 1510. As shown, the body assembly 1500 is pivotally coupled to the chassis assembly 1510 near a rear end of the refuse vehicle 100. By way of example, the body assembly 1500 may be pinned to the chassis assembly 1510 by a pair of pins such that the body assembly 1500 is pivotable about a lateral axis of rotation 1514 extending through the pins. The body assembly 1500 is repositionable between a lowered position or operating position, shown in FIG. 39, and a raised position or maintenance position, shown in FIG. 40. The lowered position may represent a normal operating configuration of the refuse vehicle 100. The raised position may represent a maintenance configuration of the refuse vehicle 100 in which the body assembly 1500 is raised to facilitate access to one or more components (e.g., components that would be covered by the body assembly 1500 in the lowered position).

One or more actuators, shown as body lift cylinders 1520, are coupled to the body assembly 1500 and the chassis assembly 1510. By way of example, the body lift cylinders 1520 are positioned near a front end of the body assembly 1500 (i.e., forward of the axis of rotation 1514). The body lift cylinders 1520 are configured to raise and lower the body assembly 1500 between the raised position and the lowered position. By way of example, the body lift cylinders 1520 may be or include hydraulic cylinders, pneumatic cylinders, screws, or electric linear actuators. The body lift cylinders 1520 may be powered by the refuse vehicle 100 (e.g., by the batteries 60, by an onboard pump, etc.) or by an external power source (e.g., an external hydraulic pump, by an external battery, by an operator turning a crank, etc.).

The body assembly 1500 represents the assembly of components lifted by the body lift cylinders 1520. The body assembly 1500 generally includes the application kit 80 (e.g., the refuse compartment 130, the tailgate 136, the lift assembly 140, etc.). The body components 1502 may include any components within the body assembly 1500 that perform one or more functions. By way of example, the body components 1502 may include electrical components (e.g., electric motors, power conditioners, batteries, etc.), hydraulic components (e.g., pumps, reservoirs, hydraulic cylinders, etc.), pneumatic components (e.g., air tanks, compressors, pneumatic cylinders, etc.), thermal management components (e.g., heat sinks, radiators, coolant pumps, etc.), controllers, sensors, actuators (e.g., the tailgate actuators 138, the lift arm actuators 144, the articulation actuators 148, etc.), or other components. The body components 1502 may be coupled to the refuse compartment 130.

The refuse vehicle 100 may include an intermediate refuse collection assembly, shown as carry can 1530. The carry can 1530 defines a refuse compartment 1532 that is configured to contain a volume of refuse. The refuse compartment 1532 may be used to temporarily store the refuse while multiple refuse containers (e.g., residential cans) are emptied into the refuse compartment 1532. The carry can 1530 may include one or more actuators (e.g., hydraulic cylinders, electric motors, etc.) that control a refuse collection assembly (e.g., an arm, a tipper, etc.) that empties the refuse containers into the refuse compartment 1532. Once filled, the lift assembly 140 may lift the carry can 1530 to empty the refuse into the refuse compartment 130. The carry can 1530 may be supported by components of the body assembly 1500 (e.g., the lift assembly 140). Accordingly, the lift assembly 140 may be considered part of the body assembly 1500. In other embodiments, the carry can 1530 is removed or omitted entirely from the refuse vehicle 100.

The chassis assembly 1510 represents the assembly of components that move relative to the body assembly 1500 when the body assembly 1500 is lifted by the body lift cylinders 1520. Components of the chassis assembly 1510 support the body assembly 1500. The chassis assembly 1510 includes the chassis 20, the cab 40, the batteries 60, the front axle 50, and the rear axles 52. The chassis components 1512 may include any components within the chassis assembly 1510 that perform one or more functions. By way of example, the chassis components 1512 may include electrical components (e.g., electric motors, power conditioners, the batteries 60, etc.), hydraulic components (e.g., pumps, reservoirs, hydraulic cylinders, etc.), pneumatic components (e.g., air tanks, compressors, pneumatic cylinders, etc.), thermal management components (e.g., heat sinks, radiators, coolant pumps, etc.), controllers, sensors, actuators, or other components. The chassis components 1512 may be coupled to the chassis 30.

As shown in FIG. 41, the refuse vehicle 100 includes a connection assembly, bundle, loop, wiring harness, hose harness, or hose and wiring harness, shown as harness 1540, that extends between the body assembly 1500 and the chassis assembly 1510. The harness 1540 operatively couples at least one of the body components 1502 to at least one of the chassis components 1512. The harness 1540 may fluidly couple the body components 1502 and the chassis components 1512 (e.g., transferring coolant, hydraulic oil, compressed air, etc. between the body components 1502 and the chassis components 1512). The harness 1540 may electrically couple the body components 1502 and the chassis components 1512 (e.g., transferring power, electrical signals, etc. between the body components 1502 and the chassis components 1512). The harness 1540 may communicatively couple the body components 1502 and the chassis components 1512 (e.g., transferring data, instructions, etc. between the body components 1502 and the chassis components 1512).

The harness 1540 may include wires, cables, or electrical connections, shown as cables 1542. The cables 1542 may be configured to electrically and/or communicatively couple the body components 1502 and the chassis components 1512. Additionally or alternatively, the harness 1540 may include conduits (e.g., hoses, pipes, tubes, channels, lines, ducts, etc.), shown as hoses 1544. The hoses 1544 may be configured to fluidly couple the body components 1502 and the chassis components 1512.

Figure 43:
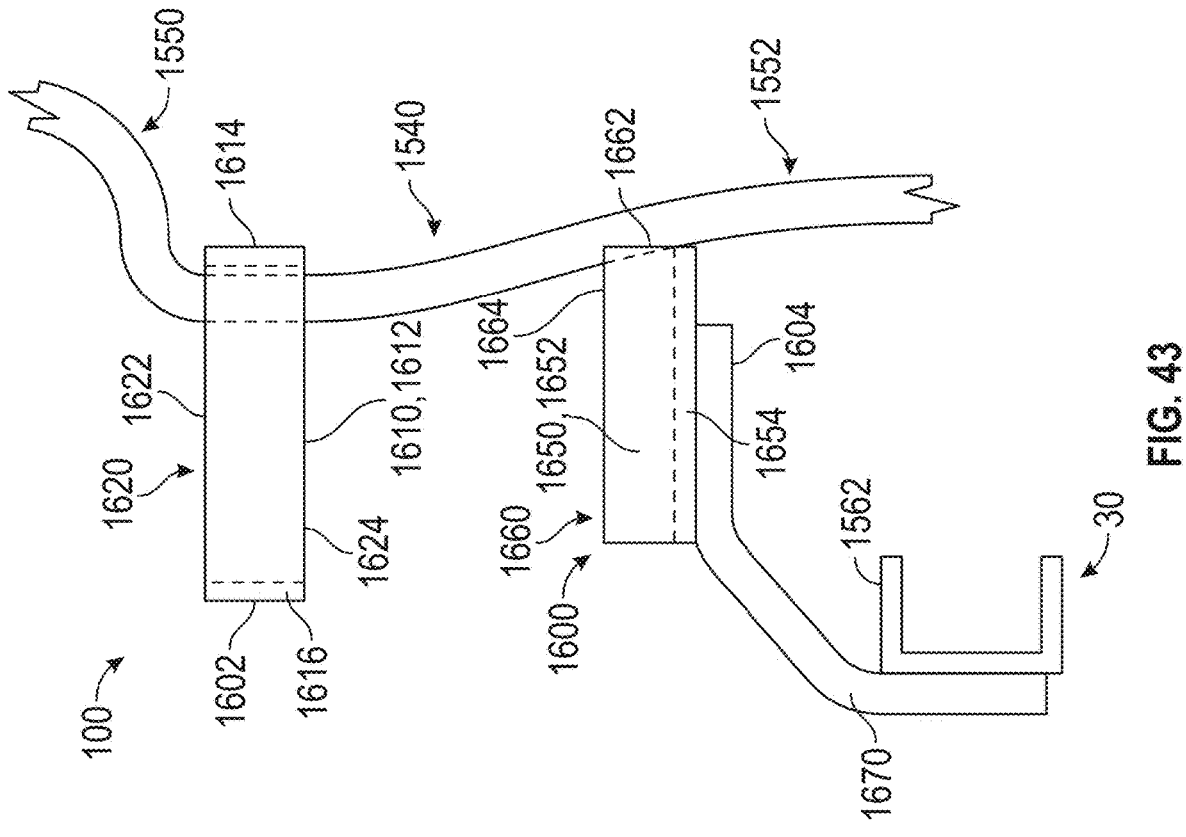
FIG. 43 is a schematic of the front-loading refuse vehicle of FIG. 4 with the body assembly in the raised position.
Figure 42:
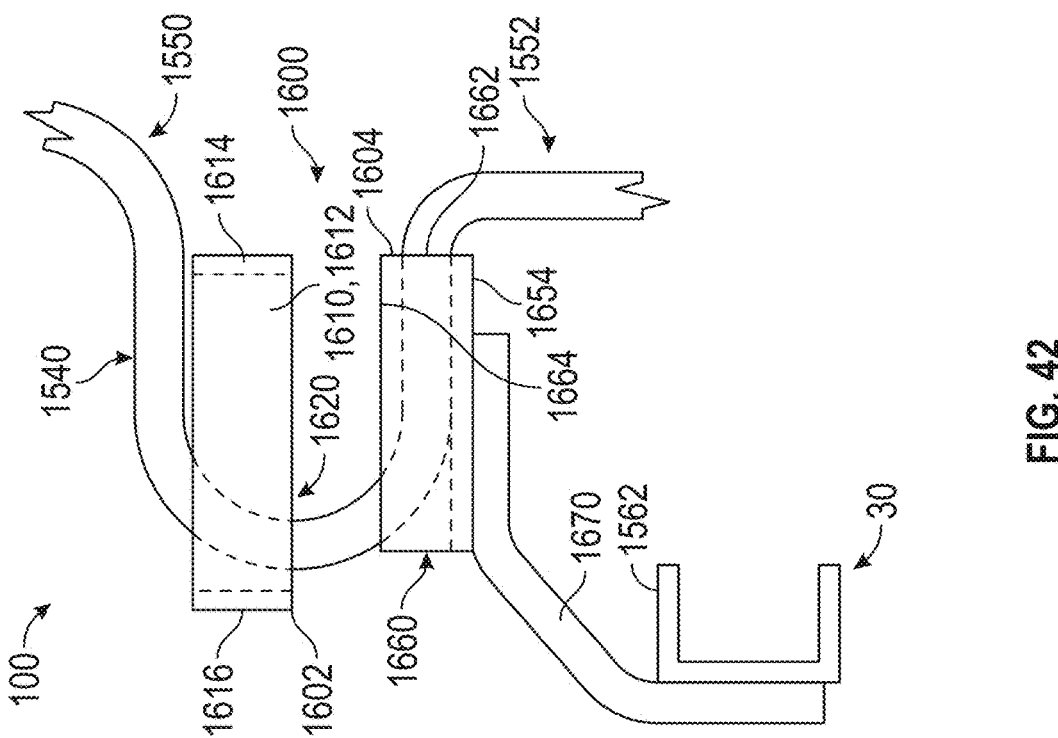
FIG. 42 is a schematic of the front-loading refuse vehicle of FIG. 4 with the body assembly in the lowered position.

Referring to FIGS. 42 and 43, the harness 1540 may be flexible such that the harness 1540 is capable of repeated bending throughout operation without damage. By way of example, the cables 1542 and the hoses 1544 may be flexible to permit the bending. A first portion 1550 of the harness 1540 (e.g., an upper end) may be fixedly coupled to the body assembly 1500, and a second portion 1552 of the harness 1540 may be fixedly coupled to the chassis assembly 1510. Accordingly, as the body assembly 1500 is raised or lowered, a distance between the first portion 1550 and the second portion 1552 may vary. The harness 1540 may bend to accommodate this relative motion. Accordingly, the flexible nature of the harness 1540 may avoid damage that could otherwise be caused by repeated raising and lowering of the body assembly 1500.

Figure 44:
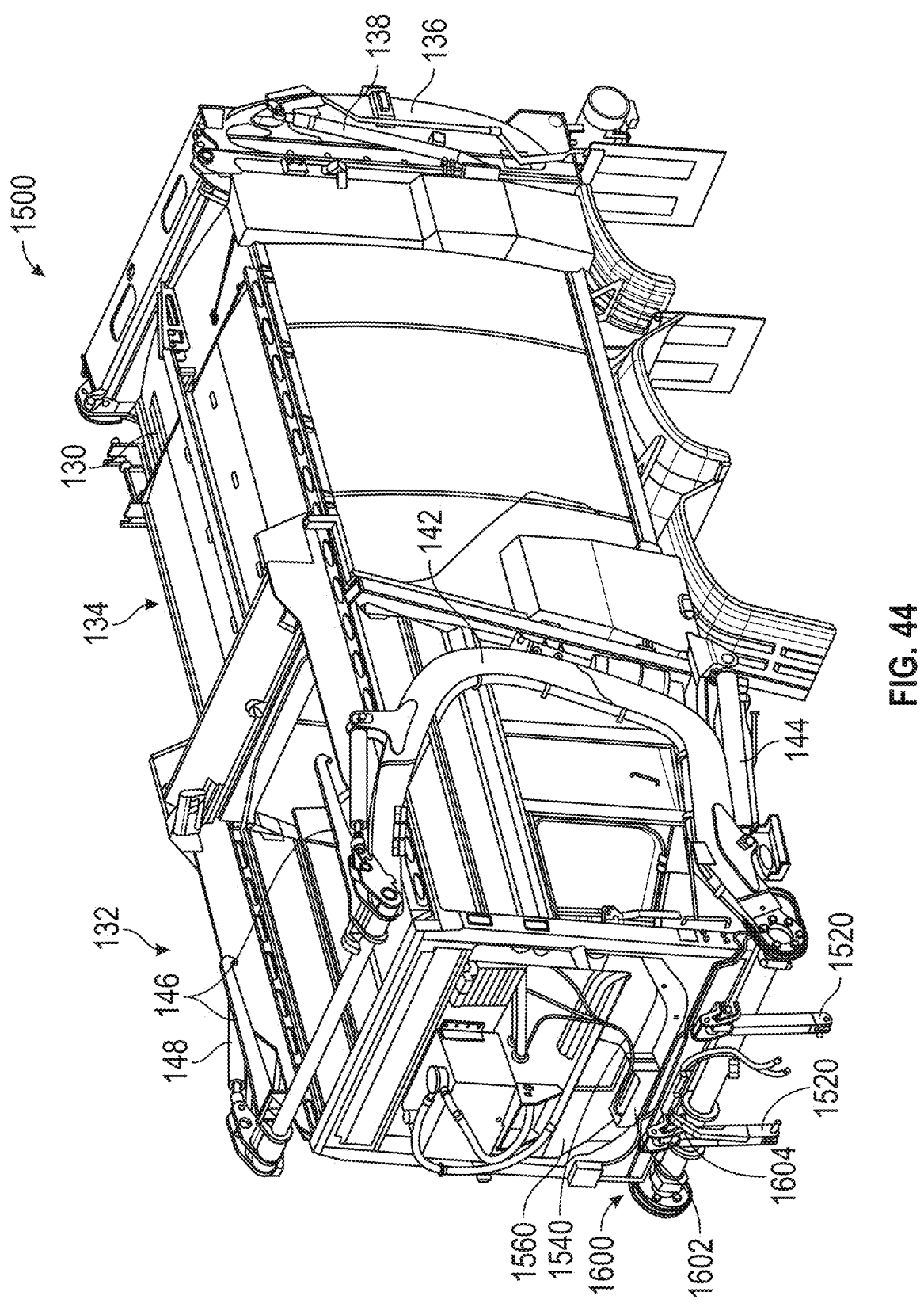
FIG. 44 is a perspective view of the body assembly of the front-loading refuse vehicle of FIG. 4.
Figure 45:
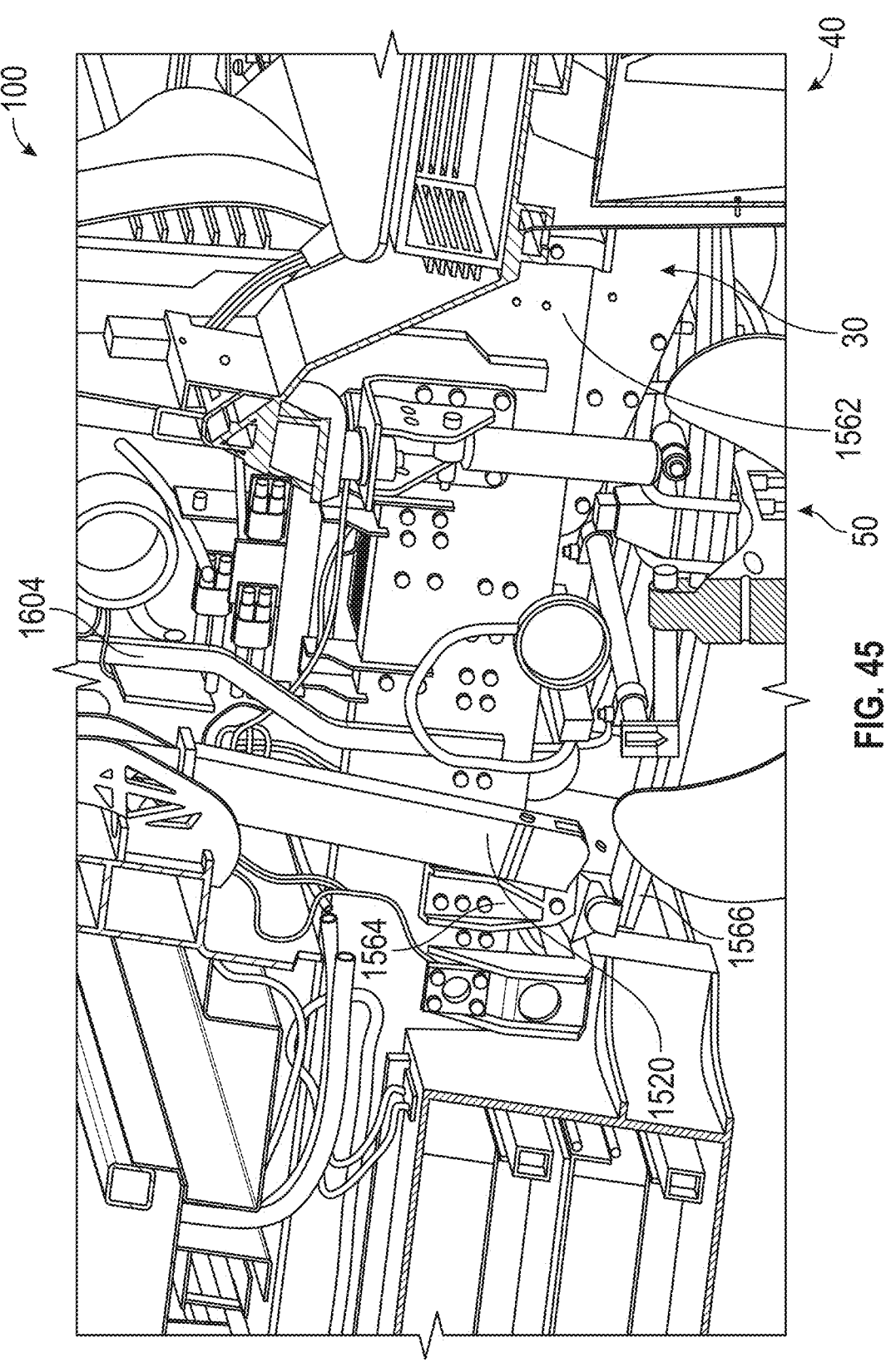
FIGS. 45 and 46 are right side section views of the front-loading refuse vehicle of FIG. 4.
Figure 46:
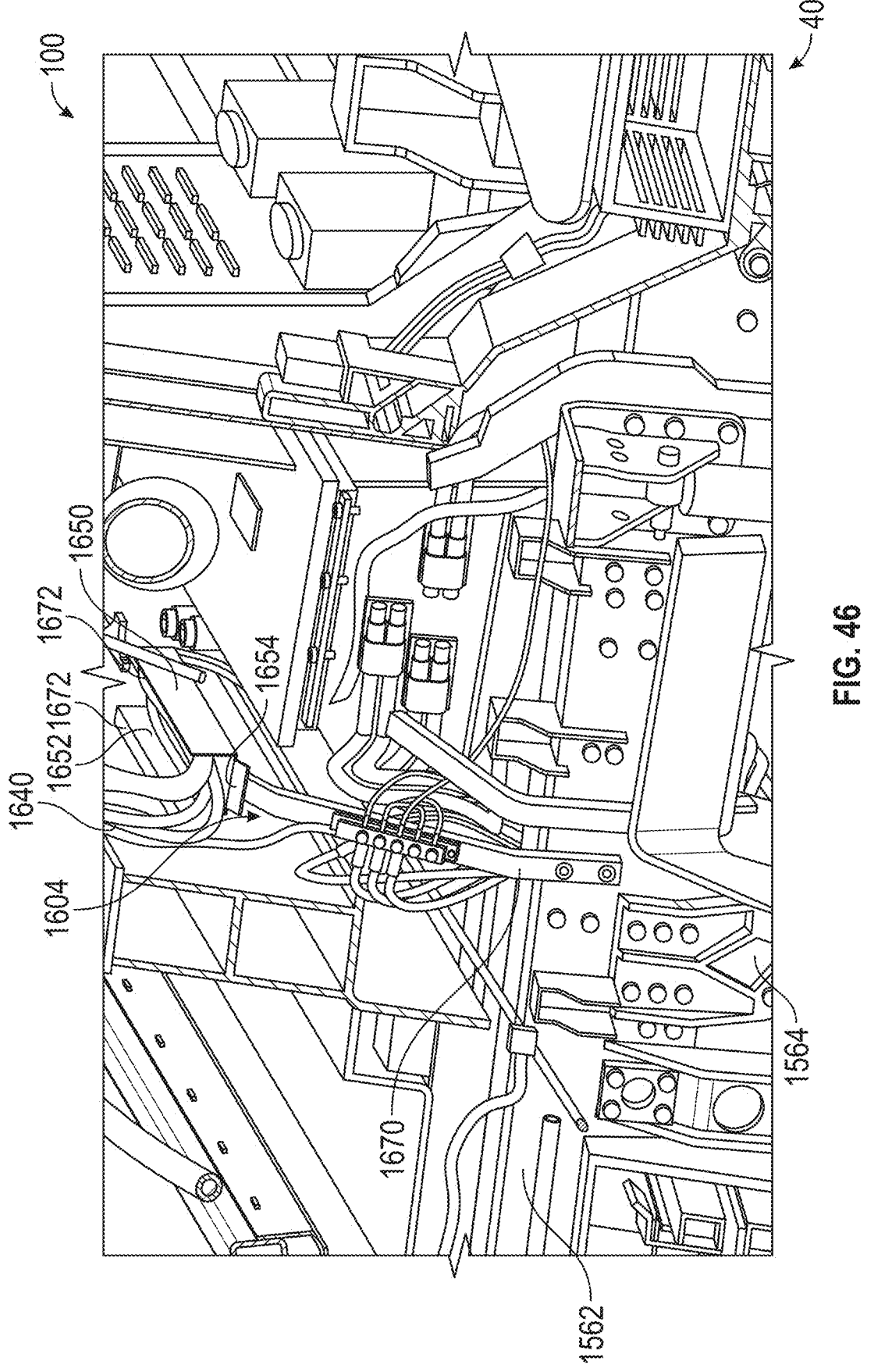
Figure 47:
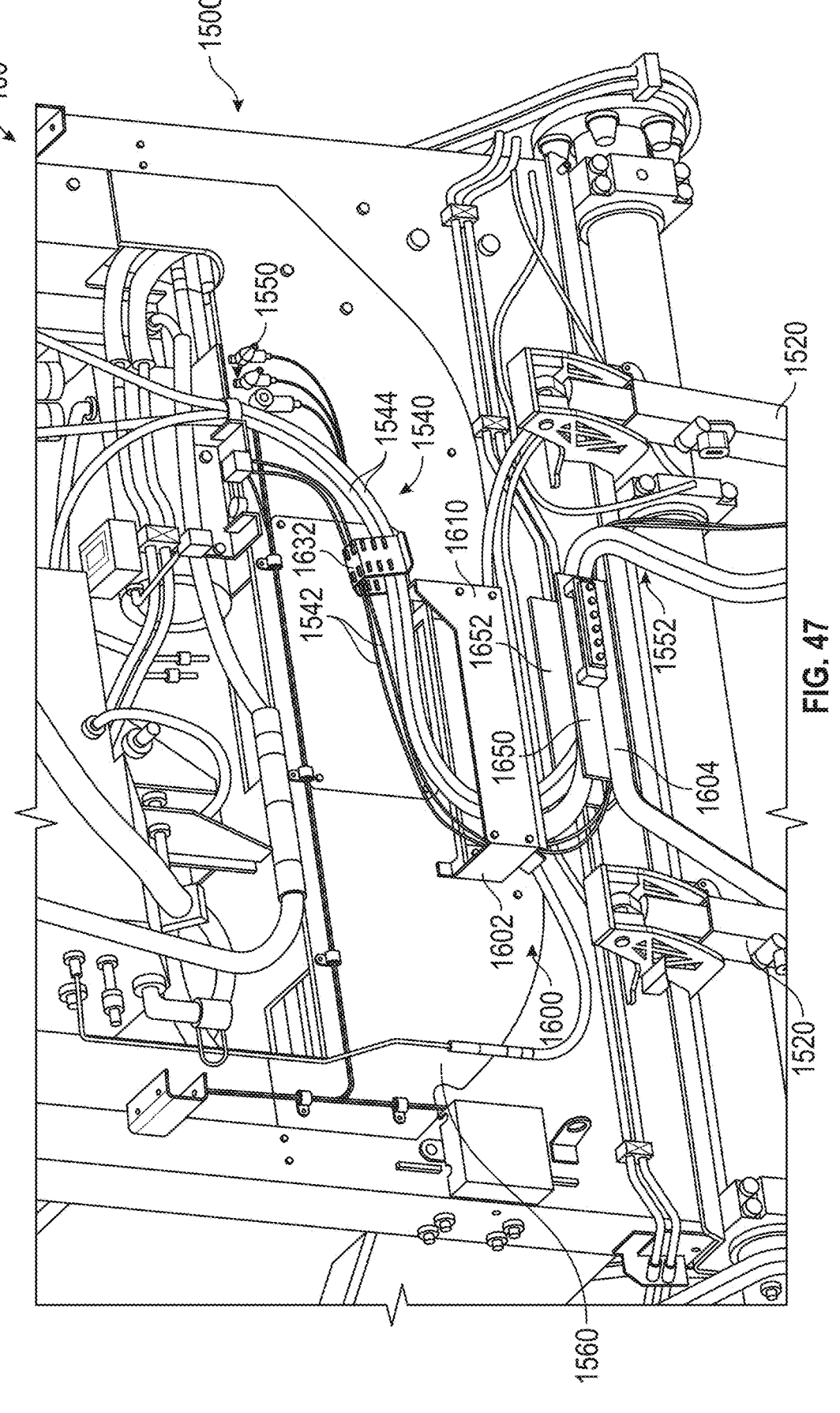
FIGS. 47-51 are perspective views of the body assembly of the front-loading refuse vehicle of FIG. 4.
Figure 48:
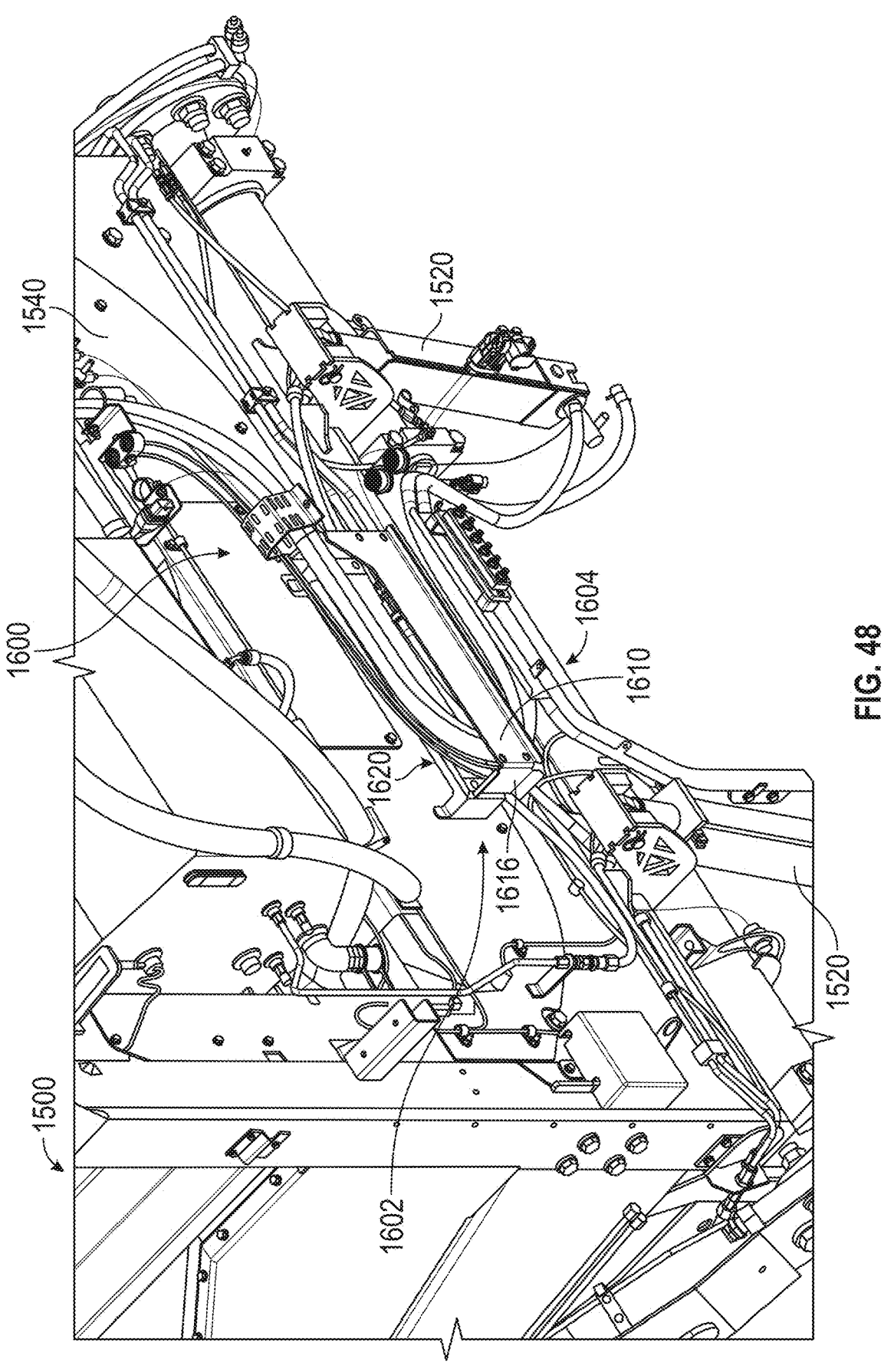
Figure 49:
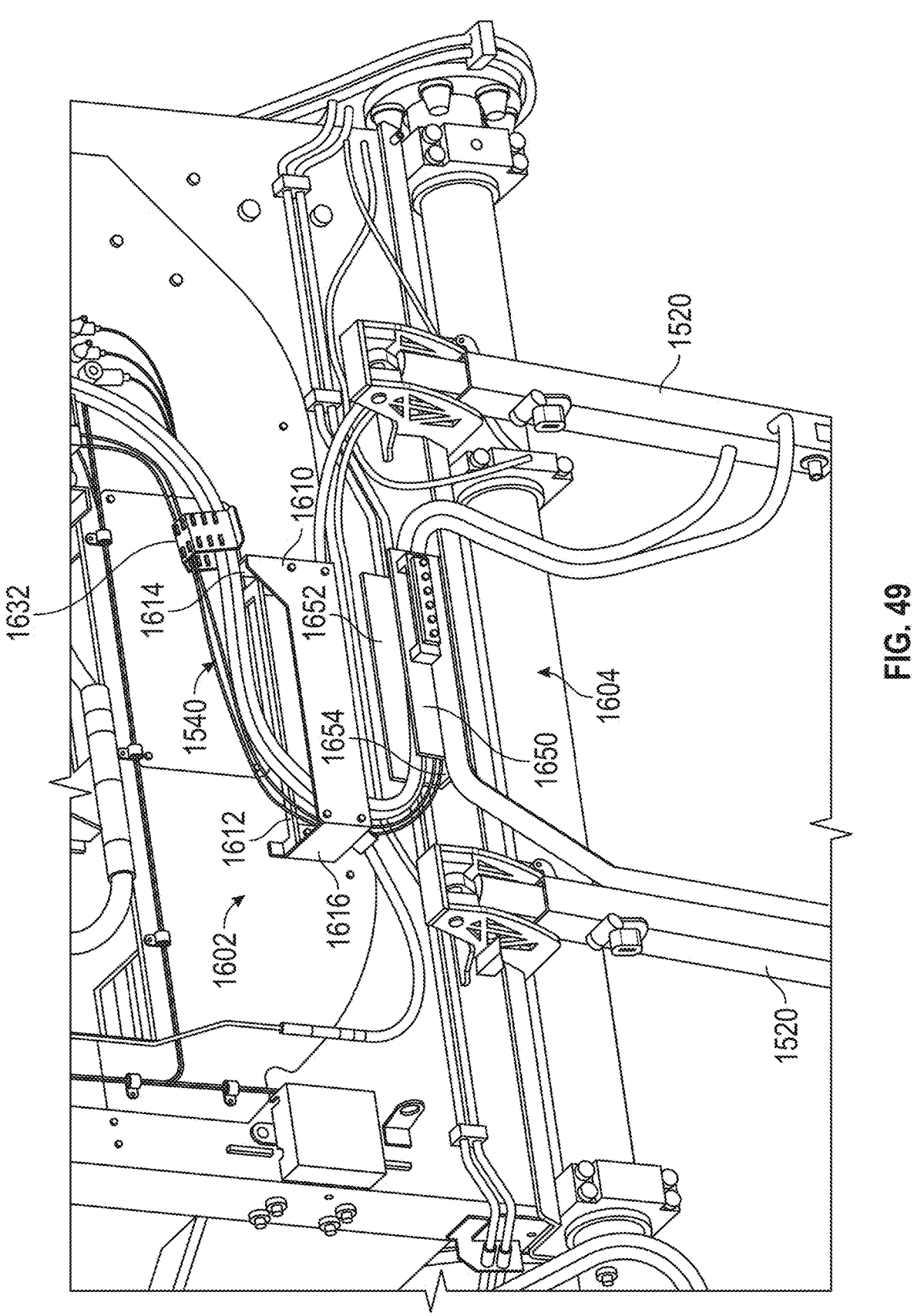

Referring to FIGS. 44 and 45, connections between the body lift cylinders 1520, the body assembly 1500, and the chassis assembly 1510 are shown according to an exemplary embodiment. The body lift cylinders 1520 extend substantially vertically. The body lift cylinders 1520 are laterally offset from one another and positioned along a front wall 1560 of the refuse compartment 130. The front wall 1560 extends laterally and vertically. The front wall 1560 faces in a longitudinally forward direction. An upper end portion of each body lift cylinder 1520 is coupled to the front wall 1560. A lower end portion of each body lift cylinder 1520 is coupled to the chassis 30. As shown in FIG. 45, the chassis 30 includes a pair of longitudinally-extending frame members, shown as frame rails 1562. The frame rails 1562 extend longitudinally beneath the body assembly 1500 and are laterally offset from one another. A bracket, shown as mount 1564, couples the lower end portion of the body lift cylinder 1520 to the frame rail 1562. Each mount 1564 is additionally directly coupled to a suspension element, shown as leaf spring 1566, that couples front axle 50 to the chassis 30.

Referring to FIGS. 42-47, the refuse vehicle 100 includes a bracket assembly or harness support assembly, shown as harness support 1600, that is configured to support and constrain the motion of the harness 1540. The harness support 1600 extends between the front wall 1560 of the refuse compartment 130 and a rear wall of the cab 40. The harness support 1600 includes a first support or bracket, shown as body bracket 1602, and a second support or bracket, shown as chassis bracket 1604. The body bracket 1602 is fixedly coupled to body assembly 1500. Specifically, the body bracket 1602 is fixedly coupled to the front wall 1560 of the refuse compartment 130. The chassis bracket 1604 is fixedly coupled to the chassis assembly 1510. Specifically, the chassis bracket 1604 is fixedly coupled to one of the frame rails 1562. The harness 1540 extends through the body bracket 1602 and the chassis bracket 1604.

The body bracket 1602 limits longitudinal and lateral movement of the harness 1540. The chassis bracket 1604 limits longitudinal and downward movement of the harness 1540.

Referring to FIGS. 47-52, the body bracket 1602 includes a series of walls, panels, or partitions including (a) a front wall 1610, (b) a rear wall 1612, (c) a side wall 1614, and (d) a side wall 1616 that are fixedly coupled to one another to form the body bracket 1602. The front wall 1610 and the rear wall 1612 each extend laterally and vertically. The front wall 1610 and the rear wall 1612 are longitudinally offset from one another. The side wall 1614 and the side wall 1616 each extend vertically and longitudinally. Specifically, the side wall 1614 and the side wall 1616 extend longitudinally between the front wall 1610 and the rear wall 1612. The side wall 1614 and the side wall 1616 are laterally offset from one another.

The front wall 1610, the rear wall 1612, the side wall 1614, and the side wall 1616 define a volume, shown as passage 1620, therebetween. The passage 1620 extends vertically through the body bracket 1602 from an aperture 1622 along the top of the body bracket 1602 to an aperture 1624 along the bottom of the body bracket 1602. The harness 1540 extends through the passage 1620. The front wall 1610 limits forward movement of the harness 1540 (i.e., movement of the harness 1540 in a first longitudinal direction) within the passage 1620. The rear wall 1612 limits rearward movement of the harness 1540 (i.e., movement of the harness 1540 in a second longitudinal direction) within the passage 1620. The side wall 1614 limits movement of the harness 1540 in a first lateral direction within the passage 1620. The side wall 1616 limits movement of the harness 1540 in a second lateral direction within the passage 1620. Accordingly, the body bracket 1602 surrounds the harness 1540 but permits free vertical movement of the harness 1540 (e.g., up and down) through the passage 1620 and limited lateral movement of the harness 1540 within the passage 1620.

A series of spacers, shown as standoffs 1630, extend between the rear wall 1612 and the front wall 1560, coupling the body bracket 1602 to the refuse compartment 130. The standoffs 1630 space the rear wall 1612 forward of the front wall 1560. In other embodiments, the rear wall 1612 is omitted, and the front wall 1560 acts as the rear wall 1612.

A coupler or guide, shown as collar 1632, is fixedly coupled to a top portion of the side wall 1614. The harness 1540 extends laterally though the collar 1632. Accordingly, the collar 1632 directs the harness 1540 laterally away from the body bracket 1602. In some embodiments, the collar 1632 cinches or tightens around the 1540 to fix the first portion 1550 of the harness 1540 to the body assembly 1500.

Figure 50:
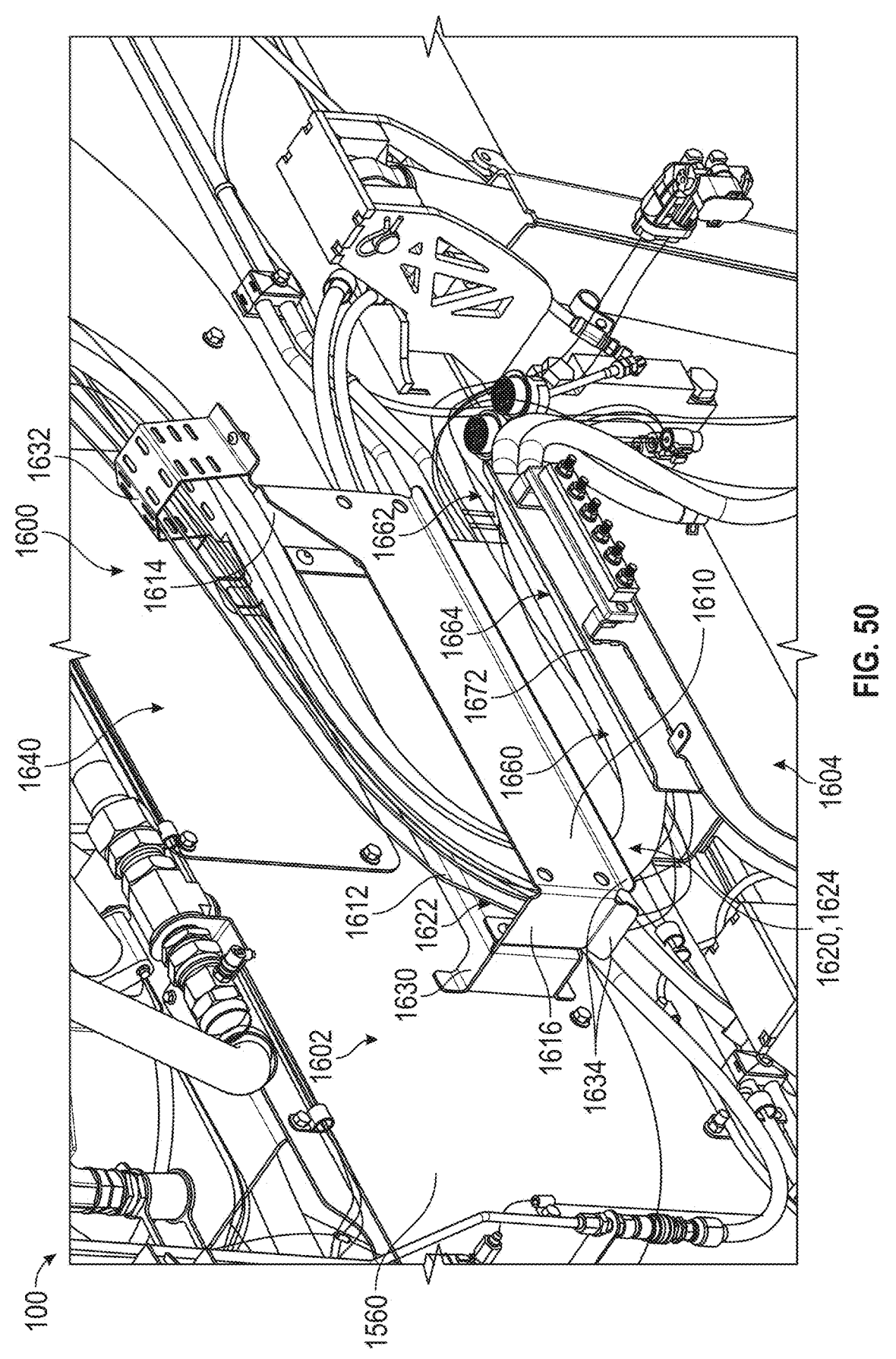
Figure 51:
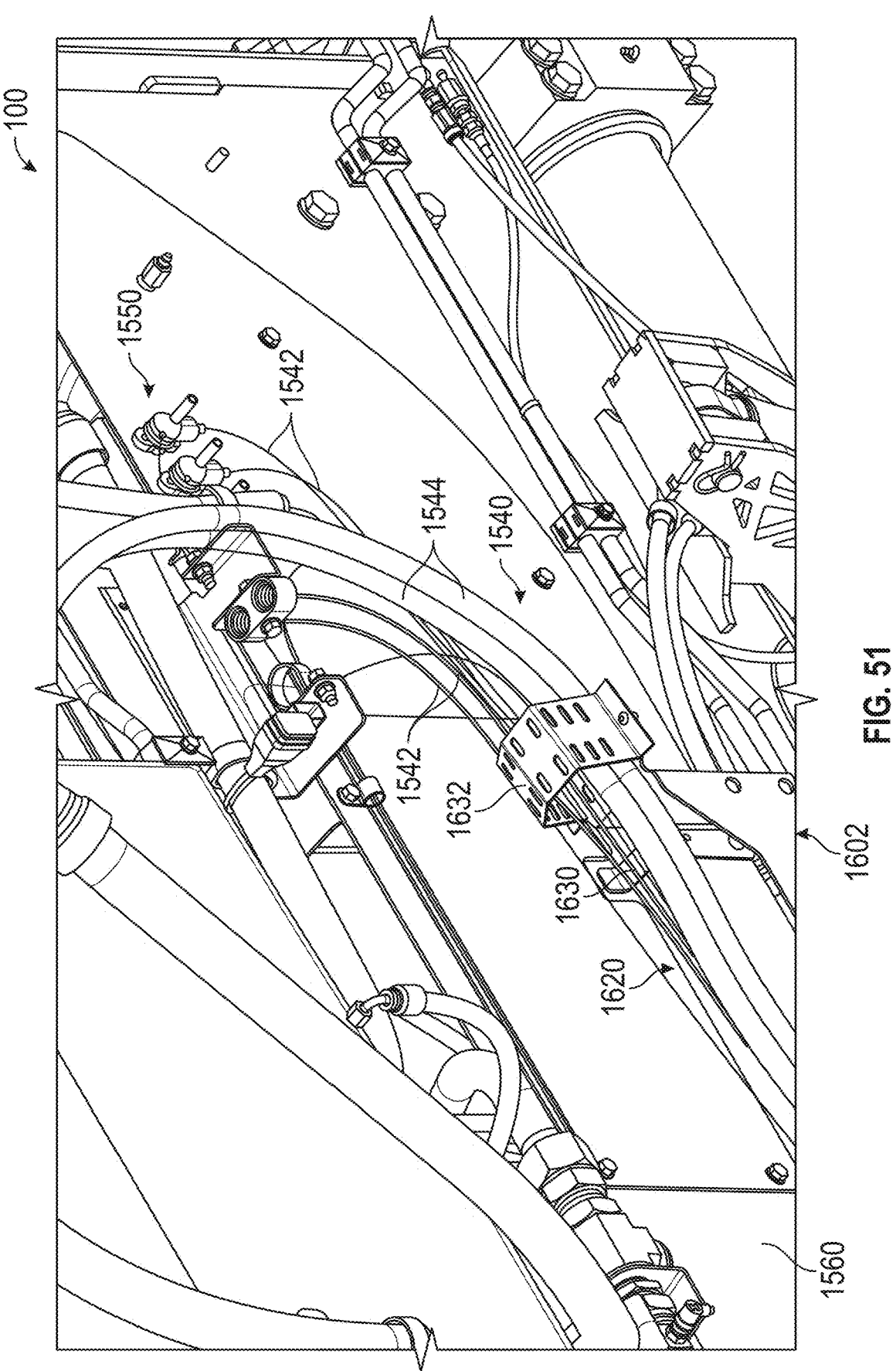
Figure 52:
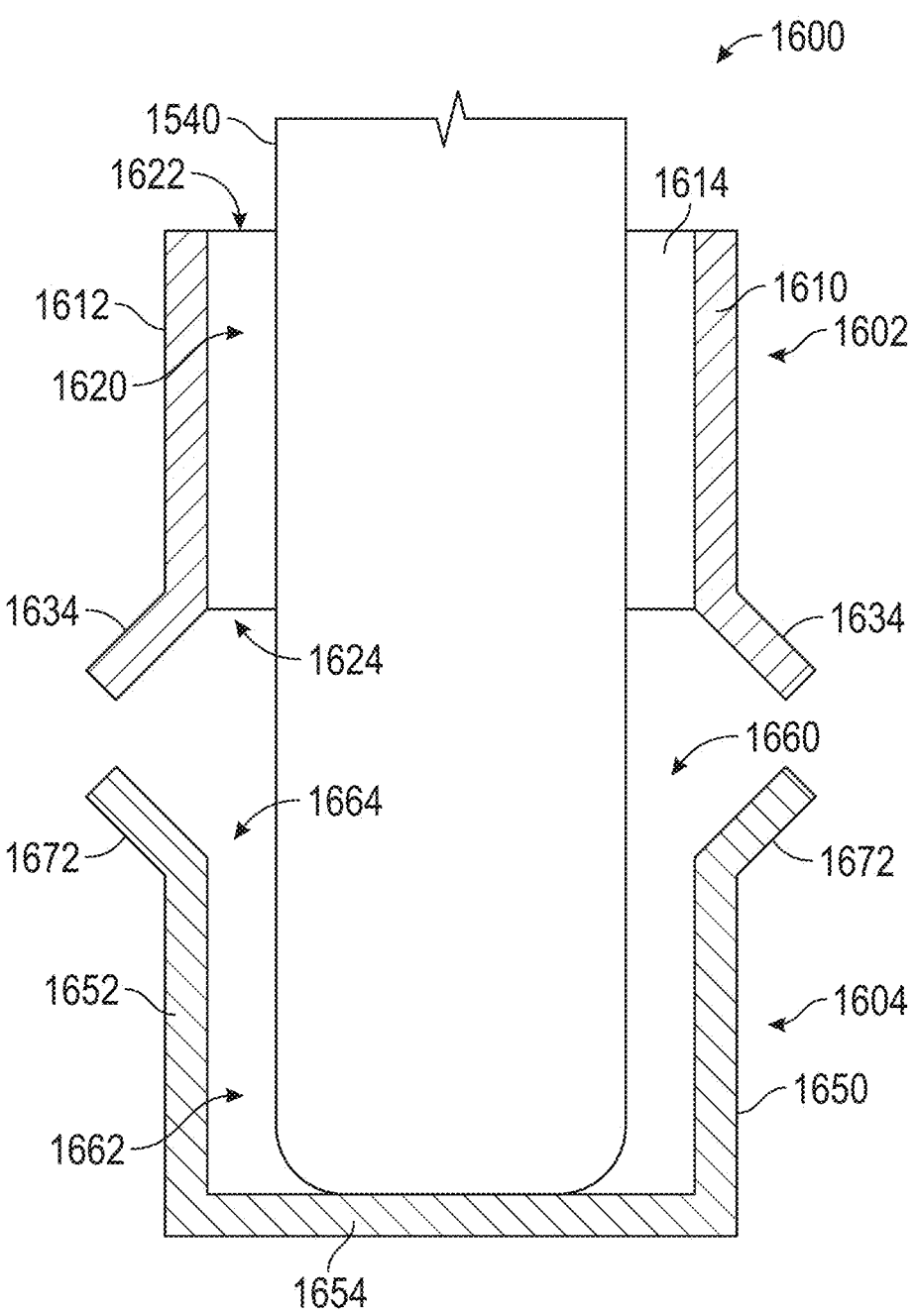
FIG. 52 is a right side section view of a harness support of the front-loading refuse vehicle of FIG. 4.

As shown in FIGS. 50 and 52, a series of directing flanges or guides, shown as angled flanges 1634, are positioned along the bottom of the body bracket 1602. The angled flanges 1634 extend downward and outward from the aperture 1624. As shown, the angled flanges 1634 are coupled to the side wall 1616 and the front wall 1610. The angled flanges 1634 guide the harness 1540 into the passage 1620. By way of example, when the body assembly 1500 is being lowered, the angled flanges 1634 may engage the harness 1540 to force the harness 1540 into the passage 1620 if the harness 1540 moves out of lateral or longitudinal alignment with the passage 1620.

Referring to FIGS. 42, 43, 46, 47, 49, 50, and 52, the chassis bracket 1604 includes a series of walls, panels, or partitions including (a) a front wall 1650, (b) a rear wall 1652, and (c) a bottom wall 1654 that are fixedly coupled to one another to form the chassis bracket 1604. The front wall

1650 and the rear wall 1652 each extend laterally and vertically. The front wall 1650 and the rear wall 1652 are longitudinally offset from one another. The bottom wall 1654 extends laterally and longitudinally. Specifically, the bottom wall 1654 extends longitudinally between the front wall 1650 and the rear wall 1652.

The front wall 1650, the rear wall 1652, and the bottom wall 1654 define a volume, shown as passage 1660, therebetween. The passage 1660 extends laterally and vertically through the chassis bracket 1604 from an aperture 1662 along the left side of the chassis bracket 1604 to an aperture 1664 along the top of the chassis bracket 1604. The harness 1540 extends through the passage 1660. The front wall 1650 limits forward movement of the harness 1540 (i.e., movement of the harness 1540 in a first longitudinal direction) within the passage 1660. The rear wall 1652 limits rearward movement of the harness 1540 (i.e., movement of the harness 1540 in a second longitudinal direction) within the passage 1660. The bottom wall 1654 limits downward movement of the harness 1540 within the passage 1660. Accordingly, the body bracket 1602 permits free upward movement and free lateral movement of the harness 1540 through the passage 1660, but limits how far downward the harness 1540 is permitted to move. If the harness 1540 were lifted upward sufficiently, the harness 1540 could be completely removed from the passage 1660, as the body bracket 1602 does not completely enclose the harness 1540.

A spacer or standoff, shown as support 1670, extends between chassis bracket 1604 and one of the frame rails 1562, coupling the chassis bracket 1604 to the chassis 30. The support 1670 extends along a vertical, laterally outward facing surface of the frame rail 1562. The support 1670 extends upward and laterally inward from the frame rail 1562 to the chassis bracket 1604. The support 1670 places the chassis bracket 1604 in the same longitudinal position as the body bracket 1602. Accordingly, the support 1670 aligns the passage 1660 with the passage 1620.

As shown in FIG. 52, a series of directing flanges or guides, shown as angled flanges 1672, are positioned along the top of the chassis bracket 1604. The angled flanges 1672 extend upward and outward from the aperture 1664. As shown, the angled flanges 1672 are coupled to the front wall 1650 and the rear wall 1652. The angled flanges 1672 guide the harness 1540 into the passage 1660 if the harness 1540 is longitudinally offset from the passage 1660.

Referring to FIGS. 42, 43, and 52, the harness support 1600 guides the harness 1540 as the body assembly 1500 moves between the raised position and the lowered position. In the lowered position, the first portion 1550 and the second portion 1552 are positioned close to one another, forming slack in the harness 1540. The harness 1540 rests on the bottom wall 1654 of the chassis bracket 1604. The front wall 1650 and the rear wall 1652 control the longitudinal position of the harness 1540 within the chassis bracket 1604. The front wall 1610 and the rear wall 1612 control the longitudinal position of the harness 1540 within the body bracket 1602. The slack within the harness 1640 causes the harness 1640 to coil outward and extend toward a first lateral end of the passage 1620.

As the body assembly 1500 moves from the lowered position toward the raised position, the first portion 1550 and the second portion 1552 move away from one another, removing slack from the harness 1540. The harness 1540 lifts off of the bottom wall 1654 of the chassis bracket 1604. The harness 1540 moves out from between the front wall 1650 and the rear wall 1652, permitting the harness 1540 to move longitudinally relative to the chassis assembly 1510.

This longitudinal freedom of movement may be desirable, as the pivoting action of the body assembly 1500 may cause the body assembly 1500 to move rearward as the body assembly 1500 approaches the raised position. The front wall 1610 and the rear wall 1612 continue to control the longitudinal position of the harness 1540 within the body bracket 1602. As the slack within the harness 1640 is removed, the harness 1640 straightens, moving downward and toward a second lateral end of the passage 1620. Accordingly, the body bracket 1602 maintains the longitudinal position of the harness 1640 relative to the body assembly 1500 while permitting the harness 1640 to move vertically and laterally within the passage 1620 as the slack is removed.

As the body assembly 1500 moves from the raised position to the lowered position, the reverse of this process is followed. If the harness 1540 moves out of alignment with the passage 1620, the angled flanges 1634 guide the harness 1540 into the passage 1620 as the body assembly 1500 is lowered. Similarly, if the harness 1540 moves out of alignment with the passage 1660, the angled flanges 1672 guide the harness 1540 into the passage 1660 as the body assembly 1500 is lowered. Accordingly, the harness 1540 and the harness support 1600 permit repeated raising and lowering of the body assembly 1500 while constraining the motion of the harness 1540 and without damage to the harness 1540.

While the harness support 1600 is shown being utilized with a front-loading refuse vehicle, the harness support 1600 may be incorporated into any other vehicle having a body assembly that is movable relative to a chassis assembly. By way of example, the harness support 1600 may be used with a side-loading refuse vehicle or a rear-loading refuse vehicle. In other embodiments, the harness support 1600 is usable with other types of vehicles (e.g., military vehicles, delivery vehicles, fire trucks, etc.).

Service Step Above High Voltage Power Distribution

According to an exemplary embodiment, a vehicle includes a cab, a refuse compartment, a chassis, and a high voltage power distribution unit (HVPDU). The HVPDU includes a battery, a plurality of cables, and a manual service disconnect. The manual service disconnect may be accessed via a through hole of a wheel well of the refuse vehicle. The vehicle may further include a platform removably coupled to the chassis and the HVPDU and configured to enclose the high voltage power distribution unit. In some embodiments, the through hole of the wheel well may be covered by a flap of material fastened to the wheel well. In some embodiments, the HVPDU may direct power from the battery to a plurality of components of the refuse vehicle via the plurality of cables.

Figure 53:
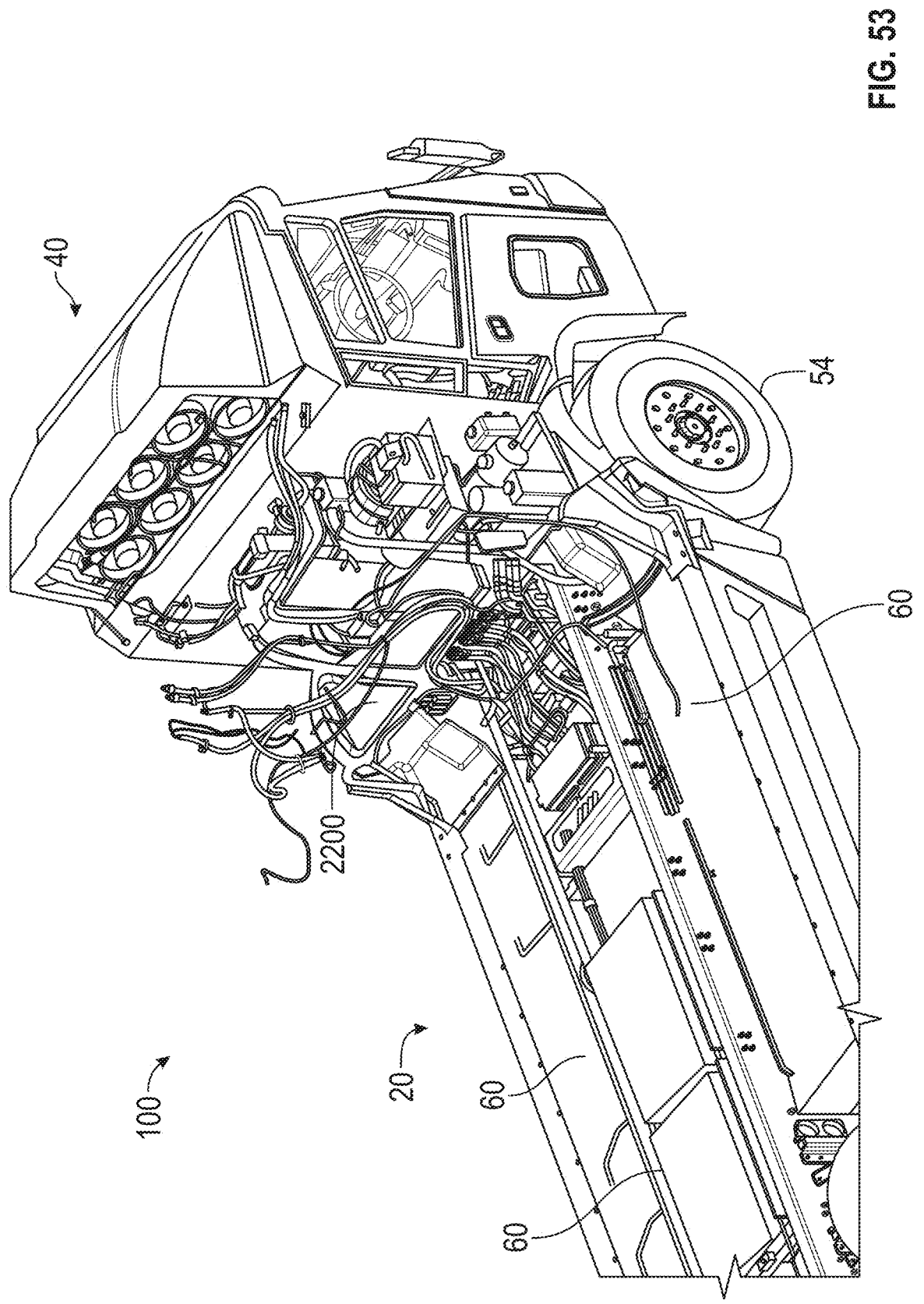
FIG. 53 is a perspective view of the vehicle of FIG. 1 configured as a refuse vehicle, according to an exemplary embodiment.
Figure 54:
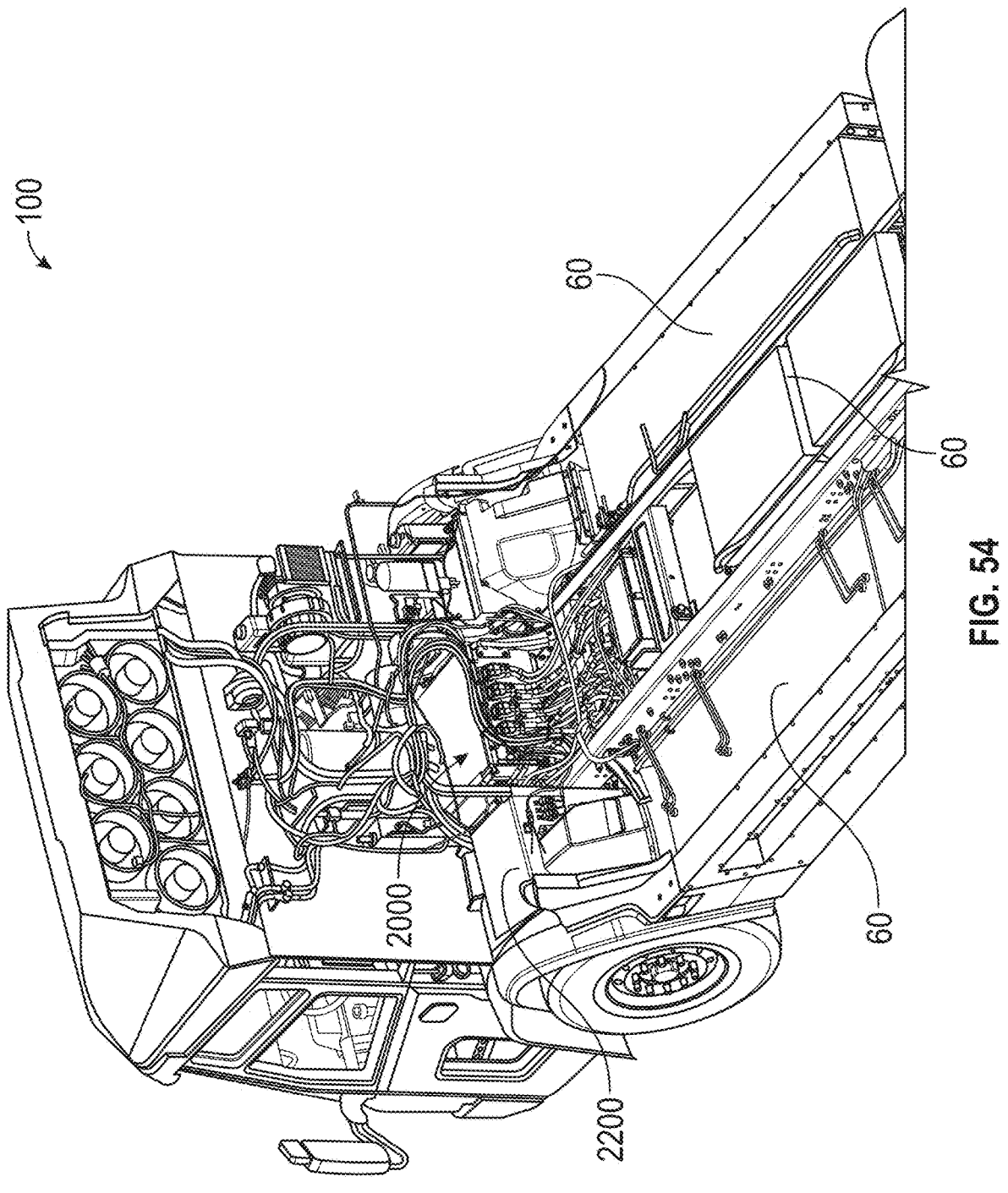
FIG. 54 is a perspective view of the vehicle of FIG. 1 configured as a refuse vehicle, according to an exemplary embodiment.
Figure 55:
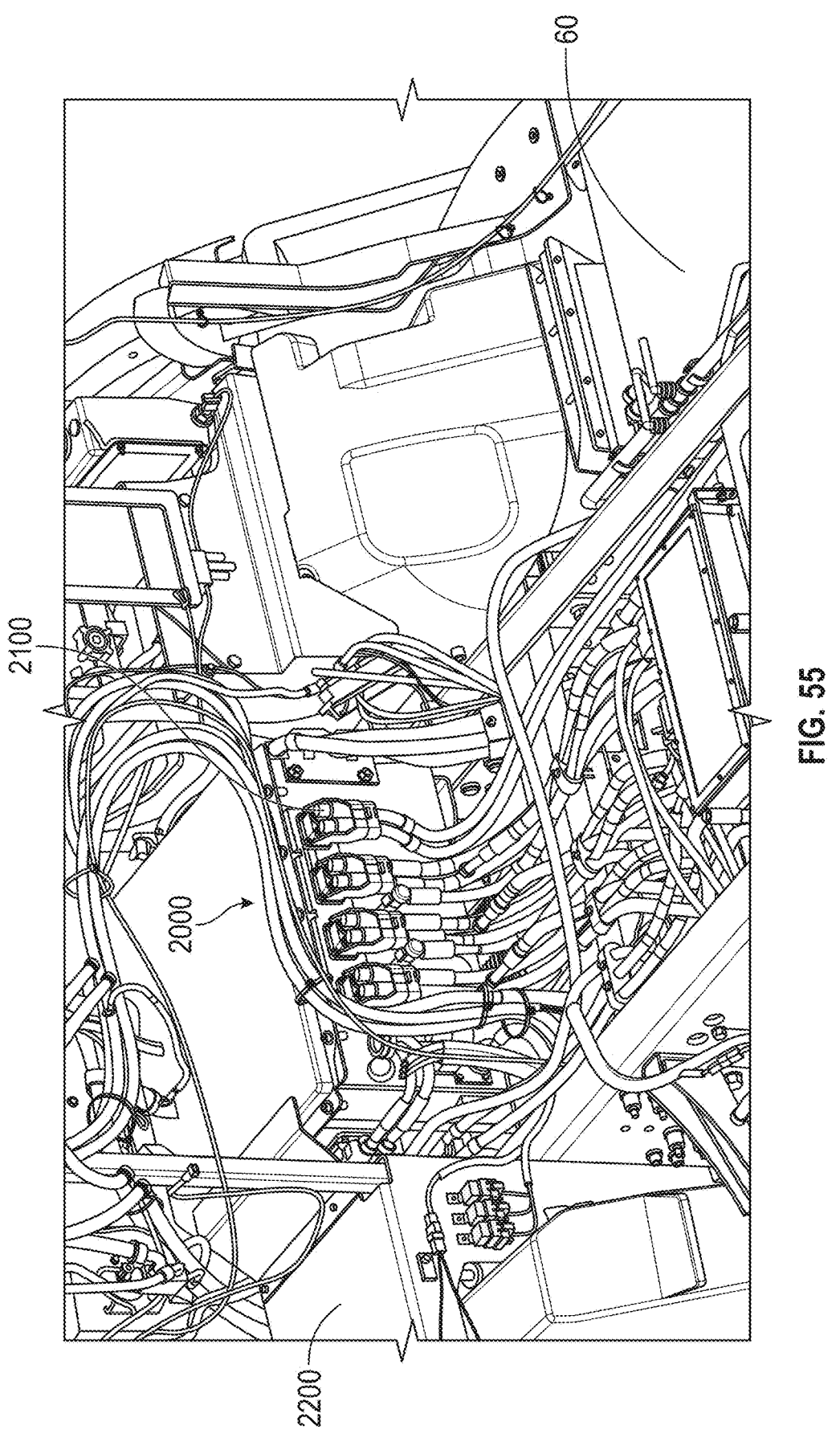
FIG. 55 is a perspective view of a high voltage power distribution unit of the vehicle of FIG. 1, according to an exemplary embodiment.
Figure 56:
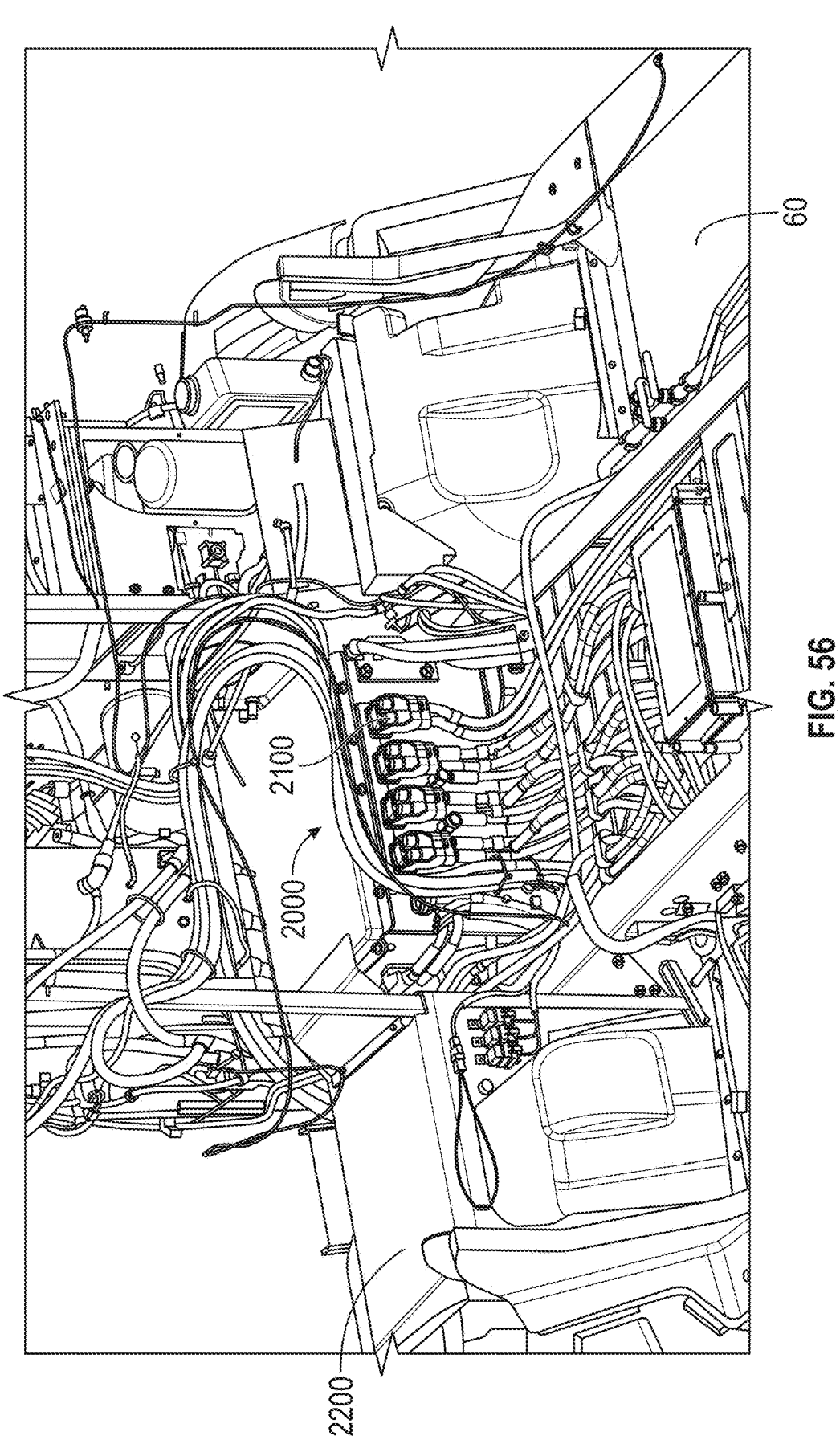
FIG. 56 is a perspective view of a high voltage power distribution unit of the vehicle of FIG. 1, according to an exemplary embodiment.
Figure 57:
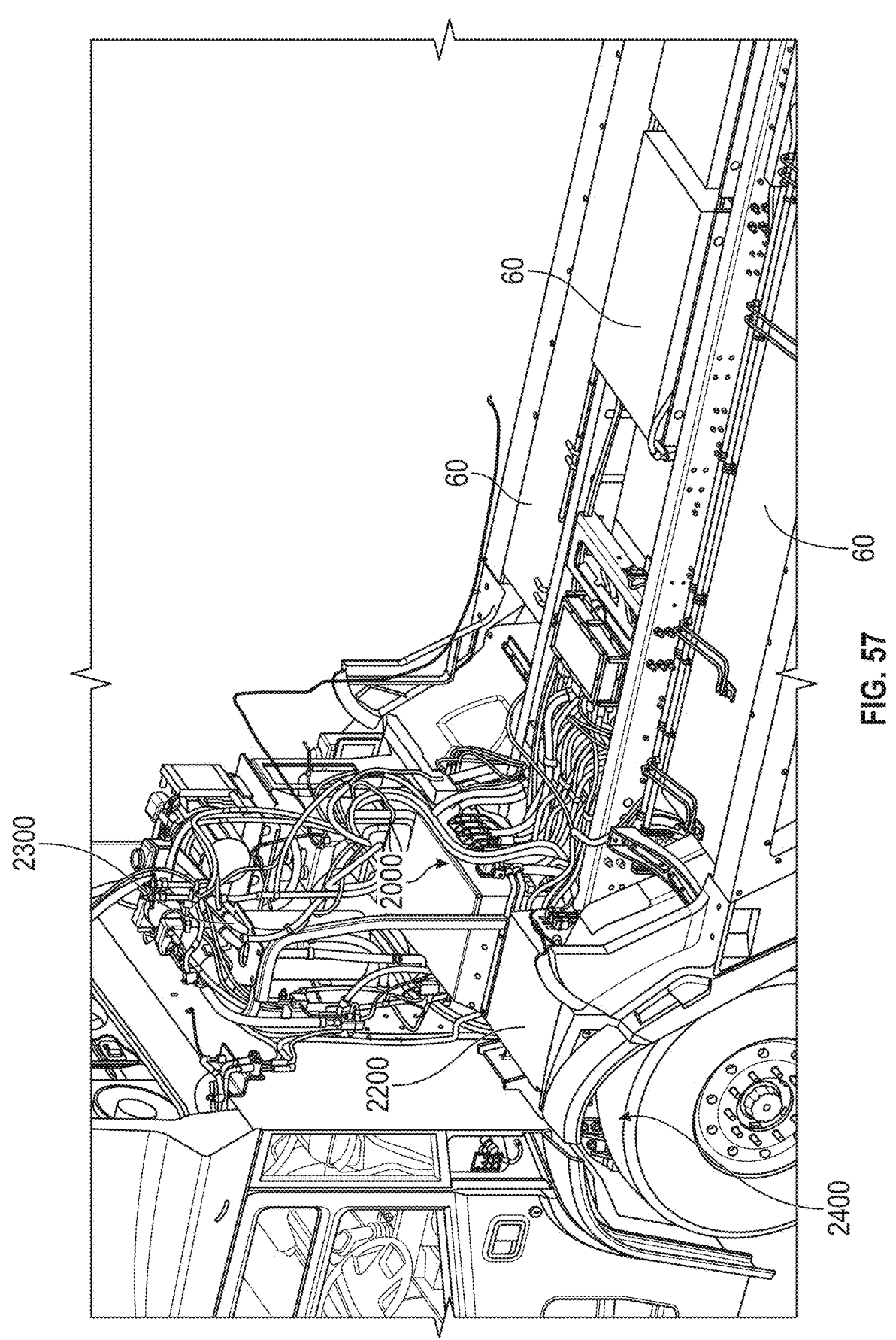
FIG. 57 is a perspective view of a high voltage power distribution unit of the vehicle with a platform, according to an exemplary embodiment.

Referring now to FIGS. 53 and 54, the vehicle 10 is configured as a refuse vehicle, shown as the refuse vehicle 100. In various embodiments, the refuse vehicle 100 may be a front loading refuse vehicle, such as shown in FIGS. 3-4, a side loading refuse vehicle, such as shown in FIGS. 5-8, or any other type of refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.). The refuse vehicle 100 of FIGS. 53-64 is shown without the refuse compartment 130. However, the refuse vehicle 100f may include the refuse compartment 130 in various embodiments. Referring to FIGS. 53 and 54, the vehicle 100 includes one or more batteries 60 supplying power to various components of the vehicle 100. The vehicle 100 also includes a high voltage power distribution unit (HVPDU) 2000. As shown in FIGS. 53-57, the battery 60 is separate from the HVPDU 2000. In various embodiments, the batteries 60 may be part of the HVPDU 2000. The HVPDU 2000 may be positioned between the cab 40 and the refuse compartment 130 of the refuse vehicle 100. For example, the HVPDU 2000 may be positioned or supported on the chassis 20 and proximate to or between the cab 40 and the refuse compartment 130. The refuse vehicle 100 may include one or more components including electrical components, pneumatic components, and/or hydraulic components. For example, the components may include battery packs, a front traction inverter, a rear traction inverter, a charge inlet, a compressor, a battery heater, an AC/DC converter, a DC/DC converter, a steering motor, and a cab heater. The batteries 60 may supply power to the components of the vehicle 100 described herein.

The HVPDU 2000 may include a plurality of connectors, shown as connectors or cables 2100, to provide power to components of the vehicle 100. For example, the HVPDU 2000 may include individual connectors 2100 for each of the battery strings, the front and rear traction inverters, the charge inlet, the compressor, the battery heater, the AC/DC converter, the DC/DC converter, the steering motor, and/or the cab heater. The connectors 2100 of the HVPDU 2000 may distribute power from the batteries 60 to one or more motors in addition to the components described above. For example, the connectors may deliver power from the HVPDU 2000 to the steering motor. In various embodiments, the HVPDU 2000 may receive power from the batteries 60 and distribute power to individual components of the vehicle 2100. The HVPDU 2000 may receive power from the batteries 60 via cables 2100 and distribute power to the vehicle components through cables 2100.

The refuse vehicle 100 may include a platform, shown as platform 2200. The platform may extend above the HVPDU 2000 such that the HVPDU 2000 is positioned below the platform 2200. The platform 2200 may be configured to house or at least partially cover the HVPDU 2000. Further, the platform 2200 may be configured to separate the HVPDU 2000 from an open space above both the HVPDU 2000 and the platform 2200. In various embodiments, the open space may include a plurality of connectors 2100 to deliver power to various components of the vehicle 100. The space above the HVPDU 2000 may house, for example, coolant connectors 2300 (see, e.g., FIG. 57). Alternatively or additionally, the space above the HVPDU 2000 may include connectors to control one or more pumps for the vehicle 100. For example, the pumps may be used to power and/or control power steering of the vehicle 100. The connectors may also connect the HVPDU 2000 to compressors. In various embodiments, the compressors may be used for a braking system of the vehicle 100. The compressors may be, for example, electrical compressors, pneumatic compressors, hydraulic compressors, etc.

In various embodiments, the platform 2200 may include a step. In various embodiments, the platform 2200 may be configured to support a weight of a user. For example, a user may access the coolant connectors 2300 by standing on the platform. The platform 2200 may be positioned above or proximate a wheel well 2400 of the vehicle 100. The platform 2200 may prevent user contact with connectors and/or wires 2100 of the HVPDU 2000. In various embodiments, the connectors and/or wires 2100 may deliver power having a high voltage, which may cause injury to a user if the user contacts the HVPDU 2000 or the connectors/wires 2100 connected to the HVPDU 2000. In various embodiments, the platform may be placed over the HVPDU 2000 and may not contact a housing of the HVPDU 2000. The platform 2200 may be configured such that stresses are not transferred to the HVPDU 2000 when the user utilizes or engages the platform 2200. The platform 2200 may be fastened to a portion of the vehicle 100, for example a portion of the chassis 20, such that the platform 2200 is secured.

Figure 58:
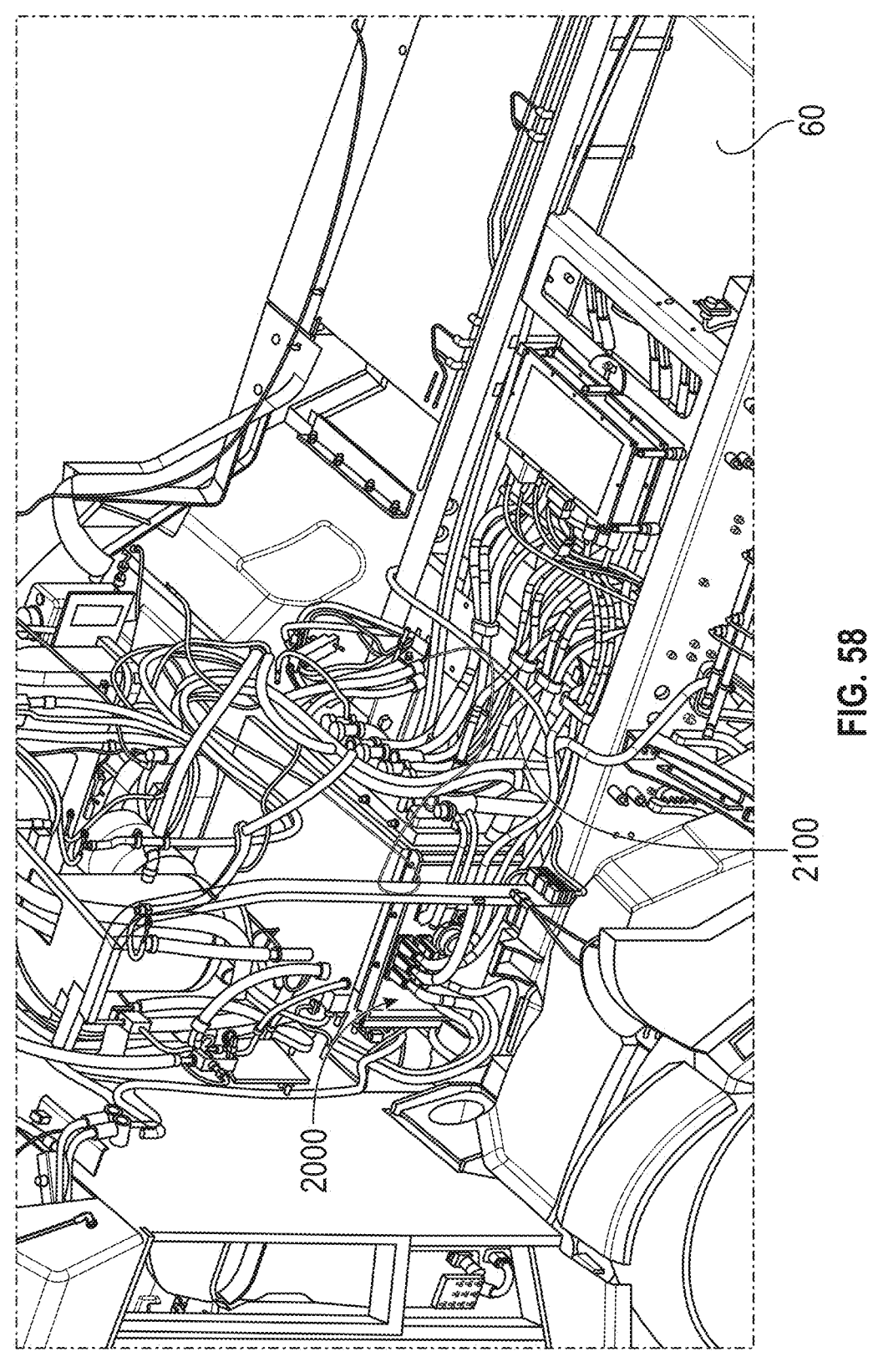
FIG. 58 is a perspective view of the high voltage power distribution unit without a platform, according to an exemplary embodiment.
Figure 59:
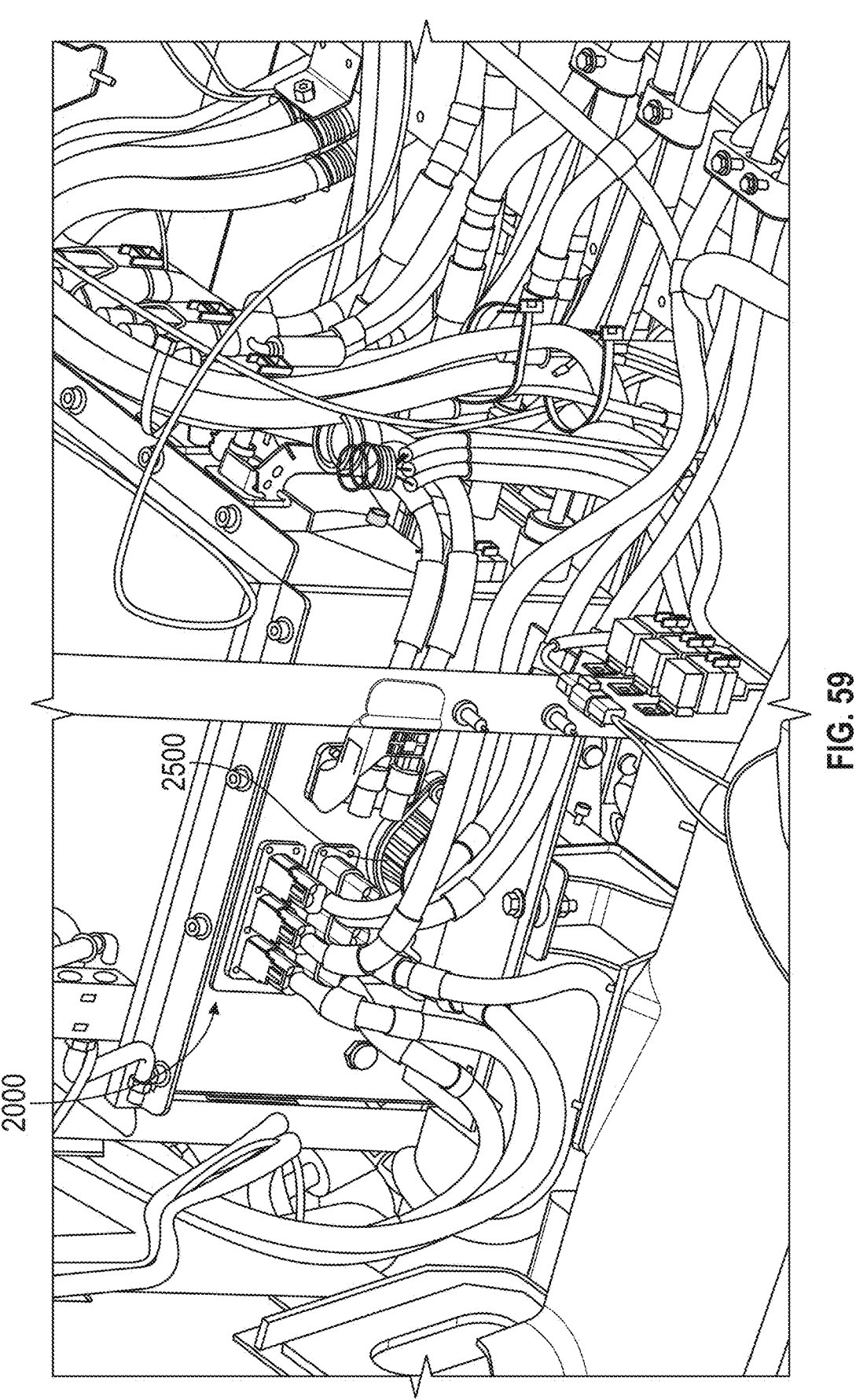
FIG. 59 is a perspective view of the high voltage power distribution unit without a platform, according to an exemplary embodiment.

Referring now to FIGS. 58 and 59, the HVPDU 2000 is shown without the platform 2200, according to an exemplary embodiment. The platform 2200 may be removably coupled to the chassis 20. The HVPDU 2000 may include a manual service disconnect (MSD) 2500. The MSD 2500 may disconnect batteries 60 of the vehicle 100 from the components of the vehicle 100. For example, when the MSD 2500 is disconnected, the batteries 60 may be disconnected from the vehicle components to which they supply power. Therefore, various components of the vehicle 100 (e.g., front traction inverter, compressor, cab heater, etc.) may not receive power. The MSD 2500 may be accessed and the batteries 60 subsequently disconnected from the respective components when, for example, a user is going to perform maintenance (e.g., maintenance on the batteries or components to which the batteries supply power). As shown in FIG. 59, the MSD 2500 may be a knob or switch that can be accessed to enable and/or disable the MSD 2500.

Figure 60:
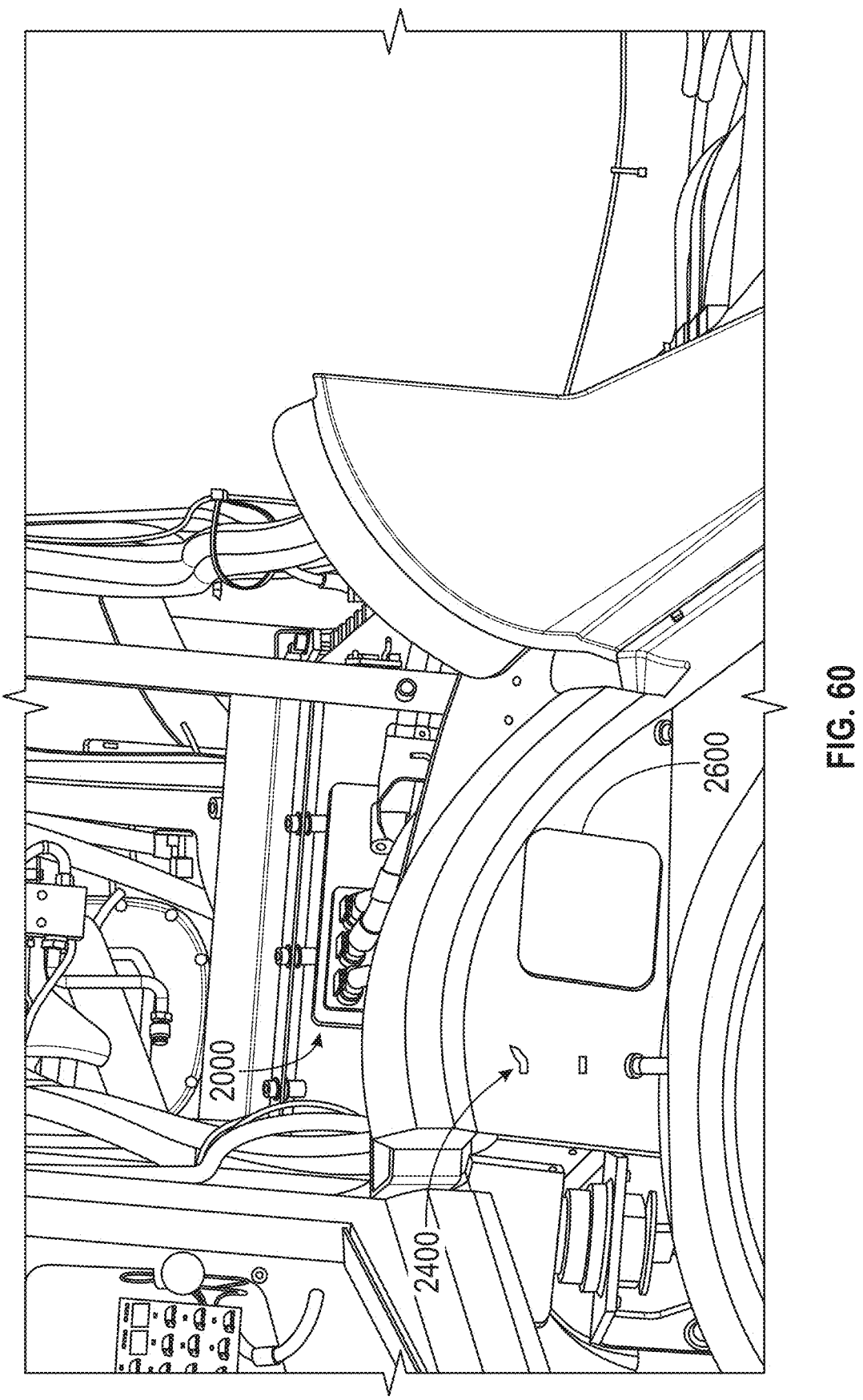
FIG. 60 is a view of a wheel well of the vehicle of FIG. 1 having a through hole, according to an exemplary embodiment.
Figure 61:
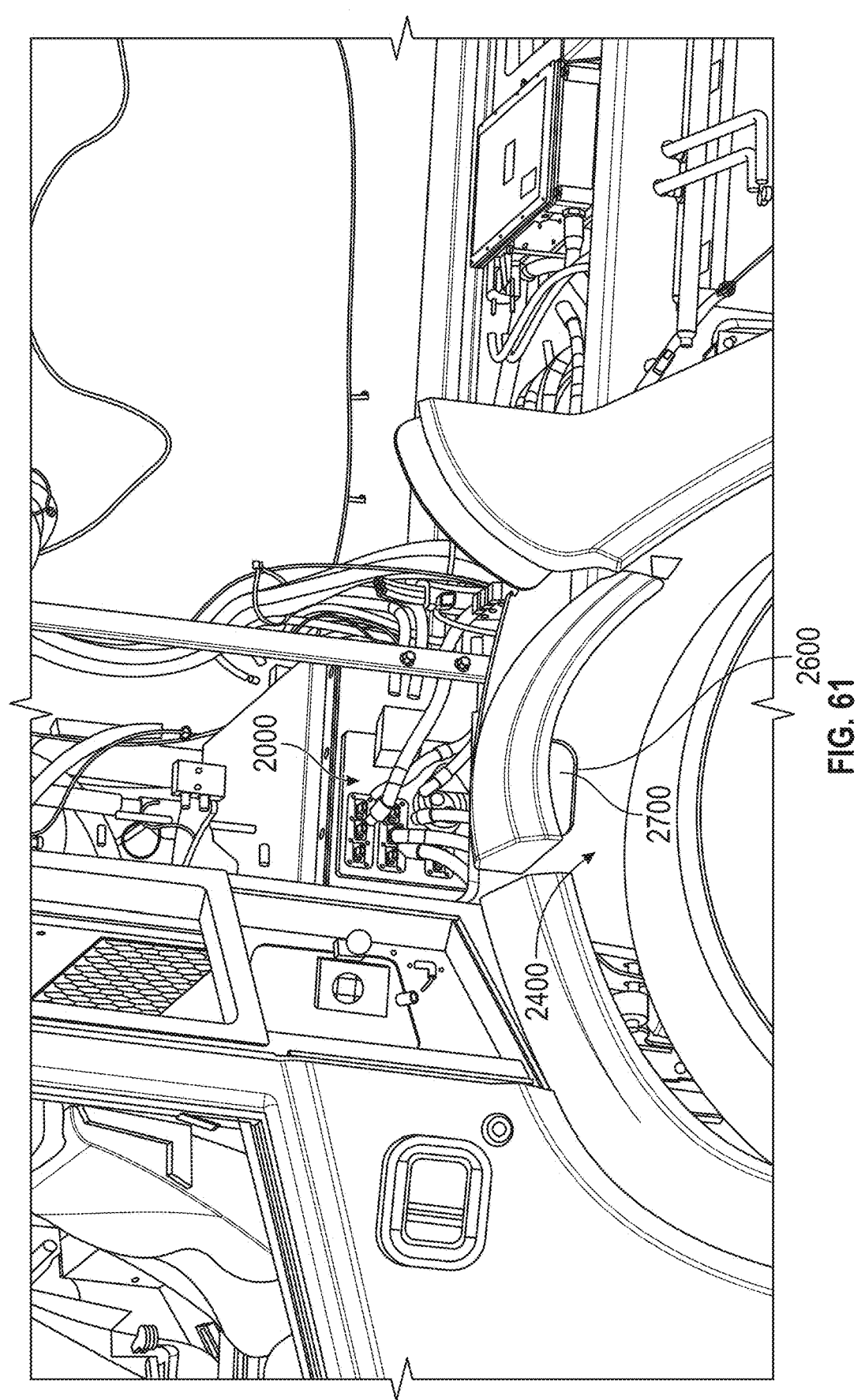
FIG. 61 is a view of a wheel well of the vehicle of FIG. 1 having a through hole covered by a flap, according to an exemplary embodiment.
Figure 62:
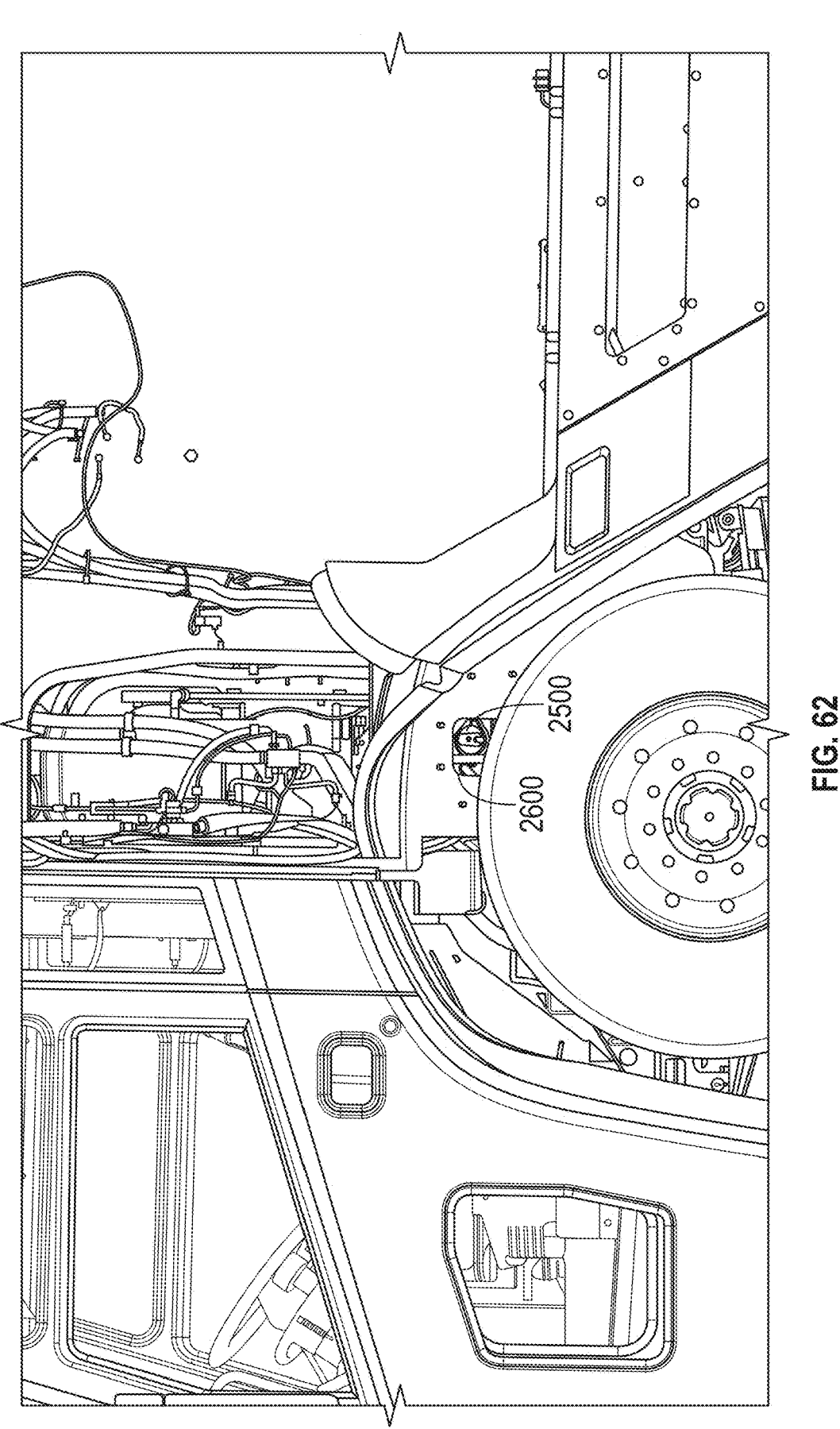
FIG. 62 is a side view of the vehicle of FIG. 1 configured as a refuse vehicle, according to an exemplary embodiment.

FIGS. 60-62 show the HVPDU 2000 partially hidden by the wheel well 2400, according to an exemplary embodiment. A portion of the wheel well 2400 may define a through hole 2600 or cavity of the wheel well 2400 through which the MSD 2500 can be accessed. For example, the through hole 2600 may be a cut out portion of the wheel well positioned such that the MSD 2500 is located behind the through hole 2600 (e.g., as shown in FIG. 62). In various embodiments, the through hole 2600 may be a round or square shape. The though hole 2600 may be large enough that the MSD 2500 may be manually or otherwise accessed (e.g., a user can reach through the through hole 2600 to reach the MSD 2500). In various embodiments, the though hole 2600 may be covered or partially covered by a piece of material, as shown in FIG. 61. For example, a flap 2700 may cover the through hole 2600. The flap 2700 may be made of, for example, rubber or other material. In various embodiments, the flap 2700 may be made of a flexible material. The flap 2700 may be fastened to the wheel well 2400 on one end. For example, a first edge of the flap 2700 may be fastened to the wheel well above the through hole 2600. The flap 2700 may extend down to cover the through hole 2600. The flap 2700 may be raised to access the MSD 2500. In various embodiments, the flap 2700 may be otherwise moved to access the MSD 2500. The flap 2700 may protect the MSD 2500 while the MSD 2500 is not being accessed. For example, the flap 2700 may prevent any debris (e.g., a rock) from entering the through hole 2600 and damaging the MSD 2500 while the vehicle 100 is in motion.

Figure 63:
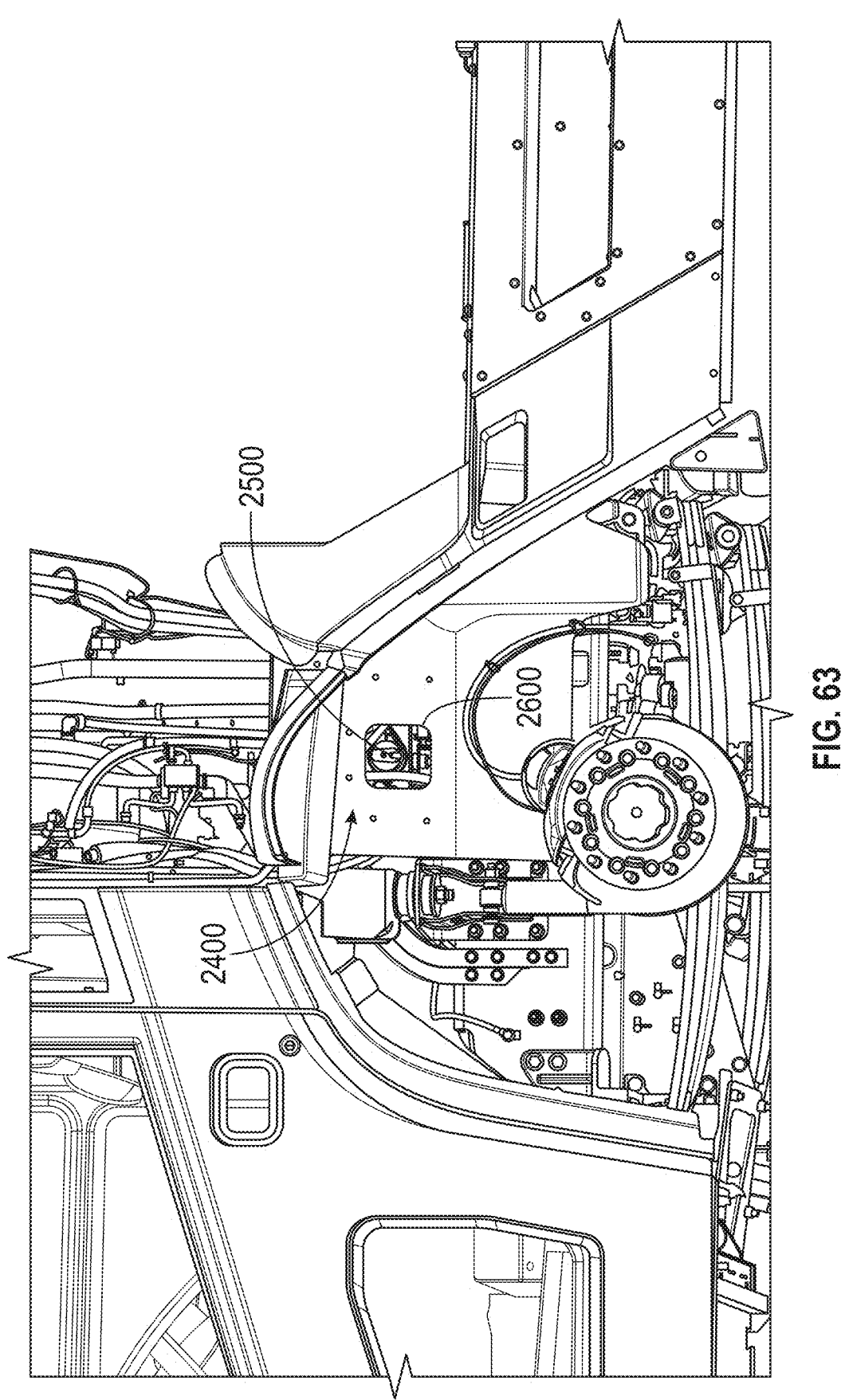
FIG. 63 is a view of the vehicle of FIG. 1 configured as a refuse vehicle, having a wheel removed, according to an exemplary embodiment.
Figure 64:
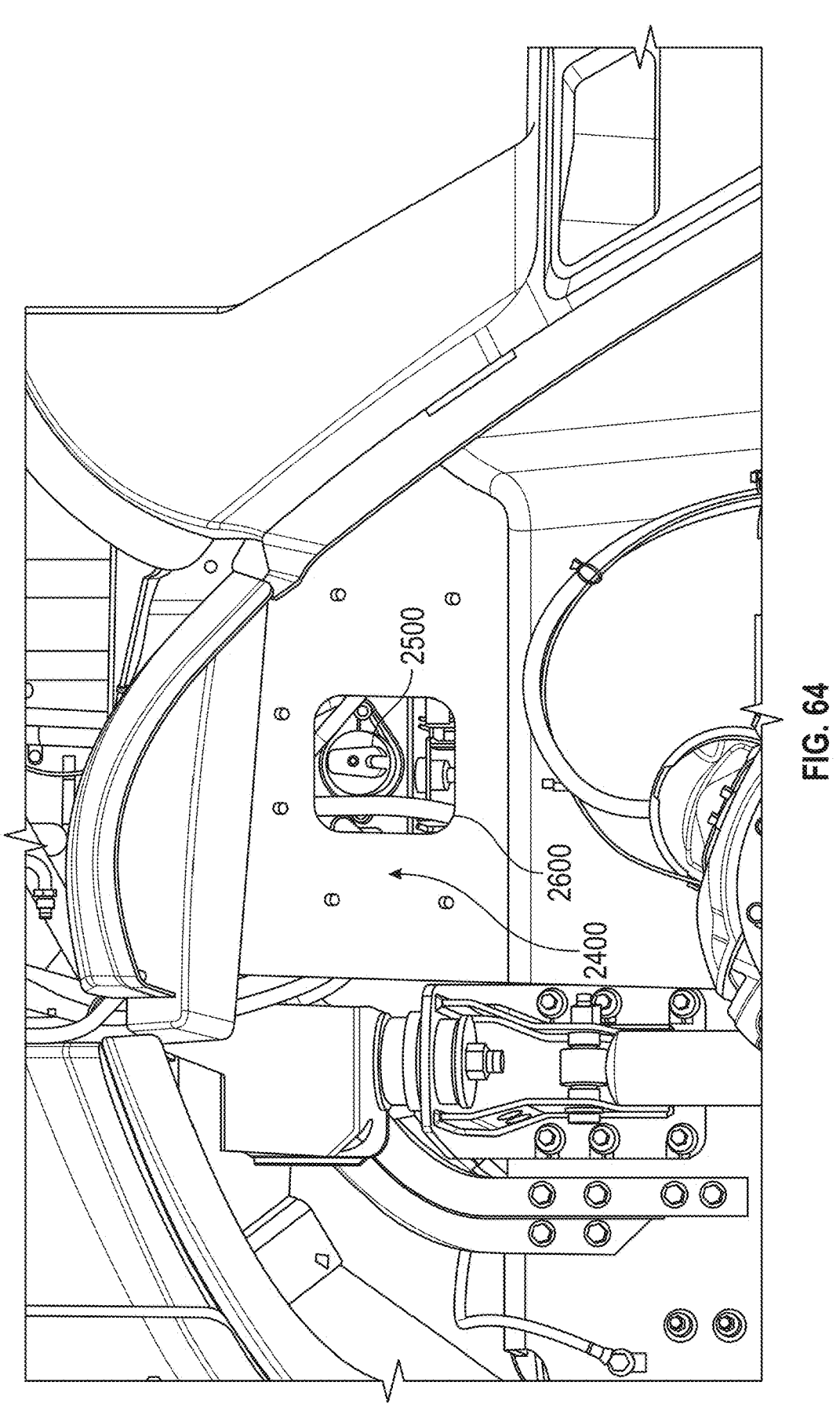
FIG. 64 is a view of the vehicle of FIG. 1 configured as a refuse vehicle, having a wheel removed, according to an exemplary embodiment.
Figure 65:
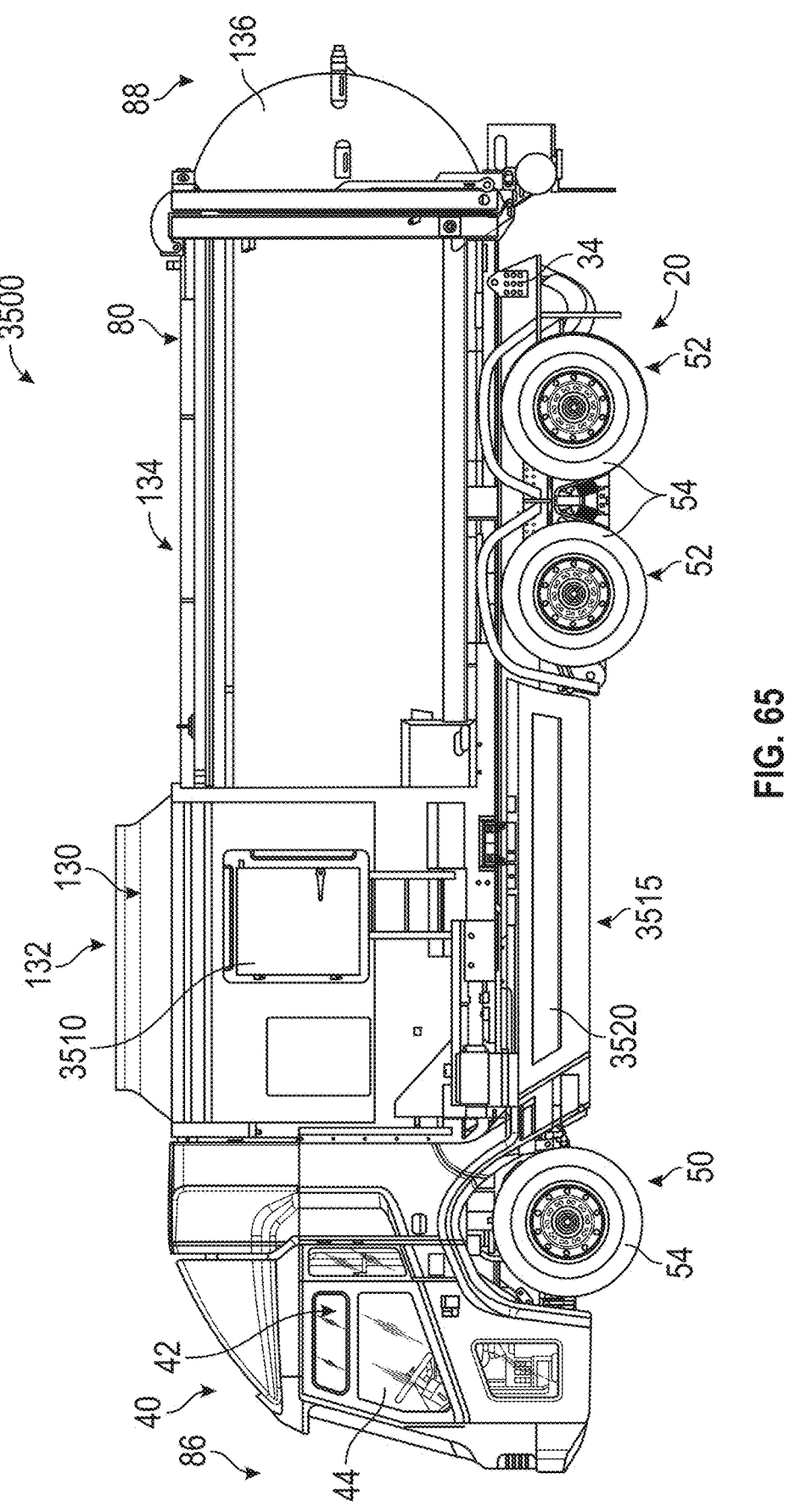
FIG. 65 is a left side view of the vehicle of FIG. 1 configured as a side-loading refuse vehicle, according to an exemplary embodiment.
Figure 66:
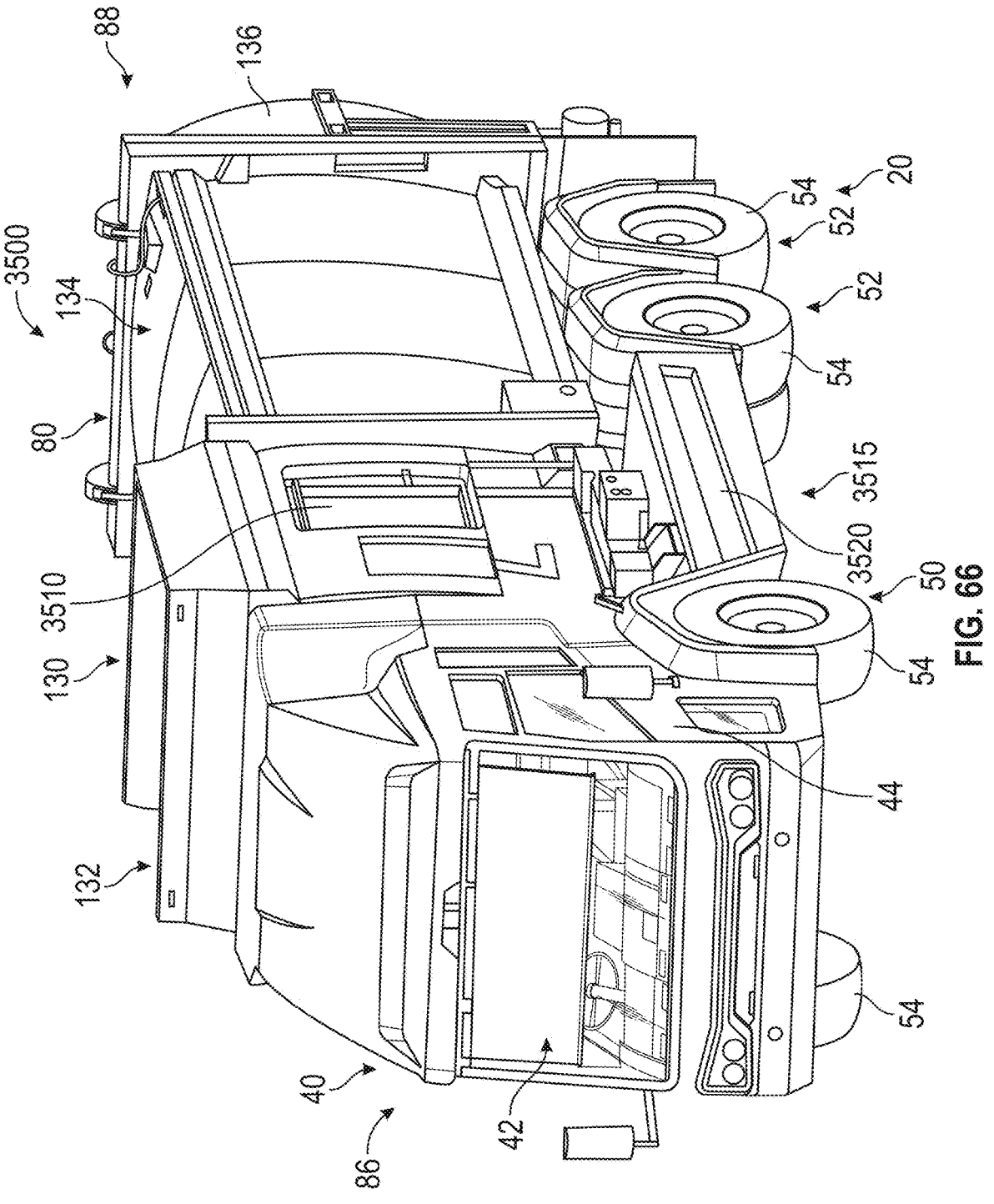
FIG. 66 is a perspective view of the side-loading refuse vehicle of FIG. 65, according to an exemplary embodiment.
Figure 67:
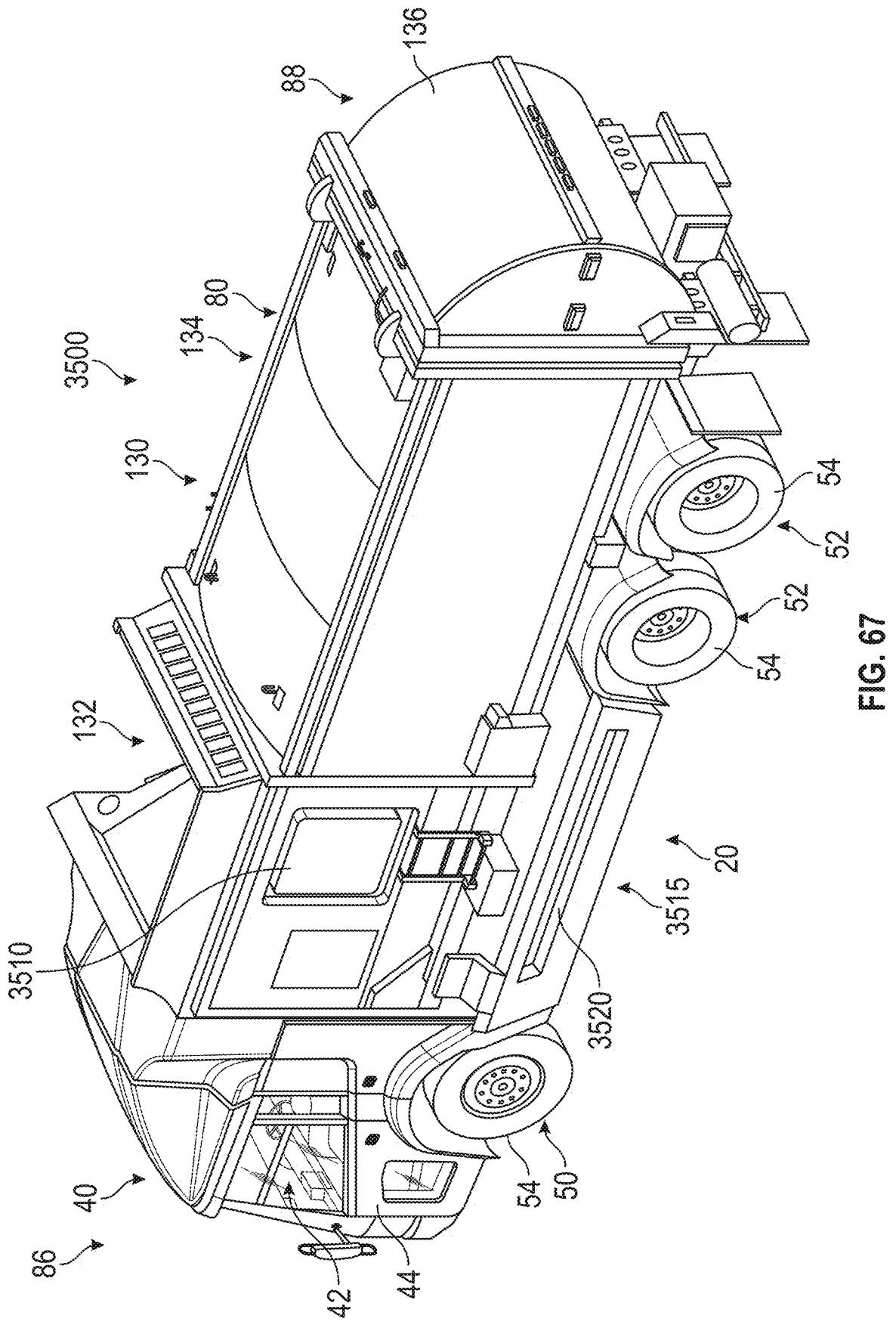
FIG. 67 is a perspective view of the side-loading refuse vehicle of FIG. 65, according to an exemplary embodiment.
Figure 68:
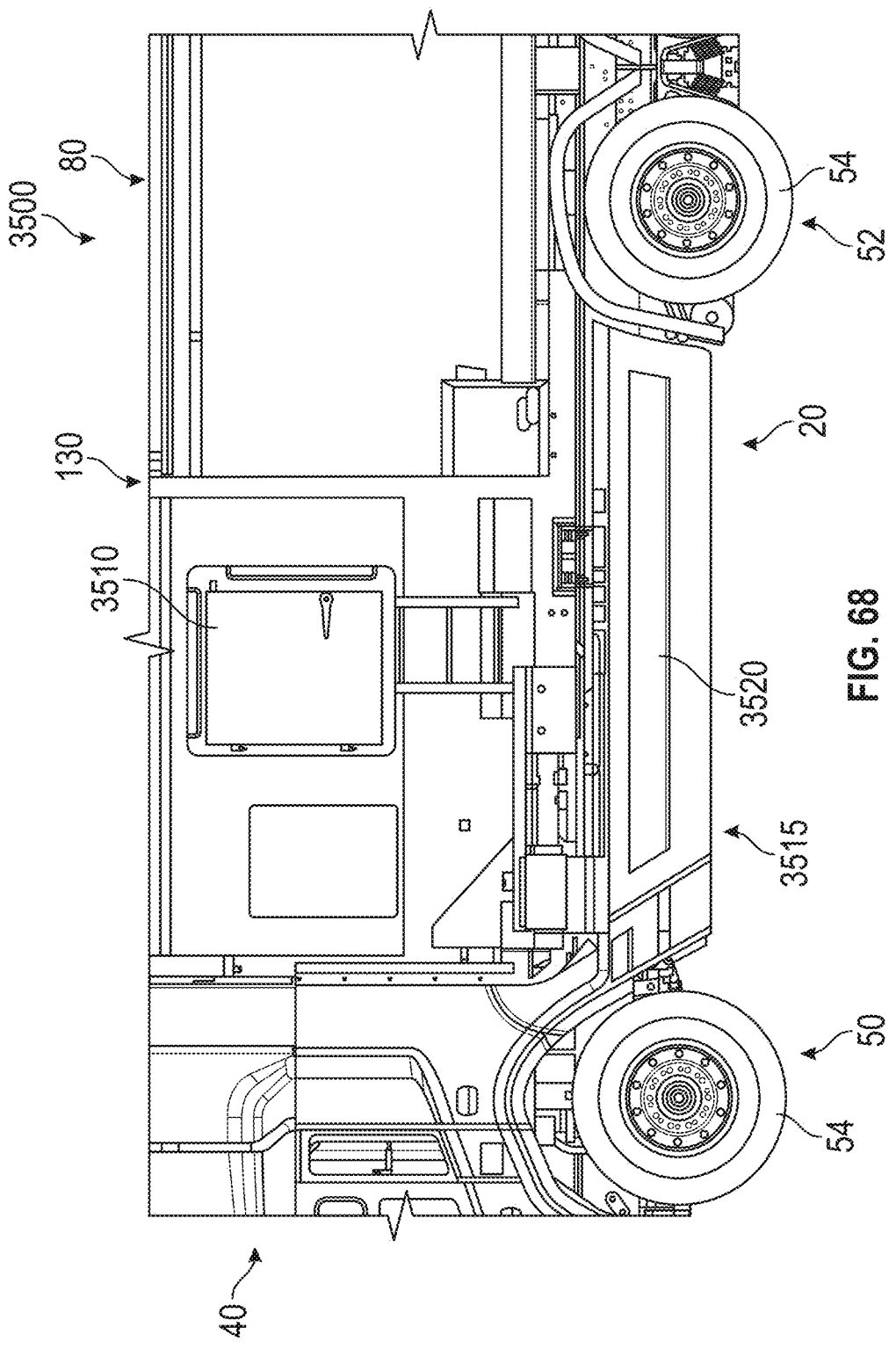
FIG. 68 is a detailed left side view of the side-loading refuse vehicle of FIG. 65, according to an exemplary embodiment.
Figure 69:
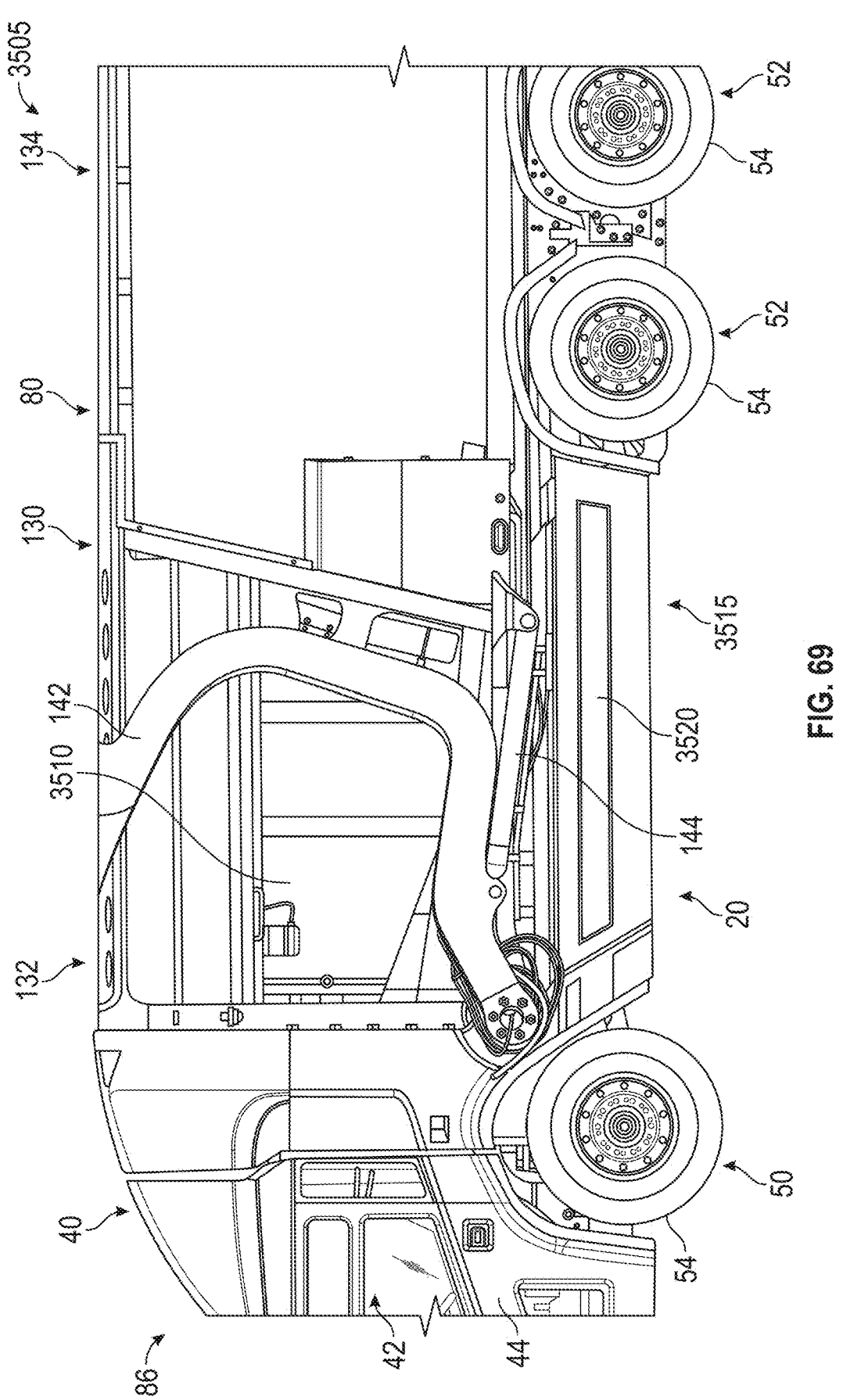
FIG. 69 is a left side view of the vehicle of FIG. 1 configured as a front-loading refuse vehicle, according to an exemplary embodiment.
Figure 70:
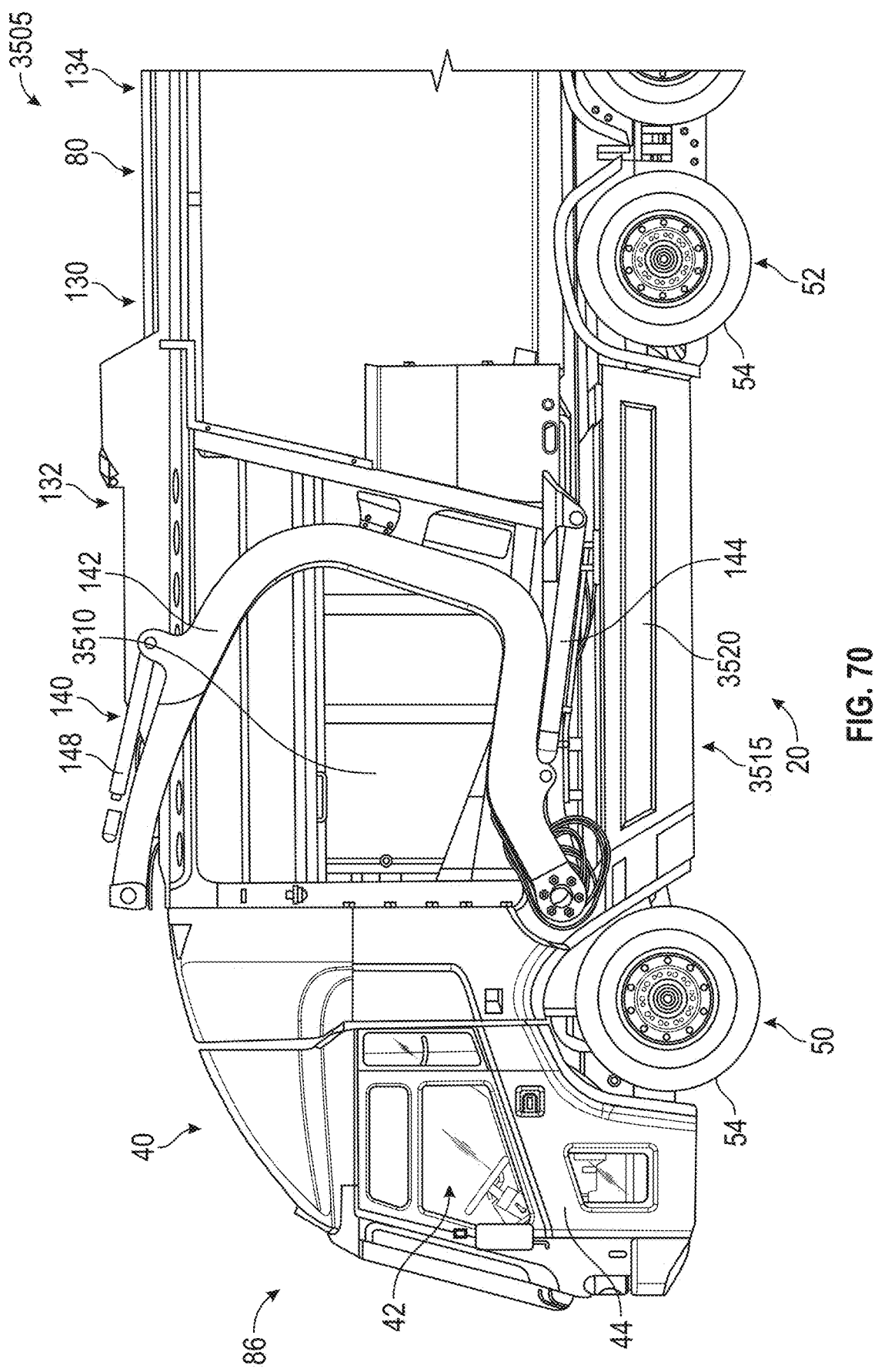
FIG. 70 is a left side view of the front-loading refuse vehicle of FIG. 69, according to an exemplary embodiment.
Figure 71:
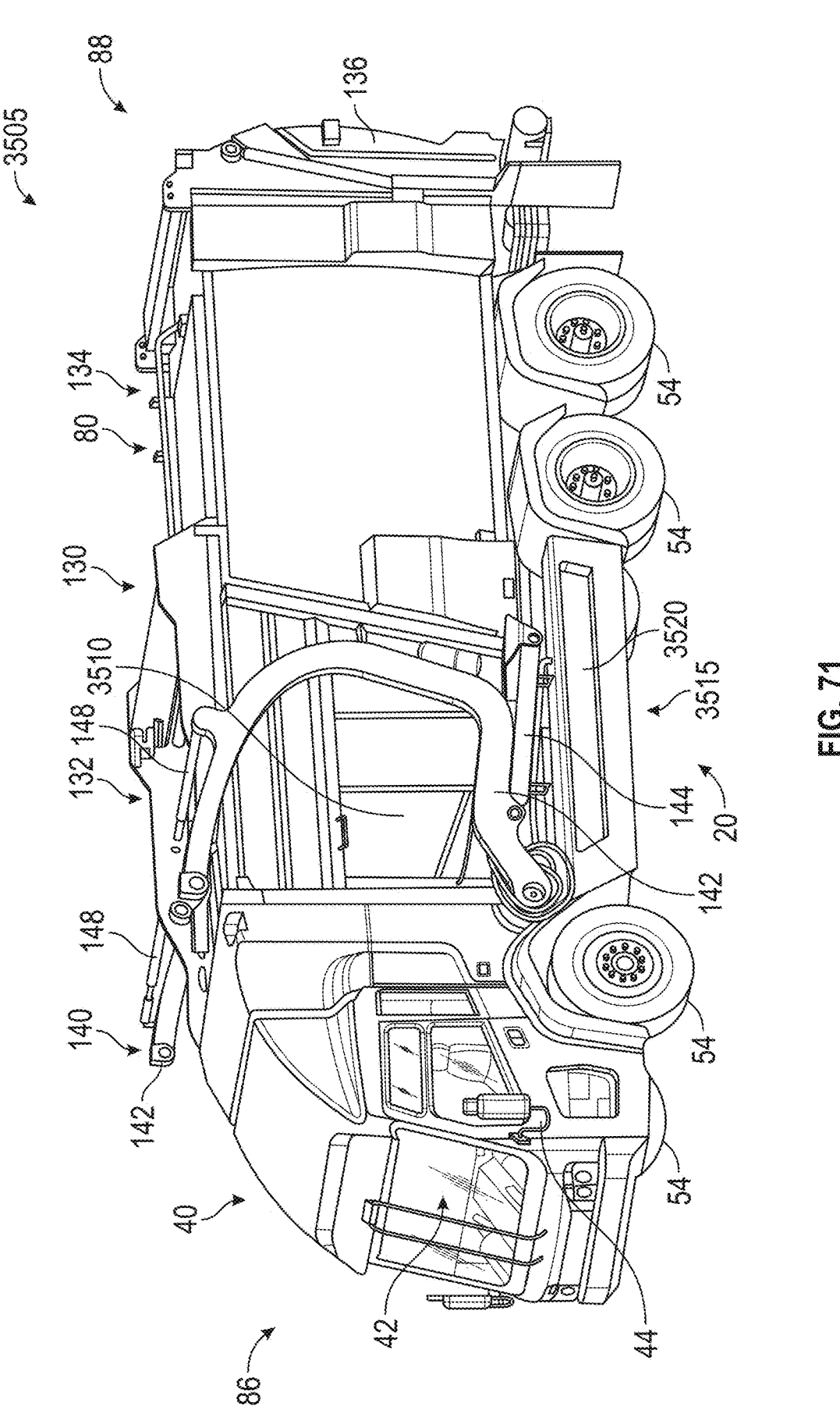
FIG. 71 is a perspective view of the front-loading refuse vehicle of FIG. 69, according to an exemplary embodiment.

Referring now to FIGS. 63 and 64, the refuse vehicle 100 is shown with the wheel and tire assembly 54 removed. In various embodiments, the wheel and tire assembly 54 may be removed such that the MSD 2500 may be accessed more easily than with the wheel attached to the wheel well 2400. For example, the tire may be removed from an axle. FIGS. 63-64 show the through hole 2600 of the wheel well 2400 with the wheel and tire assembly 54 removed, according to an exemplary embodiment. As shown in the figures, the MSD 2500 may be accessed by a user when the wheel is removed without interference by the wheel and tire assembly 54.

Common Cab and Chassis

According to an exemplary embodiment, a vehicle includes chassis, a cab coupled to a front end portion of the chassis, and a body assembly coupled to a rear end portion of the chassis. The cab and the chassis are configured to accommodate varying configurations of the body assembly. By way of example, the vehicle may include the body assembly configured as a side-loading refuse vehicle. By way of another example, the vehicle may include the body assembly configured as a front-loading refuse vehicle. The cab and the chassis may be manufactured such that the vehicle is configured to function normally when the body is configured as either the side-loading refuse vehicle or the front-loading refuse vehicle. In other words, the chassis and the cab may be designed the same for the front-loading refuse vehicle and the side-loading refuse vehicle.

The side-loading refuse vehicle and the front-loading refuse vehicle may both include an access door that facilitates selective access to a refuse compartment. The position of the access door included in the side-loading refuse vehicle may be farther from a front wall defining the side-loading refuse vehicle body when compared to the position of the access door included in the front-loading refuse vehicle relative to a front wall defining the front-loading refuse vehicle body. The vehicle may include an underslung coupled to the chassis and including a step that is configured to accommodate for the different positions (e.g., locations, sizes, etc.) of the access door included in the side-loading refuse vehicle and in the front-loading refuse vehicle. By way of example, a longitudinal length of the step may be long enough such that a user could open or close the access door when the body assembly is configured as the side-loading refuse vehicle body or the front-loading refuse vehicle body. As such, a common chassis (e.g., a common step) accommodates for the difference in the access door positioning between the side-loading refuse vehicle body and the front-loading refuse vehicle body.

The side-loading refuse vehicle and the front-loading refuse vehicle may both include a control system configured to control, in response to a user input to a control panel, one or more operations of the vehicle and one or more components thereof. A location of the control system and the components thereof included in the side-loading refuse vehicle may be different than a location of the control system and the components thereof included in the front-loading refuse vehicle. By way of example, the location of the control system and the components thereof included in the side-loading refuse vehicle may be located along a curb side (e.g., right side, passenger's side, etc.) of the vehicle such that an operator can oversee the operations and the components being controlled via the control system. By way of another example, the location of the control system and the components thereof included in the front-loading refuse vehicle may be located along a street side (e.g., left side, driver's side) of the vehicle such that an operator can oversee the operations and the components being controlled via the control system. The cab and the chassis may include cable routing channels for the control system to accommodate for the difference in the control system positioning between the side-loading refuse vehicle body and the front-loading refuse vehicle body.

The front-loading refuse vehicle may include protective bars installed to protect the front windshield of the vehicle from a refuse can that is lifted over the windshield (and falling refuse therefrom) falling (e.g., crashing, smashing, etc.) into and breaking the windshield. The protective bars may be mounted to the front of the cab. The common cab may be manufactured to include mounts at mounting locations to couple the protective bars to the vehicle when the body assembly is configured as a front-loading refuse vehicle body. In an embodiment where the body assembly is configured as a side-loading refuse vehicle body, the common cab may still include the mounts even though the protective bars may not be installed.

The cab of the vehicle includes a front portion and a rear portion coupled to the chassis. A front shroud may be coupled to the front portion on the top surface of the cab. The common cab is manufactured (e.g., sized, shaped, positioned, etc.) to provide a space between the front shroud and a front wall of the body assembly to accommodate a rear shroud that varies in size between the side-loading refuse vehicle and the front-loading refuse vehicle. A height of the body assembly of the side-loading refuse vehicle is shorter than a height of the body assembly of the front-loading refuse vehicle. Accordingly, the rear shroud of the front-loading refuse vehicle is taller than the rear shroud of the side-loading refuse vehicle to accommodate for the height difference between the configurations. As such, the common cab accommodates for the difference in the size of the rear shroud between the side-loading refuse vehicle and the front-loading refuse vehicle.

The body assembly can be raised and lowered relative to the chassis between a lowered position and a raised position. The body assembly may be rotatably coupled to the chassis near the rear end of the chassis, and may rotate about a lateral axis (e.g., a horizontal axis) such that the front end of the body assembly raises and lowers. One or more body actuators are configured to selectively move the body assembly between the raised position and the lowered position. An upper end portion of each body actuator is coupled to a front wall of the body assembly, and a lower end portion of each body actuator is coupled to the chassis. The vehicle includes a pivot assembly configured to permit rotation of the body assembly relative to the chassis. By way of example, the pivot assembly may be configured to pivotably couple the rear portion of the body assembly to the rear portion of the chassis. By way of another example, when the body actuators move the body assembly between the raised position and the lowered position, the body may rotate about a pin included in the pivot assembly. The pivot assembly is coupled to the chassis at the same location for both the side-loading refuse vehicle and front-loading refuse vehicle configurations, thereby facilitating rotation of the body assembly in either configuration relative to the common chassis.

As shown in FIGS. 65-68, 72, 73, and 78, the vehicle 10 is configured as the refuse vehicle 100. Specifically, the refuse vehicle 100 is a side-loading refuse vehicle (e.g., automated side loader (ASL)), shown as ASL 3500. The ASL 3500 of FIGS. 65-68, 72, 73, and 78 may be substantially similar to the refuse vehicle 100 of FIGS. 3 and 4 except as otherwise specified herein, and, as such, like components may be used to describe the ASL 3500.

As shown in FIGS. 69-71, 74-77, 79, and 80, the vehicle 10 is configured as the refuse vehicle 100. Specifically, the refuse vehicle 100 is a front-loading refuse vehicle (e.g., front end loader (FEL)), shown as FEL 3505. The FEL 3505 of FIGS. 69-71, 74-77, 79, and 80 may be substantially similar to the refuse vehicle 100 of FIGS. 5-8 and the ASL 3500 of FIGS. 65-68, 72, 73, and 78 except as otherwise specified herein and, as such, like components may be used to describe the FEL 3505. The ASL 3500 and the FEL 3505 may be substantially similar to each other such that the cab 40 and the chassis 20 remain generally unchanged between the configurations, but define different application kits 80

(e.g., slide-loader application kit versus front-loader application kit). Accordingly, the chassis 20 and the cab 40 may be manufactured such that the refuse vehicle 100 is configured to function normally when the application kits 80 is configured as either the ASL 3500 or the FEL 3505. In other words, the chassis 20 and the cab 40 may be designed the same or substantially similarly for the ASL 3500 and the FEL 3505 to accommodate either the application kit 80 of the ASL 3500 or the FEL 3505.

A. Underslung Step

As shown in FIGS. 65-71, 76, and 79, the ASL 3500 and the FEL 3505 include a door (e.g., panel, gate, opening, etc.), shown as access door 3510, pivotably coupled to the application kit 80. The access door 3510 is configured to selectively permit access to an interior volume of the refuse compartment 130. The access door 3510 is shown coupled to a street side (e.g., a driver's side, a left side, etc.) of the application kit 80 proximate the cab 40. In some embodiments, the access door 3510 otherwise suitably positioned throughout the application kit 80 such that the access door 3510 is configured to selectively permit access to the interior volume of the refuse compartment 130. In some embodiments, the ASL 3500 and the FEL 3505 include two or more access doors 3510 variously positioned about the application kit 80 to selectively permit access to the interior volume of the refuse compartment 130 are various locations around the ASL 3500 and the FEL 3505.

According to an exemplary embodiment, the interior volume of the refuse compartment 130 includes a packing assembly configured to initiate (i) an ejection procedure where refuse is ejected from the refuse compartment 130, and (ii) a packing procedure where refuse is compacted within the refuse compartment 130. The packing assembly may include a pack panel movable between retracted and extendable positions. Actuating the pack panel during a packing procedure between the retracted and extendable positions facilitates compacting and displacing refuse in the hopper volume 132 of the refuse compartment 130 in a direction toward the storage volume 134 of the refuse compartment 130. Actuating the pack panel during an ejection procedure between the retracted and extendable positions facilitates ejecting refuse from the refuse compartment 130 and out of the refuse vehicle 100 (e.g., the ASL 3500, the FEL 3505, etc.) through the tailgate 136.

During the packing and ejection procedures, refuse may fall behind the pack panel or get stuck between the pack panel and the walls defining the refuse compartment 130. This refuse may inhibit packing and ejection procedure operations and/or damage one or more components of the refuse vehicle 100 (e.g., actuators, motors, etc.). The access door 3510 is configured to selectively permit access to the interior volume of the refuse compartment 130 such that the refuse that has fallen behind the pack panel or gotten stuck between the pack panel and the walls defining the refuse compartment 130 may be removed from the refuse compartment 130.

As shown in FIGS. 65-71, 76, and 79, the access door 3510 of the FEL 3505 is positioned (i) along the street side wall of the application kit 80 proximate the cab 40 and (ii) forward the relative positioning of the access door 3510 of the ASL 3500. By way of example, a minimum distance from a rear end of the cab 40 to a front end (e.g., front edge, leading edge, etc.) of the access door 3510 of the FEL 3505 is less than a minimum distance from the rear end of the cab 40 to a front end (e.g., front edge, leading edge, etc.) of the access door 3510 of the ASL 3500. By way of another example, when the refuse vehicle 100 is configured as the ASL 3500, the access door 3510 is located at a first position along a wall defining the refuse compartment 130, and when the refuse vehicle 100 is configured as the FEL 3505, the access door 3510 is located at a second position along a wall defining the refuse compartment 130. The second position may be located closer to the front side 86 of the refuse vehicle 100 than the first position. In some embodiments, the access door 3510 is otherwise relatively positioned between the ASL 3500 and the FEL 3505. By way of example, the access door 3510 of the FEL 3505 may be positioned rearward the relative positioning of the access door 3510 of the ASL 3500. In some embodiments, the access door 3510 is positioned along a curb side (e.g., a passenger's side, a right side, etc.) of the ASL 3500 and the FEL 3505.

As shown in FIGS. 65-71, 75, 76, and 79, the ASL 3500 and the FEL 3505 include a battery enclosure (e.g., panel, housing, etc.), shown as underslung 3515, configured to house and/or secure one or more batteries 60 of the refuse vehicle 100. In some embodiments, the underslung 3515 is configured to house, secure, and/or protect one or more other components of the ASL 3500 and the FEL 3505 (e.g., the track actuator 174, components of the driveline, etc.). As shown in FIGS. 65-71, 75, 76, and 79, the underslung 3515 is coupled to the chassis 20 (e.g., to the front rail portion 30, to the rear rail portion 34, etc.) along the street side of the ASL 3500 and the FEL 3505 and extends in a longitudinal direction (e.g., a direction between the front side 86 and the rear side 88). The underslung 3515 is coupled to the chassis 20 between the front axle 50 and the rear axles 52. The underslung 3515 may be positioned below at least a portion of the application kit 80. In some embodiments, the underslung 3515 is positioned below at least a portion of the cab 40. In some embodiments, the underslung 3515 is additionally or alternatively coupled to the ASL 3500 and the FEL 3505 in a different position along the chassis 20.

As shown in FIGS. 65-71, 75, 76, and 79, the underslung 3515 includes a step (e.g., a platform, a support surface, etc.), shown as step 3520, integrated with (e.g., formed on an outer wall of) the underslung 3515. The step 3520 may be configured to support a user to facilitate access to (i) a side of the ASL 3500 and the FEL 3505 and/or (ii) an elevated portion and/or component of the ASL 3500 and the FEL 3505. By way of example, the user may climb, step, or travel up the step 3520 to access the access door 3510. In some embodiments, the step 3520 is defined by a recess formed on the outer wall of the underslung 3515. In other embodiments, the step 3520 extends outward from the underslung 3515 in a lateral direction (e.g., in a direction between the street side and the curb side) from the chassis 20. A longitudinal length of the step 3520 may extend substantially the entirety of a longitudinal length of the underslung 3515. In some embodiments, the underslung 3515 includes a first step 3520 longitudinally adjacent to a second step 3520. In other embodiments, the underslung 3515 includes two or more steps 3520 vertically spaced from each other. In some embodiments, the ASL 3500 and the FEL 3505 do not include the underslung 3515. In such embodiments, the step 3520 is integrally formed with and/or otherwise coupled directly to the chassis 20.

As shown in FIGS. 65-71, 75, 76, and 79, the step 3520 may be sufficiently sized to facilitate access to the access door 3510 of the ASL 3500 and the access door 3510 of the FEL 3505. In some embodiments, a first portion of the step 3520 along the length thereof is aligned with (e.g., positioned below) the access door 3510 when the refuse vehicle 100 is configured as the ASL 3500, and a second portion of the step 3520 along the length thereof is aligned with (e.g., positioned below) the access door 3510 when the refuse vehicle 100 is configured as the FEL 3505. By way of example, the longitudinal length of the step 3520 is sufficiently sized (e.g., long enough) such that a user may access (i) the access door 3510 when the refuse vehicle 100 is configured as the ASL 3500 and (ii) the access door 3510 when the refuse vehicle 100 is configured as the FEL 3505, thereby accommodating access to the access door 3510 located at different relative positions between the ASL 3500 and the FEL 3505 configurations. By way of another example, the first, front portion of the step 3520 may be positioned below the access door 3510 when the refuse vehicle 100 is configured as the ASL 3500, and the second, rear portion of the step 3520 may be positioned below the access door 3510 when the refuse vehicle 100 is configured as the FEL 3505. In some embodiments, the first portion and the second portion of the step 3520 overlap. Accordingly, regardless of whether the refuse vehicle 100 is configured as the ASL 3500 or the FEL 3505, the step 3520 is sufficiently sized to support the user to open the access door 3510 to access the interior volume of the refuse compartment 130 to manually clean out refuse, thereby facilitating use of a common chassis 20 when the refuse vehicle 100 is configured as the ASL 3500 or the FEL 3505.

B. Control Panel

As shown in FIGS. 72-76, the ASL 3500 and the FEL 3505 include a vehicle control system, shown as control system 3600, configured to control operation of one or more components and/or operations of the ASL 3500 and the FEL 3505 (e.g., drive motors 62, tag axle 90, tailgate actuator 138, lift assembly 140, lift assembly 160, grabber assembly 162, packer assembly, driving operations, refuse collection operations, packing operations, ejection operations, etc.). The control system 3600 includes a controller 3605 in communication with a control panel (e.g., user interface, user controller, inputs, operator controls, etc.), shown as control panel 3610, an emergency button (e.g., stop button, lever, joystick, knob, touch display, user interface, etc.), shown as E-stop 3615, and one or more other components of the ASL 3500 and the FEL 3505.

The controller 3605 may include a processing circuit having a processor and memory. The processing circuit can be communicably connected to a communications interface such that the processing circuit and the various components thereof can send and receive data via the communications interface. The processor can be implemented as a general purpose processor, an application specific integrated circuit ("ASIC"), one or more field programmable gate arrays ("FPGAs"), a group of processing components, or other suitable electronic processing components. The memory (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory can be or include volatile memory or non-volatile memory. The memory can include database components, object code components, script components, or any other type of information structure for supporting the various activities and information structures described in the present application. According to some embodiments, the memory is communicably connected to the processor via the processing circuit and includes computer code for executing (e.g., by the processing circuit and/or the processor) one or more processes described herein.

The control panel 3610 and the E-stop 3615 are configured to provide an operator with the ability to control one or more functions of and/or provide commands to the refuse vehicle 100 and the components thereof (e.g., turn on, turn off, drive, turn, brake, engage various operating modes, raise/lower an implement, etc.). The control panel 3610 and the E-stop 3615 may include one or more displays and one or more input devices. The one or more displays may be or include a touchscreen, a LCD display, a LED display, a speedometer, gauges, warning lights, etc. The one or more input devices may be or include buttons, switches, knobs, levers, dials, etc.

As shown in FIGS. 72-75, the control panel 3610 includes one or more user interfaces (e.g., buttons, levers, joysticks, knobs, LCD displays, touch displays, etc.), shown as panel buttons 3620, that, when interacted with (e.g., pressed, touched, engaged, etc.) by a user, transmits a signal to the controller 3605 to command one or more components of the ASL 3500 or the FEL 3505 to perform an action. Each panel button 3620 included in the control panel 3610 may be associated with a different action and/or operation of the one or more components of the ASL 3500 or the FEL 3505. By way of example, a first panel button 3620 may be associated with moving the lift assembly 140 and/or the lift assembly 160, respectively, to a first position, such that in response to the user providing an input to the first panel button 3620, the controller 3605 sends a signal to the lift assembly 140 and/or the lift assembly 160 commanding the lift arms 142 and/or the grabber assembly 162 to actuate to the first position. Similarly, a second panel button 3620 may be associated moving the lift assembly 140 and/or the lift assembly 160, respectively, to a second position, such that in response to the user providing an input to the second panel button 3620, the controller 3605 sends a signal to the lift assembly 140 and/or the lift assembly 160 commanding the lift arms 142 and/or the grabber assembly 162 to actuate to the second position. By way of another example, in response to a user providing an input to the panel buttons 3620, the controller 3605 may initiate one or more other operations (e.g., driving operations, refuse collection operations, packing operations, ejection operations, etc.) of the ASL 3500 and/or the FEL 3505.

The E-stop 3615 may be configured to receive an input from the user to stop or limit operation of the ASL 3500 or the FEL 3505. By way of example, the E-stop 3615 may be in communication with the controller 3605 such that, in response to the user providing an input to the E-stop 3615 (e.g., during an emergency situation), the controller 3605 sends a signal to one or more components of the ASL 3500 or the FEL 3505 to stop or limit operation thereof.

Figure 72:
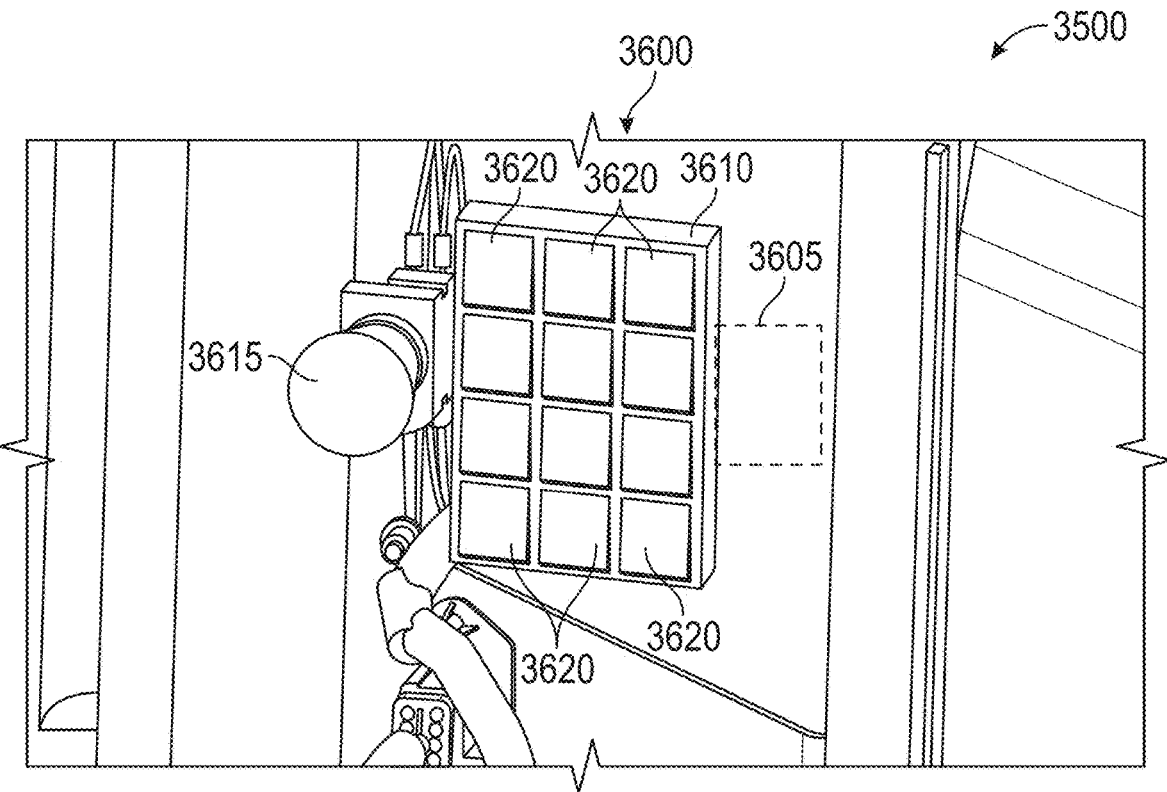
FIGS. 72 and 73 are various views of a control system of the side-loading refuse vehicle of FIG. 65, according to an exemplary embodiment.
Figure 73:
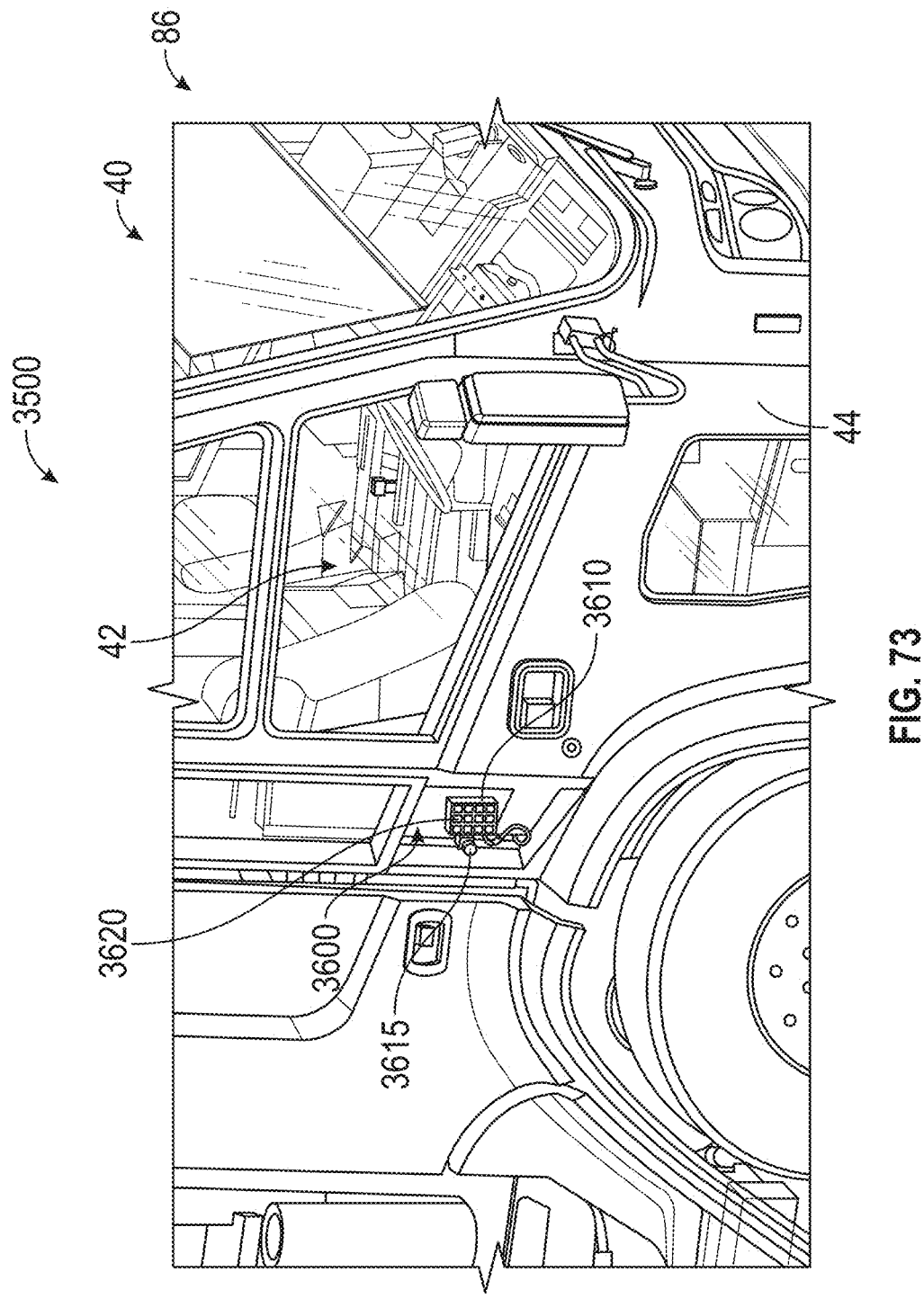

As shown in FIGS. 72 and 73, the ASL 3500 is shown including the control panel 3610 and the E-stop 3615 positioned outside of the cab 40 along the curb side of the ASL 3500. The control panel 3610 of the ASL 3500 is located along the curb side because the lift assembly 160 (e.g., the side-loading lift assembly) and the components thereof (e.g., the grabber assembly 162, the grabber fingers 166, the finger actuators 168, the lift actuator 172, the track actuator 174, etc.) are located along the curb side of the ASL 3500. Therefore, when the user is controlling, using the control panel 3610, operation of the lift assembly 160 and the components thereof (e.g., refuse dumping operations, refuse collection operations, etc.), the user is capable of overseeing (e.g., monitoring, tracking, etc.) the operation because the control panel 3610 and the lift assembly 160 are located on the same side (e.g., the curb side) of the ASL 3500, thereby facilitating safe, accurate, and efficient operation of the lift assembly 160. Similarly, because the E-stop 3615 is located on the same side of the ASL 3500 as the lift assembly 160, the user can monitor the operation of the lift assembly 160 and efficiently stop and/or otherwise inhibit operation of the lift assembly 160 in the event of detecting an emergency.

Figure 74:
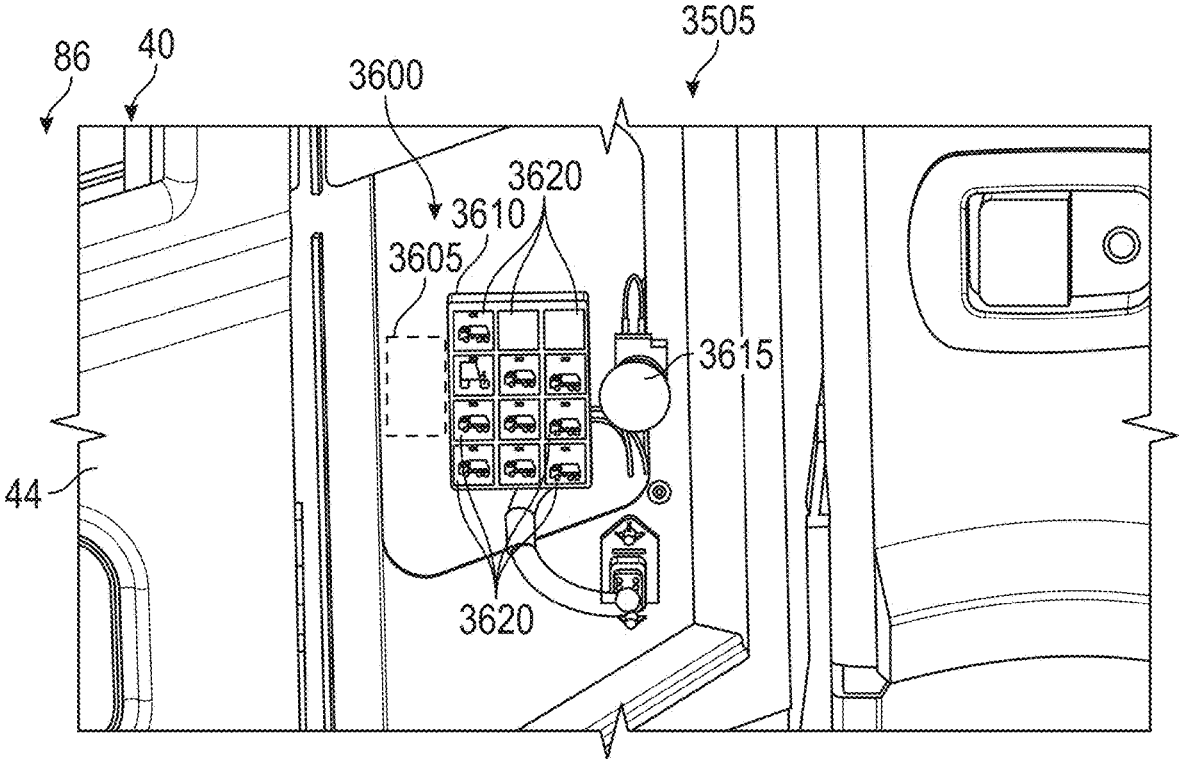
FIGS. 74 and 75 are various views of a control system of the front-loading refuse vehicle of FIG. 69, according to an exemplary embodiment.
Figure 75:
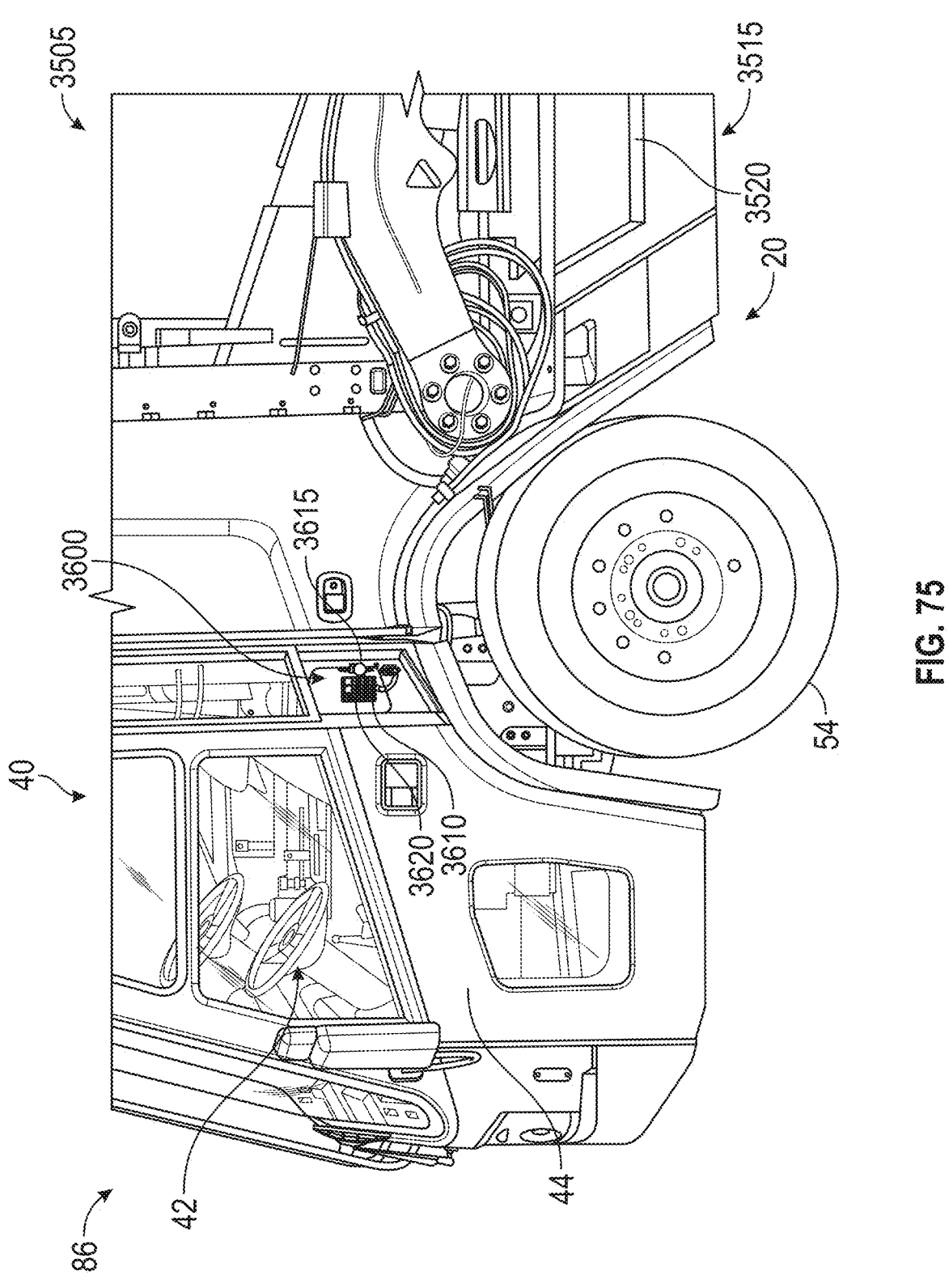
Figure 76:
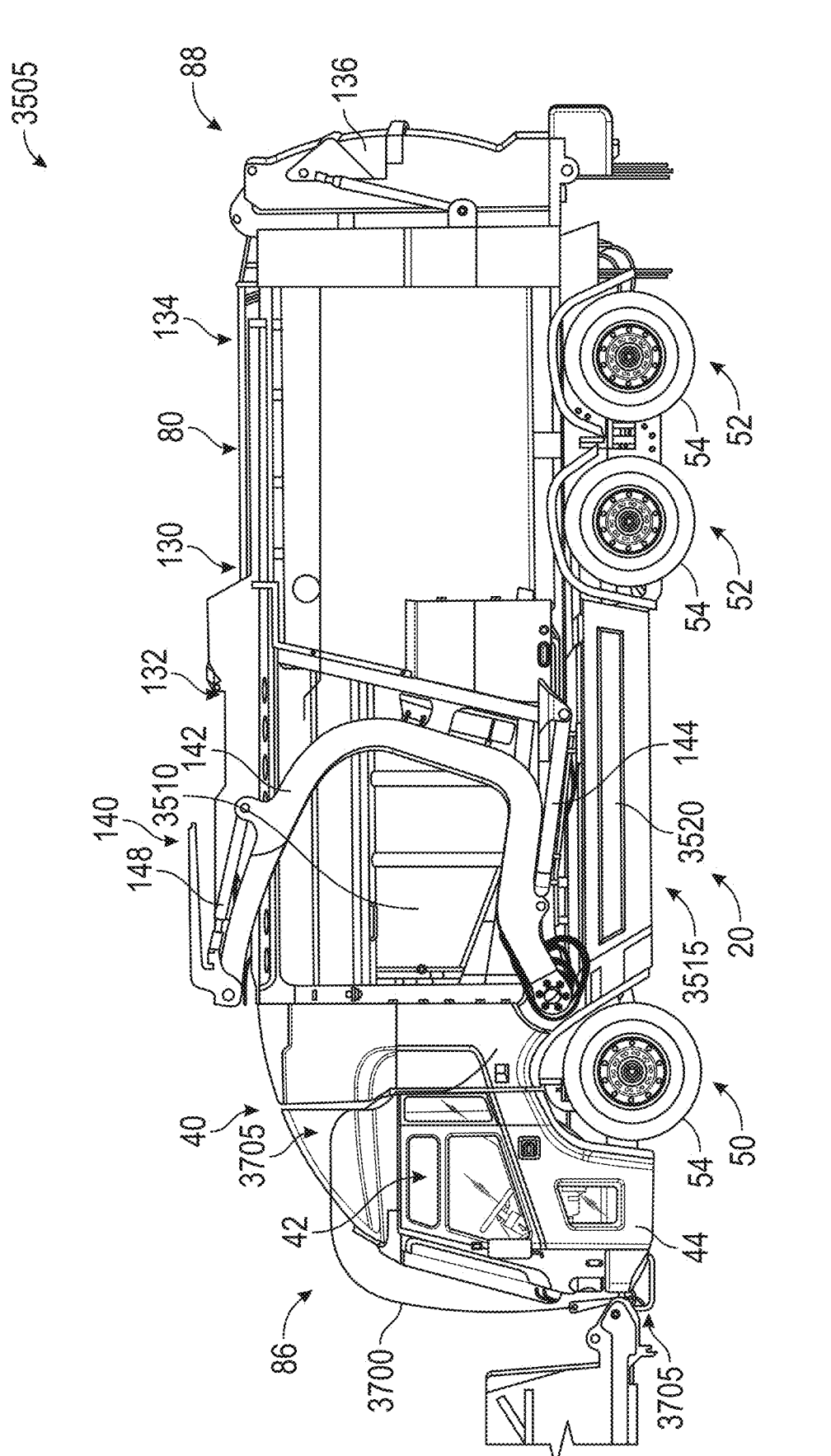
FIG. 76 is a left side view of the front-loading refuse vehicle of FIG. 69 including protection bars, according to an exemplary embodiment.
Figure 77:
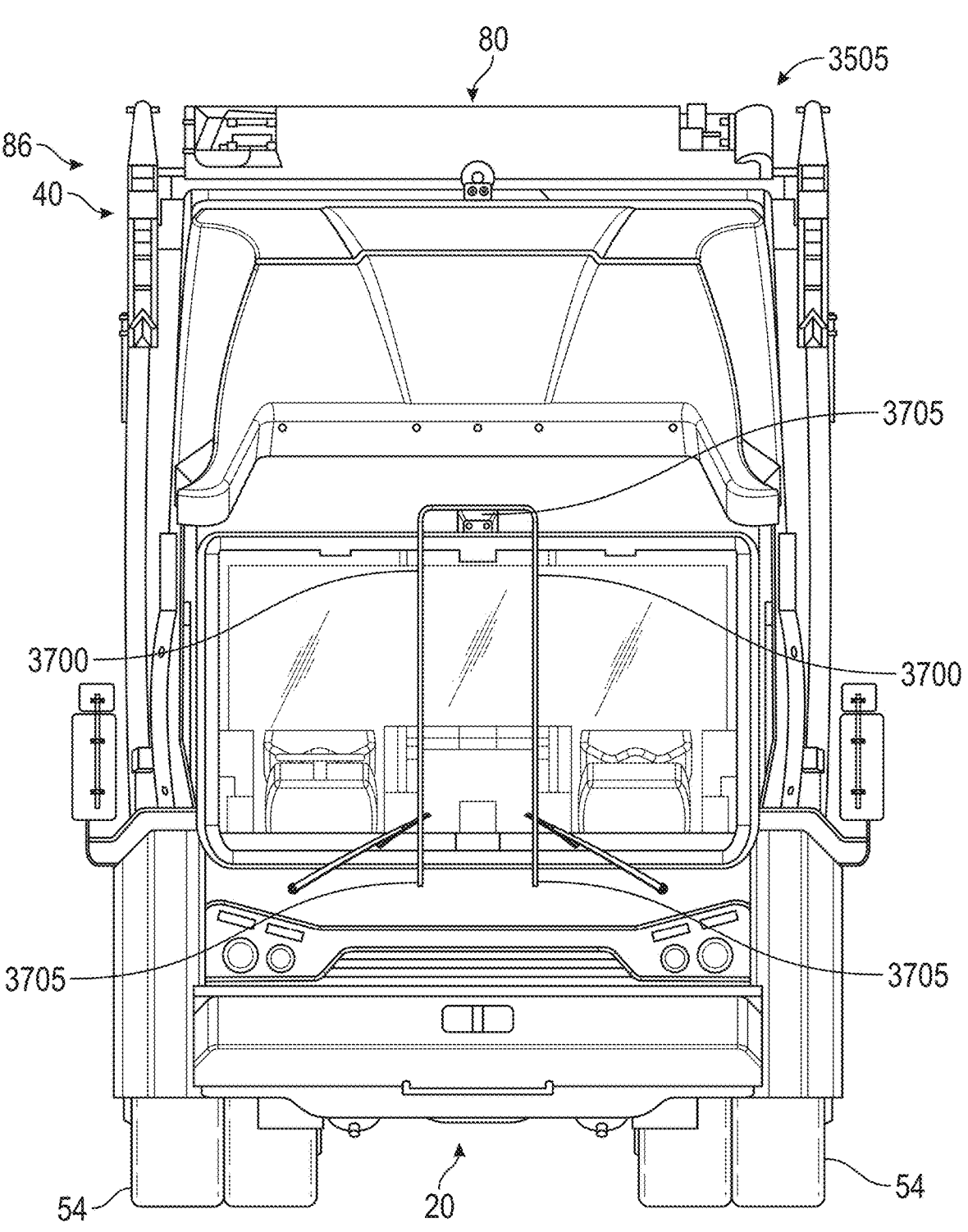
FIG. 77 is a front view of the front-loading refuse vehicle of FIG. 69 including protection bars, according to an exemplary embodiment.

As shown in FIGS. 74 and 75, the FEL 3505 is shown including the control panel 3610 and the E-stop 3615 positioned outside of the cab 40 proximate a driver's side door (e.g., door 44) along the street side of the FEL 3505. The control panel 3610 of the FEL 3505 is located along the street side and proximate the front side 86 because the lift assembly 140 (e.g., the side-loading lift assembly) and the components thereof (e.g., the lift arms 142, the lift arm actuators 144, the lift forks 146, the articulation actuators 148, etc.) are located along the front side 86 of the FEL 3505. Therefore, when the user is controlling, using the control panel 3610, operation of the lift assembly 140 and the components thereof (e.g., refuse dumping operations, refuse collection operations, etc.), the positioning of the control panel 3610 relative to the lift assembly 140 facilitates the user being capable of overseeing (e.g., monitoring, tracking, etc.) the operation of the lift assembly 140, thereby facilitating safe, accurate, and efficient operation of the lift assembly 140. Similarly, because the position of the E-stop 3615 is located proximate the lift assembly 140, the user can monitor the operation of the lift assembly 140 and efficiently stop and/or otherwise inhibit operation of the lift assembly 140 in the event of detecting an emergency.

According to an exemplary embodiment, the cab 40 is configured to facilitate positioning the control panel 3610 and the E-stop 3615 (i) along the curb side when the refuse vehicle 100 is configured as the ASL 3500, and (ii) along the street side when the refuse vehicle 100 is configured as FEL 3505, thereby facilitating the use of a common cab 40 for either the ASL 3500 or the FEL 3505 configurations. Similarly, the chassis 20 may be configured to provide hard wire routing channels from the control system 3600 to one or more components of the refuse vehicle 100 to facilitate positioning the control panel 3610 and the E-stop 3615 (i) along the curb side when the refuse vehicle 100 is configured as the ASL 3500, and (ii) along the street side when the refuse vehicle 100 is configured as FEL 3505, thereby facilitating the use of a common chassis 20 for either the ASL 3500 or the FEL 3505 configurations.

C. Protection Bars

As shown in FIGS. 70, 71, 76, and 77, the FEL 3505 includes protection bars (e.g., guards, shield members, bumpers, protective grilles, etc.), shown as protective bars 3700, configured to be coupled to the cab 40. In some embodiments, the protective bars 3700 are removably coupled to the cab 40 at mounting locations using one or more mounts (e.g., brackets, bracings, etc.), shown as mounts 3705, positioned along the cab 40 such that the protective bars 3700 are selectively installed (e.g., selectively removable). By way of example, the protective bars 3700 may be coupled to the refuse vehicle 100 when the refuse vehicle 100 is configured as the FEL 3505, and may be removed from the refuse vehicle 100 when the refuse vehicle 100 is configured as the ASL 3500. As shown in FIGS. 70, 71, 76, and 77, the protective bars 3700 extend in a generally vertical direction across a windshield of the cab 40. The protective bars 3700 are spaced forward from the windshield of the cab 40 to protect the windshield from being damaged (e.g., breaking, cracking, scratching, etc.) during refuse dumping and refuse collection operations. As shown, the protective bars 3700 include two members laterally spaced apart from each other. The protective bars 3700 may be suitably spaced to provide a substantially unobstructed view of a surrounding environment through the windshield from a perspective of a driver and/or passenger of the FEL 3505. In some embodiments, the protective bars 3700 include more or fewer than two members. In some embodiments, the protective bars 3700 form a meshed pattern of one or more vertically and/or horizontally extending members to protect the windshield while maintaining sufficient visibility through the windshield for the driver. In some embodiments, the protective bars 3700 extend across the entirety of the front side (e.g., front side 86) of the cab 40. In such embodiments, the protective bars 3700 are configured to protect the windshield, a front grill of the FEL 3505, headlights, paint, and/or any other component or feature of the front side 86 of the FEL 3505. In such embodiments, a bottom portion of the protective bars 3700 may be coupled to the chassis 20.

During refuse collection operations, the lift forks 146 may be configured to engage a refuse container (e.g., a dumpster) to selectively couple the refuse container to the lift arms 142, and the articulation actuators 148 may assist in tipping refuse out of the refuse container and into the refuse compartment 130. The lift arm actuators 144 may then rotate the lift arms 142 to return the empty refuse container to the ground. By way of example, during the refuse collection operations, the refuse container is lifted over the windshield. In some embodiments, during the refuse collection operations, a lid of the refuse container may fall (e.g., pivot, rotate, etc.) in a direction towards the windshield. In such embodiments, the protective bars 3700 prevent the lid of the refuse container from contacting the windshield and potentially breaking the windshield on impact. In some embodiments, during the refuse collection operations, the refuse container is lifted over the windshield, and refuse from the refuse container falls out of the refuse container in a direction towards the windshield. In such embodiments, the protective bars 3700 prevent the refuse falling out of the refuse container from contacting the windshield and potentially breaking the windshield on impact. In some embodiments, the ASL 3500 does not include the protective bars 3700 because the refuse container is not lifted above the windshield in such a configuration. In such embodiments, the common cab 40 and/or common chassis 20 may include the mounts 3705 for the protective bars 3700, even though the protective bars 3700 may not be installed.

D. Front and Rear Shroud

Figure 78:
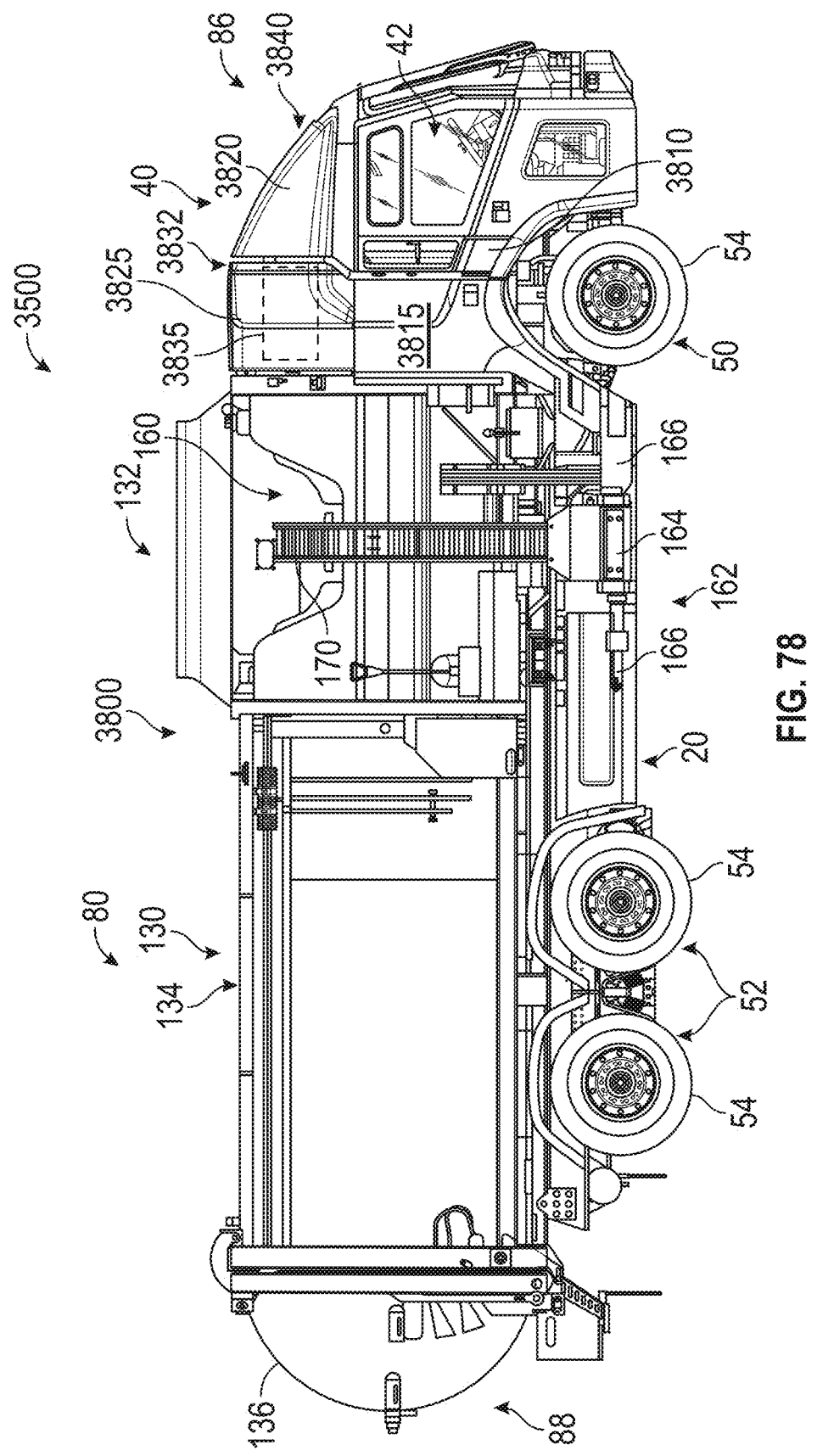
FIG. 78 is a right side view of the side-loading refuse vehicle of FIG. 65 including a cowl assembly, according to an exemplary embodiment.
Figure 79:
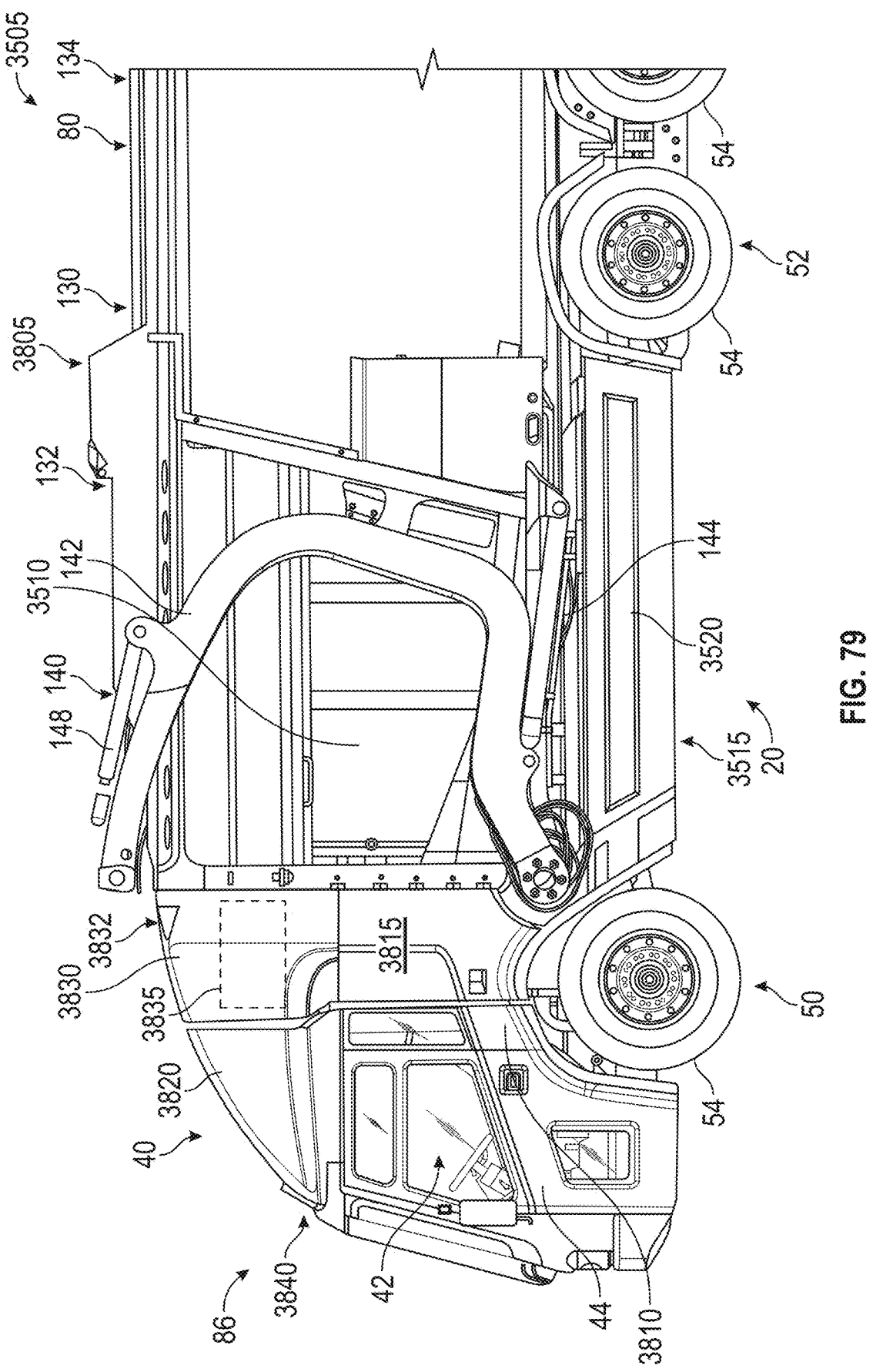
FIG. 79 is a left side view of the front-loading refuse vehicle of FIG. 69 including a cowl assembly, according to an exemplary embodiment.

As shown in FIG. 78, the application kit 80 of the ASL 3500 includes a first body assembly (e.g., container, structure, etc.), shown as ASL body 3800, positioned rearward of the cab 40. Similarly, as shown in FIG. 79, the application kit 80 of the FEL 3505 includes a second body assembly (e.g., container, structure, etc.), shown as FEL body 3805, positioned rearward of the cab 40. As shown, the ASL body 3800 and the FEL body 3805 are substantially rectangular (e.g., a rectangular prism). As shown, the ASL body 3800 and the FEL body 3805 extend above (e.g., are taller than) the cab 40.

As shown in FIGS. 78 and 79, the cab 40 includes a first portion (e.g., an operator portion), shown as front portion 3810, and a second portion (e.g., a storage portion), shown as rear portion 3815, each coupled to the chassis 20. The front portion 3810 defines at least a portion of the cab interior 42 and is configured to contain one or more operators. The rear portion 3815 is positioned between (e.g., longitudinally between) the front portion 3810 and the ASL body 3800 or the FEL body 3805. In some embodiments, the rear portion 3815 defines one or more storage spaces that contain components of the refuse vehicle 100 (e.g., pumps, batteries, plumbing, etc.) and/or provide storage for items of the operator (e.g., clothing, equipment, etc.). The rear portion 3815 may include one or more doors that facilitate accessing the storage spaces from outside of the refuse vehicle 100 and/or from inside of the cab interior 42. In some embodiments, the front portion 3810 and the rear portion 3815 are fixedly coupled to the chassis 20 (e.g., the front portion 3810 and the rear portion 3815 remain stationary when the ASL body 3800 or the FEL body 3805 are raised). In other embodiments, the rear portion 3815 is fixedly coupled to the ASL body 3800 or the FEL body 3805 (e.g., the rear portion 3815 moves with the ASL body 3800 or the FEL body 3805 when the ASL body 3800 or the FEL body 3805 are raised).

Figure 80:
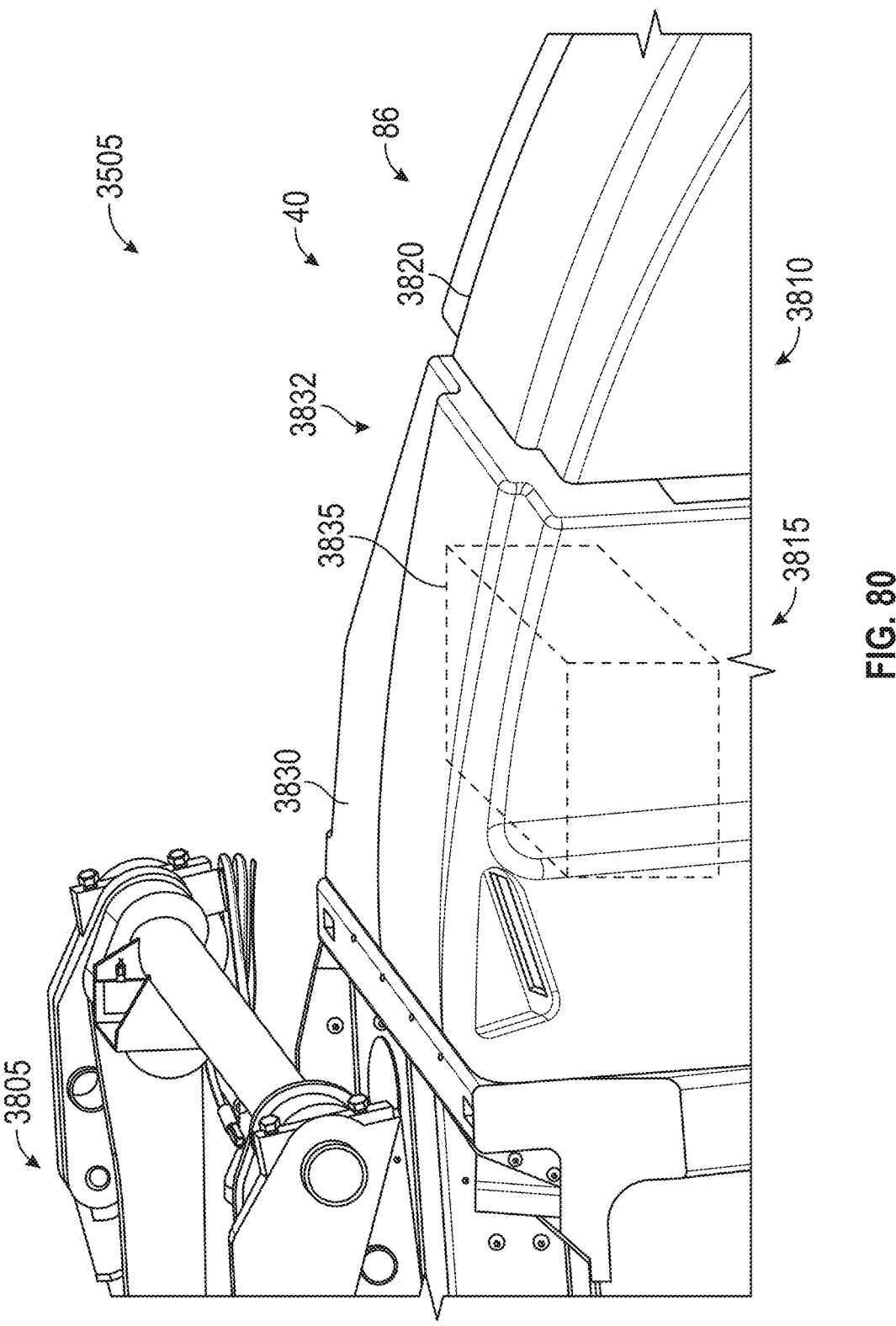
FIG. 80 is a detailed perspective view of the cowl assembly of FIG. 79, according to an exemplary embodiment.

As shown in FIGS. 78-80, the ASL 3500 and the FEL 3505 include a cover, guard, cowl, or flow control member, shown as front shroud 3820 (e.g., a front cowl portion, a front shroud portion, etc.). The front shroud 3820 is positioned directly above the front portion 3810 of the cab 40 and coupled to the front portion 3810. The front shroud 3820 defines a front-facing surface that slopes gradually. According to an exemplary embodiment, the front shroud 3820 of the ASL 3500 is the same as the front shroud 3820 the FEL 3505. By way of example, the front shroud 3820 of the ASL 3500 defines the same dimensions and features and is configured to operate substantially similarly as the front shroud 3820 of the FEL 3505.

As shown in FIG. 78, the ASL 3500 includes a cover, guard, cowl, or flow control member, shown as ASL rear shroud 3825 (e.g., a rear cowl portion, a rear shroud portion, etc.). The ASL rear shroud 3825 is positioned directly above the rear portion 3815 of the cab 40 and coupled to the ASL body 3800. The ASL rear shroud 3825 is positioned between (e.g., longitudinally between) the front shroud 3820 and the ASL body 3800. The front-facing surface of the front shroud 3820 of the ASL 3500 slopes gradually from the front surface of the cab 40 to the top surface of the ASL rear shroud 3825. The top surface of the ASL rear shroud 3825 may extend within a substantially horizontal plane (e.g., within a plane that is substantially parallel to a ground surface that the ASL 3500 is traversing on, flat, etc.) from the front shroud 3820 to the top surface of the ASL body 3800 (e.g., such that a trailing edge of the ASL rear shroud 3825 is aligned with the top surface of the ASL body 3800). This gradual transition (e.g., from the front shroud 3820 to the ASL rear shroud 3825) may reduce the drag on the ASL 3500 when the ASL 3500 travels in a forward direction.

As shown in FIGS. 79 and 80, the FEL 3505 includes a cover, guard, cowl, or flow control member, shown as FEL rear shroud 3830 (e.g., a rear cowl portion, a rear shroud portion, etc.). The FEL rear shroud 3830 is positioned directly above the rear portion 3815 of the cab 40 and coupled to the FEL body 3805. The FEL rear shroud 3830 is positioned between (e.g., longitudinally between) the front shroud 3820 and the FEL body 3805. The FEL rear shroud 3830 may be arcuate (e.g., defining a curved profile). In some embodiments, a curvature of the FEL rear shroud 3830 is complementary to (e.g., matches) a curvature of the front shroud 3820 such that the front shroud 3820 and the FEL rear shroud 3830 define a continuous curvature of a top surface of the FEL 3505. By way of example, together, the front shroud 3820 and the FEL rear shroud 3830 may define a top surface of the cab 40 of the FEL 3505 that slopes gradually from the front surface of the cab 40 to the top surface of the FEL body 3805 (e.g., such that a trailing edge of the FEL rear shroud 3830 is aligned with the top surface of the FEL body 3805). This gradual transition may reduce the drag on the FEL 3505 when the FEL 3505 travels in a forward direction.

According to an exemplary embodiment, the ASL body 3800 defines a first vertical height that is shorter (e.g., smaller, less, etc.) than a second vertical height defined by the FEL body 3805. As such, the ASL rear shroud 3825 defines a maximum vertical height that is less than a maximum vertical height of the FEL rear shroud 3830 (e.g., vertical heights from a ground surface or from a bottom edge of the application kit 80 to top surfaces of the ASL rear shroud 3825 or the FEL rear shroud 3830, respectively). By way of example, the ASL rear shroud 3825 and the FEL rear shroud 3830 include a front edge (e.g., a leading surface, a leading edge, etc.) that is substantially the same height of a top, rear edge of the common front shroud 3820 used in both the ASL 3500 and FEL 3505 configurations.

According to an exemplary embodiment, the ASL rear shroud 3825 and the FEL rear shroud 3830 rear surfaces (e.g., top, rear edges of the ASL rear shroud 3825 and the FEL rear shroud 3830) that define different heights. By way of example, a height of the rear surface of the front shroud 3820 extends to substantially the same height as a front surface of the ASL body 3800. Accordingly, because the height of the front surface of the ASL body 3800 is at substantially the same height as the rear surface of the front shroud 3820, the top surface of the ASL rear shroud 3825 is substantially horizontal. Similarly, the height of the rear surface of the FEL rear shroud 3830 extends to substantially the same height as a front surface of the FEL body 3805. Accordingly, because the height of the front surface of the FEL body 3805 is greater (e.g., taller) than the height of the rear surface of the front shroud 3820, the height of the rear surface of the FEL rear shroud 3830 is taller than the height of the rear surface of the ASL rear shroud 3825. By way of example, the common cab 40 may be manufactured to provide a space (e.g., a gap, a volume, an area, etc.), shown as space 3832, between the front shroud 3820 and a front wall of the application kit 80 (e.g., ASL body 3800, the FEL body 3805) to accommodate (e.g., receive) a rear shroud (e.g., ASL rear shroud 3825, FEL rear shroud 3830) that varies in size (e.g., height) between the ASL 3500 and the FEL 3505. By way of another example, the common cab 40 may be manufactured such that a longitudinal distance between a front wall of the application kit 80 (e.g., ASL body 3800, the FEL body 3805) and a rear wall of the front shroud 3820 is sufficiently sized to receive (i) the ASL rear shroud 3825 when the refuse vehicle 100 is configured as the ASL 3500 or (ii) the FEL rear shroud 3830 when the refuse vehicle 100 is configured as the FEL 3505.

As shown in FIGS. 78-80, a space or volume (e.g., an air volume, a plenum, a radiator volume, etc.) is defined between a top surface of the cab 40, a front surface of the ASL body 3800 and/or FEL body 3805, a bottom surface of the front shroud 3820, and a bottom surface of the ASL rear shroud 3825 and/or FEL rear shroud 3830. The space or volume may be a radiator volume containing one or more radiators (e.g., heat exchangers, cores, etc.), shown as radiator 3835. The radiator 3835 may transfer thermal energy from any component or system of the ASL 3500 and/or the FEL 3505 to the surrounding atmosphere. By way of example the radiator 3835 may act as a condenser. By way of another example the radiator 3835 may act as a hydraulic fluid radiator that cools hydraulic fluid. In some embodiments the radiator volume includes a series of air movers, blowers, fans, etc. The fans may be coupled to the radiator 3835 and configured to direct air through the radiator 3835

(e.g., across fins of the radiator 3835). The radiator 3835 and the fans are positioned above the cab 40 and out of the way of the operators during normal use of the ASL 3500 and/or the FEL 3505. The radiator 3835 and the fans are protected from rain and falling debris (e.g., acorns, hail, rocks, refuse, etc.) by the front shroud 3820 and the ASL rear shroud 3825 and/or the FEL rear shroud 3830.

As shown in FIGS. 78-80, the radiator 3835 is positioned within the radiator volume to facilitate airflow through the radiator 3835, thereby increasing cooling performance of the radiator 3835. The front shroud 3820 defines a first aperture, front aperture, air intake, etc., shown as inlet 3840. The inlet 3840 is positioned near the front of the front shroud 3820 such that air from an external environment is forced through the inlet 3840 when the ASL 3500 and/or the FEL 3505 travels in a forward direction. The inlet 3840 may be approximately centered about a longitudinal centerline of the cab 40. The ASL rear shroud 3825 and the FEL rear shroud 3830 define a series of second apertures, rear apertures, louvers, vents, outlets, etc. The outlets may be positioned along the lateral sides of the ASL rear shroud 3825 and/or the FEL rear shroud 3830. Air that flows into the radiator volume through the inlet 3840 subsequently exits the radiator volume through the outlets.

In some embodiments, the front shroud 3820, the ASL rear shroud 3825, and the FEL rear shroud 3830 is a front shroud and a rear shroud as described in U.S. application Ser. No. 18/110,976, filed Feb. 17, 2023, the entire disclosure of which is incorporated by reference herein.

E. Lift Cylinders and Pivot Assembly

In some embodiments, the application kit 80 (e.g., the ASL body 3800, the FEL body 3805) is configured to move relative to the chassis 20 and the cab 40. The ASL body 3800, the FEL body 3805, and/or the application kit 80 may be hereinafter collectively referred to as the body assembly 3904, as shown in FIGS. 82-85. In some such embodiments, the body assembly 3904 can be raised and lowered relative to the chassis 20 between a lowered or operating position and an elevated position. The body assembly 3904 may be rotatably coupled to the chassis 20 near the rear end of the chassis 20, and may rotate about a lateral axis (e.g., a horizontal axis) such that the front end of the body assembly 3904 (e.g., a front end closest to the front side 86) raises and lowers. In other embodiments, the entire body assembly 3904 raises and lowers.

Figure 81:
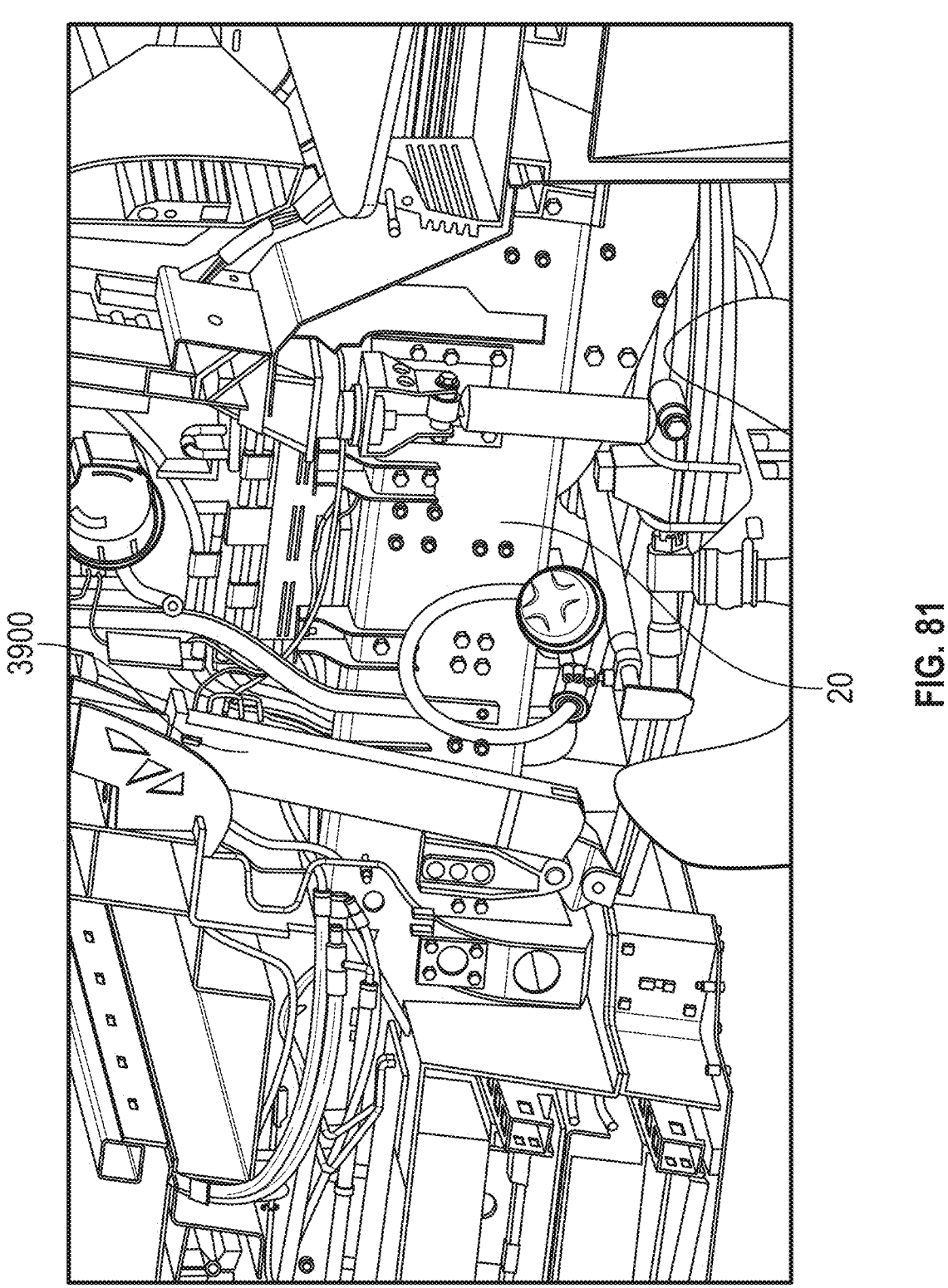
FIG. 81 is a perspective view a body actuator of a body assembly of the vehicle of FIG. 1, according to an exemplary embodiment.
Figure 82:
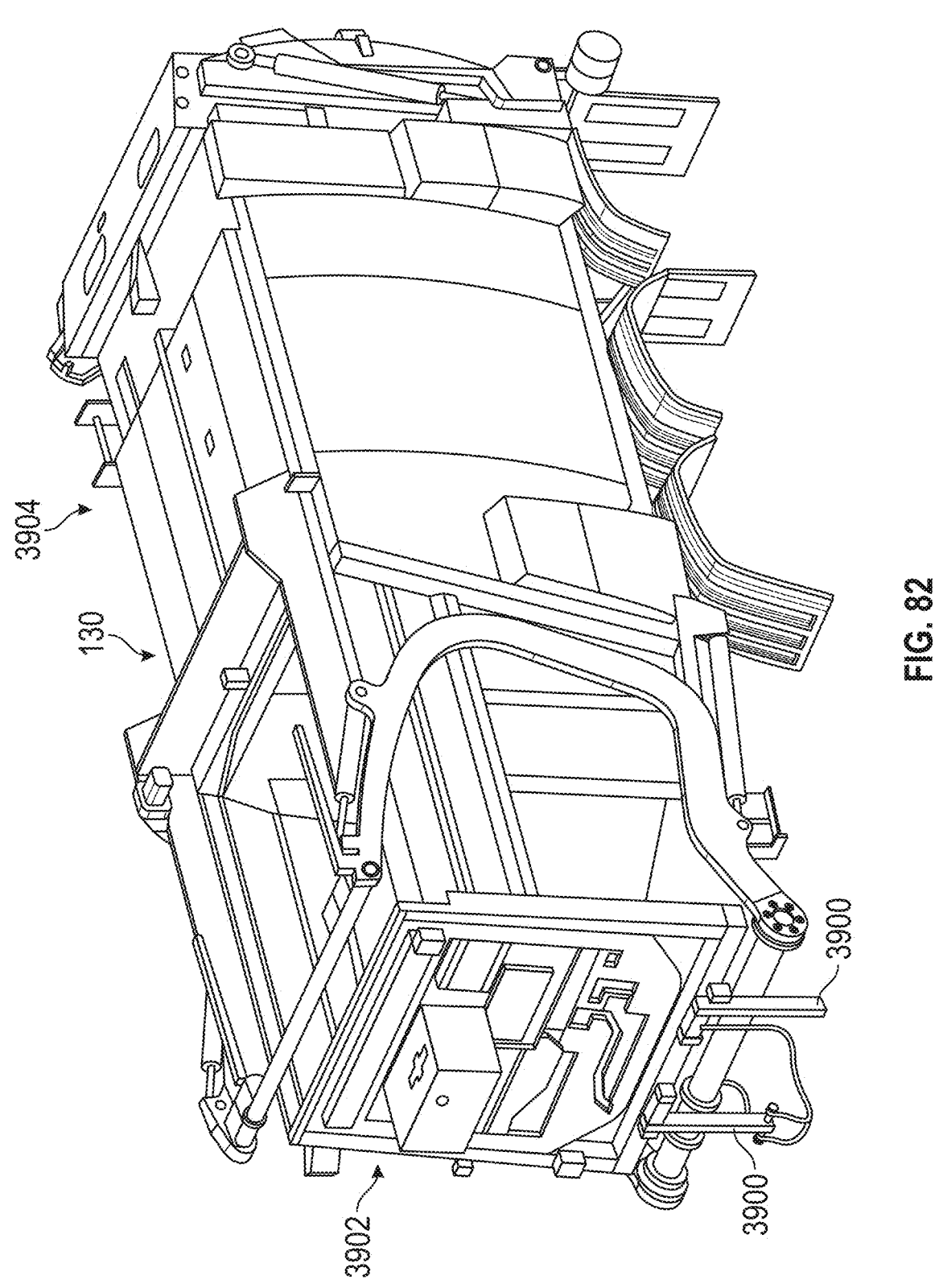
FIG. 82 is a perspective view of the body actuators and the body assembly of FIG. 81 according to an exemplary embodiment.
Figure 83:
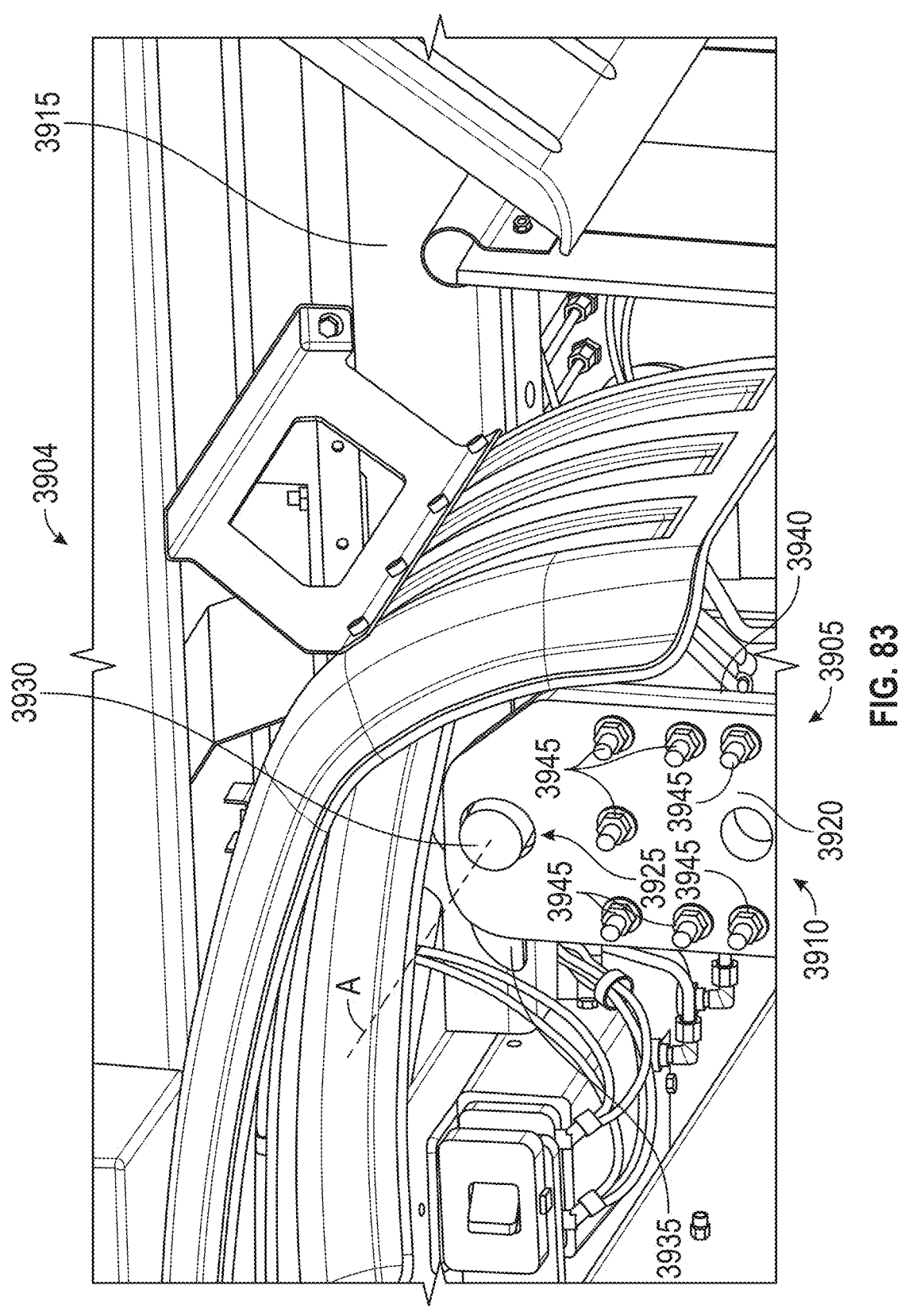
FIGS. 83-85 are various perspective views of a pivot assembly of the body assembly of FIG. 81, according to an exemplary embodiment.

According to an exemplary embodiment shown in FIGS. 81-83, the ASL 3500 and the FEL 3505 include an actuator (e.g., a hydraulic cylinder, an electric linear actuator, a pneumatic cylinder, etc.), shown as body actuator 3900, that is coupled to the chassis 20 and the body assembly 3904 (e.g., the ASL body 3800, the FEL body 3805). The body actuator 3900 is configured to selectively move the body assembly 3904 between the raised position and the lowered position. The body actuator 3900 may be communicably coupled with the control system 3600 (e.g., the controller 3605) such that the body actuator 3900 moves the body assembly 3904 between the raised position and the lowered position in response to a signal received from the control system 3600. By way of example, an actuation signal may be transmitted to the body actuator 3900 in response to a manual input from a user (e.g., in response to a user engaging with a panel button 3620 associated with actuating the body actuator 3900). In the raised position, the body actuator 3900 facilitates access to one or more components of the ASL 3500 and/or the FEL 3505 that are positioned below the body assembly 3904 when the body assembly 3904 is in the lowered position. The body actuator 3900 is coupled to the chassis 20 at the same location for both the ASL 3500 and the FEL 3505 configurations.

As shown in FIG. 82, the ASL 3500 and the FEL 3505 include two body actuators 3900. In some embodiments, the ASL 3500 and the FEL 3505 include more or fewer than two body actuators 3900. The body actuators 3900 extend substantially vertically. The body actuators 3900 are laterally offset from one another and positioned along a front wall 3902 of the refuse compartment 130 (e.g., a front wall of the ASL body 3800, the FEL body 3805, and/or the body assembly 3904). The front wall 3902 extends laterally and vertically. The front wall 3902 faces in a longitudinally forward direction. An upper end portion of each body actuator 3900 is coupled to the front wall 3902, and a lower end portion of each body actuator 3900 is coupled to the chassis 20. In some embodiments, the chassis 20 includes a pair of longitudinally-extending frame members (e.g., frame members of the chassis 20, the frame members 3915, etc.). The frame members extend longitudinally beneath the body assembly 3904 and are laterally offset from one another. A bracket may couple the lower end portion of the body actuators 3900 to said frame members. Each bracket may be additionally directly coupled to a suspension element (e.g., a leaf spring) that couples the front axle 50 to the chassis 20.

Figure 84:
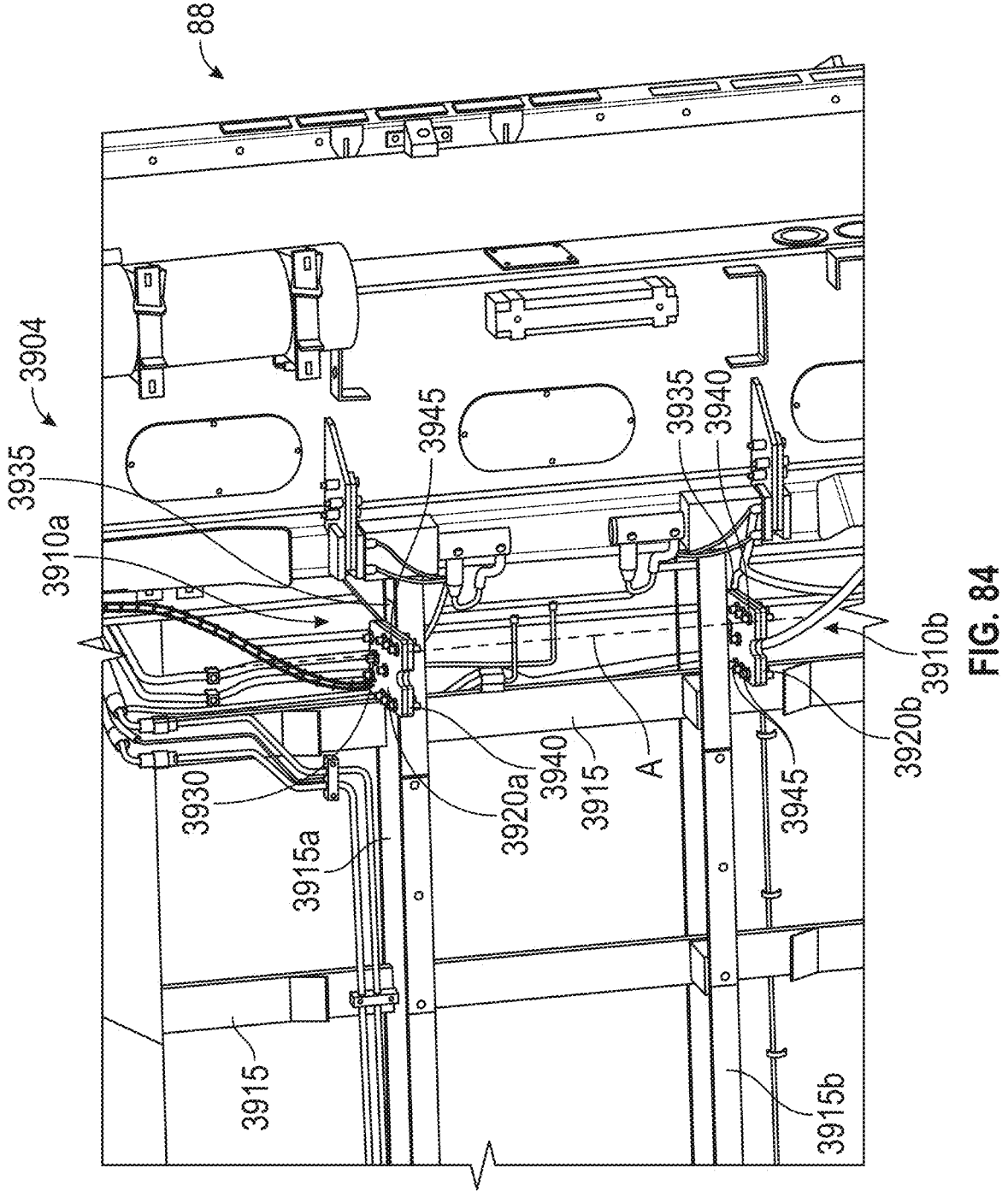
Figure 85:
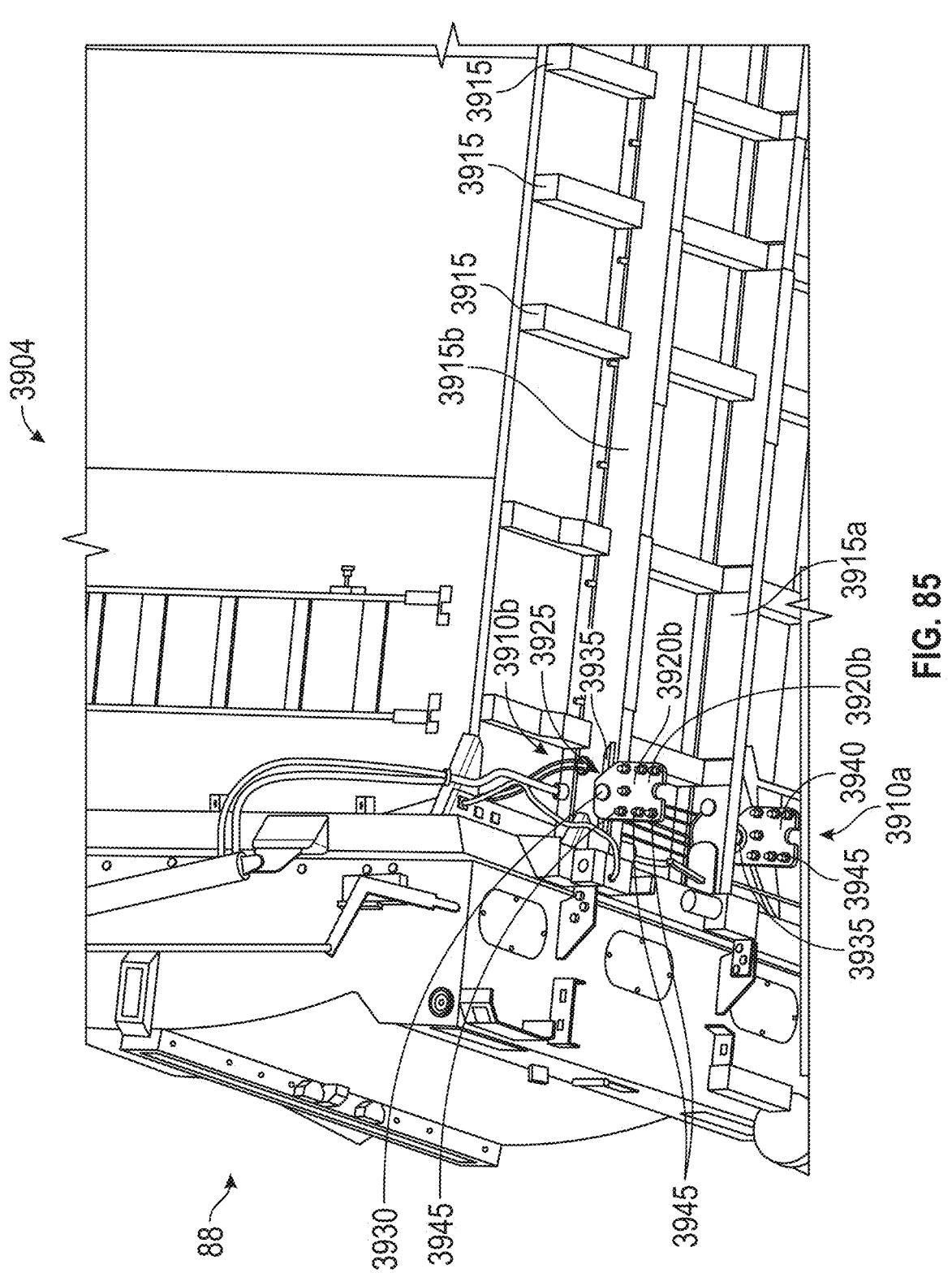

As shown in FIGS. 83-85, a body rotation assembly (e.g., rotation anchor, rear end tie-down, etc.), shown as pivot assembly 3905, is configured to couple a rear portion of the body assembly 3904 (e.g., the ASL body 3800, the FEL body 3805) to a rear portion (e.g., end) of the chassis 20. The pivot assembly 3905 is configured to permit rotation of the body assembly 3904 relative to the chassis 20. By way of example, the pivot assembly 3905 is configured to pivotably couple the rear portion of the body assembly 3904 to the rear rail portion 34 and the rear rail portion 36 of the chassis 20. The pivot assembly 3905 is coupled to the chassis 20 at the same location for both the ASL 3500 and the FEL 3505 configurations, thereby facilitating rotation of the ASL body 3800 and/or the FEL body 3805 relative to the common chassis 20.

As shown in FIGS. 83-85, the pivot assembly 3905 includes a first pivot coupler 3910a and a second pivot coupler 3910b (collectively referred to as the pivot couplers 3910) laterally spaced from each other and configured to couple the rear rail portion 34 and the rear rail portion 36, respectively, to a first frame member 3915a and a second frame member 3915b (collectively referred to as the frame members 3915) of the body assembly 3904 (e.g., the ASL body 3800, the FEL body 3805). In some embodiments, the frame members 3915 are (i) coupled to a bottom surface of the body assembly 3904, (ii) laterally spaced apart from each other, and (iii) extend in a longitudinal direction along the bottom surface of the body assembly 3904. In some embodiments, the body assembly 3904 additionally or alternatively includes one or more frame members 3915 that are longitudinally spaced apart from each other and extend in a lateral direction.

As shown in FIGS. 83-85, the pivot couplers 3910 each include a first plate (e.g., structural member), shown as plate 3920, that includes an opening (e.g., an aperture), shown as slot 3925. The slot 3925 is configured to receive a protrusion (e.g., an axle), shown as pin 3930, of a second plate (e.g., structural member), shown as plate 3935. The plate 3935 may be a structural member configured to couple to the frame member 3915. In some embodiments, the plate 3935 is otherwise fixedly coupled to the body assembly 3904. The plate 3920 may be a structural member configured to couple with the chassis 20. By way of example, a first plate 3920a may be coupled to the rear rail portion 34 and a second plate 3920b may be coupled to the rear rail portion 36. The pivot couplers 3910 facilitate rotation of the frame members 3915 and the body assembly 3904 relative to the chassis 20 of the ASL 3500 and the FEL 3505. By way of example, the body assembly 3904 may rotate about an axis of rotation (i.e., a horizontal axis, a lateral axis, etc.), shown as axis A, defined by the pin 3930 such that the front end of the body assembly 3904 raises and lowers. When the body actuators 3900 actuate from a retracted position to an extended position, the front end of the body assembly 3904 is raised, and the body assembly 3904 may be at least partially supported by and rotate (e.g., pivot) about the pin 3930 relative to the chassis 20.

As shown in FIGS. 83-85, the plate 3920 is configured to couple with an end portion of the chassis 20 (e.g., a portion of the chassis 20 proximate the rear side 88 of the ASL 3500 and the FEL 3505) with a spacer 3940. The spacer 3940 is configured to be positioned laterally between the plate 3920 and the plate 3935. In other words, the spacer 3940 is configured to be positioned laterally inward relative to the plate 3920 and laterally outward relative to the plate 3935. In some embodiments, the spacer 3940 is positioned along an exterior surface (e.g., an outward facing surface) of the chassis 20. In some embodiments, the pivot assembly 3905 includes an elongated member (e.g., a lateral frame member, a bar, a beam, etc.) that extends between opposite members of the chassis 20 such that the pivot couplers 3910 are positioned at opposite ends of the elongated member and fixedly coupled to the chassis 20 by way of the elongated member. The spacer 3940 may include multiple openings corresponding in size, position, and pattern to openings of the plate 3920 in order to receive fasteners 3945 to selectively fixedly couple the plate 3920 with the chassis 20.

Electric Power Take Off for Vocational Vehicle

According to an exemplary embodiment, a vehicle includes an electric power take off (EPTO) pod, which is used to provide power to auxiliary functions on a vehicle, specifically an electric vehicle. The EPTO pod receives electrical energy from the vehicle batteries or battery pack and supplies pressurized hydraulic fluid to operate various functions of the vehicle (e.g., carry can, arms, forks, packer, tailgate lift, tailgate locks). In some embodiments, the EPTO pod is positioned along a front portion of the body of the vehicle, in an area between a front end of the body and a pack panel within the body. Such an arrangement can, beneficially, reduce the physical footprint of the refuse vehicle and increase space utilization within the body. Such an arrangement can also facilitate access to components of the EPTO system for maintenance (e.g., service) events, such as by eliminating the need for an entirely separate/independent enclosure to store components of the EPTO system).

The EPTO is formed as a self-contained pod that can be assembled offboard of the vehicle and attached to the body during final assembly. The EPTO pod includes a hydraulic reservoir attached to the body, a frame, one or more pumps, one or more motors, and an inverter. Beneficially, embodiments of the EPTO pod of the present application simplify assembly of the vehicle by providing a single interface between auxiliary functions and the battery pack, and without requiring separate connections between the body and individual components of the hydraulic system. The arrangement can also reduce vehicle downtime during maintenance events by enabling replacement of hydraulic system components all together, such as by removal of the EPTO pod mounting structure (that supports the various components of the EPTO system) from the body as a single unit.

Figure 86:
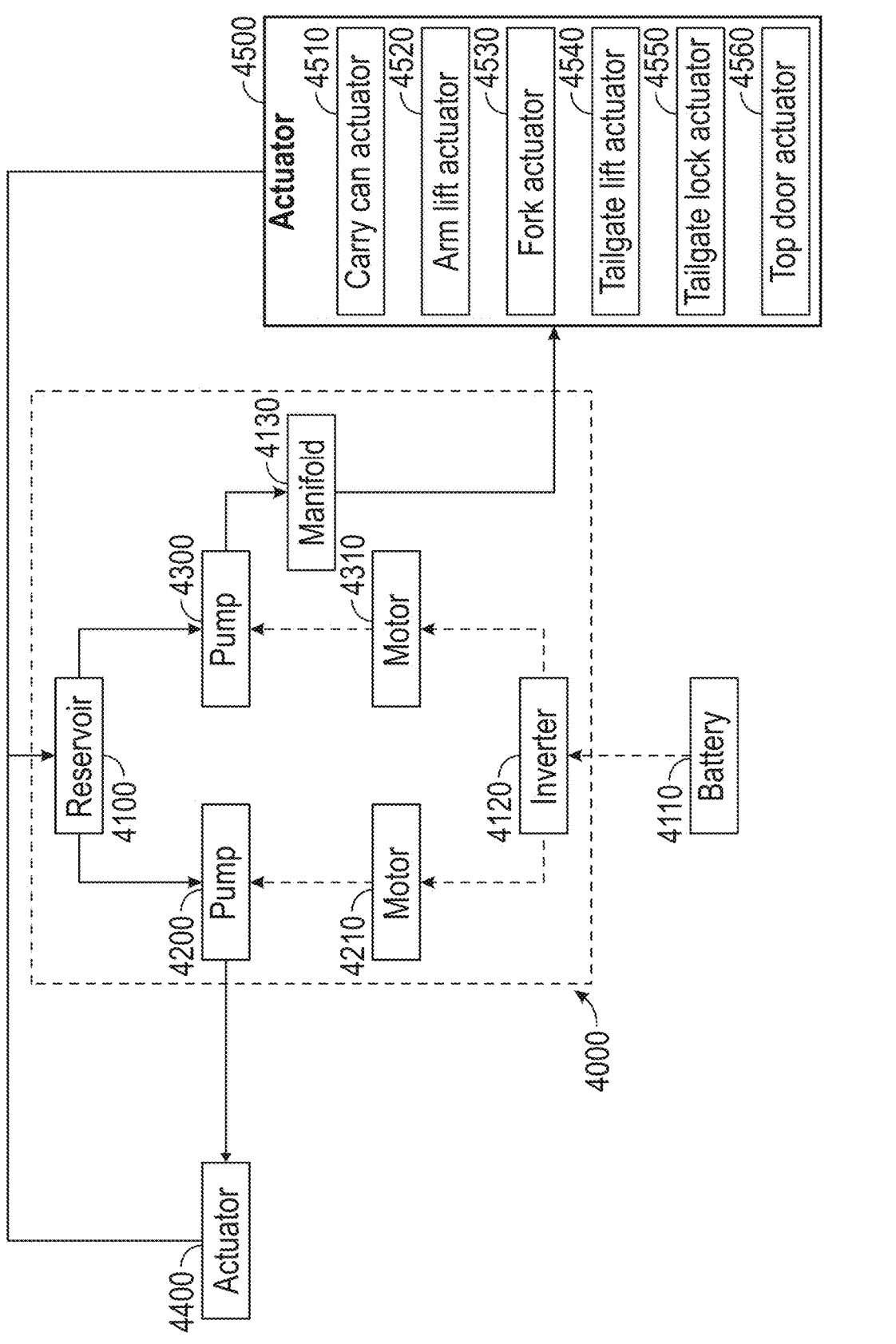
FIG. 86 is a schematic diagram of an electric power take off pod that may be used with the vehicle of FIG. 1, according to an exemplary embodiment.

Referring to FIG. 86, an electric power take off (EPTO) pod 4000 (shown in dotted lines) includes a tank, shown as reservoir 4100, a first pump (e.g., a pack pump, primary pump), shown as pump 4200, a first motor (e.g., pack motor, primary motor), shown as motor 4210, a second pump (e.g., auxiliary pump, secondary pump), shown as second pump 4300, a second motor (e.g., an auxiliary pump, secondary pump), shown as second motor 4310, an inverter 4120, and a pressure distributer, shown as manifold 4130.

The reservoir 4100 provides a supply of low-pressure (e.g., atmospheric) fluid (e.g., hydraulic fluid). The pump 4200 is fluidly coupled (indicated by solid lines in FIG. 86) to the reservoir 4100 and draws low pressure fluid from of the reservoir 4100 and supplies the fluid at increased pressure to an actuator 4400 (e.g., a pack panel actuator). The pump 4200 supplies pressurized (e.g., high pressure) fluid to the actuator 4400 in order to complete one or more functions, such as moving a pack panel with a body assembly (e.g., the application kit 80 of FIG. 1) to compress refuse.

The second pump 4300 is fluidly coupled to the reservoir 4100 and draws low pressure fluid from the reservoir 4100 and supplies the fluid at increased pressure to the manifold 4130. The manifold 4130 distributes the pressurized fluid by sending the fluid to one or more of a carry can actuator 1510, an arm lift actuator 4520, a fork actuator 4530, a tailgate lift actuator 4540, a tailgate lock actuator 4550, and a top door actuator 4560, shown collectively as actuator 4500. The second pump 4300 supplies pressurized (e.g., high pressure) fluid to the actuator 4500 in order to complete one or more functions such as moving a carry can, an arm lift, a fork, a tailgate, or a top door of the refuse vehicle.

An energy storage device (e.g., a battery pack), shown as battery 4110, which may include one or more batteries (e.g., the batteries 60 of FIG. 1), supplies electrical energy to the inverter 4120 in the form of direct current (DC) power, as indicated by a dash-dot line in FIG. 86. The inverter 4120 converts DC power to alternating current (AC) power, and the inverter 4120 supplies AC power to the motor 4210 and the second motor 4310 (i.e., the motor 4210 and the second motor 4310 are electric motors), shown in dashed lines in FIG. 86. The motor 4210 is mechanically coupled to pump 4200 and is configured to drive the pump 4200 to move low pressure fluid from reservoir 4100 to high pressure in order to operate the actuator 4400. The second motor 4310 is mechanically coupled to the second pump 4300 and is configured to drive the second pump 4300 to move low pressure fluid from reservoir 4100 to high pressure in order to operate the actuator 4500.

Referring now to FIGS. 87-91, the EPTO pod 4000 is configured for use with the refuse vehicle 100 of FIGS. 3 and 4, and will be described with reference to FIGS. 3 and 4 (e.g., using similar reference numerals to identify similar components). The EPTO pod 4000 is positioned along a front portion 82 of the body assembly (e.g., the application kit), shown as body 80 of the refuse vehicle 100. In the illustrated embodiment, the EPTO pod 4000 is coupled to the front portion 82 of a refuse vehicle 100 in the form of a font-loading refuse vehicle. In some embodiments, the EPTO pod 4000 may be coupled to a front portion of a body on a side loading refuse vehicle (e.g., the body 82 of the side-loading refuse vehicle 100 of FIGS. 5-8). In general, the EPTO pod 4000 is formed as a self-contained sub-assembly that can be assembled offboard a vehicle and attached to the vehicle during the final assembly steps, for example, as a single individual unit. The body 80 defines an interior cavity

Figure 88:
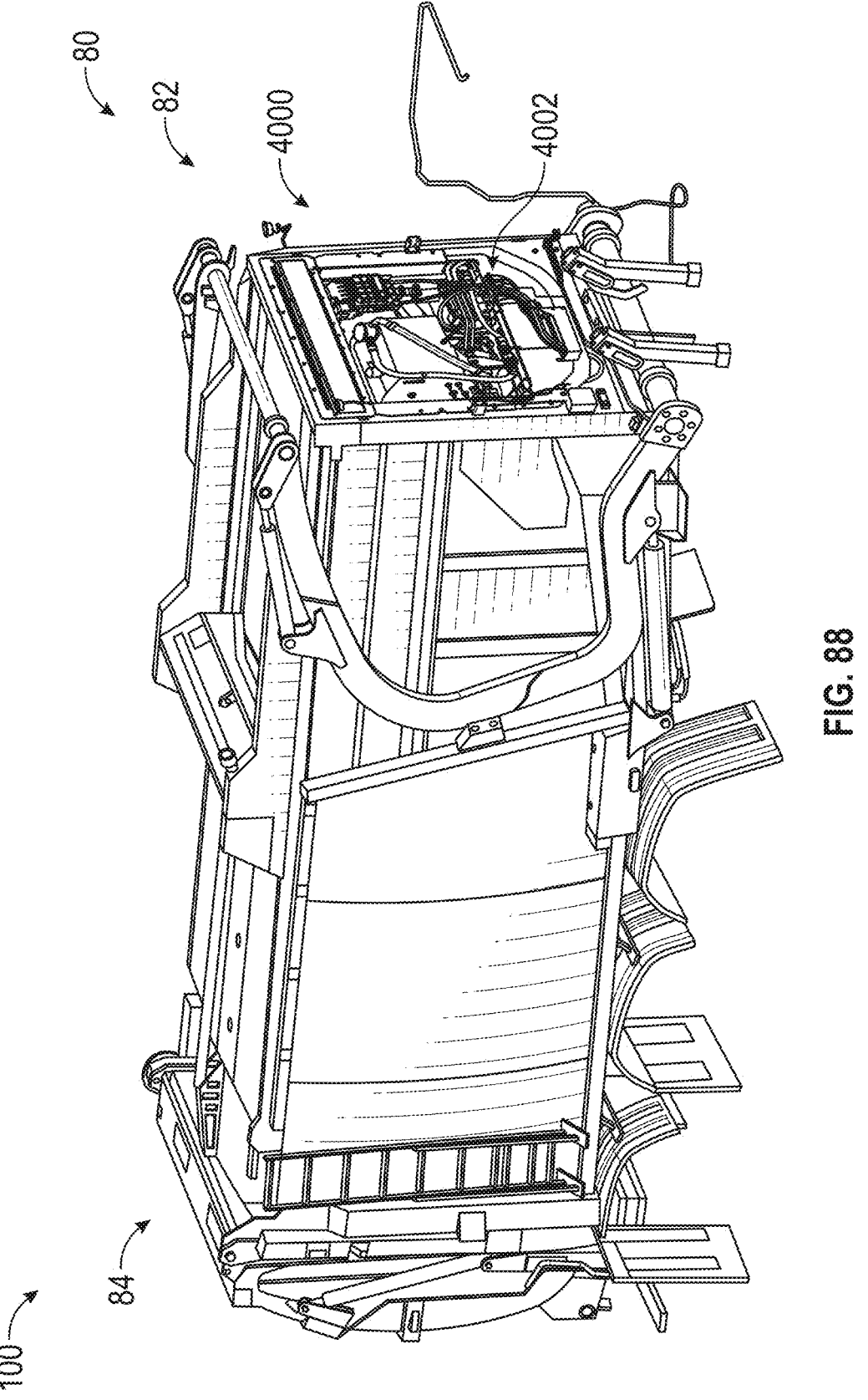
FIG. 88 is a perspective view of a body assembly of the vehicle of FIG. 3, according to an exemplary embodiment.
Figure 89:
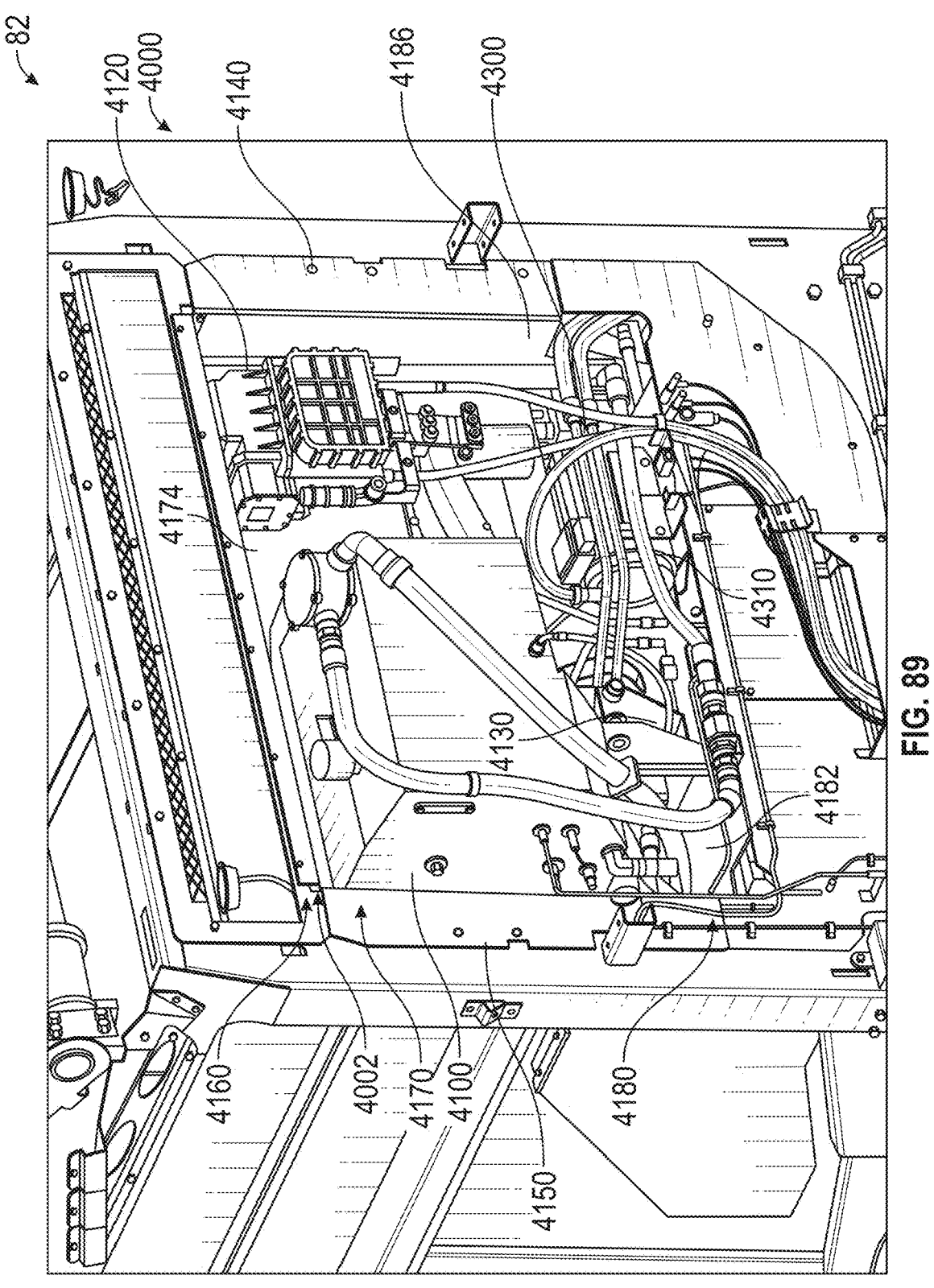
FIG. 89 is a side perspective view of an electric power take off pod for the vehicle of FIG. 3, according to an exemplary embodiment.

4002 extending from a front end of the body 80. In the embodiment of FIGS. 88-89, the interior cavity 4002 is a portion of the storage volume 134 (e.g., the refuse compartment 130) at the front end of the body 80 (see FIG. 3), and forward of a pack panel that is disposed within the storage volume 134.

In some embodiments, the EPTO pod 4000 may be removably coupled to the refuse vehicle 100 by a plurality of fasteners 4140 (e.g., screws, bolts, rivets, or other fastening mechanisms). The plurality of fasteners 4140 detachably couple one or more support structures and/or support panels (e.g., one or more mounting plates, etc.) of the EPTO pod 4000, shown as mounting plate 4150, to the front portion 82 of the body 80 of the refuse vehicle 100. The EPTO pod 4000 (e.g., the support structure, the one or more mounting panels, etc.) defines a chamber 4160 (e.g., a cavity, an inset, an opening, a depression, a recessed area) such that one or more components of the EPTO pod 4000 (e.g., the inverter 4120, the reservoir 4100, the motor 4210, the second motor 4310, the pump 4200, the second pump 4300, the manifold 4130, etc.) are inset within (e.g., disposed at least partially within) the front portion 82 of the body 80 (e.g., the storage volume 134 of FIGS. 3-4, the interior cavity 4002). For example, the support structure may include an outer flange (e.g., a planar outer wall) that extends along an outer perimeter thereof, and at least one wall that is coupled to and offset from the flange (e.g., by one or more sidewalls as will be described in further detail below) so that the outer flange and the at least one wall together at least partially define the chamber 4160. In such embodiments, the outer flange may at least partially (e.g., fully) circumscribe the chamber 4160. In the embodiment of FIGS. 87-91, the EPTO pod 4000 is removably coupled to the body 80 by the outer flange.

The chamber 4160 may be coextensive with the interior cavity 4002 of the body 80 when the EPTO pod 4000 is coupled to the body 80. In such an arrangement, various components of the EPTO pod 4000 may extending (e.g., protrude, etc.) into the body 80, such as into the storage volume 134 (see FIGS. 3-4) (e.g., the refuse compartment 130). In such arrangements, the EPTO pod 4000 may be disposed within a portion of the storage volume 134 that is between the forward end of the body 80 and a pack panel that is configured to compress refuse material within the storage volume (e.g., the portion defined at least partially by a forward facing surface of the pack panel that faces toward the cab and away from the refuse compartment 130).

Figure 90:
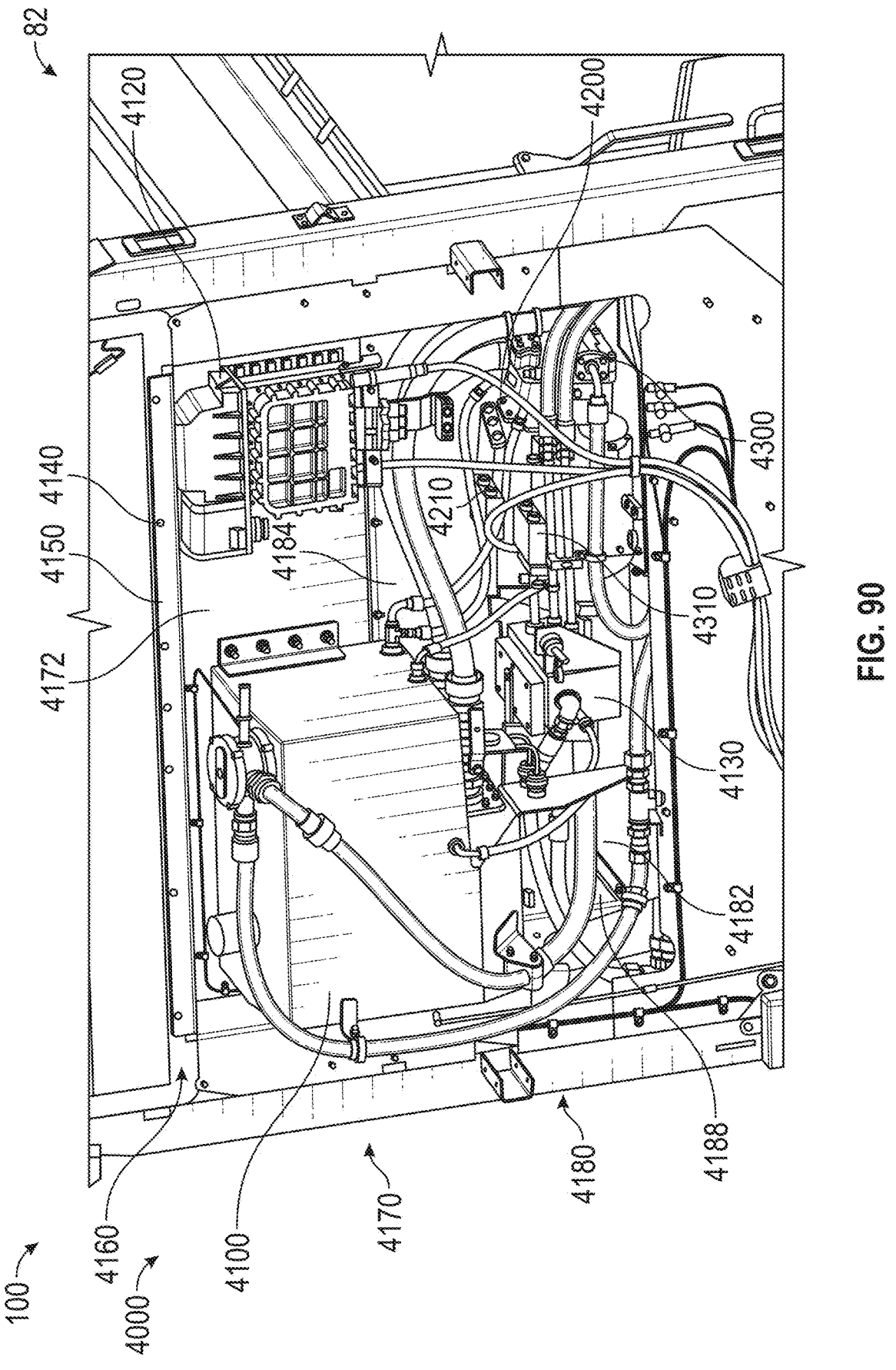
FIG. 90 is a front perspective view of the electric power take off pod for the vehicle of FIG. 3, according to an exemplary embodiment.
Figure 91:
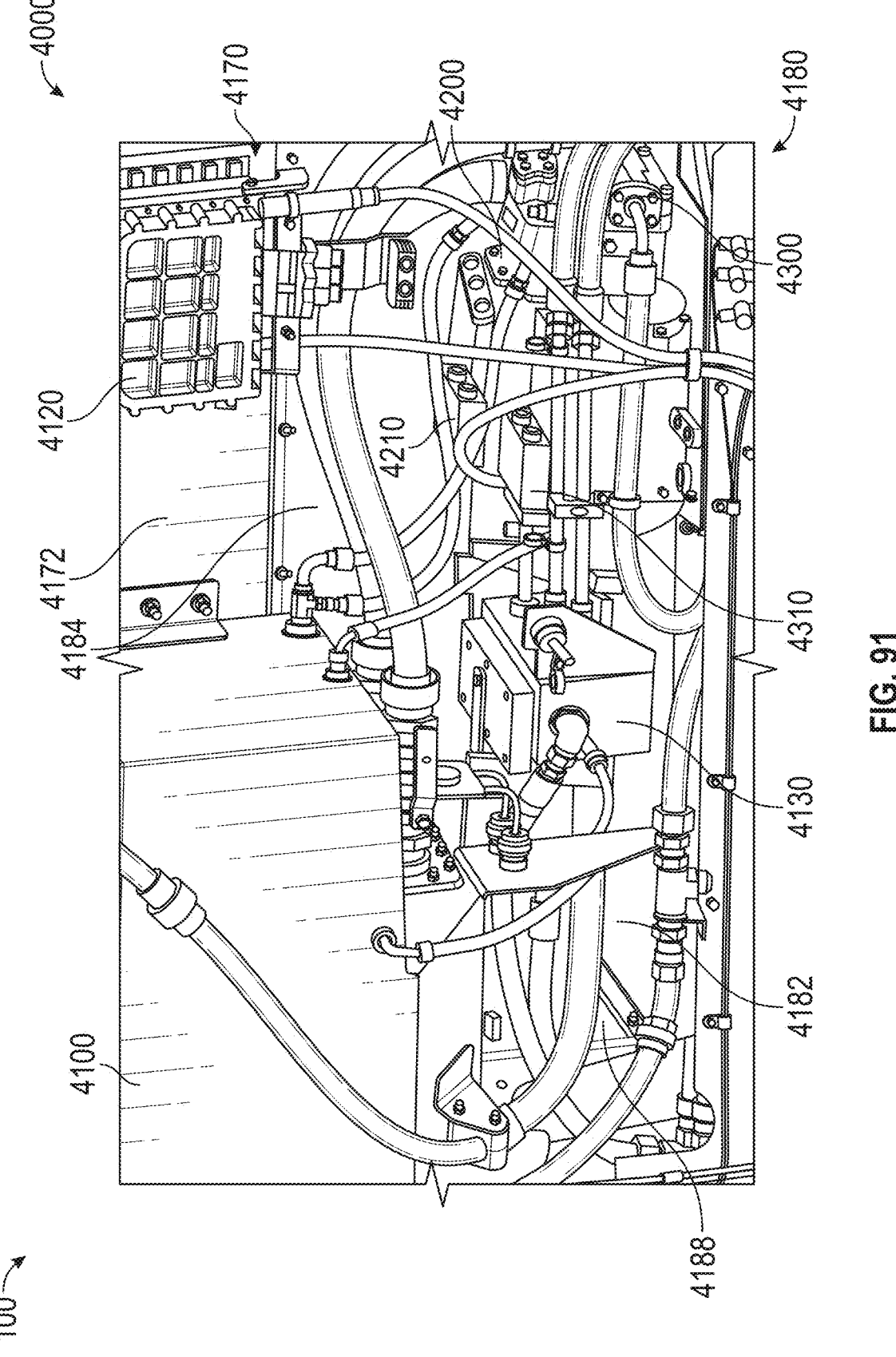
FIG. 91 is a front perspective view of the electric power take off pod of FIGS. 89-90, shown near a manifold and inverter of the electric power take off pod, according to an exemplary embodiment.

The chamber 4160 includes an upper portion 4170 and a lower portion 4180. In some embodiments, and as shown in FIGS. 89-91, the lower portion 4180 is inset at a greater depth than the upper portion 4170 into the front portion 82 of the body 80, which can, beneficially, accommodate a larger number of components within the EPTO pod 4000 and better utilize space provided by the natural curvature of the pack panel within the body 80.

The upper portion 4170 includes a back, rear, or first surface 4172. The lower portion 4180 includes a bottom, lower, or first surface 4182 and a rear, base, or second surface 4184 that are positioned between a right (as shown in the orientation of the view of FIGS. 89-91), first lateral, or third surface 4186 and a left, second lateral, or fourth surface 4188.

The battery 4110 (see FIG. 87) supplies electrical energy to the EPTO pod 4000. The battery 4110 stores electrical energy that is sent to the inverter 4120 as direct current (DC). In the exemplary embodiment, the battery 4110 is located on the refuse vehicle 100 outside the EPTO pod 4000. In some embodiments, the battery 4110 may be located within the EPTO pod 4000.

In some embodiments, the inverter 4120 is arranged within the upper portion 4170 of the chamber 4160 and is coupled to the back surface 4172 of the upper portion 4170. The inverter 4120 is positioned laterally from the reservoir 4100 in a direction towards the first lateral surface 4186. The inverter 4120 is positioned vertically from (e.g., spaced vertically apart from, arranged vertically above, etc.) at least one or more of the pump 4200, the motor 4210, the second pump 4300, and the second motor 4310. The inverter 4120 is vertically and laterally spaced (e.g., diagonally spaced, spaced vertically above and laterally away from) from the manifold 4130. The inverter 4120 is electrically coupled to the battery 4110 (see FIG. 87) from which the inverter 4120 receives electrical energy in the form of DC power. The inverter 4120 is configured to invert the DC power from the battery to AC power to be sent the motor 4210 and the second motor 4310. The inverter 4120 is electrically coupled to the motor 4210 and the second motor 4310 such that once the inverter 4120 changes the DC to the AC, the inverter 4120 transmits the AC to the motor 4210 and the second motor 4310 to drive the pump 4200 and the second pump 4300, respectively.

In some embodiments, the motor 4210 is arranged within the lower portion 4180 of the chamber 4160 and is coupled to the bottom surface 4182 of the lower portion 4180. The motor 4210 is positioned laterally between the pump 4200 and the second lateral surface 4188. The motor 4210 is positioned toward the front of the chamber 4160 such that that the motor 4210 is closer to the front portion 82 of the body 80 than the second motor 4310. The motor 4210 is electrically coupled to the inverter 4120 and mechanically coupled to the pump 4200 such that the motor 4210 is powered by the AC power from the inverter 4120 and uses the AC power to provide mechanical energy to the pump 4200. The power output of the motor 4210 corresponds to a demanded fluid displacement of the pump 4200.

In some embodiments, the second motor 4310 is located within the lower portion 4180 of the chamber 4160 and is coupled to the bottom surface of the lower portion 4180. The second motor 4310 is positioned rearward of the motor 4210, such that the second motor 4310 is further away from the front portion 82 of the body 80 than the motor 4210. The second motor 4310 is positioned laterally between the second pump 4300 and the second lateral surface 4188. The second motor 4310 is electrically coupled to the inverter 4120 and mechanically coupled to the second pump 4300 such that the second motor 4310 is powered by the AC power from the inverter 4120 and uses the AC power to provide mechanical energy to the second pump 4300. The power output of the second motor 4310 corresponds to a demanded fluid displacement of the second pump 4300.

In some embodiments, the second motor 4310 and the motor 4210 are similar to one another or identical to one another (e.g., same pump capacity, displacement, flow rate, and/or pressure). In some embodiments, the demanded fluid displacement of the pump 4200 is greater than the demanded fluid displacement of the second pump 4300, and the motor 4210 may have a higher power output that corresponds to the power required for the pump 4200 to operate the actuator 4400 (e.g., the pack panel actuator).

In some embodiments, the reservoir 4100 is located within the upper portion 4170 of the chamber 4160 and is coupled to the back surface 4172 of the upper portion 4170. The reservoir 4100 is coupled to the back surface 4172 such that the reservoir 4100 extends partially out of the chamber

4160 and outwardly from the front portion 82 of the body 80 (e.g., in a direction away from the back portion 84), and so that the reservoir 4100 protrudes outwardly from the body 80. Such an arrangement can facilitate access to the reservoir 4100 to add hydraulic fluid and/or to access the main hydraulic lines from the reservoir 4100. The reservoir 4100 is positioned vertically from (e.g., vertically above) the manifold 4130 and is laterally spaced from the inverter 4120 in a direction toward the second lateral surface 4188. The reservoir 4100 is both laterally and vertically spaced (e.g., diagonally spaced) from the motor 4210, the pump 4200, the second motor 4310, and the second pump 4300. In the exemplary embodiment, the reservoir 4100 stores hydraulic fluid (e.g., oil), and the reservoir 4100 is fluidly coupled to the pump 4200, the second pump 4300, the actuator 4400, and the actuator 4500.

In some embodiments, the pump 4200 is located within the lower portion 4180 of the chamber 4160 and is coupled to the bottom surface of the lower portion 4180. The pump 4200 is positioned laterally between the motor 4210 and the first lateral surface 4186 of the lower portion 4180. The pump 4200 is positioned rearward of the second pump 4300 such that the pump 4200 is further away from the front portion 82 of the body 80. In alternative embodiments, location of the pump 4200 and the motor 4210 may be substantially similar to the location of the second pump 4300 and the second motor 4310 as described herein.

Figure 92:
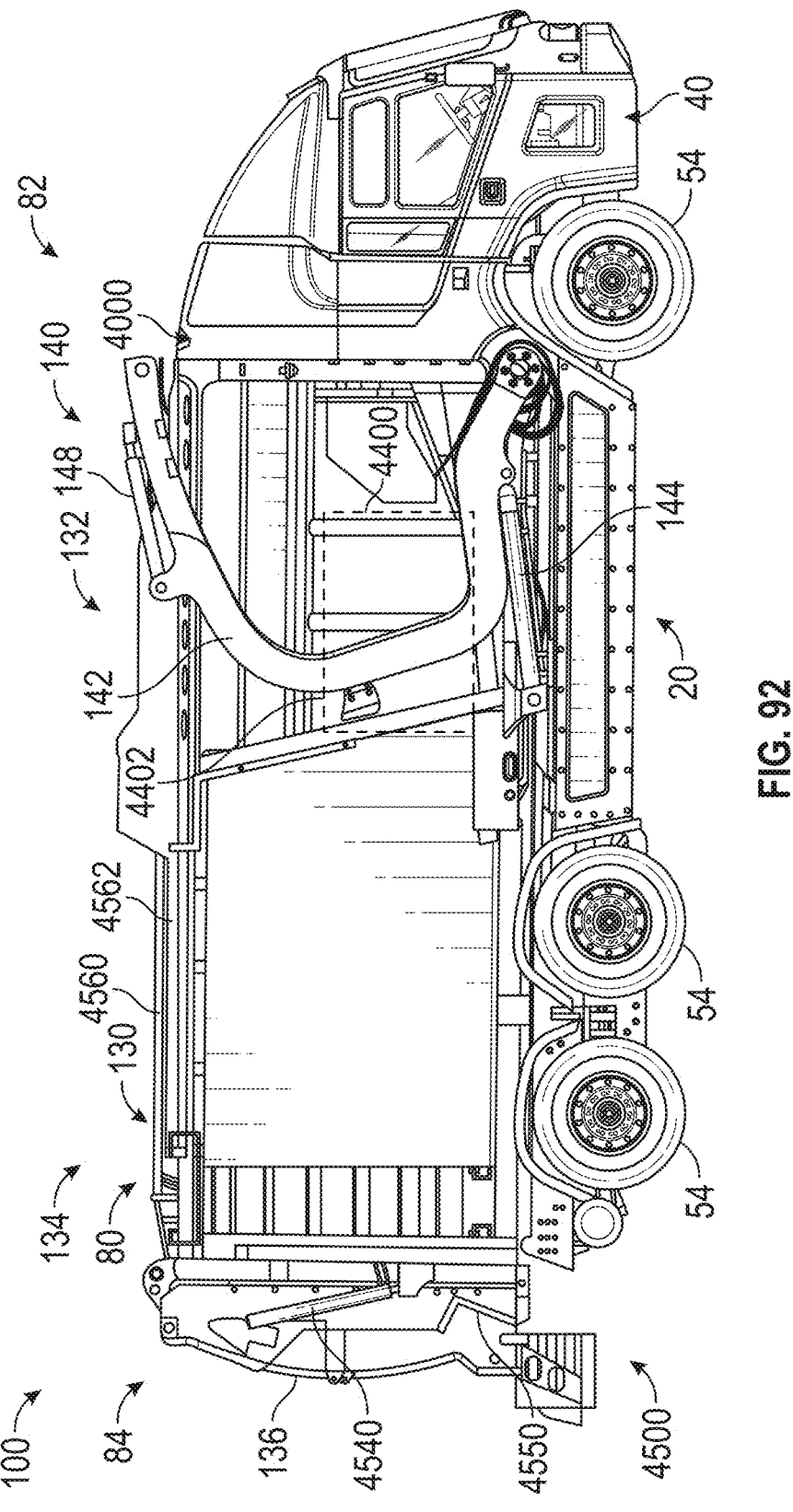
FIG. 92 is a side view of the vehicle of FIG. 1 configured as a front-loading refuse vehicle, according to an exemplary embodiment.

The actuator 4400, shown in dashed lines in FIG. 92, is located within the hopper volume 132 of the refuse compartment 130 and includes one or more pack panel actuators configured to push a pack panel 4402 that is disposed within the refuse compartment 130 toward a back portion 84 of the body 80. As refuse is placed in the hopper volume 132 of the refuse compartment 130, the actuator 4400 moves the pack panel 4402 toward the back portion 84 of the body 80 and away from the EPTO pod 4000, in order to compact the refuse. With more refuse placed in the refuse compartment 130, the actuator 4400 will require a greater force to move the pack panel 4402 and compact the refuse. As the greater force is required, the pump 4200 will displace the hydraulic fluid at a faster rate and/or a higher pressure in order to activate the actuator 4400 to move the pack panel 4402. In some embodiments, the pack panel and actuator 4400 operates in a similar or the same manner as described in U.S. patent application Ser. No. 18/342,603, which is incorporated herein by reference in its entirety.

In some embodiments, the second pump 4300 is located within the lower portion 4180 of the chamber 4160 and is coupled to the bottom surface 4182 of the lower portion 4180. The second pump 4300 is positioned laterally between the second motor 4310 and the first lateral surface 4186 of the lower portion 4180. The second pump 4300 is positioned toward the front of the chamber 4160 such that the second pump 4300 is closer to the front portion 82 of the body 80 than the pump 4200. In alternative embodiments, the location of the pump 4200 and the motor 4210 may switched with the location of the second pump 4300 and the second motor 4310, respectively.

In some embodiments, the manifold 4130 is located within the lower portion of the chamber 4160 and is coupled to the bottom surface 4182 of the lower portion 4180 such that the manifold 4130 is positioned vertically from (e.g., spaced vertically apart from, arranged vertically below, etc.) the reservoir 4100 and laterally and vertically spaced (e.g., diagonally spaced) from the inverter 4120. The manifold 4130 is positioned laterally between the second lateral surface 4188 of the lower portion 4180 and at least one of the second motor 4310 or the motor 4210. The manifold 4130 is fluidly coupled to the second pump 4300 and receives pressurized fluid from the second pump 4300. The manifold 4130 is configured to selectively distribute the pressurized fluid to the actuator(s) 4500.

Figure 87:
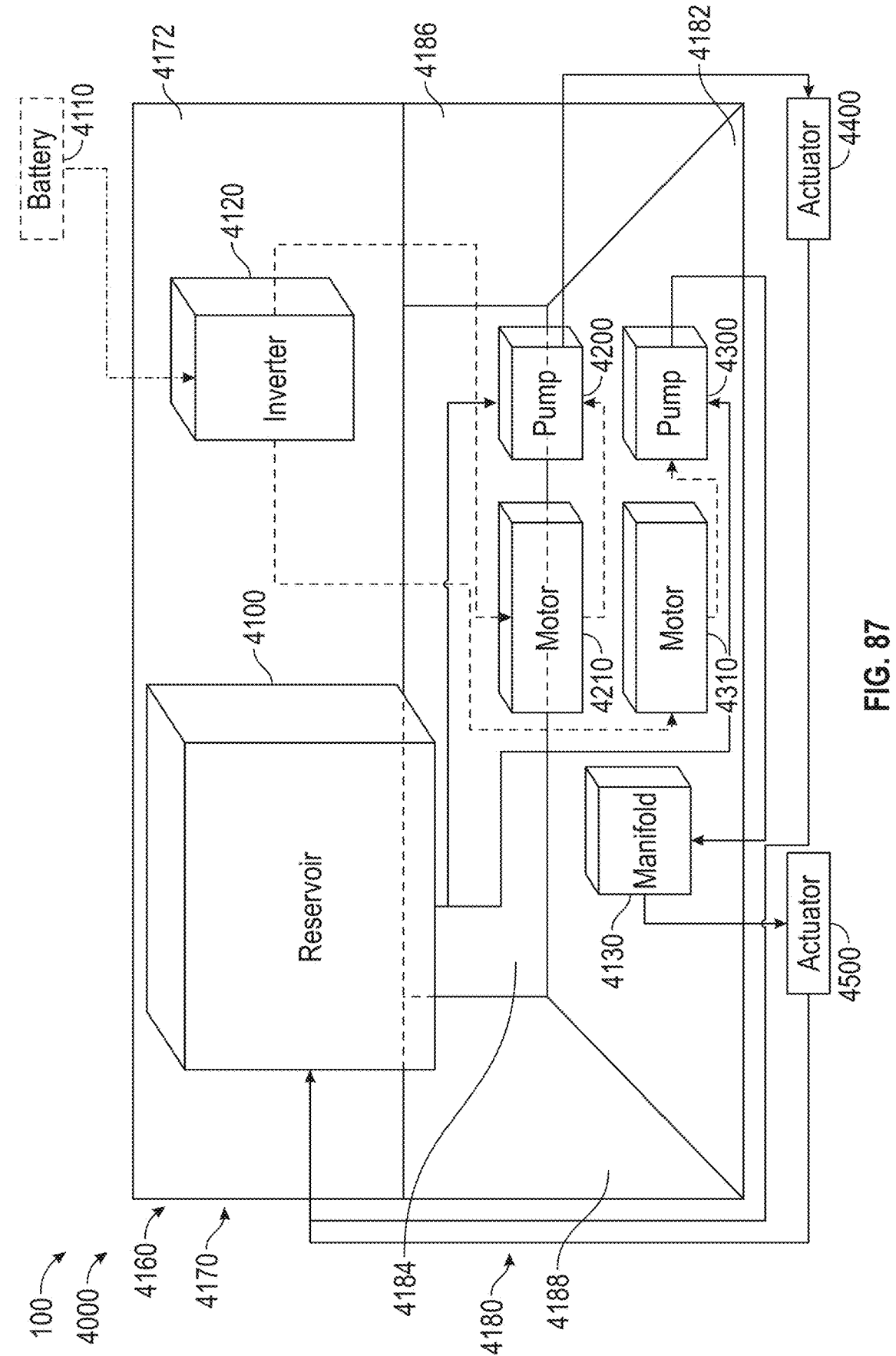
FIG. 87 is another schematic diagram of an electric power take off pod of FIG. 86 that may be used with the vehicle of FIG. 1, according to an exemplary embodiment.

As shown in FIG. 87, the actuator(s) 4500 may include one, or a combination of, the carry can actuator 1510, the arm lift actuator 4520, the fork actuator 4530, the tailgate lift actuator 4540, the tailgate lock actuator 4550, and the top door actuator 4560. The arm lift actuator 4520 may be substantially similar or identical to the lift arm actuators 144 as described in FIGS. 3-4. The fork actuator 4530 may be substantially similar or identical to the articulation actuators 148 as described in FIGS. 3-4. The tailgate lift actuator 4540 may be substantially similar or identical to the tailgate actuator 138 as described in FIGS. 3-4. In some embodiments, the actuator 4500 may include the finger actuators 168, the lift actuator 172, and the track actuator 174 as described in FIGS. 5-8. In some embodiments, the actuator 4500 may include the lower lift cylinder 364 and the upper lift cylinder 366 as shown in FIG. 12. In some embodiments, the actuator 4500 includes the leveling actuators 410 and the lift actuators 424 as shown in FIG. 13.

Figure 93A:
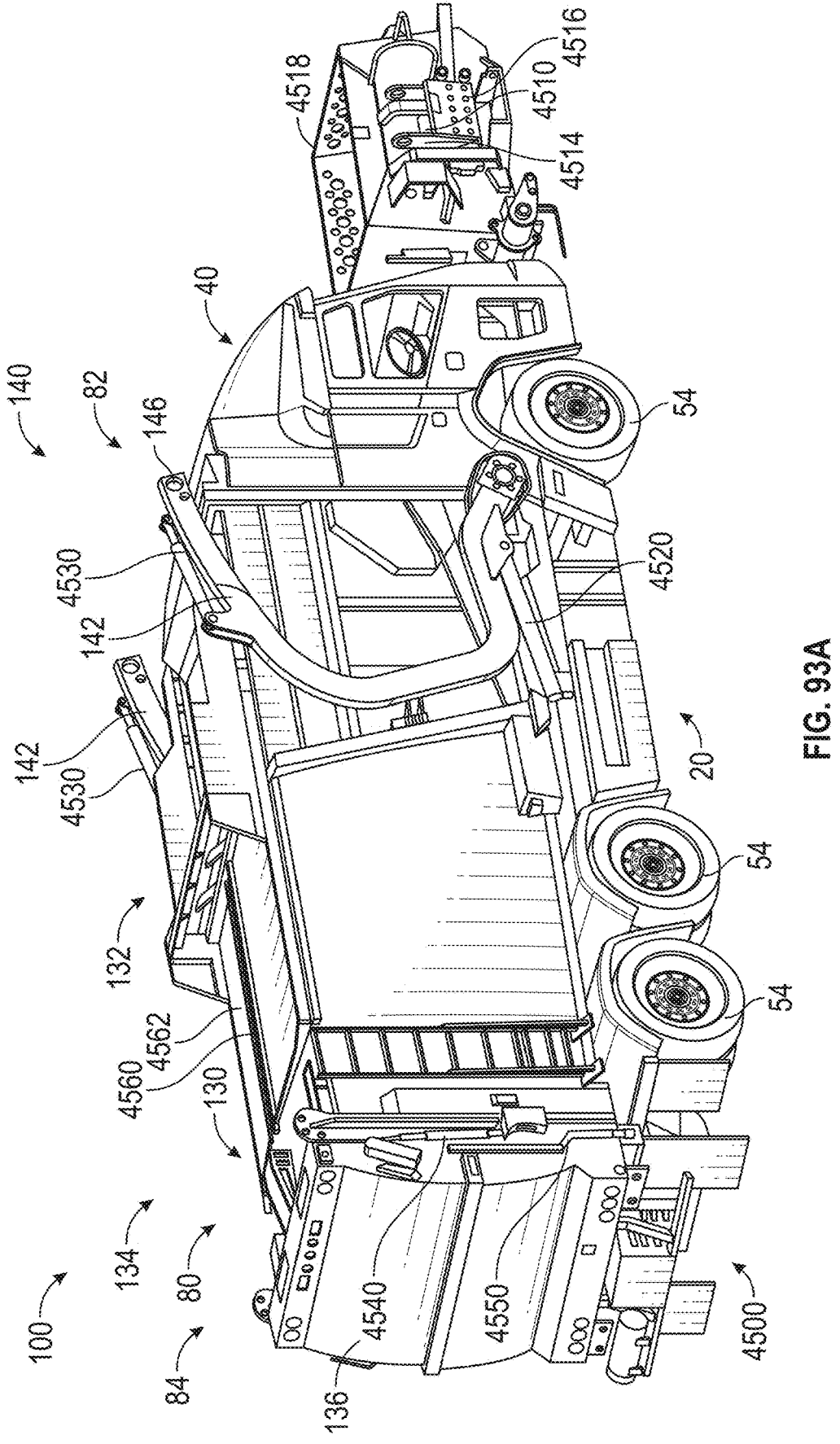
FIG. 93A is a perspective view of the vehicle of FIG. 1 configured as a front-loading refuse vehicle with an intermediary container, according to an exemplary embodiment.

Referring to FIG. 93A, the carry can actuator 1510 is coupled to a carry can assembly 4512. According to an exemplary embodiment, the carry can assembly 4512 includes a pair of carry can arms 4514, an engagement mechanism 4516, and the carry can actuator 1510. The carry can arms 4514 may be coupled to an intermediary container 4518 disposed along a front portion of the refuse vehicle 100. The carry can arm 1514 lowers the engagement mechanism 4516 to detachedly couple a refuse container (e.g., a trash can) to the engagement mechanism 4516 such that when the engagement mechanism 4516 lifts the refuse container, the refuse is dumped into the intermediary container 4518.

According to an exemplary embodiment, the arm lift actuators 4520 may be positioned such that extension and retraction of the arm lift actuators 4520 rotates the lift arms 142 about an axis extending through a pivot. In this regard, the lift arms 142 may be rotated by the arm lift actuators 4520 to lift the intermediary container 4518 over the cab 40. The lift forks 146 may be configured to engage the intermediary container 4518 to selectively couple the intermediary container 4518 to the lift arms 142. By way of example, each of the lift forks 146 may be received within a corresponding pocket defined by the intermediary container 4518. The fork actuators 4530 are each coupled to one of the lift arms 142 and one of the lift forks 146. The fork actuators 4530 may be positioned to rotate the lift forks 146 relative to the lift arms 142 about a horizontal axis. Accordingly, the fork actuators 4530 may assist in tipping refuse out of the intermediary container 4518 and into the refuse compartment. The arm lift actuators 4520 may then rotate the lift arms 142 to return the empty intermediary container 4518 to its original position.

Referring to FIGS. 92-93A, the tailgate lock actuator 4550 is coupled to the tailgate 136 and configured to reposition a tailgate lock between an unlocked and a locked position. The top door actuator 4560 is coupled to the body 80 and a top door 4562 of the refuse vehicle 100 and configured to reposition the top door 4562 such that the refuse compartment 130 may be opened or closed.

Figure 93B:
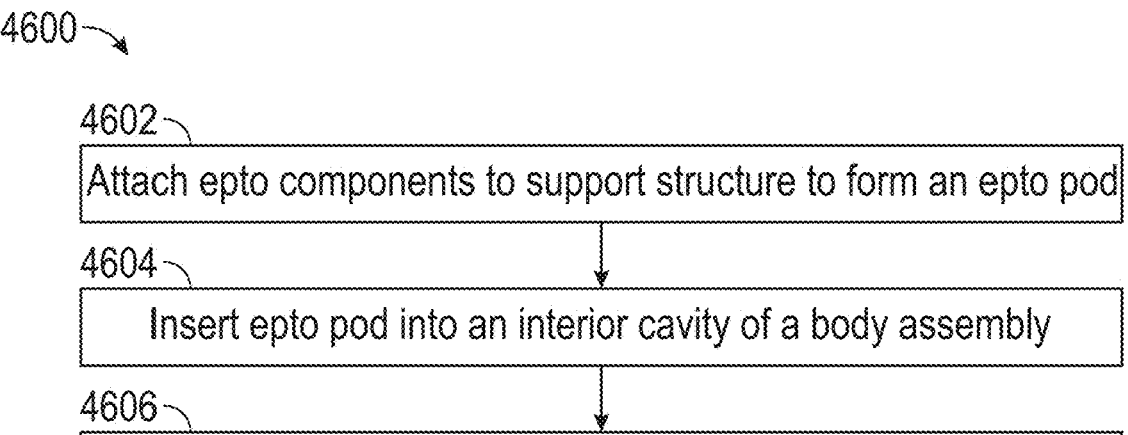
FIG. 93B is a flow diagram of a method of making and installing an EPTO pod on a vehicle, according to an exemplary embodiment.

Referring to FIG. 93B, a method 4600 of making and replacing an EPTO pod is shown, according to an embodiment. The method 4600 may be used to make, replace, and/or install the EPTO pod 4000 described with reference to FIGS. 86-91 and will therefore be described using the same terminology and with reference to FIGS. 86-91. In other embodiments, the method 4600 may include additional, fewer, and/or different operations.

Operation 4602 includes coupling various components of the EPTO system to a common support structure. In some embodiments, operation 4602 includes mounting or otherwise attaching at least one of an inverter, a hydraulic reservoir, a hydraulic pump, a motor, a hydraulic manifold, an electrical disconnect, and/or a hydraulic disconnect to a support structure. For example, operation 4602 may include fastening any one or a combination of the above-noted components to a mounting panel (e.g., a mounting plate) and in different locations along the mounting panel (including the various component locations described herein with respect to FIGS. 87-91. In other embodiments, operation 4602 may include coupling any of the components described herein to a skeletal frame (e.g., a frame support including square beams, I-beams, etc.) or another support structure to form an EPTO pod that supports all of the EPTO system components.

Operation 4604 includes inserting the EPTO pod, including the support structure and EPTO system components, into an interior cavity of a refuse body (e.g., body 80 as shown in FIGS. 87-91, etc.). In some embodiments, operation 4604 includes inserting the support structure (e.g., a mounting panel, plate, etc.) into the body from a front end of the body, and from a region between the cab and the body. For example, operation 4604 may include inserting the mounting panel into a portion of a refuse compartment (e.g., the refuse compartment 130 of FIGS. 3-4) formed by the body in front of a pack panel that is located within the body. In some embodiments, operation 4604 includes inserting a first portion (e.g., an upper portion, etc.) of the mounting structure farther into the interior cavity than a second portion (e.g., a lower portion, etc.) so as to more fully accommodate a space between the pack panel and the front of the body.

Operation 4606 includes coupling the EPTO pod to the refuse body. In some embodiments, operation 4606 includes fastening the support structure to the body. For example, operation 4606 may include engaging an outer flange of the mounting panel that extends along an outer perimeter edge of the mounting panel with a forward wall of the body (e.g., with one or more walls of the body that define the opening to the interior cavity). In some embodiments, operation 4606 includes aligning openings that are defined by the flange with corresponding fastener openings formed into the body. Operation 4606 may include inserting bolts or another mechanical fastener through a respective opening along the flange and into a respective one of the fastener openings to detachably couple the support structure (e.g., the mounting panel) to the body.

In some embodiments, operation 4606 includes electrically and hydraulically coupling the EPTO pod to the vehicle, such as by using a common disconnect (e.g., a terminal bus, a hydraulic connection manifold, etc.) that is connected to one of the EPTO pod or the body. For example, operation 4606 may include connecting a high voltage cable of the body that is electrically coupled to the battery to a high voltage disconnect (e.g., connector, etc.) that is mounted to the support structure. Operation 4606 may also include connecting one or more hydraulic lines to the pump and/or manifold of the EPTO pod to hydraulically connect the pump to actuators onboard the vehicle. Among other benefits, including a common disconnect on the vehicle body or support structure can simplify installation operations and reduce the risk of injury when connecting the EPTO pod to the body.

In other embodiments, the method 4600 may further include replacing an existing, first EPTO pod onboard the vehicle with a replacement, second EPTO pod. In such embodiments, the method 4600 may include removing the first EPTO pod from the body by disconnecting EPTO system components electrically and hydraulically from other components on the vehicle, removing fasteners that couple the first EPTO pod to the body, and removing the first EPTO pod from the interior cavity prior to installation of the second EPTO pod.

Limp Home with Operator Override

According to an exemplary embodiment, a vehicle includes one or more component assemblies (e.g., lift assemblies, packers, arm assemblies, grabber assemblies, actuators, pumps, drive trains, coolant exchanges, temperature control systems, light fixtures or light sources, etc.) that consume energy or power. As operations of the component assemblies are performed energy or power may be consumed from one or more energy storage devices (e.g., batteries). Repeated or subsequent operation of the component assemblies may result in a reduction in power output by the batteries. For example, as the component assemblies consume energy a State-Of-Charge (SoC) of the batteries may be reduced. In some instances, the power output of the batteries may be reduced responsive to the SoC of the batteries reaching a given amount. As described herein, one or more processing circuits, computing devices, or electric devices may detect when the batteries output is reduced and may control or modify one or more subsequent operations of the component assemblies based on the reduction in the batteries output.

As a first non-limiting example, the vehicle may include a refuse vehicle and various operations associated with the refuse vehicle may be reduced or limited based on a reduction in a power output of one or more batteries that power the refuse vehicle. In this first non-limiting example, operation of a lift assembly, a packer, and/or a grabber assembly may be reduced by a processing circuit based on a reduction in the power output by the batteries of the refuse vehicle. As a second non-limiting example, the vehicle may include a fire fighting vehicle and various operations associated with the fire fighting vehicle may be reduced or limited based on a reduction in a power output of one or more batteries that power the refuse vehicle. In this second non-limiting example, a processing circuit may limit an amount of power that is accessible to a drive train of the fire fighting vehicle while the fire fighting vehicle is returning to a fire station.

Figure 94:
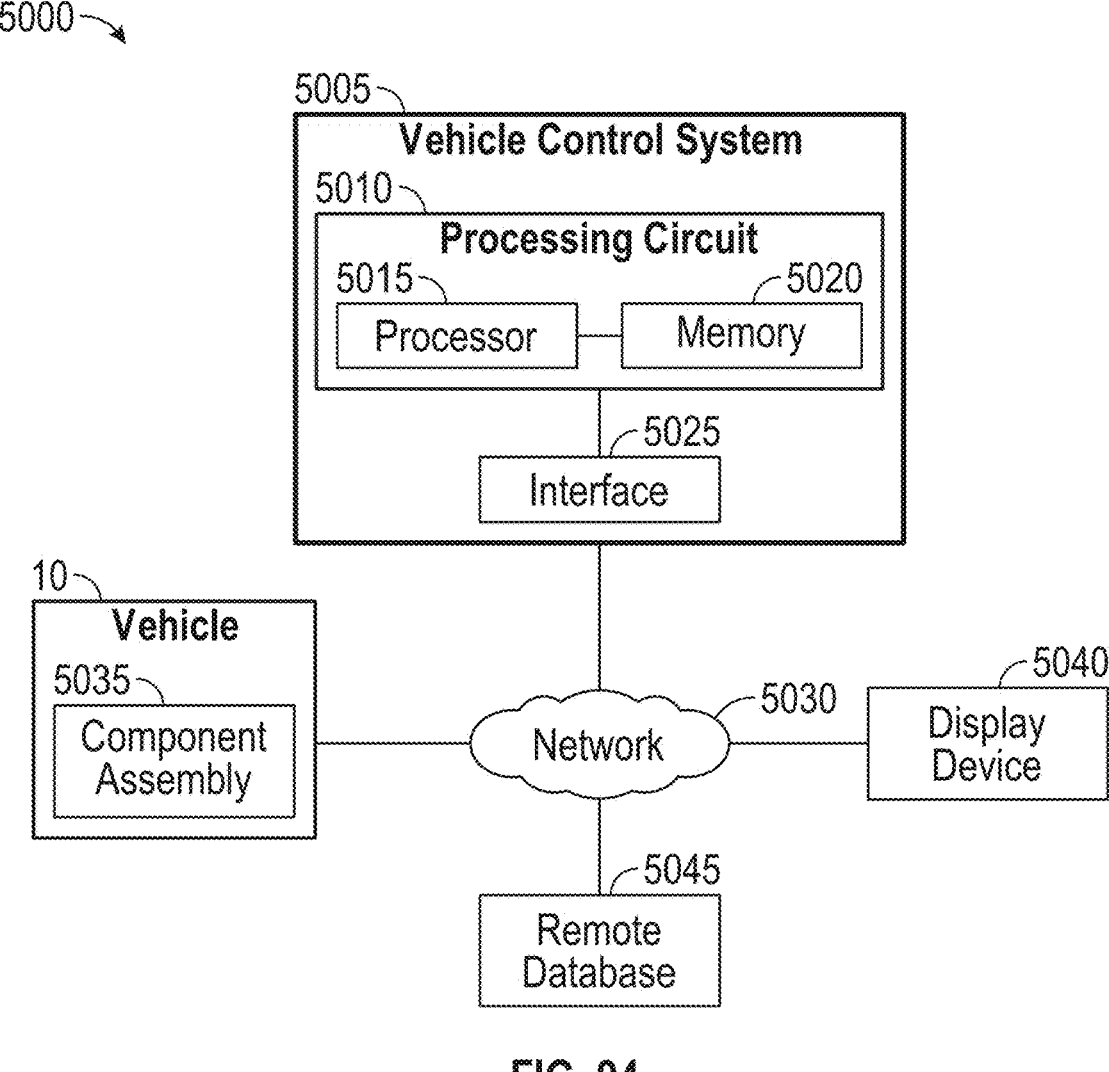
FIG. 94 is a block diagram of a system to control operation of the vehicle illustrated in FIG. 1, according to an exemplary embodiment.

FIG. 94 depicts a block diagram of a system 5000, according to some embodiments. Each system and/or component of the system 5000 can include one or more processors, memory, network interfaces, communication interfaces, and/or user interfaces. Memory can store programming logic that, when executed by the processors, controls the operation of the corresponding computing system or device. Memory can also store data in databases. The network interfaces can allow the systems and/or components of the system 5000 to communicate wirelessly. The communication interfaces can include wired and/or wireless communication interfaces and the systems and/or components of the system 5000 can be connected via the communication interfaces. The various components in the system 5000 can be implemented via hardware (e.g., circuitry), software (e.g., executable code), or any combination thereof.

Systems, devices, and components as shown in FIG. 94 can be added, deleted, integrated, modified, separated, and/or rearranged.

In some embodiments, the system 5000 may include at least one Vehicle Control System (VCS) 5005, at least one network 5030, at least one display device 5040, at least one remote database 5045, and the vehicle 10. In some embodiments, the system 5000 and/or one or more systems, devices, and/or components thereof may implement at least one of the various techniques or processes described herein.

In some embodiments, the network 5030 may include at least one of a local area network (LAN), a wide area network (WAN), a telephone network (such as the Public Switched Telephone Network (PSTN)), a Controller Area Network (CAN), wireless link, intranet, the Internet, a cellular network, and/or combinations thereof. In some embodiments, the various systems, components, and/or devices included in the system 5000 may communicate with one another via the network 5030.

In some embodiments, the display device 5040 may perform various actions and/or access various types of information. The information may be provided over the network 5030. In some embodiments, the display device 5040 may perform similar functionality to that of at least one system, device, and/or component of the system 5000. For example, the display device 5040 may perform similar operations to that of the VCS 5005. In some embodiments, the display device 5040 may include one or more applications to receive information, display information, and/or receive user interactions with content displayed by the display device 5040.

In some embodiments, the display device 5040 may include at least one of a screen, a monitor, a visual display device, a touchscreen display, a television, a video display, a liquid crystal display (LCD), a light emitting diode (LED) display, a mobile device, a kiosk, a digital terminal, a mobile computing device, a desktop computer, a smartphone, a tablet, a smart watch, a smart sensor, and/or any other device that can facilitate providing, receiving, displaying and/or otherwise interacting with content (e.g., webpages, mobile applications, etc.). For example, the display device 5040 may include displays that include a resistive touchscreen that can receive user input via interactions (e.g., touches) with the touchscreen. In some embodiments, the display device 5040 may be included with the vehicle 10. For example, the display device 5040 may be a digital instrument cluster included in the vehicle 10. As another example, the display device 5040 may be an infotainment system included in the vehicle 10.

In some embodiments, the remote database 5045 may include at least one of a computing device, a remote server, a server bank, a remote device, and/or among other possible computer hardware and/or computer software. For example, the remote database 5045 may include a server bank and the server bank can store, keep, maintain, and/or otherwise hold the various types of information described herein. In some embodiments, the remote database 5045 may house and/or otherwise implement at least one of the various systems, devices, and/or components described herein. In some embodiments, the remote database 5045 may include, store, maintain, and/or otherwise host the VCS 5005. For example, the VCS 5005 may be distributed across one or more servers (e.g., the remote database 5045). In some embodiments, the VCS 5005 and/or various other components of the system 5000 may be implemented using cloud computing services/platforms.

In some embodiments, the VCS 5005 may include at least one processing circuit 5010 and at least one interface 5025. The processing circuit 5010 may include at least one processor 5015 and memory 5020. In some embodiments, the processing circuit 5010 and/or one or more components thereof (e.g., the processors 5015 and memory 5020) may perform similar functionality to that of the VCS 5005. For example, memory 5020 may store programming logic that, when executed by the processors 5015, cause the processors 5015 to perform functionality similar to the VCS 5005.

In some embodiments, the processing circuit 5010 may be communicably connected to one or more components of the VCS 5005. For example, the processing circuit 5010 may be communicably connected to the interface 5025. In some embodiments, the processors 5015 may be implemented as a general-purpose processor, an application specific integrated circuit (ASIC), one or more field programmable gate arrays (FPGAs), a group of processing components, or other suitable electronic processing components.

In some embodiments, memory 5020 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 5020 may be or include volatile memory or non-volatile memory. Memory 5020 may include database components, object code components, script components, or any other type of information structure for supporting the various activities and information structures described in the present application. In some embodiments, memory 5020 is communicably connected to the processors 5015 via the processing circuit 5010 and memory 5020 includes computer code for executing (e.g., by the processing circuit 5010 and/or the processors 5015) one or more processes described herein.

In some embodiments, the interface 5025 may include at least one of network communication devices, network interfaces, and/or other possible communication interfaces. The interface 5025 may include wired or wireless communications interfaces (e.g., jacks, antennas, transmitters, receivers, transceivers, wire terminals, etc.) for conducting data communications with various systems, devices, and/or components described herein. The interface 5025 may be direct (e.g., local wired or wireless communications) and/or via a communications network (e.g., the network 5030). For example, the interface 5025 may include an Ethernet card and port for sending and receiving data via an Ethernet-based communications link or network. The interface 5025 may also include a Wi-Fi transceiver for communicating via a wireless communications network (e.g., the network 5030). The interface 5025 may include a power line communications interface. The interface 5025 may include an Ethernet interface, a USB interface, a serial communications interface, and/or a parallel communications interface. In some embodiments, the interface 5025 may also include one or more Human-Machine Interfaces (HMIs). For example, the interface 5025 may include a display screen that presents information to a user. As another example, the interface 5025 may receive one or more indications or selections via a user interface that is displayed by the interface 5025.

In some embodiments, the system 5000 may include one or more vehicles 10. For example, the system 5000 may include a first vehicle 10 and a second vehicle 10. In some embodiments, the vehicles 10 may include at least one of the various vehicles and/or machines described herein. The vehicle 10 may include at least one of a front-loading refuse vehicle, a side-loading refuse vehicle, a carry can refuse vehicle, a lift device, and/or a fire fighting vehicle.

In some embodiments, the vehicles 10 may include at least one component assembly 5035. For example, the vehicles 10 may include a first component assembly 5035 and a second component assembly 5035. In some embodiments, the component assemblies 5035 may include at least one of the various components, devices, systems, assemblies, modules, and/or structures described herein. For example, the component assemblies 5035 may include the lift assembly 140. In some embodiments, the component assemblies 5035 may include at least one of a lift assembly, a grabber assembly, a packer, and/or an actuator assembly.

In some embodiments, the component assemblies 5035 may be in communication with one or more energy storage devices. For example, the component assemblies 5035 may be electrically coupled with the batteries 60. In some embodiments, the batteries 60 may provide power to power the component assemblies 5035. For example, the batteries 60 may provide electrical energy to the component assemblies. In some embodiments, the component assemblies 5035 may perform one or more operations. For example, the component assemblies 5035 may perform a first operation and a second operation. In some embodiments, the operations may include at least one of the various operations or actions described herein. For example, an operation may include grabbing a refuse container. As another example, an operation may include disposing refuse within the refuse compartment 130.

In some embodiments, the processing circuit 5010 may be in communication with one or more devices, components, or elements of the vehicle 10. For example, the processing circuit 5010 may be in communication with the component assemblies 5035. As another example, the processing circuit 5010 may be in communication with the batteries 60. In some embodiments, the processing circuit 5010 may communicate with one or more devices by sending and/or receiving one or more signals. For example, the processing circuit 5010 may receive a first signal and send a second signal. In some embodiments, the processing circuit 5010 may communicate with one or more sensors. For example, the vehicle 10 may include one or more sensors and the processing circuit 5010 may communicate with the sensors to receive information pertaining to the vehicle 10.

In some embodiments, the processing circuit 5010 may determine a power output for one or more energy storage devices. For example, the processing circuit 5010 may determine a power output for the batteries 60. In some embodiments, the processing circuit 5010 may determine the power outputs based on a State-Of-Charge (SoC) of the batteries 60. For example, the processing circuit 5010 may receive information from one or more sensors, regarding the SoC of the batteries 60, and the processing circuit 5010 may determine a power output for the batteries 60 based on the SoC of the batteries. In some embodiments, the batteries 60 may produce or output one or more amounts of power (e.g., power outputs). For example, the batteries 60 may produce a first power output and a second power output. In some embodiments, the SoC of the batteries 60 may define or dictate a power output of the batteries 60. For example, the batteries 60 may produce a first power output when the batteries 60 have a first SoC. As another example, the batteries 60 may produce a second power output when the batteries 60 have a second SoC.

As a non-limiting example, the batteries 60 may include a wattage rating or wattage output (e.g., power output) of 700 watts. In this non-limiting example, the batteries 60 may be able to produce or provide 700 watts when the SoC of the batteries 60 is above and/or at a given value or percentage. To continue this non-limiting example, the given value or percentage for the SoC of the batteries 60 may be 15%. That is to say that when the batteries 60 have a SoC at and/or above 15%, that the batteries 60 may produce or provide 700 watts. In this non-limiting example, the power output of the batteries may decrease or change when the SoC of the batteries 60 falls below the given value or percentage. To continue this non-limiting example, the power output of the batteries 60 may drop to 600 watts when the SoC of the batteries 60 falls below 15%.

In some embodiments, the processing circuit 5010 may detect that the power output of the batteries 60 is below a predetermined threshold. For example, the batteries 60 may have a power output threshold of X watts and the processing circuit 5010 may detect that the power output of the batteries is below the X watts. In some embodiments, the processing circuit 5010 may detect that the power output is below the predetermined threshold responsive to determining the power output.

In some embodiments, the processing circuit 5010 may adjust one or more amounts of power. For example, the processing circuit 5010 may adjust amounts of power that are accessible to one or more components of the vehicle. In some embodiments, the processing circuit 5010 may adjust an amount of power accessible to the component assemblies 5035. For example, the processing circuit 5010 may adjust an amount of power from a first value to a second value. In some embodiments, the component assemblies 5035 may ask for and/or draw various amounts of power based on operational metrics of the component assemblies 5035. For example, the component assemblies 5035 may include a packer that draws a given wattage while packing refuse. In some embodiments, the component assemblies 5035 may continue to operate even with a reduction in received power. For example, the component assemblies 5035 may continue to be able to grab refuse containers even if the component assemblies 5035 are receiving a reduced amount of power.

In some embodiments, the processing circuit 5010 may adjust the amounts of power accessible to the component assemblies 5035 to reduce, change, modify, and/or otherwise limit an amount of power that is consumed by the component assemblies 5035. For example, the processing circuit 5010 may limit the amount of power provided to the component assemblies 5035 to conserve energy for a return trip (e.g., the vehicle 10 returning to a collection site). As another example, the processing circuit 5010 may limit the amount of power provided to one or more first component assemblies 5035 to reserve energy for one or more second component assemblies 5035.

In some embodiments, the processing circuit 5010 may generate one or more predictions. For example, the processing circuit 5010 may implement and/or utilize one or more machine learning models to generate predictions. In some embodiments, the processing circuit 5010 may generate one or more predictions of a number of operations performable by the component assemblies 5035. For example, the processing circuit 5010 may predict that the lift assembly 140 (e.g., a first component assembly 5035) can perform a given number of operations (e.g., lift the refuse container) based on the amount of power allocated for the lift assembly 140. Stated otherwise, the processing circuit 5010 may generate predictions of the number of operations performable by the component assemblies 5035 responsive to an adjustment in the amount of power accessible to the component assemblies 5035. In some embodiments, the processing circuit 5010 may generate predictions based on the power produced or output by the batteries 60. For example, the processing circuit 5010 may continuously and/or semi-continuously generate predictions as to the number of operations performable by the component assemblies 5035 based on the power output and/or the SoC of the batteries 60.

In some embodiments, the interface 5025 may transmit one or more signals. For example, the interface 5025 may transmit a first signal and a second signal. In some embodiments, the interface 5025 may transmit the signals to one or more devices. For example, the interface 5025 may transmit the signals to the display device 5040. As another example, the interface 5025 may transmit the signals to one or more components of the vehicle 10. In some embodiments, the interface 5025 may transmit the signals to cause the display device 5040 to display a user interface. For example, the display device 5040 may produce, provide, or display at least one user interface responsive to the interface 5025 transmitting the signals. In some embodiments, the interface 5025 may transmit the signals responsive to generating the predictions.

In some embodiments, the user interface may include one or more elements or indications. For example, the user interface may include at least one of icons, buttons, selectable elements, text boxes, pop-up windows, overlays, displays, prompts, and/or various other user interface elements. In some embodiments, the user interface may include at least one indication to indicate that the power output of the batteries 60 is below the predetermined threshold. For example, the user interface may include a pop-up window that includes a text box to indicate the power output of the batteries 60. In some embodiments, the user interface may include at least one indication to indicate the number of operations performable by the component assemblies 5035. For example, the user interface may include one or more icons to indicate a remaining number of operations that are available for the component assemblies 5035.

In some embodiments, the interface 5025 may receive one or more requests. For example, the interface 5025 may receive requests from the vehicle 10. As another example, the interface 5025 may receive requests from the display device 5040. In some embodiments, the interface 5025 may receive the requests responsive to displaying the user interface. For example, the interface 5025 may receive the requests responsive to a user selecting one or more elements on the user interface. In some embodiments, the interface 5025 may receive one or more requests to provide one or more amounts of power to the component assemblies 5035. For example, the interface 5025 may receive a first to provide an amount of power that was accessible to the component assemblies 5035 prior to the adjustment of the amount of power. Stated otherwise, the interface 5025 may receive a request to override the adjustment in the amount of power accessible to the component assemblies 5035. In some embodiments, the interface 5025 may receive one or more requests to perform one or more subsequent operations of the component assemblies 5035. For example, the interface 5025 may receive a request to perform a given operation responsive to an allotted number of operations having already been performed.

In some embodiments, the processing circuit 5010 may determine one or more points along a route. For example, the processing circuit 5010 may determine points along a route for the vehicle 10. In some embodiments, the vehicle 10 may perform one or more stops or operations along a route. For example, the vehicle 10 may stop at one or more sites to collect refuse along the route. In some embodiments, the processing circuit 5010 may determine the points along the route based on a location of the vehicle 10.

In some embodiments, the processing circuit 5010 may adjust one or more amounts of power based on the point along the route. For example, the processing circuit 5010 may adjust an amount of power for a first component assembly 5035. In some embodiments, the processing circuit 5010 may maintain one or more amounts of power based on the point along the route. For example, the processing circuit 5010 may maintain an amount of power for a second component assembly 5035.

As a non-limiting example, the point along the route may include the vehicle 10 being located at the collection site. In this non-limiting example, the first component assembly 5035 may be the lift assembly 140 and the second component assembly 5035 may be a packer. To continue this non-limiting example, given the location of the vehicle 10, the processing circuit 5010 may determine that the vehicle 10 has completed collecting refuse (e.g., the vehicle 10 has completed all stops along the route). In this non-limiting example, operation of the lift assembly 140 may be reduced or limited given that no additional refuse is likely to be collected. To continue this non-limiting example, the processing circuit 5010 may limit operation of the lift assembly 140 by adjusting an amount of power accessible to the lift assembly 140. In this non-limiting example, the processing circuit 5010 may limit operation of the lift assembly 140 to maintain operation of the packer. To continue this non-limiting example, limiting or reduction of operation in the lift assembly 140 may provide or allocate a given amount of power so that the amount of power accessible to the packer is maintained.

In some embodiments, the processing circuit 5010 may prevent operation of the component assemblies 5035. For example, the processing circuit 5010 may transmit one or more signals that cause the component assemblies 5035 to halt operation. As another example, the processing circuit 5010 may transmit one or more signals to electrically decouple the component assemblies 5035 from the batteries 60. As even another example, the processing circuit 5010 may prevent operation of the component assemblies 5035 by reducing an amount of power accessible to the component assemblies 5035.

In some embodiments, the interface 5025 may transmit one or more signals to indicate that the amount of power accessible to the component assemblies 5035 has been reduced. For example, the processing circuit 5010 may reduce the amount of power to a given value and the interface 5025 may transmit signals to cause the display device 5040 to display a user interface that includes an indication of the given value of the amount of power.

In some embodiments, the processing circuit 5010 may determine one or more distances. For example, the processing circuit 5010 may determine a distance between the vehicle 10 and a collection site. In some embodiments, the processing circuit 5010 may determine the distances based on a location of the vehicle 10. For example, the processing circuit 5010 may receive telematic information from the vehicle 10 and the processing circuit 5010 may determine one or more distances based on the telematic information.

In some embodiments, the vehicle 10 may include one or more electric motors (e.g., the drive motors 62). For example, the vehicle 10 may include a first drive motor 62 and a second drive motor 62. In some embodiments, the drive motors may propel or move the vehicle 10. For example, the drive motors 62 may move the vehicle 10 forward or backwards. In some embodiments, the processing circuit 5010 may adjust one or more amounts of power that are accessible to the drive motors 62. For example, the processing circuit 5010 may adjust the amounts of power accessible to the drive motors 62 from a first value to a second value. In some embodiments, the processing circuit 5010 may adjust the amounts of power by one or more values. For example, the processing circuit 5010 may adjust the amount of power accessible to a first drive motor 62 by a first amount and the processing circuit 5010 may adjust the amount of power accessible to a second drive motor 62 by a second amount. In some embodiments, the first amount and the second amount may be the same amount or different amounts.

In some embodiments, the processing circuit 5010 may display, generate, produce, provide, or otherwise generate one or more user interfaces. For example, the processing circuit 5010 may transmit signals that cause one or more devices to display a user interface. In some embodiments, the various user interfaces described herein may be provided, presented, or displayed as a continuous or uniform user interface. For example, the user interface may be a continuous screen and the various user interfaces described herein may be accessible by scrolling or navigating the continuous screen. In some embodiments, the various user interfaces described herein may be presented as one or more user interfaces. For example, the various user interfaces may be presented as a first user interface and a second user interface. As another example, the various user interfaces may be presented as one or more pop-up windows or overlays.

Figure 95:
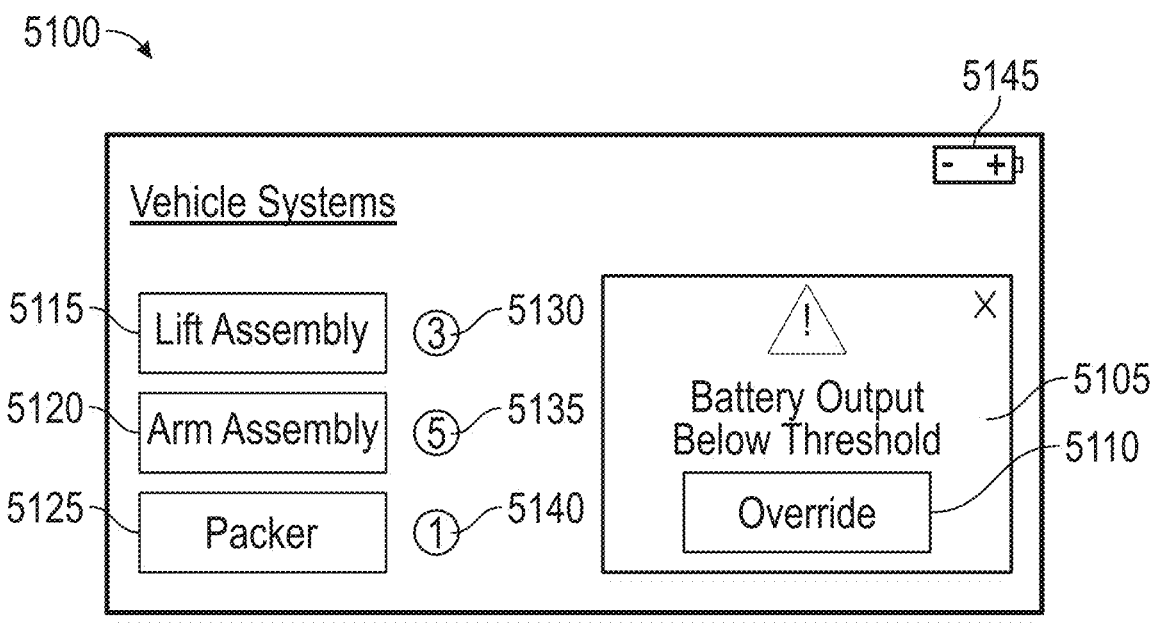
FIG. 95 is an example user interface including information generated by the system illustrated in FIG. 94, according to an exemplary embodiment.

FIG. 95 depicts a user interface 5100, according to some embodiments. In some embodiments, the interface 5025 may transmit one or more signals to cause the user interface 5100 to be displayed. For example, the interface 5025 may transmit signals to cause the display device 5040 to display the user interface 5100. In some embodiments, the user interface 5100 may include at least one element 5105, at least one element 5110, at least one element 5115, at least one element 5120, at least one element 5125, at least one element 5135, at least one element 5140, and at least one element 5145. The various elements of the user interface 5100, as shown in FIG. 95, may include or indicate information generated or provided by the VCS 5005. For example, the elements 5130, 5135, and 5140 include icons to indicate a number of operations available to various component assemblies 5035 (represented as elements 5115, 5120, and 5125). In some embodiments, the user interface 5100 may be updated responsive to one or more operations. For example, the user interface 5100 may be updated to adjust the element 5130 responsive to an operation of the lift assembly 140. In some embodiments, an operator of the vehicle 10 and/or the display device 5040 may select the element 5110 to override an amount of power accessible to the component assemblies 5035 and/or to override a prevention of one or more operations of the component assemblies 5035. In some embodiments, the element 5145 may represent and/or indicate at least one of the SoC for the batteries 60 or an amount of power produced or provided by the batteries 60.

Figure 96:
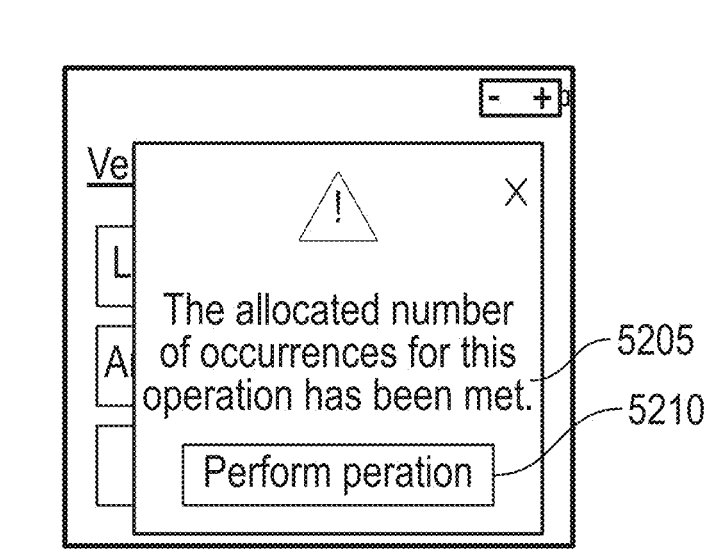
FIG. 96 is an example user interface including information generated by the system illustrated in FIG. 94, according to an exemplary embodiment.

FIG. 96 depicts a user interface 5200, according to some embodiments. In some embodiments, the user interface 5200 may be generated or displayed responsive to performance and/or a request to perform one or more operations. For example, the user interface 5200 may be generated responsive to activation of the component assemblies 5035. In some embodiments, the user interface 5200 may include at least one element 5205 and at least one element 5210. The element 5205 may include at least one prompt. For example, in FIG. 96, the element 5205 is shown to include a prompt that indicates that an allocated number of operations has been performed. In some embodiments, the processing circuit 5010 may limit or prevent subsequent operation of the component assemblies 5035 responsive to the performance of the allocated number of operations. In some embodiments, an operator of the vehicle 10 or the display device 5040 may select the element 5210 to override a prevention of a subsequent operation of the component assemblies 5035. In some embodiments, the processing circuit 5010 may reallocate a given amount of power to enable or allow for the subsequent operation of the component assemblies 5035 responsive to the selection of the element 5210.

On-Route Preconditioning to Prepare for Charging

According to an exemplary embodiment, a vehicle includes one or more batteries that provide energy to one or more components of the vehicle. For example, the batteries may provide power to at least one of lift assemblies, packers, arm assemblies, grabber assemblies, actuators, pumps, drive trains, coolant exchanges, temperature control systems, water pumps, light fixtures or light sources. In some instances, batteries may have one or more temperature ranges. For example, batteries may have a temperature range for when the batteries are discharging (e.g., providing) energy. As another example, batteries may have a temperature range for when the batteries are being charged. In operation, the temperature range for batteries that are discharging energy may be lower than the temperature ranges for the batteries when they are being charged. Stated otherwise, batteries may operate at a lower temperature when discharging energy versus when charging the batteries. Longevity and/or performance of the batteries may be improved by regulating the temperature of the batteries. For example, a peak State-Of-Charge (SoC) may decrease if the batteries are charged frequently at temperatures below a charging temperature range for the batteries. As another example, performance of the batteries may be impacted if the batteries are discharging energy at temperatures below a discharge temperature range for the batteries.

As described herein, one or more processing circuits, computing devices, or electronic devices (e.g., circuitry, hardware, software, firmware, etc.) may detect when the batteries are discharging energy and/or when the batteries will be charged. The processing circuits may communicate with one or more temperature control systems of the vehicle to control and/or adjust the temperature of the batteries. The processing circuits may determine when the vehicle has completed one or more routes and as such is likely be charged. In some instances, the temperature of the batteries may be lower than a temperature range for charging the batteries. Advantageously, the processing circuits may communicate with the temperature control system of the vehicle to precondition the batteries (e.g., adjust the temperature of the batteries to be within the temperature range for charging the batteries).

As a first non-limiting example, the vehicle may include a refuse vehicle and various operations and/or information associated with the refuse vehicle may indicate when the refuse vehicle is in route to a collection site. In this non-limiting example, the processing circuits may determine that the refuse vehicle is in route to the collection site responsive to a detection that one or more components of the refuse vehicle have been inactive for a predetermined amount of time. To continue this example, the one or more components may include components used by the refuse vehicle to collect refuse (e.g., lift assemblies, packers, grabber assemblies, tailgates, actuators, etc.). In this non-limiting example, the refuse vehicle may also operate at one or more speeds and the processing circuits may determine that the refuse vehicle is in route to the collection site based on the speed of the refuse vehicle. To continue this non-limiting example, the processing circuits may also determine that the refuse vehicle is in route to the collection site based on a location and/or geofence of the refuse vehicle. In this non-limiting example, the geofence may include an area around a pickup area (e.g., a refuse collection zone) and the processing circuits can detect when the refuse vehicle has exited the geofence. To continue this non-limiting example, the refuse vehicle may also have a predetermined return time (e.g., a point in time) for when the refuse vehicle returns to a collection site or depot. In this non-limiting example, the processing circuits may determine that the refuse vehicle is in route to the collection time based on a time of day.

As a second non-limiting example, the vehicle may include a fire fighting vehicle and the processing circuits may determine that the fire fighting vehicle is in route to a station based on various operations of the fire fighting vehicle. In this non-limiting example, the processing circuits may determine that the fire fighting vehicle is in route to the station based on the sirens having been turned off. To continue this non-limiting example, the processing circuits may also determine that the fire fighting vehicle is in route to the station based on one or more water pumps having been turned off. In this non-limiting example, the processing circuits may also determine that the fire fighting vehicle is in route to the station based on a detection that the fire fighting vehicle is traveling along a roadway after having been stationary for a predetermined amount of time. To continue this non-limiting example, the processing circuits may also determine that the fire fighting vehicle is in route to the station responsive to receiving an indication that the fire fighting vehicle is no longer assisting with one or more incidents.

The processing circuits may evaluate, analysis, check, or otherwise determine the temperature of the batteries for the vehicle based on the detection that the vehicle is in route to the station and/or collection site. For example, the processing circuits may evaluate the temperature of the batteries to determine whether to adjust the temperature of the batteries in anticipation of the batteries being charged once the vehicle returns to the station and/or collection site. To continue this example, the processing circuits may control the temperature control system of the vehicle responsive to determining that the temperature of the batteries is below a temperature range for charging the batteries.

FIG. 07 depicts a block diagram of a system 6000, according to some embodiments. Each system and/or component of the system 6000 can include one or more processors, memory, network interfaces, communication interfaces, and/or user interfaces. Memory can store programming logic that, when executed by the processors, controls the operation of the corresponding computing system or device. Memory can also store data in databases. The network interfaces can allow the systems and/or components of the system 6000 to communicate wirelessly. The communication interfaces can include wired and/or wireless communication interfaces and the systems and/or components of the system 6000 can be connected via the communication interfaces. The various components in the system 6000 can be implemented via hardware (e.g., circuitry), software (e.g., executable code), or any combination thereof.

Figure 97:
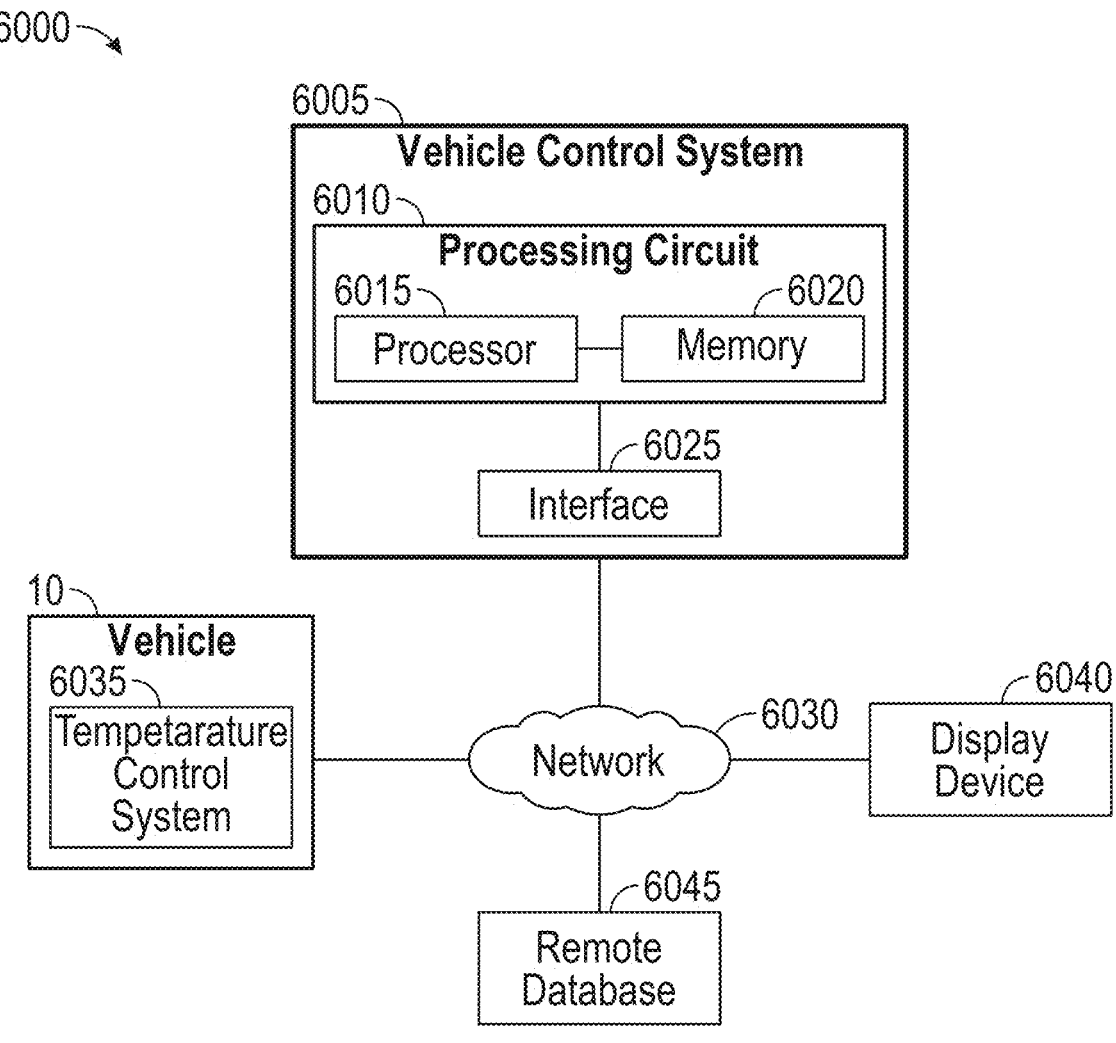
FIG. 97 is a block diagram of a system to control operation of the vehicle illustrated in FIG. 1, according to an exemplary embodiment.

Systems, devices, and components as shown in FIG. 97 can be added, deleted, integrated, modified, separated, and/or rearranged.

In some embodiments, the system 6000 may include at least one Vehicle Control System (VCS) 6005, at least one network 6030, at least one display device 6040, at least one remote database 6045, and the vehicle 10. In some embodiments, the system 6000 and/or one or more systems, devices, and/or components thereof may implement at least one of the various techniques or processes described herein.

In some embodiments, the network 6030 may include at least one of a local area network (LAN), a wide area network (WAN), a telephone network (such as the Public Switched Telephone Network (PSTN)), a Controller Area Network (CAN), wireless link, intranet, the Internet, a cellular network, and/or combinations thereof. In some embodiments, the various systems, components, and/or devices included in the system 6000 may communicate with one another via the network 6030.

In some embodiments, the display device 6040 may perform various actions and/or access various types of information. The information may be provided over the network 6030. In some embodiments, the display device 6040 may perform similar functionality to that of at least one system, device, and/or component of the system 6000. For example, the display device 6040 may perform similar operations to that of the VCS 6005. In some embodiments, the display device 6040 may include one or more applications to receive information, display information, and/or receive user interactions with content displayed by the display device 6040.

In some embodiments, the display device 6040 may include at least one of a screen, a monitor, a visual display device, a touchscreen display, a television, a video display, a liquid crystal display (LCD), a light emitting diode (LED) display, a mobile device, a kiosk, a digital terminal, a mobile computing device, a desktop computer, a smartphone, a tablet, a smart watch, a smart sensor, and/or any other device that can facilitate providing, receiving, displaying, and/or otherwise interacting with content (e.g., webpages, mobile applications, etc.). For example, the display device 6040 may include displays that include a resistive touchscreen that can receive user input via interactions (e.g., touches) with the touchscreen. In some embodiments, the display device 6040 may be included with the vehicle 10. For example, the display device 6040 may be a digital instrument cluster included in the vehicle 10. As another example, the display device 6040 may be an infotainment system included in the vehicle 10.

In some embodiments, the remote database 6045 may include at least one of a computing device, a remote server, a server bank, a remote device, and/or among other possible computer hardware and/or computer software. For example, the remote database 6045 may include a server bank and the server bank can store, keep, maintain, and/or otherwise hold the various types of information described herein. In some embodiments, the remote database 6045 may house and/or otherwise implement at least one of the various systems, devices, and/or components described herein. In some embodiments, the remote database 6045 may include, store, maintain, and/or otherwise host the VCS 6005. For example, the VCS 6005 may be distributed across one or more servers (e.g., the remote database 6045). In some embodiments, the VCS 6005 and/or various other components of the system 6000 may be implemented using cloud computing services/platforms.

In some embodiments, the VCS 6005 may include at least one processing circuit 6010 and at least one interface 6025. The processing circuit 6010 may include at least one processor 6015 and memory 6020. In some embodiments, the processing circuit 6010 and/or one or more components thereof (e.g., the processors 6015 and memory 6020) may perform similar functionality to that of the VCS 6005. For example, memory 6020 may store programming logic that, when executed by the processors 6015, causes the processors 6015 to perform functionality similar to the VCS 6005.

In some embodiments, the processing circuit 6010 may be communicably connected to one or more components of the VCS 6005. For example, the processing circuit 6010 may be communicably connected to the interface 6025. In some embodiments, the processors 6015 may be implemented as a general-purpose processor, an application specific integrated circuit (ASIC), one or more field programmable gate arrays (FPGAs), a group of processing components, or other suitable electronic processing components.

In some embodiments, memory 6020 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 6020 may be or include volatile memory or non-volatile memory. Memory 6020 may include database components, object code components, script components, or any other type of information structure for supporting the various activities and information structures described in the present application. In some embodiments, memory 6020 is communicably connected to the processors 6015 via the processing circuit 6010 and memory 6020 includes computer code for executing (e.g., by the processing circuit 6010 and/or the processors 6015) one or more processes described herein.

In some embodiments, the interface 6025 may include at least one of network communication devices, network interfaces, and/or other possible communication interfaces. The interface 6025 may include wired or wireless communications interfaces (e.g., jacks, antennas, transmitters, receivers, transceivers, wire terminals, etc.) for conducting data communications with various systems, devices, and/or components described herein. The interface 6025 may be direct (e.g., local wired or wireless communications) and/or via a communications network (e.g., the network 6030). For example, the interface 6025 may include an Ethernet card and port for sending and receiving data via an Ethernet-based communications link or network. The interface 6025 may also include a Wi-Fi transceiver for communicating via a wireless communications network (e.g., the network 6030). The interface 6025 may include a power line communications interface. The interface 6025 may include an Ethernet interface, a USB interface, a serial communications interface, and/or a parallel communications interface. In some embodiments, the interface 6025 may also include one or more Human-Machine Interfaces (HMIs). For example, the interface 6025 may include a display screen that presents information to a user. As another example, the interface 6025 may receive one or more indications or selections via a user interface that is displayed by the interface 6025.

In some embodiments, the system 6000 may include one or more vehicles 10. For example, the system 6000 may include a first vehicle 10 and a second vehicle 10. In some embodiments, the vehicles 10 may include at least one of the various vehicles and/or machines described herein. The vehicle 10 may include at least one of a front-loading refuse vehicle, a side-loading refuse vehicle, a carry can refuse vehicle, a lift device, and/or a fire fighting vehicle. In some embodiments, the vehicle 10 may include at least one of the various components, devices, assemblies, modules, and/or structures described herein. For example, the vehicle 10 may include the lift assembly 140. In some embodiments, the vehicle 10 may perform at least one of the various operations described herein. For example, the vehicle 10 may activate or control the lift assembly 140 to raise, lower, adjust, and/or otherwise move a refuse container. In some embodiments, the vehicle 10 may perform one or more operations that include at least one of activation of a lift assembly of the vehicle 10, activation of a packer of the vehicle 10, activation of a grabber assembly of the vehicle 10, and/or activation of a tailgate actuator of the vehicle 10.

In some embodiments, the vehicle 10 may include and/or communicate with the VCS 6005. For example, the vehicle 10 may include a controller that houses and/or implements the VCS 6005. As another example, the vehicle 10 may transmit one or more signals to communicate with the VCS 6005. In some embodiments, the vehicle 10 may include at least one temperature control system 6035. For example, the vehicle 10 may include a Heating Ventilation Air Conditioning (HVAC) system. As another example, the vehicle 10 may include a resistive heating system. As even another example, the vehicle 10 may include a coolant system. In some embodiments, the temperature control system 6035 may control a temperature of the batteries 60. For example, the temperature control system 6035 may adjust the temperature of the batteries 60 from a first value to a second value. In some embodiments, the temperature control system 6035 may increase, decrease, adjust, change, and/or maintain a temperature or temperature value of the batteries 60.

In some embodiments, the batteries 60 may include one or more temperature ranges and/or temperature values. For example, the batteries 60 may include a first temperature range and a second temperature range. In some embodiments, the temperature ranges may correspond to and/or be associated with one or more vehicle operations or statuses. For example, a first temperature range may be associated with when the vehicle 10 is in operation (e.g., the batteries 60 are discharging energy). As another example, a second temperature range may be associated with when the batteries 60 are being charged (e.g., receiving power from a power source).

In some embodiments, the temperature ranges for the batteries 60 may be different. For example, a temperature range for the batteries 60, when the vehicle 10 is operating, may be less than a temperature range for the batteries when charging the batteries 60. Stated otherwise, the batteries 60 may have a higher temperature range when charging the batteries 60 versus when discharging energy from the batteries 60.

In some embodiments, the interface 6025 may receive data from one or more sources. For example, the interface 6025 may receive data from one or more sensors of the vehicle 10. In some embodiments, the interface 6025 may receive data to indicate a temperature of the batteries 60. For example, the batteries 60 may be housed and/or located in a compartment or housing of the vehicle 10 and the interface 6025 may receive data that indicates an ambient temperature of the compartment that includes the batteries 60. As another example, the vehicle 10 may include sensors that can collect temperature data of a battery pack or battery assembly that includes the batteries 60.

In some embodiments, the interface 6025 may continuously and/or semi-continuously receive data and/or information regarding the vehicle 10. For example, the interface 6025 may receive temperature data at one or more predetermined time intervals. As another example, the interface 6025 may receive temperature data while the batteries 60 are discharging energy.

In some embodiments, the interface 6025 may receive telematic data from the vehicle 10. For example, the interface 6025 may receive location information from the vehicle 10. As another example, the interface 6025 may receive information that indicates and/or identifies various operations performed by the vehicle 10 (e.g., activation of the lift assembly, activation of the grabber assembly, activation of the packer, etc.). In some embodiments, the processing circuit 6010 may identify one or more types of information received by the interface 6025. For example, the processing circuit 6010 may identify information that corresponds to operations performed by the vehicle 10. As another example, the processing circuit 6010 may identify information that indicates when certain components, mechanisms, systems, assemblies, modules, or devices of the vehicle 10 were activated, utilized, operated, and/or otherwise controlled.

In some embodiments, the processing circuit 6010 may determine that the vehicle 10 is in route to a collection site. For example, the processing circuit 6010 may determine that the vehicle 10 is heading towards and/or returning to a location (e.g., a collection site) that receives and/or processes refuse collected by the vehicle 10. In some embodiments, processing circuit 6010 may determine that the vehicle 10 is in route to the collection site based on location information of the vehicle 10. For example, the processing circuit 6010 may use Global Positioning System (GPS) information to determine that the vehicle 10 is in route to the collection site.

In some embodiments, the processing circuit 6010 may determine that the vehicle 10 is in route to the collection site based on one or more amounts of time since one or more operations were performed. For example, the processing circuit 6010 may determine that the vehicle 10 is in route to the collection site based on an amount of time, since the lift assembly 140 was activated, exceeding a predetermined value. As another example, the grabber assembly 162 may be activated at one or more time intervals while the vehicle 10 is performing refuse collection. To continue this example, the processing circuit 6010 may determine that the vehicle 10 is in route to the collection site based on an amount of time, since the grabber assembly 162 was last activated, exceeding the time intervals.

As a non-limiting example, the vehicle 10 may perform refuse collection at various points or stops along a route. In this non-limiting example, the vehicle 10 may perform various actions or operations at the points along the route. To continue this example, the various actions may include activation of the lift assembly 140 to deposit refuse within the vehicle 10. In this non-limiting example, the activation of the lift assembly 140 may occur at one or more detectable or identifiable points in time. Stated otherwise, the processing circuit 6010 may detect when the lift assembly 140 is activated. To continue this non-limiting example, the lift assembly 140 may no longer be activated responsive to completion of the refuse collection. In this non-limiting example, the processing circuit 6010 may detect that the vehicle 10 is in route to the collection based on the lift assembly 140 being inactive for a given amount of time.

In some embodiments, the processing circuit 6010 may detect, responsive to determining that the vehicle 10 is in route to the collection site, that the temperature of the batteries 60 is below a predetermined threshold. For example, the processing circuit 6010 may detect that the temperature of the batteries 60 is below a predetermined temperature to charge the batteries at.

In some embodiments, the interface 6025 may transmit one or more signals. For example, the interface 6025 may transmit control signals to the temperature control system 6035. In some embodiments, the interface 6025 may transmit signals to cause the temperature control system 6035 to adjust the temperature of the batteries 60. For example, the interface 6025 may transmit signals to cause the temperature control system 6035 to provide heated air into a housing that includes the batteries 60. As another example, the interface 6025 may transmit signals to cause the temperature control system 6035 to activate heating coils that are disposed within a housing that includes the batteries 60. In some embodiments, the interface 6025 may transmit the signals to prepare the batteries 60 to receive power to charge the batteries 60. For example, performance of the batteries 60 may be impacted if the batteries 60 were to be charged when the temperature of the batteries 60 is below a predetermined value. Stated otherwise, the processing circuit 6010 may prepare the batteries 60 to be charged by adjusting the temperature of the batteries 60. In some embodiments, the temperature of the batteries 60 may also be above a predetermined threshold and the temperature control system 6035 may provide cooled air to decrease the temperature of the batteries 60.

In some embodiments, the interface 6025 may transmit one or more signals to cause one or more devices to display one or more user interfaces. For example, the interface 6025 may transmit one or more signals to cause the display device 6040 to display a user interface. In some embodiments, the user interface may include one or more prompts. For example, the user interface may include a prompt to provide one or more indications (e.g., prompts to confirm information and/or prompts to confirm information). In some embodiments, the interface 6025 may transmit the signals to cause the display device 6040 to display the user interface responsive to the processing circuit 6010 determining that the vehicle 10 is in route to the collection site. For example, the interface 6025 may transmit the signals responsive to the processing circuit 6010 communicating with the interface 6025.

In some embodiments, the user interface may include a prompt to provide an indication that the vehicle 10 is in route to the collection site. For example, the user interface may include a prompt to confirm that the vehicle 10 is in route to the collection site. As another example, the user interface may include one or more elements or icons and a selection of the elements may provide an indication that the vehicle 10 is in route to the collection site. In some embodiments, the interface 6025 may transmit the signals to the temperature control system 6035 responsive to receiving confirmation that the vehicle 10 is in route to the collection site.

In some embodiments, the processing circuit 6010 may determine that the vehicle 10 is in route to the collection site based on location information of the vehicle 10. For example, the processing circuit 6010 may receive telematic data. In some embodiments, the processing circuit 6010 may determine one or more points along a route for the vehicle 10 based on the telematic data. For example, the processing circuit 6010 may determine that the vehicle 10 has left and/or completed a final point and/or final stop on the route. To continue this example, the processing circuit 6010 may determine based on the final point that the vehicle 10 is in route to the collection site.

In some embodiments, the processing circuit 6010 may determine that the vehicle 10 is in route to the collection site based on operations performed by the vehicle 10. For example, the vehicle 10 may perform given operations while at the collection site. As another example, the vehicle 10 may deactivate given components responsive to completing a collection route. In some embodiments, the processing circuit 6010 may determine that the vehicle 10 is in route to the collection site by detecting operations that correspond to a completion of a route by the vehicle 10. In other embodiments, the processing circuit 6010 may determine that the vehicle 10 is in route to the collection site by determining a location of the vehicle 10.

As a non-limiting example, the vehicle 10 may include a packer and the packer may assist in removing refuse from the vehicle 10. For example, when the tailgate 136 of the vehicle 10 is open and the packer is subsequently activated, refuse from the vehicle 10 may exit the vehicle 10. In this non-limiting example, removal of refuse from the vehicle 10 may indicate that the vehicle 10 has completed the route. To continue this non-limiting example the processing circuit 6010 may determine that the vehicle 10 is in route to the collection site responsive to detecting activation of the packer and responsive to detecting that the tailgate 136 is open.

In some embodiments, the processing circuit 6010 may determine that the vehicle 10 is in route to the collection site by monitoring changes in location of the vehicle 10. For example, the processing circuit 6010 may monitor telematic data of the vehicle 10 to track the location of the vehicle 10. In some embodiments, the processing circuit 6010 may monitor the changes in location of the vehicle 10 to detect one or more collection stops along a route for the vehicle 10. For example, the vehicle 10 may follow and/or travel along a route that includes one or more predetermined stops and the processing circuit 6010 may use telematic data to detect when the vehicle 10 reaches and/or departs one or more of the predetermined stops.

In some embodiments, the processing circuit 6010 may determine that the vehicle 10 is in route to the collection site by detecting that the vehicle 10 departed a predetermined stop. For example, the processing circuit 6010 may determine that the vehicle 10 is in route to the collection site by detecting that the vehicle 10 is departing a final or end stop along a route for the vehicle 10. As another example, the processing circuit 6010 may determine that the vehicle 10 is in route to the collection site by determining that a distance between the vehicle 10 and a given stop of the route for the vehicle 10 exceeds a predetermined value.

In some embodiments, the processing circuit 6010 may continuously and/or semi-continuously monitor the temperature of the batteries 60. For example, the processing circuit 6010 may monitor the temperature of the batteries 60 to detect variations or changes in the temperature of the batteries 60. In some embodiments, the processing circuit 6010 may monitor the temperature of the batteries 60 to maintain and/or control the temperature of the batteries 60. For example, environmental temperature (e.g., outside temperature) may impact the temperature of the batteries 60. To continue this example, the processing circuit 6010 may monitor the temperature of the batteries 60 to detect changes in the temperature of the batteries 60 that may have resulted from the environmental temperature.

In some embodiments, the processing circuit 6010 may determine that the temperature of the batteries 60 is less than a predetermined threshold. For example, the processing circuit 6010 may determine that the temperature of the batteries 60, based on the batteries 60 discharging energy, is below a predetermined threshold. As another example, the processing circuit 6010 may determine that the temperature of the batteries 60, based on determining that the vehicle 10 is in route to the collection site, is below a predetermined threshold.

In some embodiments, the interface 6025 may transmit one or more signals to the temperature control system 6035 to cause the temperature control system 6035 to adjust the temperature of the batteries 60. For example, the interface 6025 may transmit signals that causes the temperature control system 6035 to adjust the temperature of the batteries 60 from a first value to a second value based on the batteries 60 discharging energy. In some embodiments, the interface 6025 may transmit one or more signals to the temperature control system 6035 to adjust the temperature of the batteries 60 by one or more values. For example, the interface 6025 may transmit one or more first signals to cause the temperature control system 6035 to adjust the temperature of the batteries 60 by a first value. As another example, the interface 6025 may transmit one or more second signals to cause the temperature control system 6035 to adjust the temperature of the batteries 60 by a second value. In some embodiments, the values of the temperature of the batteries 60 may be the same values and/or different values. For example, a first value for the temperature of the batteries 60 may be larger than a second value for the temperature of the batteries 60.

While some of the examples described herein have provided examples of detecting that the vehicle 10 is in route to the collection site, these examples are in no way limiting. For example, detecting that the vehicle 10 is in route to the collection site may include detecting that the vehicle 10 is located at the collection site. As another example, detecting that the vehicle 10 is in route to the collection site may include detecting that the vehicle 10 is within a given distance from the collection site. As even another example, detecting that the vehicle 10 is in route to the collection site may include detecting that the vehicle 10 is traveling at and/or above one or more speeds.

While some of the examples described herein have provided examples of various temperature ranges for the batteries 60, these examples are in no way limiting. For example, a first temperature range may be larger than (e.g., warmer) than a second temperature range. As another example, the first temperature range may be less than (e.g., colder) than the second temperature range. As a non-limiting example, the batteries 60 may discharge energy at one or more temperatures and/or temperature ranges that are less than (e.g., colder) than one or more temperatures and/or temperature ranges for charging the batteries 60. Stated otherwise, the batteries may discharge energy at lower temperatures than when charging the batteries 60.

In some embodiments, the processing circuit 6010 may display, generate, produce, provide, or otherwise generate one or more user interfaces. For example, the processing circuit 6010 may transmit signals that cause one or more devices to display a user interface. In some embodiments, the various user interfaces described herein may be provided, presented, or displayed as a continuous or uniform user interface. For example, the user interface may be a continuous screen and the various user interfaces described herein may be accessible by scrolling or navigating the continuous screen. In some embodiments, the various user interfaces described herein may be presented as one or more user interfaces. For example, the various user interfaces may be presented as a first user interface and a second user interface. As another example, the various user interfaces may be presented as one or more pop-up windows or overlays.

In some embodiments, the user interface may include one or more elements or indications. For example, the user interface may include at least one of icons, buttons, selectable elements, text boxes, pop-up windows, overlays, displays, prompts, and/or various other user interface elements.

Figure 98:
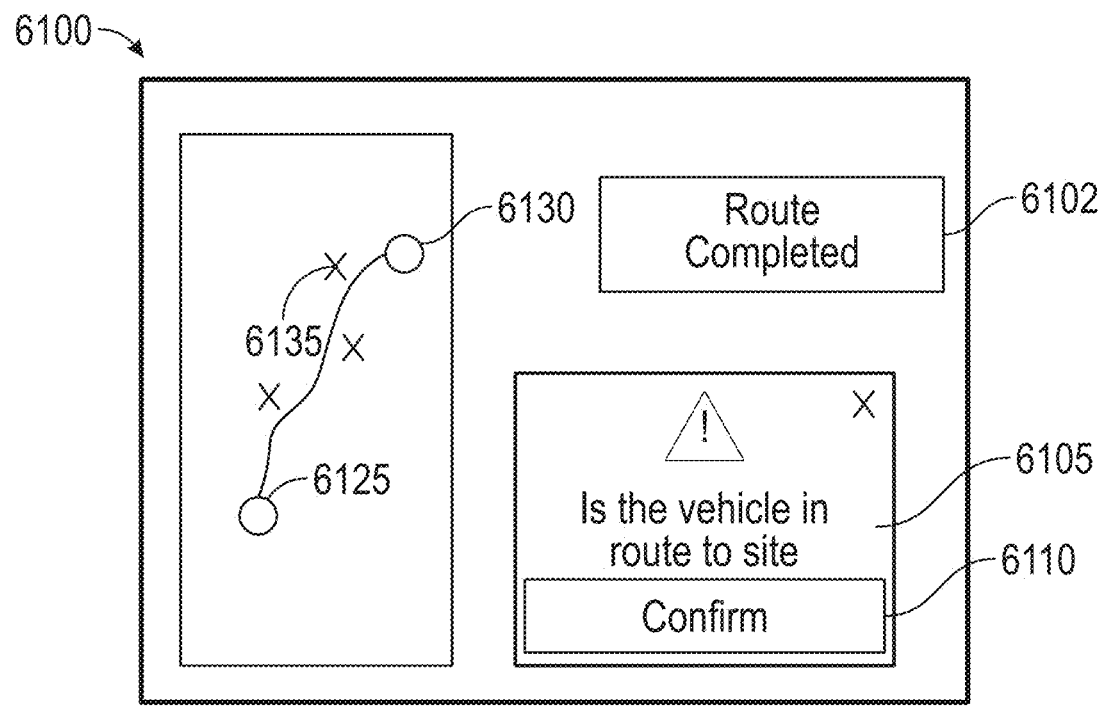
FIG. 98 is an example user interface including information generated by the system illustrated in FIG. 97, according to an exemplary embodiment.

FIG. 98 depicts a user interface 6100, according to some embodiments. In some embodiments, the interface 6025 may transmit one or more signals to cause the user interface 6100 to be displayed. For example, the interface 6025 may transmit signals to cause the display device 6040 to display the user interface 6100. In some embodiments, the user interface 6100 may include at least one element. For example, the user interface 6100 may include at least one of buttons, icons, cursors, scrolls, selectable elements, drop down menus, and/or other possible user interface elements. In some embodiments, the user interface 6100 may include at least one element 6102, at least one element 6105, at least one element 6110, at least one element 6125, at least one element 6130, and at least one element 6135. The user interface 6100 may include information provided by the VCS 6005. For example, the user interface 6100 may include a route of the vehicle 10. In some embodiments, the element 6102 may be a button and selection of the element 6102 may cause one or more signals to be transmitted to the interface 6025. For example, selection of the element 6102 may cause one or more signals to be transmitted to the interface 6025 to provide an indication that the route for the vehicle 10 has been completed. In some embodiments, an operator of the vehicle 10 and/or the display device 6040 may select the element 6102 to provide an indication that the route for the vehicle 10 has been completed.

In some embodiments, the element 6105 may include a prompt to provide an indication that the vehicle 10 is in route to the collection site. For example, the interface 6025 may transmit one or more signals that cause the user interface 6100 to include the element 6105 responsive to the processing circuit 6010 determining that the vehicle 10 is in route to the collection site. In some embodiments, the element 6110 may be a button and selection of the element 6110 may provide confirmation that the vehicle 10 is in route to the collection site. For example, the interface 6025 may receive an indication that the vehicle 10 is in route to the collection site responsive to an operator of the vehicle 10 and/or the display device 6040 selecting the element 6110. In some embodiments, the element 6125 may represent at least one of a location of the vehicle 10, a starting point for the vehicle 10 along a route, a refuse collection stop along a route, and/or various other possible locations. In some embodiments, the element 6135 may represent one or more collections stops along a route and/or one or more points along the route. In some embodiments, the element 6130 may represent the collection site.

Figure 99:
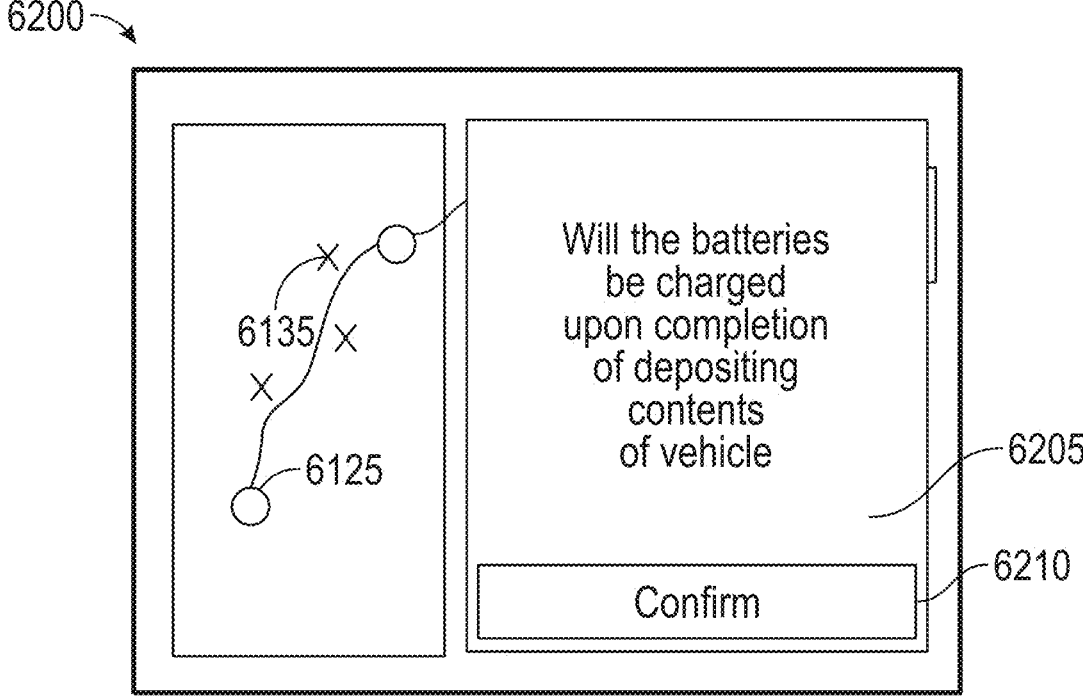
FIG. 99 is an example user interface including information generated by the system illustrated in FIG. 97, according to an exemplary embodiment.

FIG. 99 depicts a user interface 6200, according to some embodiments. In some embodiments, the user interface 6200 may be generated or displayed responsive to the processing circuit 6010 detecting one or more operations of the vehicle 10. For example, the user interface 6200 may be generated responsive to the processing circuit 6010 detecting that the tailgate 136 opened. As another example, the user interface 6200 may be generated responsive to the processing circuit 6010 detecting that the lift assembly 140 was deactivated and/or disengaged. In some embodiments, the user interface 6200 may include at least one element 6205 and at least one element 6210. The user interface 6200 may be presented, provided, generated, and/or displayed as an overlay of the user interface 6100. The user interface 6200 may also be presented, provided, generated, and/or displayed as a pop-up window in the user interface 6100. In some embodiments, the element 6205 may include a prompt to confirm that the batteries 60 of the vehicle 10 will be charged. For example, the processing circuit 6010 may detect that refuse collected by the vehicle 10 is being deposited and/or provided to a collection site. To continue this example, the depositing of the refuse may be that last operation and/or action prior to charging the batteries 60. In some embodiments, selection of the element 6210 may provide confirmation that the batteries 60 will be charged subsequent to depositing the refuse located in the vehicle 10.

Repositionable Batteries to Accommodate Axle Position

Referring generally to repositionable batteries to accommodate axle positions, aspects of which are illustrated at FIGS. 100-114, an electric vehicle can include batteries coupled with a propulsion unit for one or more driven axles of the vehicle. The electric vehicle can include, for example, a fully electric vehicle, or a hybrid vehicle including a combustion system for a fuel (e.g., fuel cell or engine) in combination with a battery-based energy storage system, any of which may be referred to as an electrified vehicle, without limiting effect. The batteries can constitute a substantial weight of the vehicle, such that a position or weight of the batteries, along with associated components, meaningfully impact a weight borne by one or more axles. The weight applied to the axles can correspond to, for example, a tractive effort generated from one or more axles; a localized force imparted to bridges, roads, or other infrastructure; inter-vehicle forces; and so forth. For example, according to some battery positions, a vehicle can exceed a design or other (e.g., regulatory) limit for an infrastructure element of the vehicle based on axle loading. In other vehicles (or for other axles), a battery position can provide too little weight, which may compromise, for example, vehicle driving dynamics, tractive effort realizable with a high adhesion surface, or so forth.

Various components of the vehicle such as frame rails or chassis elements, driveshafts, or wiring or pneumatic systems can be configured to couple with axles in a varying positions or varying numbers of axles. For example, the chassis or frame rails can include couplers (e.g., mounting holes or brackets) to couple with the axles via a suspension component, or another portion of the chassis configured to receive the axle (e.g., axle seat, casing, housing or the like). In some configurations, the vehicle can include a mounting location for a pair of rear axles; batteries can be disposed proximal to the rear axles (e.g., to bias the weight of the batteries towards the rear axles, away from a front axle). In other configurations, the vehicle can be configured to couple with the rear axles somewhat forward of such a position, which may generate clearance for an additional rear axle (e.g., tag axle, disposed opposite of the battery from the other rear axles). Although the additional rear axle can reduce a per-axle loading, the offset between the other rear axles, can cause interference between a front-most rear axle and the battery pack. Thus, the vehicle can be configured to couple with the batteries at another position, such as to forwardly adjust the battery position. Such a configuration can include various mounting points on or integral to frame rails of the vehicle, or various intermediate members which couple the frame rails with batteries of axle assembly components.

Figure 100:
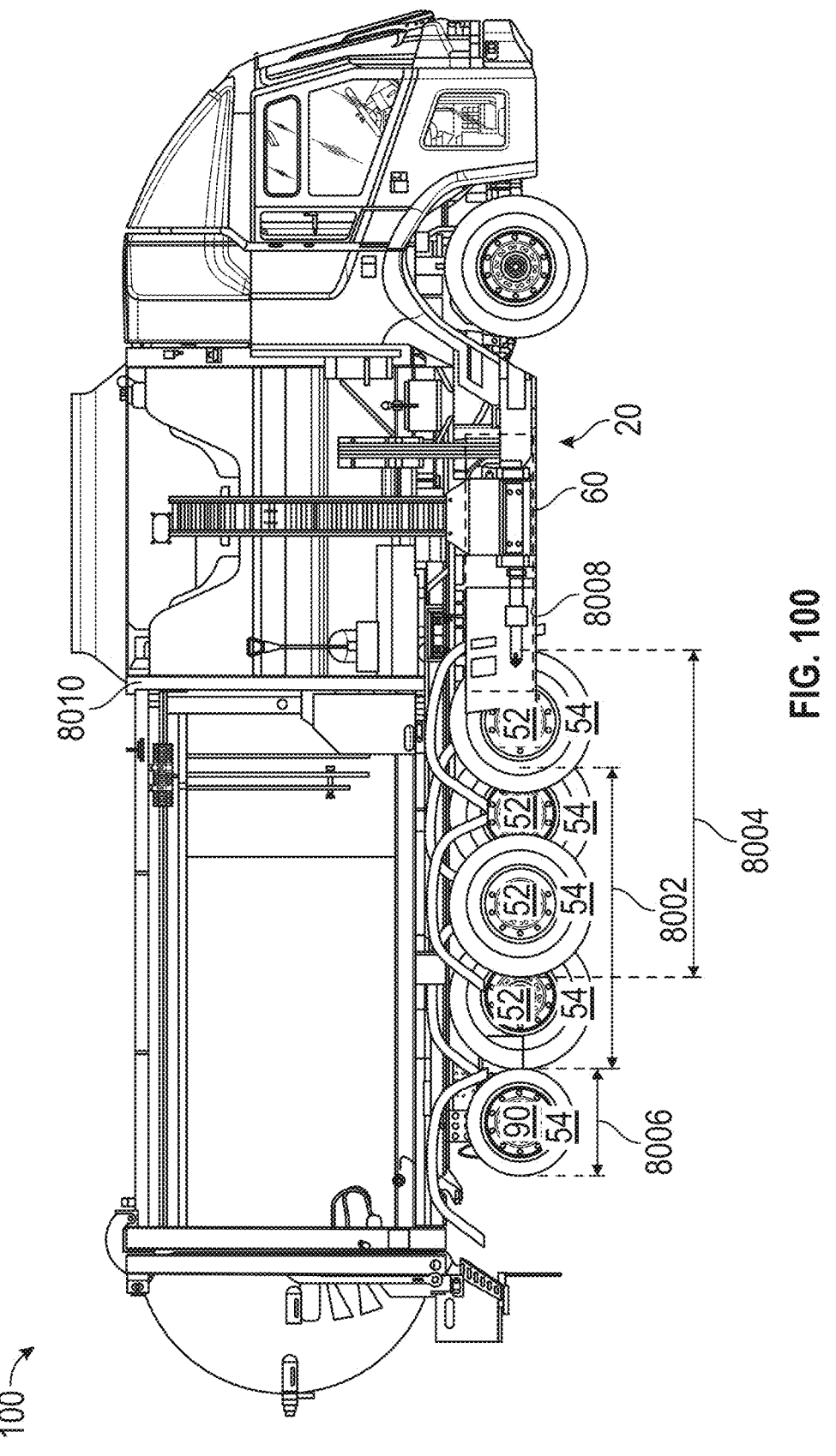
FIG. 100 is a side view of a refuse vehicle depicting first and second axle configurations relative to a chassis of the refuse vehicle, according to an exemplary embodiment.

Referring now to FIG. 100, a side view of the refuse vehicle 100 (e.g., the vehicle 10) is provided. The view depicts a first and second axle configuration relative to a chassis 20 of the refuse vehicle 100. The first configuration includes a first rear axle 52 and a second rear axle 52 disposed at a first position 8002. The rear axles 52 can be configured in a tandem axle configuration, to transfer forces between the axles, wherein the rear axles are coupled with a suspension to distribute loading therebetween (e.g., walking beam/equalizing beam (collectively referred to as a beam type suspension), leaf spring, or air suspension), or the rear axles 52 can be separately coupled with the chassis 20 (e.g., multi-leaf spring or independent suspension coupled with the frame rails for each rear axle 52). The first position 8002 is disposed rearward of a side-plate 8008 (e.g., trailer skirt or other gap reducer) coupled with the chassis 20. The side-plate 8008 can be a battery cover for a battery 60 of the vehicle 10. The side-plate 8008 can laterally overlap with a mid-beam 8010 of the vehicle 100.

The second position 8004 is disposed forward of the first position, such that a forward-most portion of the second position 8004 overlaps with the side-plate 8008, wherein one or more of the rear axles 52 or wheel and tire assemblies 54 associated therewith interferes with the side-plate 8008, or another portion of the chassis 20, battery 60, or so forth. The side-plate 8008 or other portion of a battery compartment, or the battery 60 itself can be relocatable according to a position of the rear axles 52. For example, the chassis 20 of the refuse vehicle 100, the batteries 60, or a casing for the batteries 60 can include separate mounting locations, such as a rearward configuration, as depicted, or a frontward configuration, wherein the batteries 60 do not interfere with a wheel and tire assembly 54 for any of the rear axles 52. Such rearward and frontward configurations can be disposed a same longitudinal distance as the longitudinal distance between the frontmost rear axle 52 in a first position 8002 and the frontmost rear axle 52 in a second position 8004. Such a distance may be a same distance between other of the rear axles, such as where an axle pitch (e.g., center-to-center distance along a longitudinal axis, sometimes referred to as a longitudinal pitch) between the rear axles 52 depicted in the first position 8002 and second position 8004 is a same amount. For example, a same tandem axle assembly can be selectively mounted in the first position 8002 or the second position 8004. Further, a longitudinal distance between the first position 8002 and second position 8004 (or between responsive battery 60 positions) can be less than a diameter of a wheel and tire assembly 54 for any of the rear axles 52 (e.g., any of the driven rear axles 52).

In some embodiments, the second position 8004 does not overlap with a third position 8006 for a tag axle 90, such as where the second position 8004 and the third position 8006 maintain spacing such that the tag axle 90 can be employed in a same vehicle 10 as the respective rear axles 52 as disposed at the second position 8004. Such employment can include a suspension travel of any of the wheel and tire assemblies 54, along with a movement for a deployment or retraction of the tag axle 90. Accordingly, a tag axle 90 may be deployed (in a third position 8006) along with a tandem axle assembly disposed in the second position 8004, so as to reduce a loading borne by the tandem axle assembly, and shift weight borne by a roadway or other traveled surface rearward, relative to the same configuration without a tag axle 90 (or where the tax axle 90 is in a stowed position).

Each position can correspond to a set of axle mounts of the chassis 20. That is, the positions can each correspond to a separate set of axle mounts. The axle mounts can include any of an axle housing, mounting bracket, attach points, suspension interface points, reinforcement gussets or plates, or suspension components. However, at least some components may be omitted where an axle mount is inoperable for a particular vehicle. For example, mounting brackets or attach points therefor may be retained, while suspensions components for the un-populated axle mount may be omitted. In some embodiments, a set of axle mounts for a position can include a first portion to couple with a first rear axle 52 and a second portion to couple with a second rear axle 52 (or further portions to couple with further rear axles 52). For example, the axles can each couple with frame rails or other portions of the chassis 20, such that forces transmitted between the respective axles are transmitted through the frame rails or other chassis 20 members (e.g., cross members coupled with the respective frame rails). In some embodiments, a set of axle mounts for a position can correspond to an intermediate member. The intermediate member can be coupled with each of two or more rear axles 52, such that forces transmitted between the respective axles 52 are transmitted through the intermediate member. For example, the intermediate member can include a tandem axle housing or casing, pivot arm of a beam-type suspension, or coupling therefor.

The axle mounts can include openings, brackets, fasteners, flanges, or other couplers configured to couple an axle with a chassis 20. In some embodiments, one or more axle mounts of one set of axle mounts can be shared with another set of axle mounts. For example, a front-most axle mount for the first position 8002 can be a rear or center axle mount for one or more of the second positions 8004. In some embodiment, the axle mounts are integral to, or directly coupled with the frame rails. In some embodiment, one or more intermediate members separate the axle mounts from the frame rails.

Figure 101:
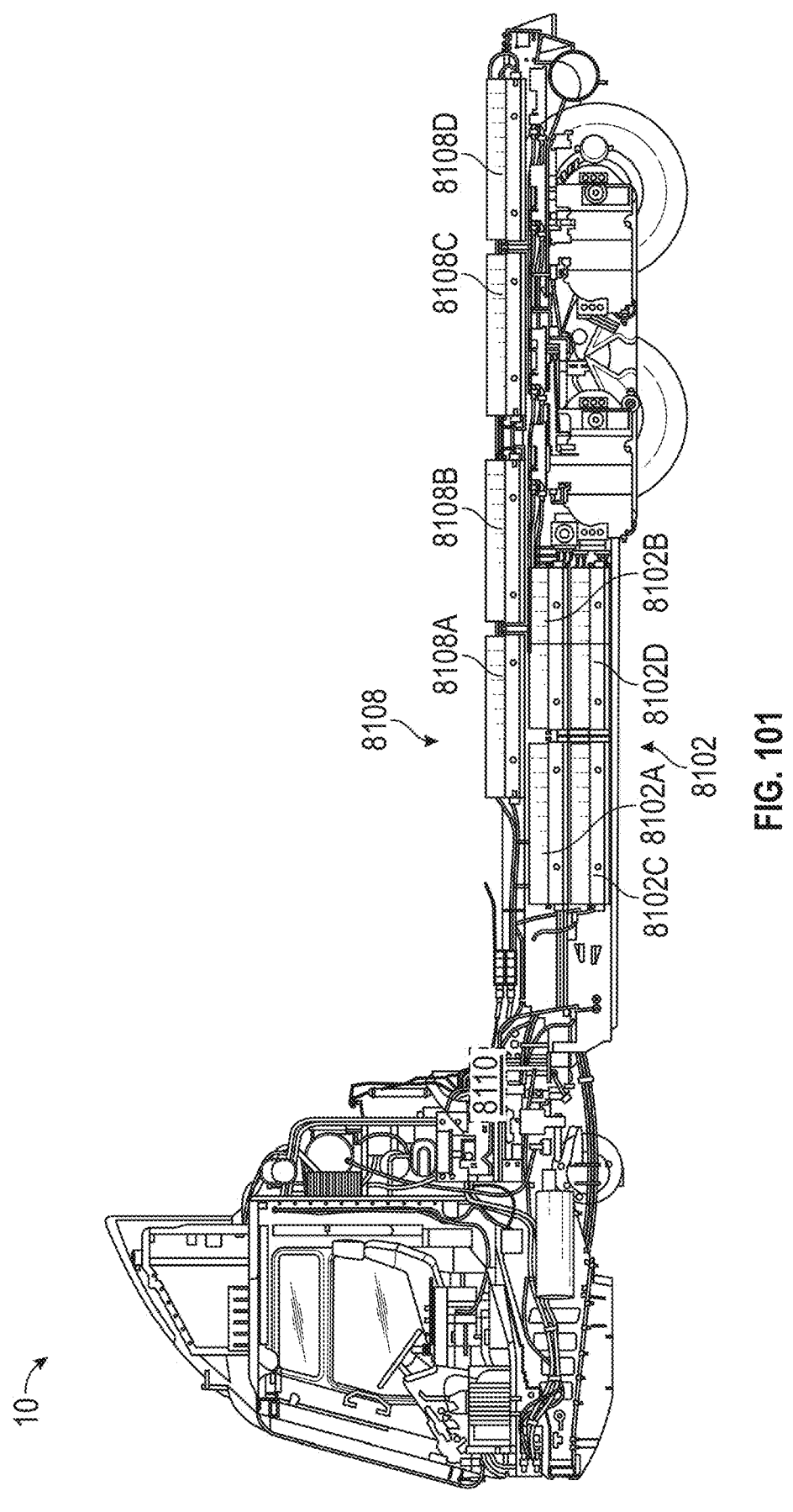
FIG. 101 is a cross sectional side view depicting a battery configuration of a vehicle, according to an exemplary embodiment.
Figure 102:
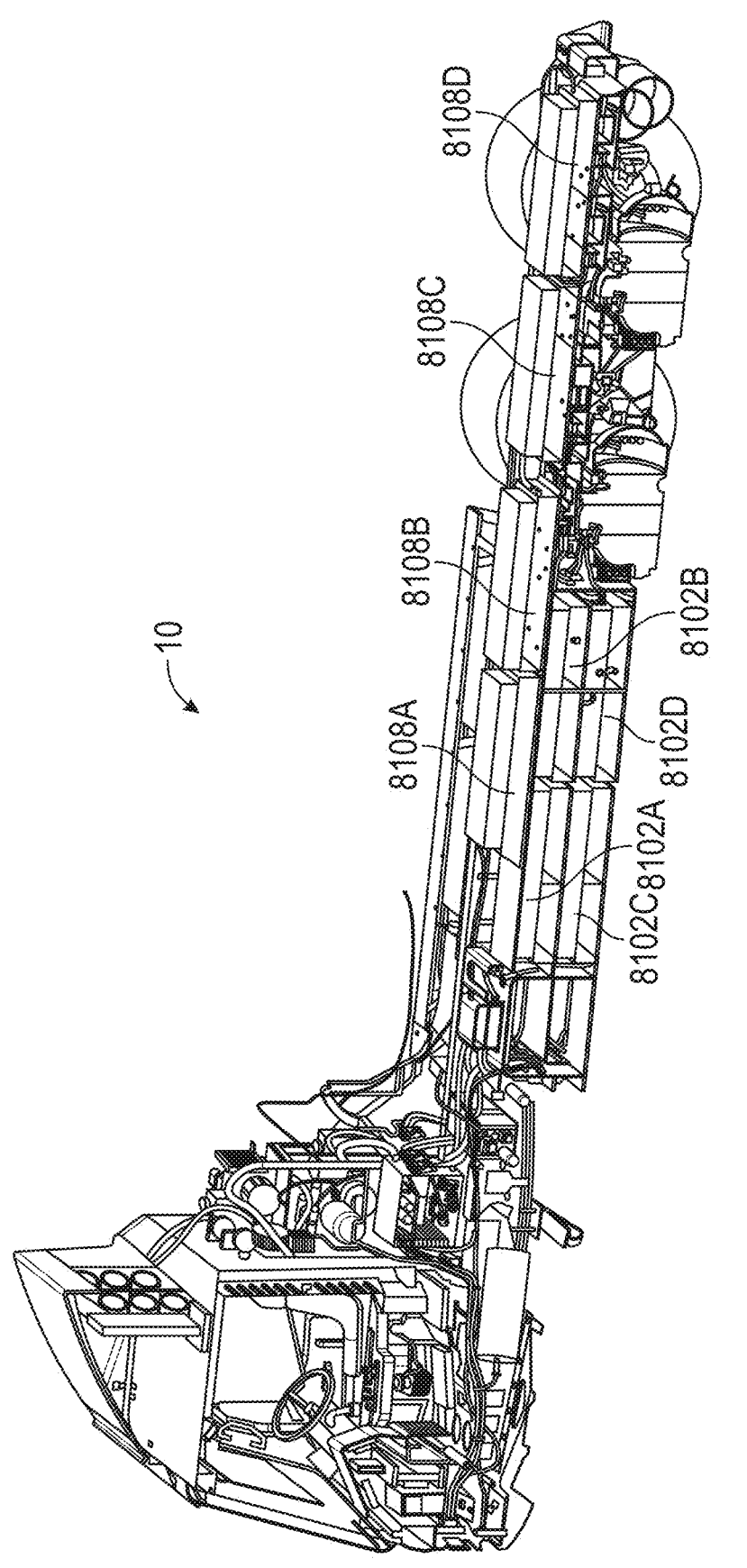
FIG. 102 is an angled side view of the vehicle of FIG. 101, according to an exemplary embodiment.

Referring now to FIGS. 101-102, a cross sectional view of a battery configuration for a vehicle 10 is provided, according to an exemplary embodiment. A first battery string 8102 is disposed in an underslung configuration parallel to or below a frame rail of the vehicle 10. A battery string can refer to a series combination of battery packs. For example, the first battery string 8102 can include a first battery pack 8102A, second battery pack 8102B, third battery pack 8102C, and fourth battery pack 8102D connected in series to form a series battery string. The series battery string may be combined with further series battery strings in a series or parallel configuration. The battery packs can themselves be further subdivided (e.g., into modules or constituent cells, which can themselves be arranged into various series or parallel combinations to achieve a charge capacity, operating voltage, etc.). One or more battery strings can be arranged into battery arrays. For example, a battery array can include the depicted first battery string 8102, disposed between a second battery string 8104 (see, e.g., FIG. 104, forward of a cut plane of the present view) disposed on the left side of the vehicle 10, opposite from a third battery string 8106 (see, e.g., FIG. 104, rearward of the cut plane in the present view behind first battery string 8102) on the right side of the vehicle 10. For example, various battery packs of the first battery string 8102, second battery string 8104, and third battery string 8106 can be aligned along a longitudinal and vertical axis of the vehicle, and be laterally staggered across its width. Such lateral staggering can include one battery string leftward of the frame rails, another battery string rightward of the frames rails, and a further battery string between the frames rails.

The batteries 60 (e.g., packs, strings, arrays, or so forth) can, in combination with any associated terminals, bus bars or other conductive elements, thermal interface elements (e.g., cold plates or liquid coolants along with coolant pumps), etc., contribute substantial weight and bulk (e.g., volume) to the vehicle 10. Thus, various embodiments of the present disclosure contemplate the relocation of various components relative the batteries 60, or relocation of the batteries 60 relative to such components. For example, components can be relocated as an assembly, or separately from the batteries 60.

A fourth battery string 8108, including a constituent first 8108A, second 8108B, third 8108C, and fourth battery pack 8108D can be received between first and second frame rails of the vehicle 10. Like other aspects of the present disclosure, the fourth battery string 8108 can be selectively included in various embodiments (e.g., omitted). Further, according to various embodiments, the battery 60 can include differently disposed packs, strings, modules, or so forth. For example, battery packs including cells arranged into a higher voltage can be configured into two-pack strings of the same voltage as the depicted four-pack strings, or additional packs can be included in a string to realize a higher voltage for the battery array.

A battery controller 8110 can control (e.g., monitor, report, modulate, etc.) a charging of the battery packs of an array, string, pack, module, or cell basis. The battery controller 8110 can discharge the batteries 60 to drive one or more of the rear axles 52 to propel the vehicle 10 using an electric propulsion system to apply a torque to induce a rotation of at least one rear axle. The battery controller 8110 can electromagnetically brake one or more of the rear axles 52 to arrest the rotation of at least one rear axles to generate electrical energy to charge the batteries 60. Such modulation can be based on a receipt of a commanded power level (e.g., from an accelerator control or brake pedal, as may be referred to as a commanded power or braking level). The battery controller 8110 can further actuate a thermal system based on operation such as a charge or discharge rate or a receipt of sensor data from one or more thermal sensors associated with the batteries 60. The battery controller 8110 can further modulate the rate of charge based on the sensor data. The battery controller 8110 can receive an indication of a quantity of batteries 60 operatively connected thereto, corresponding to various configurations of the batteries 60. For example, the battery controller 8110 can receive a configuration file indicating a quantity of batteries. In some embodiments, the battery controller 8110 can establish a communicative connection with one or more grouping of battery packs and receive an indication of a quantity, capacity, voltage, or other aspect of the batteries 60. For example, the battery controller 8110 can establish the communication connection at each bootup, dynamically during operation, or otherwise determine a configuration of a battery array based on receipt of an indication corresponding thereto. In some embodiments, the information received from the batteries 60 can include health data such as an internal resistance, quantity of charge cycles completed, capacity, or so forth. The battery controller 8110 can modulate a charge or discharge rate of the batteries based on a health of one or more battery packs or strings.

The battery controller 8110 can include one or more processors, coupled with a memory device. One or more of the memory devices can include a non-transitive memory comprising processor-executable instructions to cause the controller to execute the various operations thereof. For example, the non-transitive memory can include NAND flash, read only memory (ROM), or so forth. One or more of the memory devices can include a working memory (e.g., random access memory, RAM, or an instruction or data cache of an arithmetic logic unit (ALU), sometimes referred to as a register), which may or may not be separate from the non-transitive memory.

Figure 103:
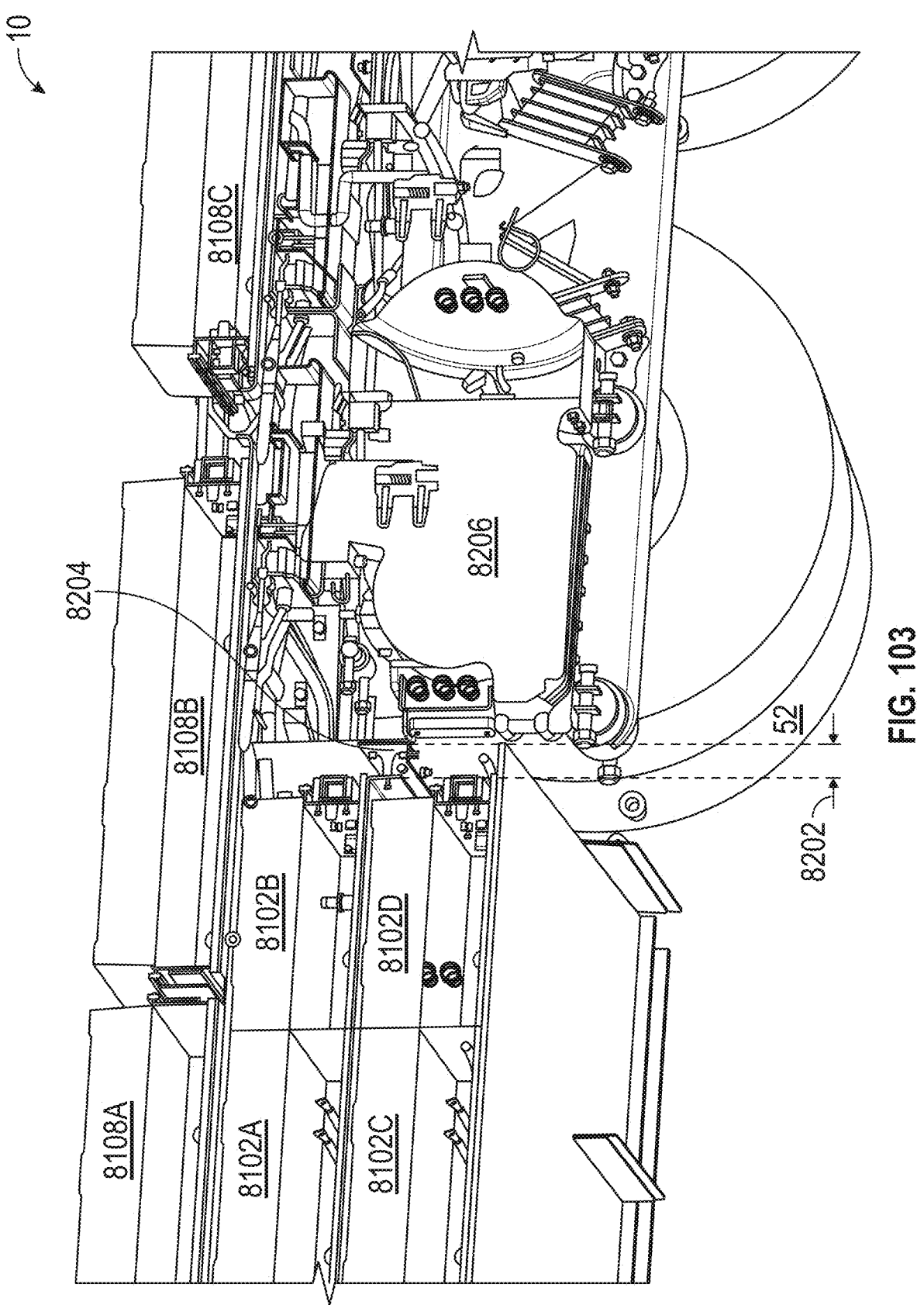
FIG. 103 is a detail view of a side view of the vehicle of FIG. 101, according to an exemplary embodiment.

Referring now to FIG. 103, a detail view of a cut view of the vehicle of FIG. 101 is provided along a same cut plane according to an exemplary embodiment. A first distance 8202 separates the battery 60 from an intermediate member 8206 of the chassis 20 or suspension component of the vehicle 10. Another distance can separate the battery 60 from a frontmost portion of a wheel and tire assembly 54 associated with a rear axle 52. For example, the first distance 8202 can correspond to a serviceability gap, or a suspension travel of the wheel and tire assembly 54. As depicted, a support 8204 for the battery 60 can be or couple with a portion of the intermediate member 8206. For example, as depicted, the coupling can be laterally disposed between the frame rails.

Figure 104:
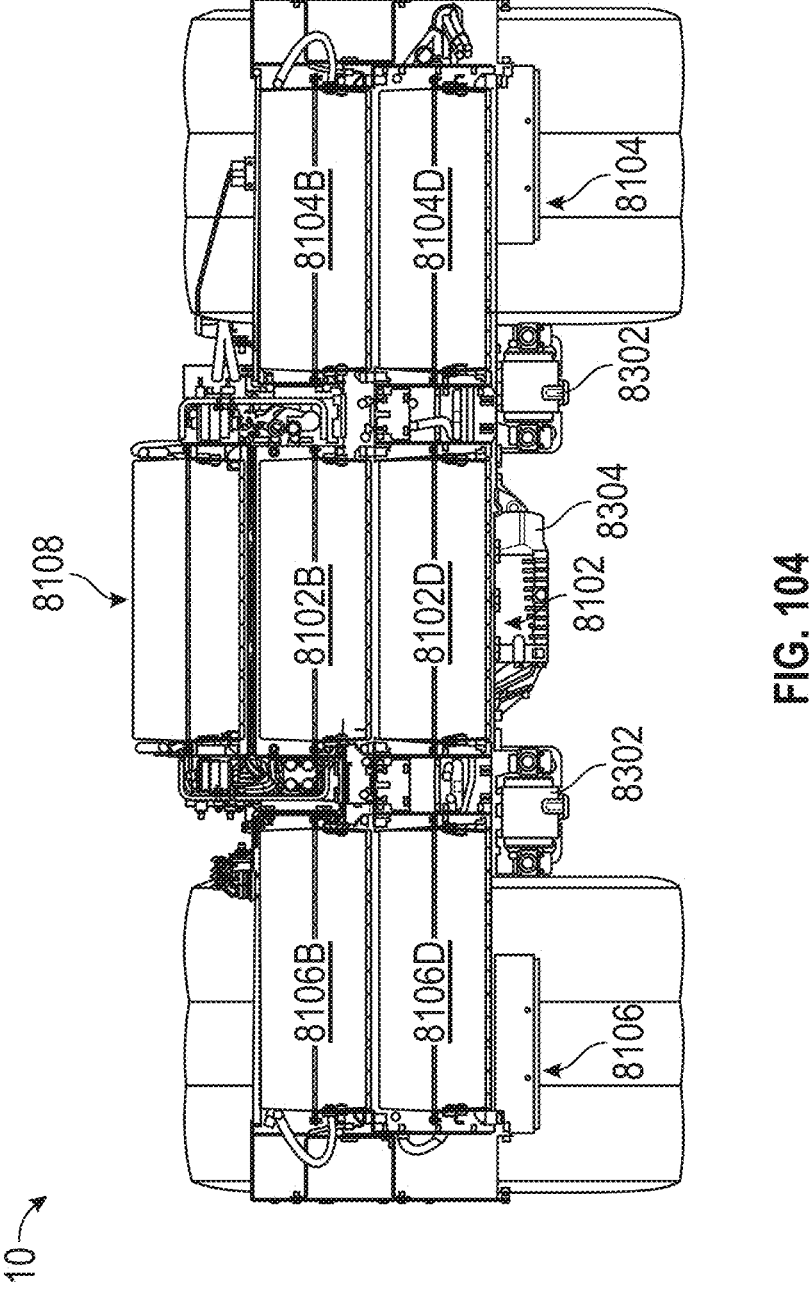
FIG. 104 is a rearward facing cross sectional view of a vehicle including various batteries, according to an exemplary embodiment.

Referring now to FIG. 104, a rearward facing cross sectional view of a vehicle 10 including various batteries 60 is provided according to an exemplary embodiment. Particularly, battery packs of a first 8102, second 8104, third 8106, and fourth string 8108 are depicted. Wherein the battery packs of the first 8102, second 8104, or third string 8106 are configured in a forward configuration, the depicted battery packs can longitudinally align with the first battery pack 8108A of the fourth battery string 8108, as depicted in FIG. 102. Wherein the battery packs of the first 8102, second 8104, or third string 8106 are configured in a rearward configuration, the depicted battery packs can align longitudinally with the second battery pack 8108B of the fourth battery string 8108. Longitudinal alignment may refer to alignment of a front or rear surface of battery packs, or other longitudinal overlap between battery packs. Various further alignments according to various relative longitudinal positions of the battery strings, or further arrangements of the strings are contemplated.

At least a portion of the batteries 60 (e.g., the first 8102, second 8104 and third string 8106) can be disposed in one or more housings underslung from the frame rails. That is, at least a portion of the housing can couple with the frame rails and receive the batteries 60, the batteries 60 laterally aligned with the frame rails or there-below. In some embodiments, separate housings can retain separate portions of the batteries 60, such as a first housing for the batteries 60 disposed laterally between (and vertically below or between) the frame rails, another housing for the batteries 60 on the left side of the vehicle 10, and yet another housing for the batteries 60 on the right side of the vehicle 10. In some embodiments, a same housing can house each of, for example, the first 8102, second 8104 and third string 8106 (or other battery packs according to various electrical configurations, as are contemplated by the present disclosure).

In various embodiments of the present disclosure, the underslung housings can further be configured to receive various components of a battery system such as the associated terminals, bus bars or other conductive elements, thermal interface elements (e.g., cold plates or liquid coolants along with coolant pumps, and so forth, as indicated above. These associated components can contribute a substantial portion of weight or bulk to a battery system. Accordingly, an adjustment of such an assemblage can aid in the adjustment of axle loading due to additional weight or bulk of such components, relative to an adjustment of the battery cells or other battery packs alone, and can further harmonize local interconnections between the battery packs. For example, electrical or fluidic connections between the various battery packs can be disposed within a housing for batteries 60 such that the electrical or fluidic connections can be coupled with a housing as an atomic unit, at least where adjustment to internal connections to the housing are not performed.

Further, the vehicle 10 can include various components longitudinally aligned with the batteries 60 or a casing therefor, which may extend to, or below the batteries 60 or a battery housing. Accordingly, when the vehicle 10 undergoes longitudinal movement, the components can come into contact with road debris or terrain obstructions prior to the batteries 60, to reduce or prevent impacts to the batteries or their housing. For example, as depicted, a suspension knuckle 8302, differential 8304, electric drive motor 62, chassis skid plate, or the like can be disposed rearward (as depicted) or forward of the batteries 60 to intermediate the battery 60 from a roadway or other traveled surface. Further, the housing can include or couple with skid plates or other components disposed between the battery cells and the traveled surface, to further protect the battery cells from roadway debris or terrain obstructions. Such components can be integral to a battery pack, or separate therefrom.

Figure 105:
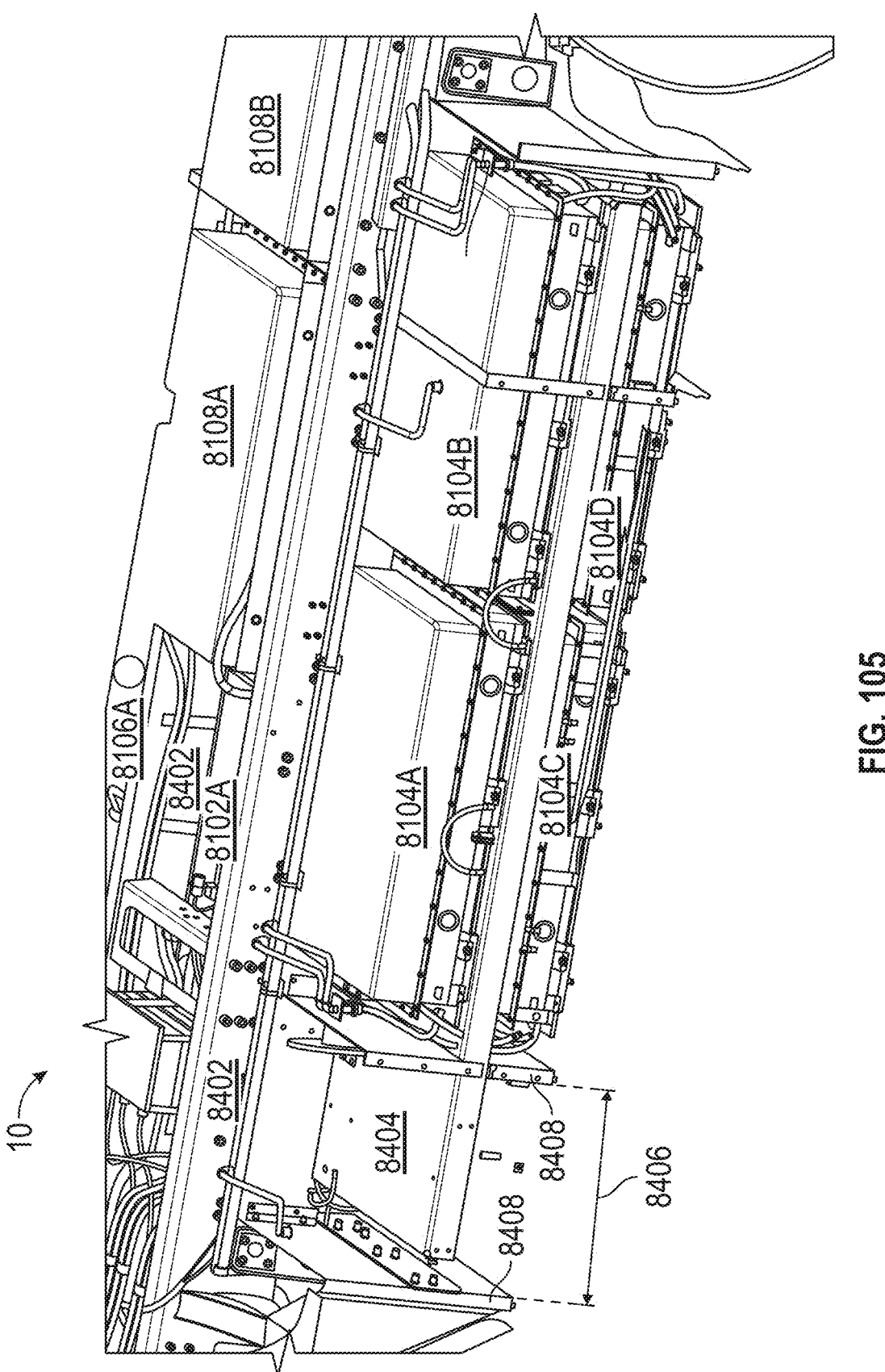
FIG. 105 is a detail cutaway view of batteries in relation to frame rails of a vehicle, according to an exemplary embodiment.

Referring now to FIG. 105, a cutaway detail view illustrating the batteries 60 in relation to frame rails 8402 of a vehicle 10 is provided according to an exemplary embodiment. As depicted, a portion of the battery packs (e.g., of the second battery string 8104) couple with the frame rails 8402, via an intermediate chassis portion 8404. The chassis portion 8404 is configured to receive the battery packs, along with any associated fluidic or electrical connections. The battery packs (or their housing) may couple (directly or otherwise) with the frame rails 8402, or otherwise couple along a surface facing the frame rails 8402 (e.g., via lateral offset bracket). As illustrated, further battery packs can be disposed opposite from the battery packs shown coupled with the chassis portion 8404. For example, a further chassis portion 8404 can couple such battery packs to the frame rails 8402. The further chassis portion 8404 may be provided as substantially symmetrical to the depicted chassis portion 8404. Another chassis portion 8404 can couple to further battery packs disposed between the frame rails 8402, or such a portion can be omitted, and the batteries 60 or their housing can couple with the frame rails 8402, directly or via an offset bracket or other intermediate member. For example, batteries can be coupled with an inner side of the frame rails or an outer side of the frame rails. That is, the first and second frame rail 8402 can define a lateral cavity to receive battery packs (depicted as a first battery pack 8108A and second battery pack 8108B of a fourth battery string 8108).

Two or more laterally offset sets of battery packs (e.g., battery packs of the first battery string 8102, the second battery string 8104, or the third battery string 8106) can be laterally aligned with each other. The various aligned battery packs can be disposed at various positions. For example, as depicted, the battery packs can be disposed a longitudinal offset distance 8406 from a front portion of a chassis portion 8404. In other embodiments, the battery packs can be disposed forward of the depicted position, such as by mounting the batteries 60 on a separate mounting location of the chassis portion 8404 to reduce the longitudinal offset distance 8406, coupling another chassis portion 8404 with the frame rails 8402 to reduce the longitudinal offset distance 8406, or so forth. This reduced longitudinal offset distance 8406 can correspond to an increased longitudinal spacing rear of the batteries, as may accommodate mounting rear axles 52 forward from the depicted position (e.g., to further accommodate a tax axle 90). That is, in various embodiments, the chassis portion 8404 can be a multipatterned chassis portion 8404 including a first mounting pattern for batteries 60 in a forward configuration, and a second mounting pattern for batteries 60 in a rearward configuration. A side-plate 8008 (see, e.g., FIG. 100) can couple to the frame rails 8402 (e.g., directly or via an intermediate member, such as via one or more of the depicted brackets 8408 or the chassis portion 8404). Accordingly, the side-plate 8008 may be sized and configured to mount to the frame rails according to a battery position (e.g., a shorter side-plate 8008 may be provided for one vehicle configuration and a longer side-plate 8008 may be provided for another vehicle configuration).

Figure 106:
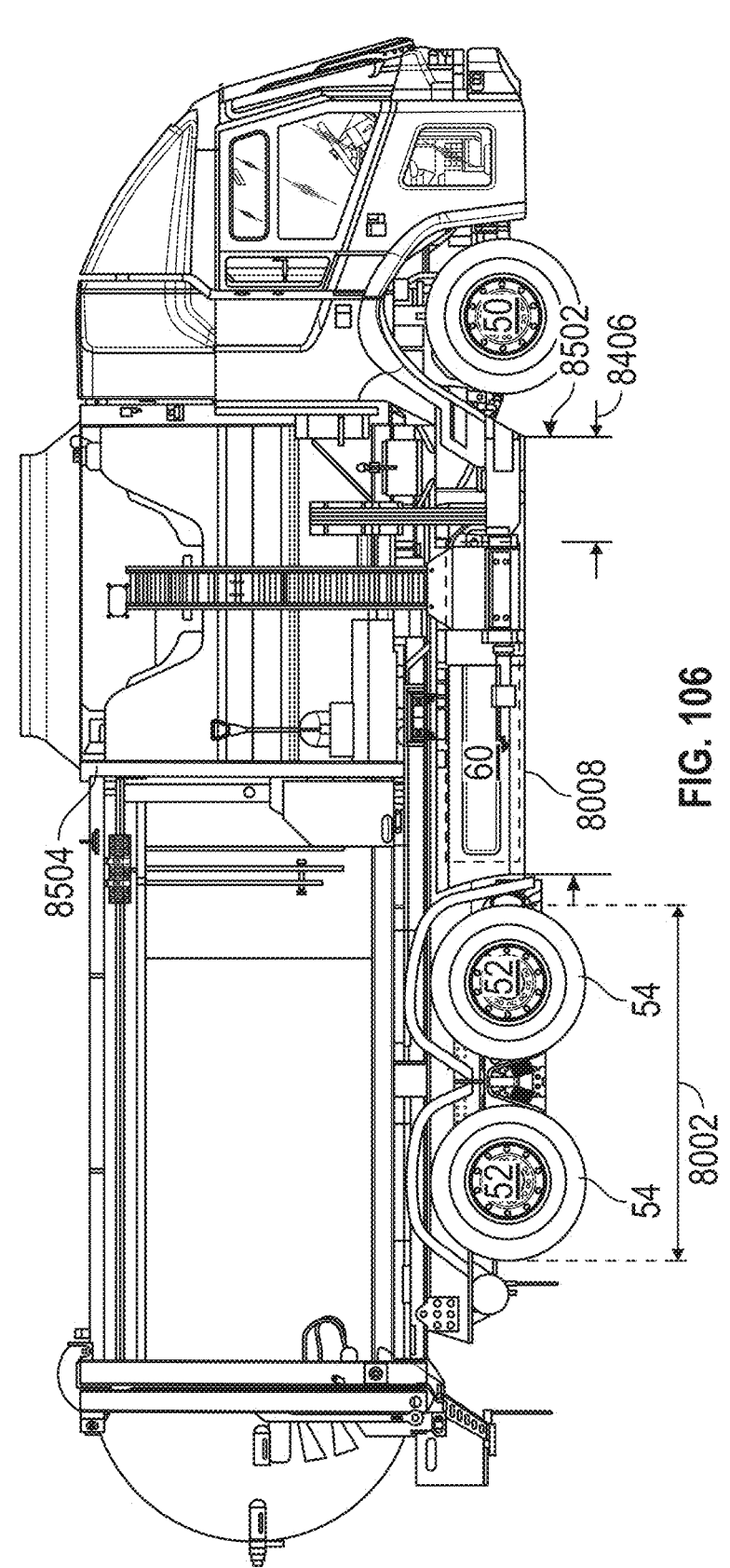
FIG. 106 is a side view of a side-loading refuse vehicle, according to an exemplary embodiment.
Figure 107:
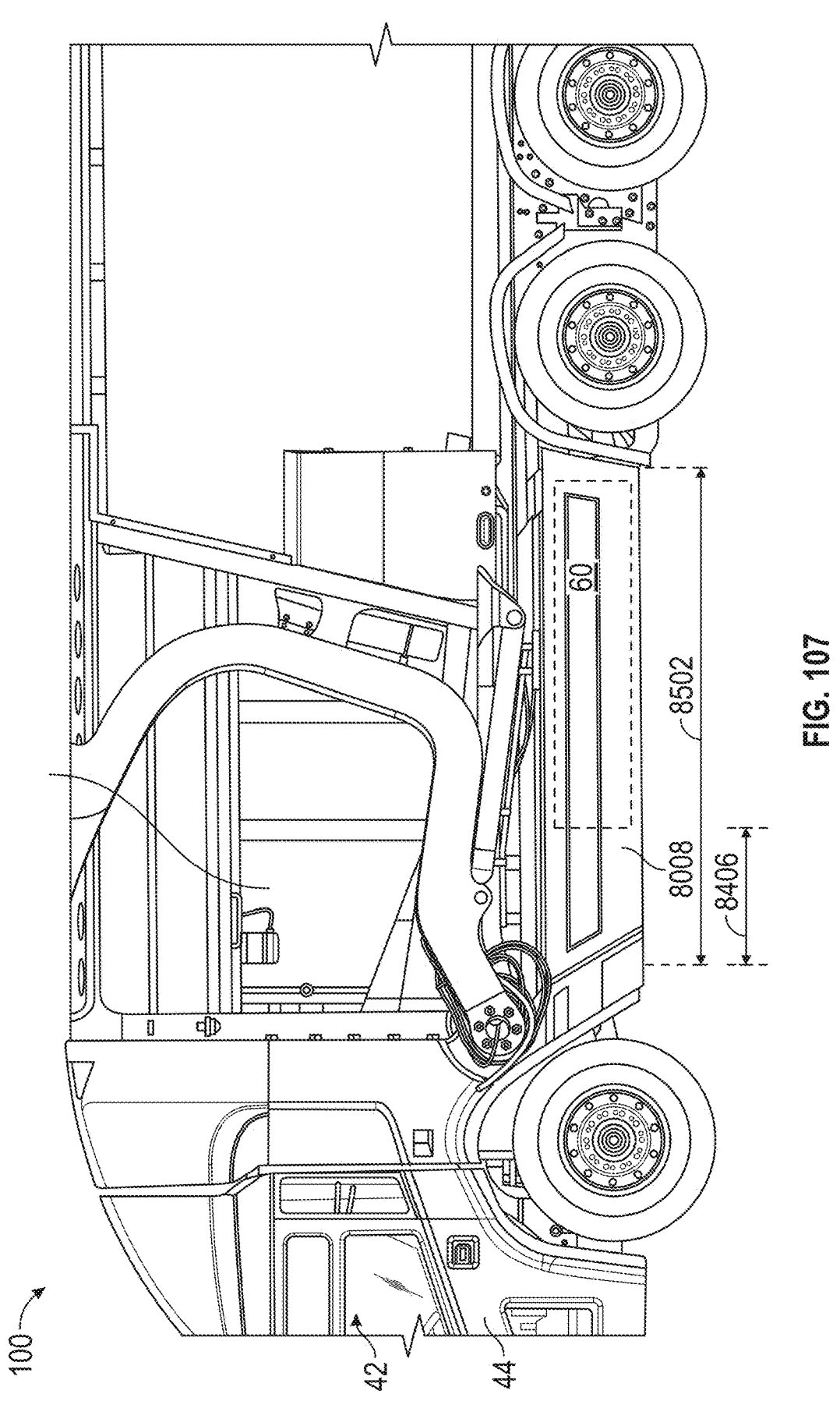
FIG. 107 is a side view of a front-loading refuse vehicle, according to an exemplary embodiment.
Figure 112:
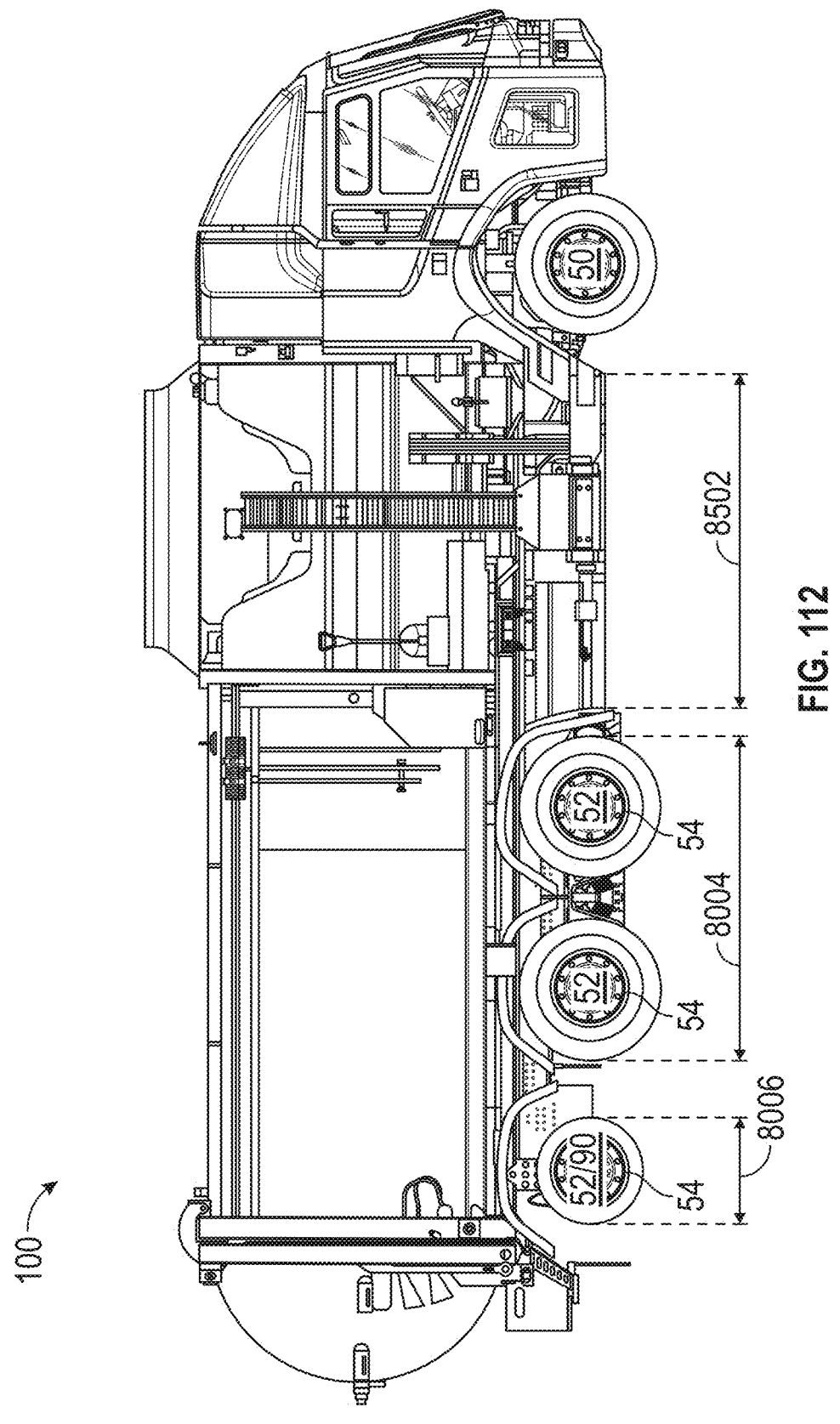
FIG. 112 is a depiction of a side view of a side-loading refuse vehicle including a tag axle, according to an exemplary embodiment.
Figure 113:
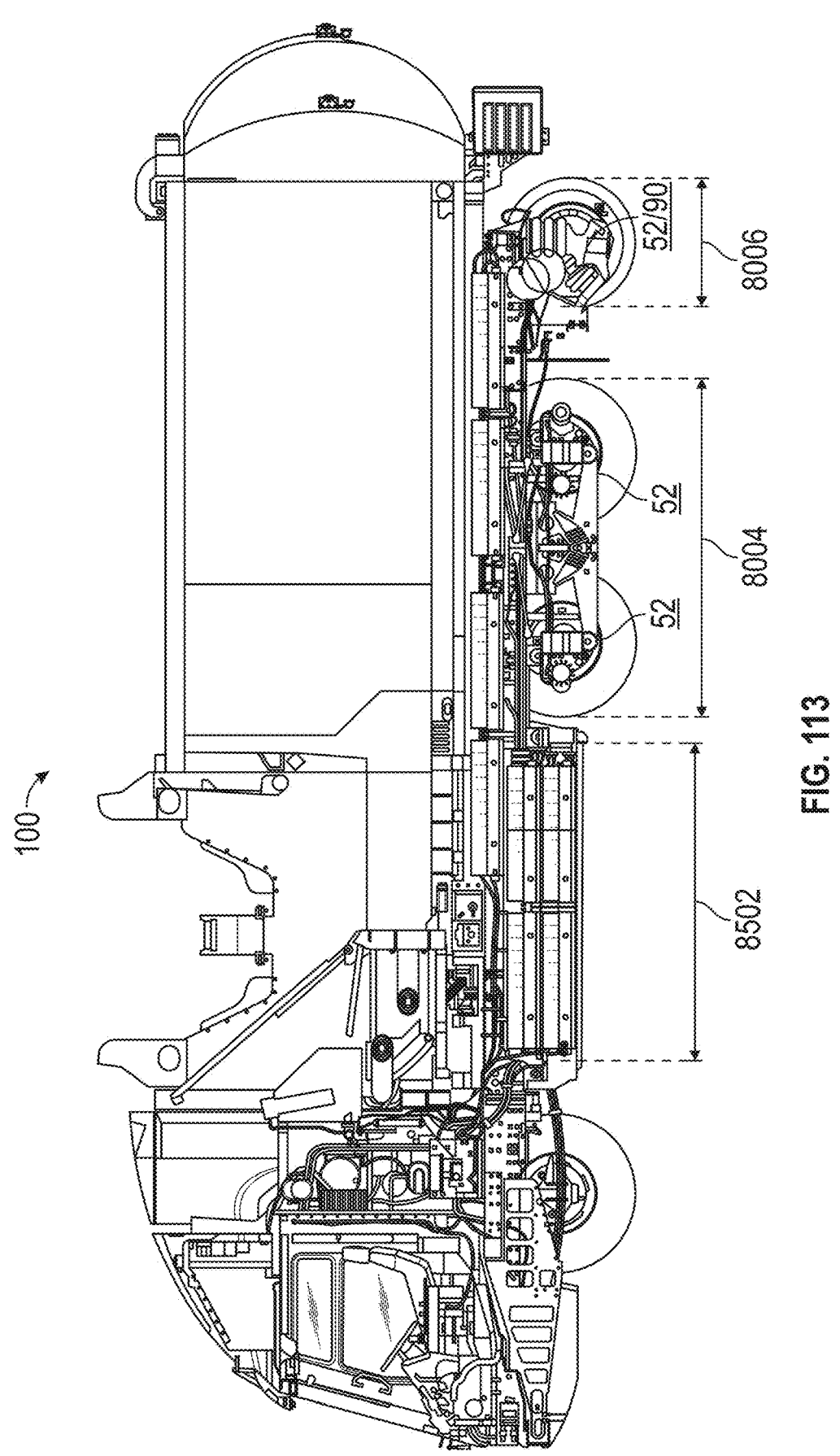
FIG. 113 is a cross sectional side view of a front-loading refuse vehicle including a tag axle, according to an exemplary embodiment.

Referring now to FIGS. 106 and 107, a side view of a side-loading refuse vehicle 100 is provided according to an exemplary embodiment. The refuse vehicle 100 includes rear axles 52 in the first position 8002 of FIG. 100. As depicted, a longitudinal distance 8502 between a wheel well for a frontmost rear axle 52 and a wheel well for a rearmost front axle 50 can include batteries 60 (e.g., various combinations of battery packs), shown covered by a side-plate 8008. The longitudinal distance 8502 can include a battery dimension and a longitudinal offset distance 8406, such that further embodiments of the vehicle 10 (e.g., as depicted, henceforth, at FIG. 112) can include lesser longitudinal distances 8502. Longitudinal distances 8502, as for the depicted illustrative example, can be coextensive with a mid-beam 8504 of the vehicle, such that the batteries extend longitudinally rearward beyond the mid-beam 8504 in one configuration, and do not extend longitudinally rearward beyond the mid-beam 8504 in another configuration (e.g., as depicted in FIG. 112 or 113). The batteries 60 can include two or more rows of batteries laterally staggered across the width of the side-loading refuse vehicle 100, or can be employed in various other configurations, or for various other vehicles 10. For example, as is depicted at FIG. 107, an opposite side of a vehicle 10 can include a substantially symmetrical side-plate 8008 between laterally opposite wheel wells. Various of the depicted configurations can be employed by various vehicle 10 types including the depicted front-loading refuse vehicle 100, mixer truck 200, ARFF truck 300, or other vehicles 100 including at least the vehicles 10 depicted herein.

Figure 108:
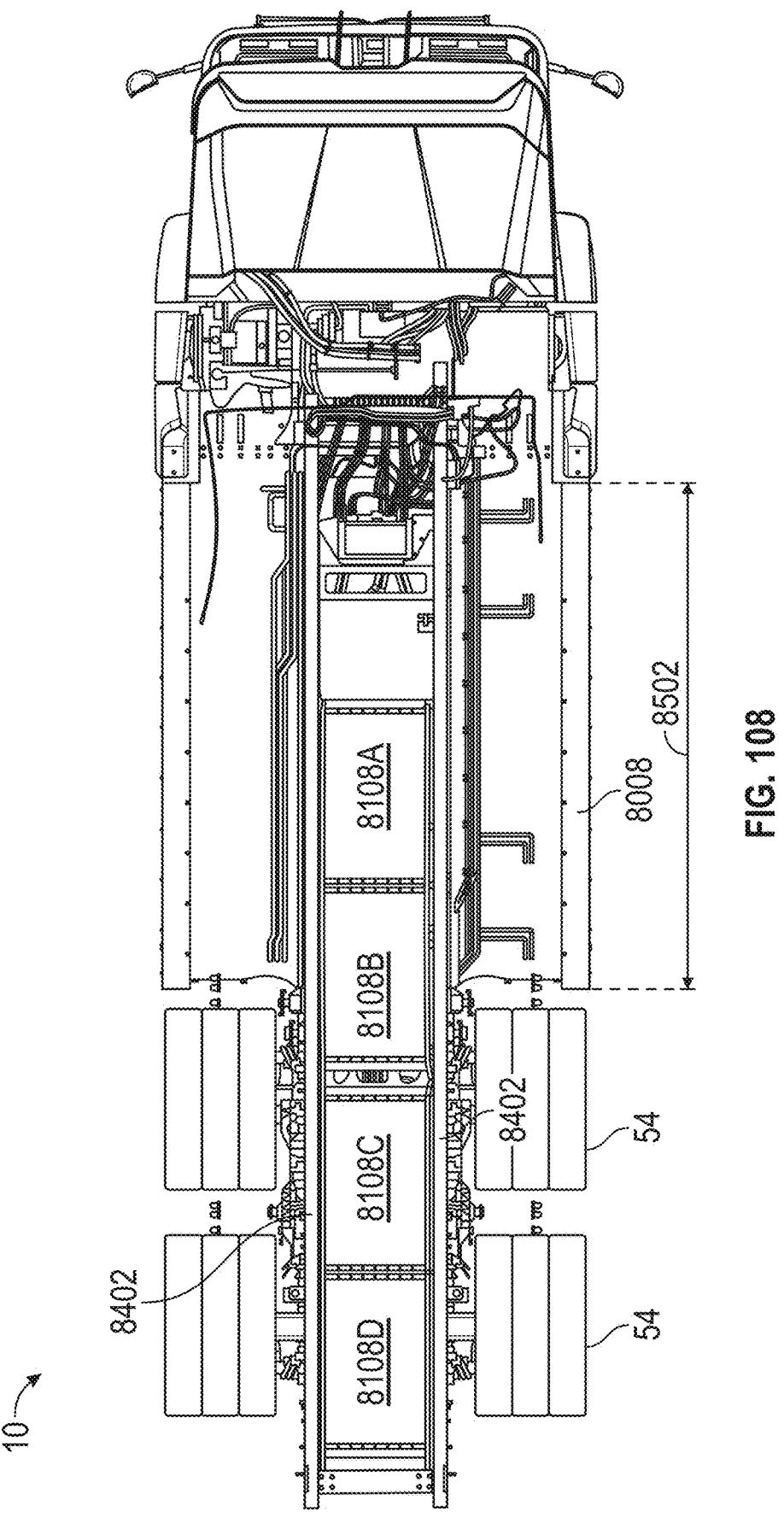
FIG. 108 is a top view of a vehicle including batteries disposed between frame rails, according to an exemplary embodiment.

Referring now to FIG. 108, a top view of a vehicle 10 including batteries 60 between first and second frame rails 8402 is provided according to an exemplary embodiment. The frame rails 8402 can further couple with a battery housing along a longitudinal distance 8502 between front and rear axles 52 of the vehicle 10. The longitudinal distance 8502 can include a first portion configured to receive at least a portion of the batteries 60 (e.g., one or more battery packs), and a further longitudinal offset distance 8406. In some embodiments, the longitudinal offset distance 8406 can be reduced or employed for other vehicle functions. For example, the longitudinal distance 8502 can be reduced to conform to an adjusted mounting location for one or more rear axles 52 and a longitudinal offset distance for the batteries 60. In some embodiments, a storage compartment, pneumatic storage, or other assemblage can occupy the longitudinal offset distance 8406.

Figure 109:
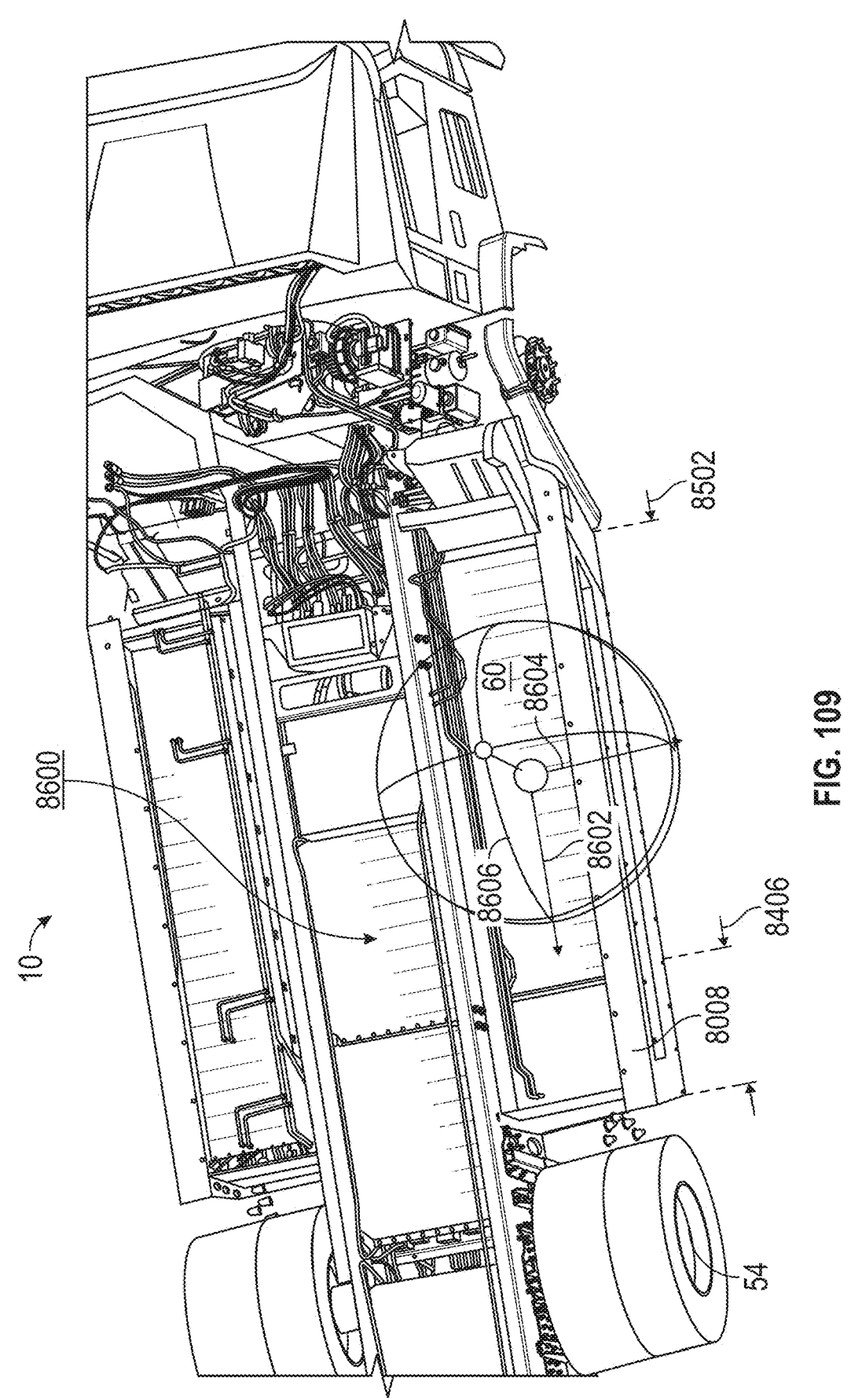
FIG. 109 is a depiction of a battery position, according to an exemplary embodiment.

Referring now to FIG. 109, a depiction of a battery position is provided according to an exemplary embodiment. For example, the battery position can be provided in a forward position of the longitudinal distance 8502, such that the longitudinal offset distance 8406 is disposed rearward of the battery. The position is provided along with an axis 8600 for the vehicle 10 including a longitudinal 8602, transverse (lateral) 8604, and vertical 8606 dimensions. The longitudinal offset distance 8406 can be occupied by a forward disposition of a rear axle 52. The side-plate 8008 can be reduced by a distance corresponding to an accommodation for the forward position of the rear axle 52.

Figure 110:
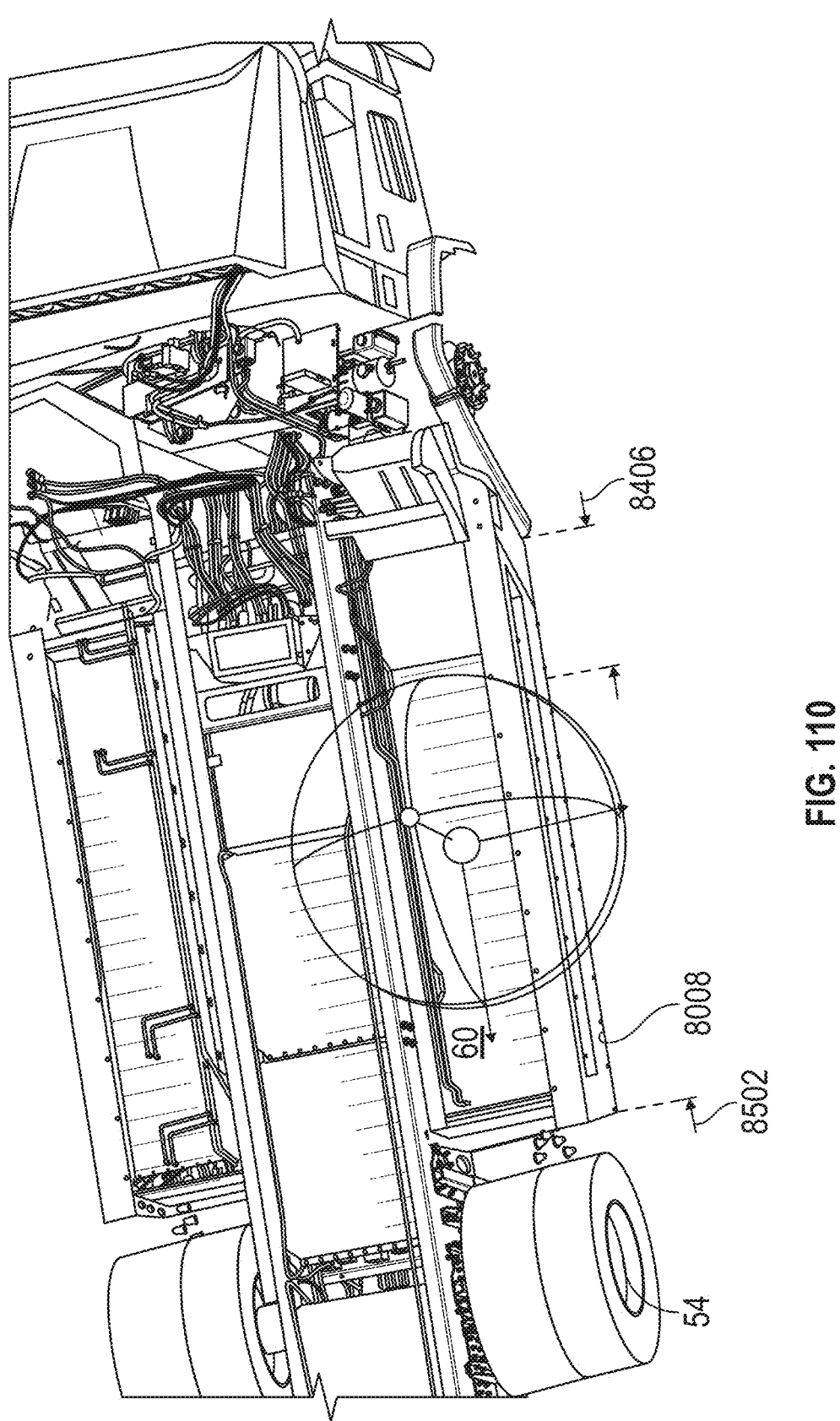
FIG. 110 is a depiction of an adjusted battery position, relative to the battery position of FIG. 109, according to an exemplary embodiment.

Conversely, in FIG. 110, an adjusted battery position, relative to the battery position of FIG. 109 is provided according to an exemplary embodiment. The adjusted position is a longitudinally offset location, relative to the position depicted in FIG. 109 (e.g., transposed along the longitudinal 8602 axis). Further examples of longitudinally offset locations are provided throughout the present disclosure. The depicted position can correspond to a rear axle in the indicated position, such that the longitudinal offset distance 8406 can remain forward of the battery 60. As indicated above, the side-plate 8008 can cover the longitudinal offset distance 8406, which can include various components of the vehicle 10, or can be provided as a storage area, or other compartment for vehicle equipment, or reserved for retrofit applications of further equipment. The side-plate 8008 can include a removable panel arranged forward of the forwardmost rear axle that is removed when the axles are in the tag axle (e.g., forward configuration) at the second position 8004. That is, at least a portion of the side-plate 8008 can be omitted in a configuration of the first position 8002.

The first position 8002 can include two rear axles 52 in the rear position and omit a tag axle 90, as depicted above with regard to FIG. 100. Batteries 60 can be a rear position within the battery box, or otherwise underslung from the frame rails 8402. Further batteries 60 can be disposed between the frame rails 8402 in a position common to various configurations. Some of the batteries (e.g., a first string) may not extend above an upper surface of the frame rails; other of the batteries (e.g., a second string) may extend above an upper surface of the frame rails. Further, in the first configuration the removable panel in the side-plate 8008 between battery box and the rear axles 52 can be included to reduce a gap between the batteries 60 (e.g., battery box or other intermediate member) and the rear axles 52 (e.g., a wheel and tire assembly coupled therewith).

In a second configuration, two rear axles 52 can be included in front position. A tag axle 90 can be included behind the rear axles 52. Batteries 60 can be disposed in a front position (e.g., within the battery box). The batteries 60 between the frame rails 8402 can be disposed in a same position as the first configuration. The removable panel of the side-plate 8008 can be omitted, wherein the relatively forward position of the rear axles 52 reduces a gap, relative to the first configuration. For example, a longitudinal dimension of the removable panel can be a same distance as a longitudinal dimension between the axles in the first position 8002 and second position 8004. That is, a gap between the side-plate 8008 in the first position 8002 and second position 8004 can be similar.

Figure 111:
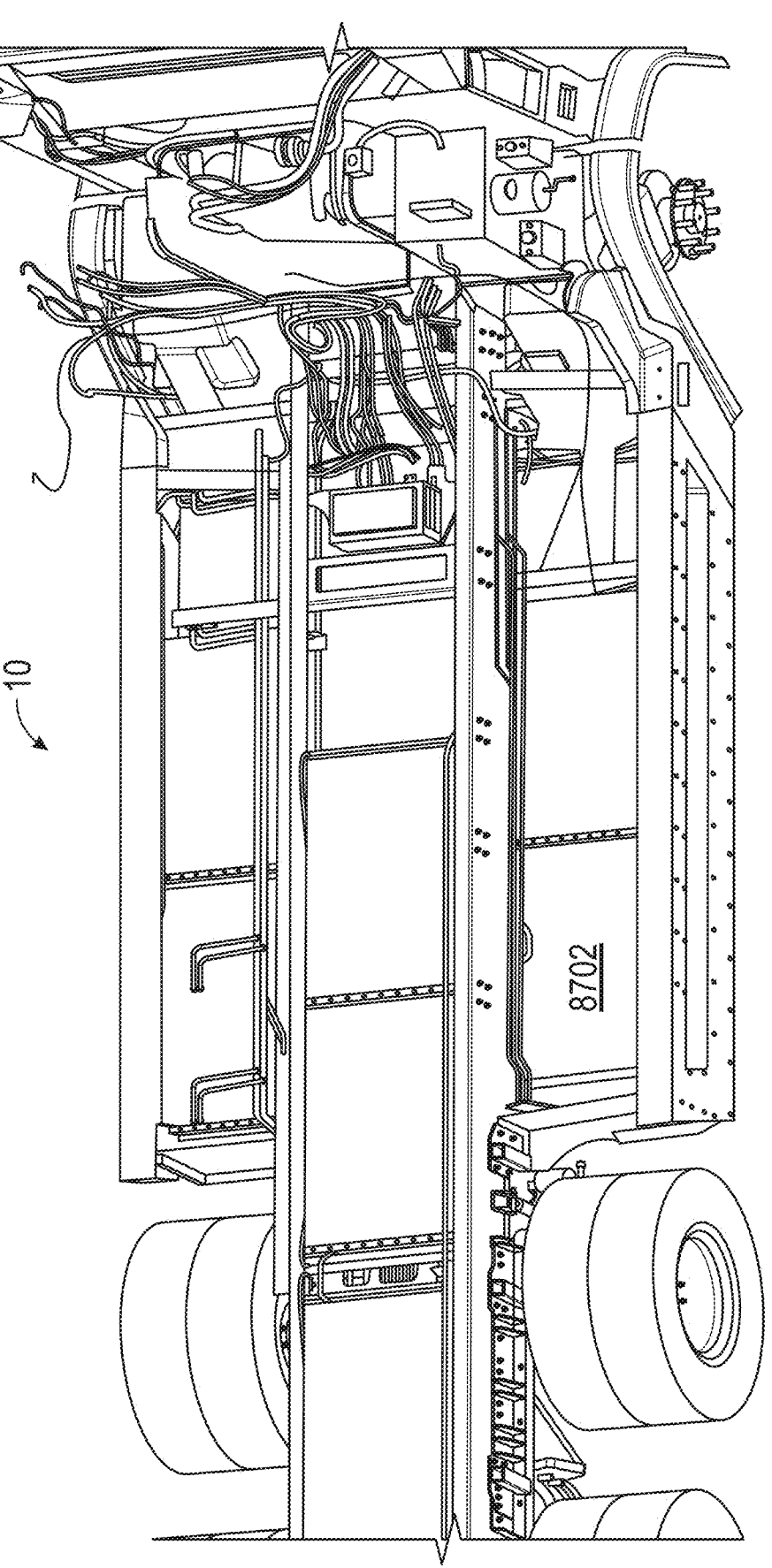
FIG. 111 is a depiction of a constituent battery module in the position corresponding to the battery position of FIG. 110, according to an exemplary embodiment.

Referring now to FIG. 111, a constituent battery module 8702 in the position corresponding to the battery position of FIG. 110, is provided. The battery module 8702 can include various battery cells, terminals, conductive elements, etc. The battery module 8702 can further include or interface with a battery management system including one or more sensors, actuators to cause the battery to charge or discharge, or open and close a circuit, and a battery controller 8110. According to various embodiments of the present disclosure, the battery module 8702 can be arranged with further battery modules of a system to form a battery system configured to provide propulsive effort to one or more driven axles of the vehicle (e.g., one or more rear axles 52 or front axles 50). The battery controller 8110 can further be configured to charge the batteries 60, such as via energy received from the axles (e.g., regenerative braking) or from a charge port.

The battery modules can be mechanically or electrically coupled to realize various charge capacities, operating voltages, etc. For example, a module can refer to or be arrayed into a battery pack of a battery string, or a battery array (e.g., a first 8106A, second 8106B, third 8106C, and fourth battery pack 8106D of a third battery string 8106).

Referring now to FIGS. 112 and 113, side views of a refuse vehicle 100 including a tag axle 90 is provided according to an exemplary embodiment. The refuse vehicle 100 includes rear axles 52 in the second position 8004 and third position 8006 of FIG. 100. In some embodiments, the rear axle 52 in the third position 8006 can be a tag axle 90, as is depicted as a selectively deployable tag axle 90. As is further depicted, the longitudinal distance 8502 between a wheel well for a frontmost rear axle 52 and a wheel well for a rearmost front axle 50 can be less than the longitudinal distance 8502 depicted in FIG. 106, by an amount equal to the longitudinal offset distance 8406 thereof. For example, the frame rails 8402 or one or more intermediate members (e.g., load bearing member of the chassis 20) can include mounting locations for the batteries 60 in either a forward or rearward position, and further include mounting locations for the rear axles 52 for any of the first position 8002, the second position 8004, or the third position 8006. The batteries 60 can be configured as depicted in FIG. 113 in various vehicles such as the side loading refuse vehicle 100, front loading refuse vehicle 100, mixer truck 200, ARFF truck 300, or other vehicles 10 including, but not limited to the vehicles depicted herein. Although the cut view of FIG. 113 depicts a cut plane extending between the frame rails 8402, further batteries 90 may be disposed forward or rearward of the depicted cut plane (e.g., leftward or rightward on the vehicle).

Figure 114:
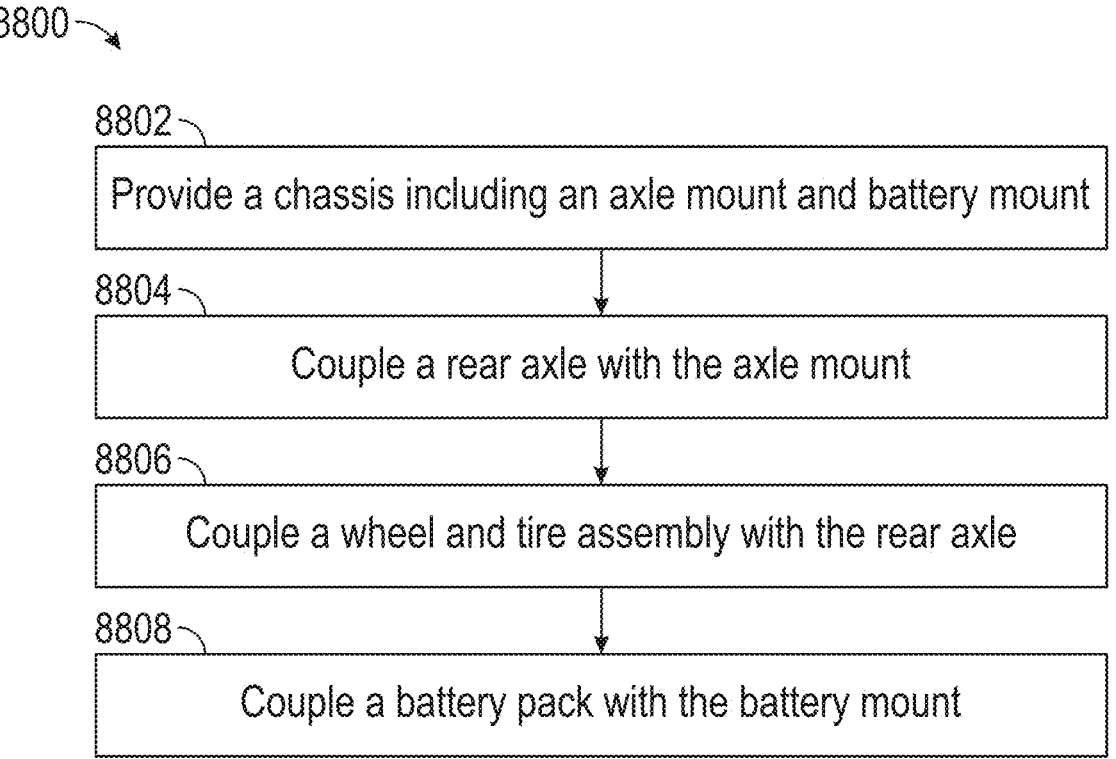
FIG. 114 is a method of manufacture for electric vehicles, according to an exemplary embodiment.
Figure 115:
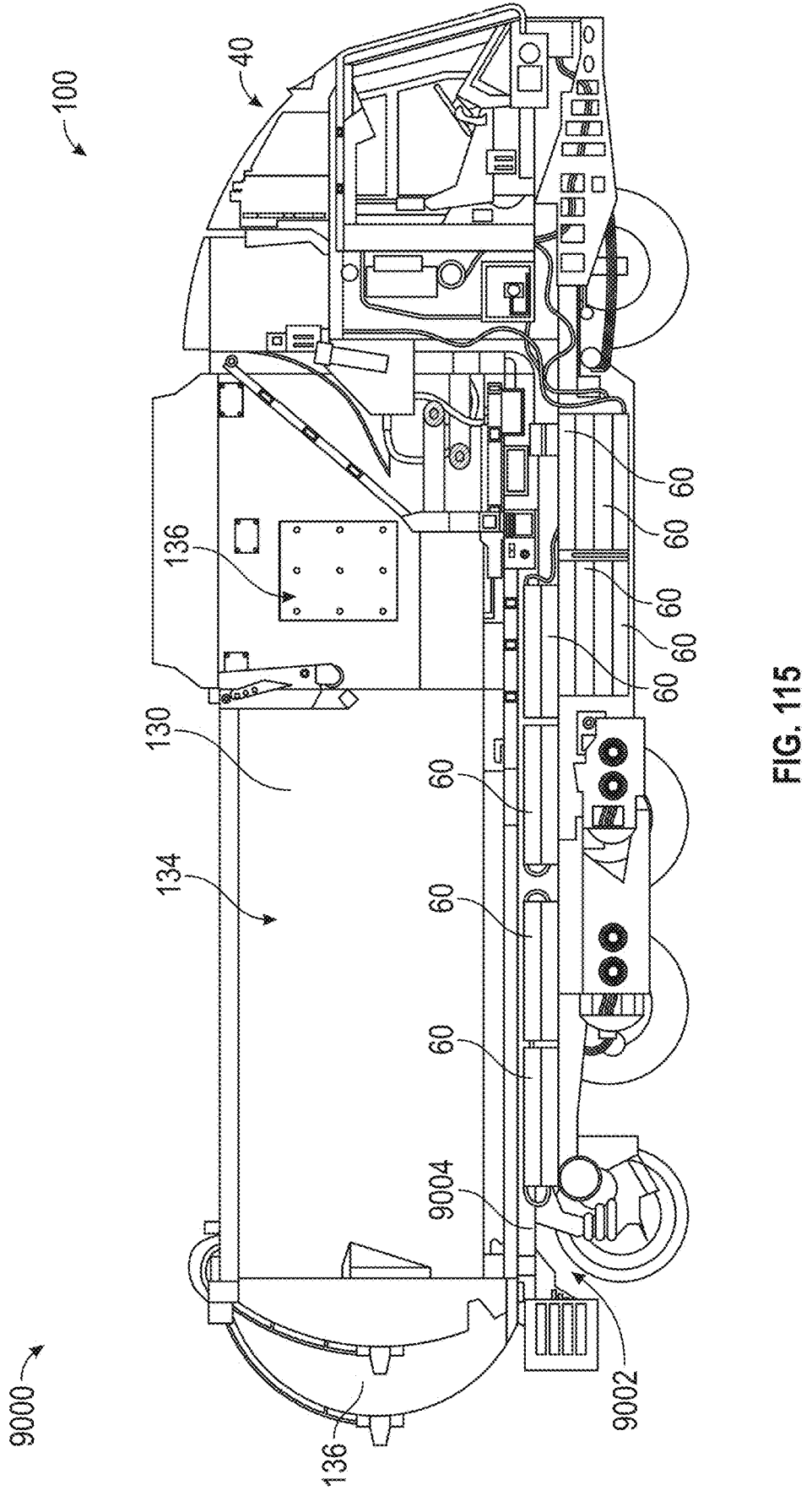
FIG. 115 is a right side view of the front-loading refuse vehicle of FIG. 3 configured with a tag axle.

Referring now to FIG. 114, a method 8800 of vehicle manufacture is provided. At operation 8802, the method includes providing a chassis including two frame rails 8402 disposed along a longitudinal axis of an electric vehicle. The chassis includes a plurality of axle mounts for a rear axle comprising a first axle mount and a second axle mount, the second axle mount disposed rearward of the first axle mount. For example, such axle mounts may be coupled with the frame rails, directly or otherwise. The chassis includes a plurality of battery mounts for battery packs including a first battery mount and a second battery mount, the second battery mount configured to mount batteries rearward of batteries mounted to the first battery mount.

At operation 8804, the method includes coupling a rear axle with the first axle mount. The rear axle of operation 8804 can include, for example, a tag axle 90 or another rear axle 54, such as a paired set of tandem axles. The tandem axles may each be coupled separately to the frame rails 8402 via distinct axle mounts of the frame rails 8402, or via an intervening common member (e.g., a shared suspension member coupled with the axles of the tandem axle). In some embodiments, axle mount components may be removed or added to the frame rails 8402 to couple with axles. For example, mounting hardware may be selectively populated at selected axels and removed from or otherwise omitted from unselected areas. In some instances, a vehicle chassis is provided as a kit which may be assembled according to various axle configuration. In some instances, a vehicle chassis is provided according to a pre-selected configuration, as may be modified to generate vehicles having various axle configurations.

At operation 8806, the method includes coupling a wheel and tire assembly with the rear axle. Like other operations of the present disclosure, operations 8804 and 8806 can be performed according to various sequences, suboperations, and so forth. For example, operation 8806 may be performed prior or subsequent to operation 8804, according to various manufacturing workflows.

At operation 8808, the method includes coupling the battery pack with the first battery mount. A pitch between the first axle mount and the second axle mount exceeds a longitudinal distance between the rear face of the battery pack and a front face of the wheel and tire assembly. Accordingly, miss-assembly of a vehicle may be avoided. For example, axles or wheel and tire assemblies 54 coupled therewith may be configured to interfere with one another if non-compatible combinations of axle mounts are populated.

The present method 8800 may be performed with various of the systems provided herein, their combination, or with further systems. In an embodiment, the system can include a chassis for a vehicle comprising a plurality of frame rails. The plurality of frame rails can be configured to couple with a plurality of rear axles at a plurality of axle mounts comprising a first, frontmost of the plurality of axle mounts for the rear axles spaced a longitudinal distance from a second of the plurality of axle mounts for the rear axles, a longitudinal pitch between any of the plurality of rear axles exceeding the longitudinal distance. The plurality of frame rails can be configured to couple with a plurality of intermediate members. The intermediate members can include a first intermediate member configured to couple with a battery pack in a first position. The intermediate members can include a second intermediate member configured to couple with the battery pack in a second position longitudinally offset from the first position.

In some embodiments, the first position overlaps with at least a portion of the second position.

In some embodiments, the system includes an axle assembly comprising a wheel and tire assembly coupled with the first of the plurality of axle mounts, the axle assembly longitudinally occupying at least a portion of the first position.

In some embodiments, the first of the plurality of axle mounts is configured to receive a third intermediate member coupled with a tandem axle assembly comprising the axle assembly and a second axle assembly, wherein at least one of the plurality of rear axles is a tag axle disposed rearward of the tandem axle assembly.

In some embodiments, the third intermediate member is a component of a beam-type suspension configured to transfer forces between the axle assembly and the second axle assembly.

Hydraulic System

According to an exemplary embodiment, a vehicle includes a chassis assembly, a body assembly, and a hydraulic system. The chassis assembly includes rail portions and a plurality of batteries positioned between the rail portions that are configured to provide electrical power to the vehicle. The body assembly is configured to be attached to the chassis assembly and to be supported by the rail portions of the chassis assembly. The body assembly includes a first body rail and a second body rail. The batteries of the chassis assembly protrude above a top surface of the rail portions of the chassis assembly, resulting in the batters protruding into an inner volume of the body positioned between the first body rail and the second body rail when the body assembly is attached to the chassis assembly. The hydraulic assembly is attached to the body assembly and is configured to pressurize a hydraulic fluid that is used to operate accessories (e.g., lift arms, tailgates, pivot assemblies, topdoors, tailgate locking assemblies, compactors, etc.) of the body assembly. The hydraulic assembly includes an electric power takeoff, a first manifold, and a second manifold. The electric power take off is configured receive electrical power and utilize the electrical power to pressurize the hydraulic fluid. The first manifold is fluidly coupled to the electric power takeoff by first conduits and is configured to distribute a first portion of the hydraulic fluid to a first set of accessories (e.g., lift arms, actuation accessories, etc.) through additional conduits. The first conduits extend through at least one of the first body rail or the second volume rail to avoid a portion of the inner volume of the body assembly where the batteries are located when the body assembly is attached to the chassis assembly. The second manifold is positioned proximate a rear side of the vehicle (e.g., rearward of the first manifold, etc.). The second manifold is fluidly coupled to the first conduits by second conduits and is configured to distribute a second portion of the hydraulic fluid to a second set of accessories (e.g., a tailgate, a tailgate locking assembly, a topdoor, etc.) through additional conduits. The second conduits are positioned outside of the inner volume of the body assembly to avoid the portion of the inner volume of the body assembly where the batteries are located when the body assembly is attached to the chassis assembly. The second conduits may require additional protection due to the second conduits being located outside of the first body rail and the second body rail. This arrangement allows for only a single set of conduits (e.g., the second conduits, etc.) to be positioned outside of the inner volume between the first manifold and the second manifold, reducing the number of conduits that require additional protection due to being located outside of the first body rail and the second body rail.

Referring to FIGS. 115-131, an example embodiment of the refuse vehicle 100 is shown. The application kit 80 of the refuse vehicle 100 may be configured as application kit 9000. According to the example embodiment shown in FIGS. 116-131, the refuse vehicle 100 is configured as a front-loading refuse vehicle and the application kit 9000 is configured for use with the front-loading refuse vehicle. Although FIGS. 116-131 show the refuse vehicle 100 configured as a front-loading refuse vehicle and the application kit 9000 configured for use with the front-loading refuse vehicle, it should be understood that the application kit 9000 may be configured for use with other applications that are not shown as described in relation to the application kit 80 herein. For example, the refuse vehicle 100 may be configured as a side-loading refuse vehicle and the application kit 9000 may be configured for use with the side-loading refuse vehicle. Additionally, the application kit 9000 may be configured for use with any of the other applications of the vehicle 10 discussed herein (e.g., the mixer truck 200, the fire fighting vehicle 250, the ARFF truck 300, the boom lift 350, the scissor lift 400, etc.).

Figure 116:
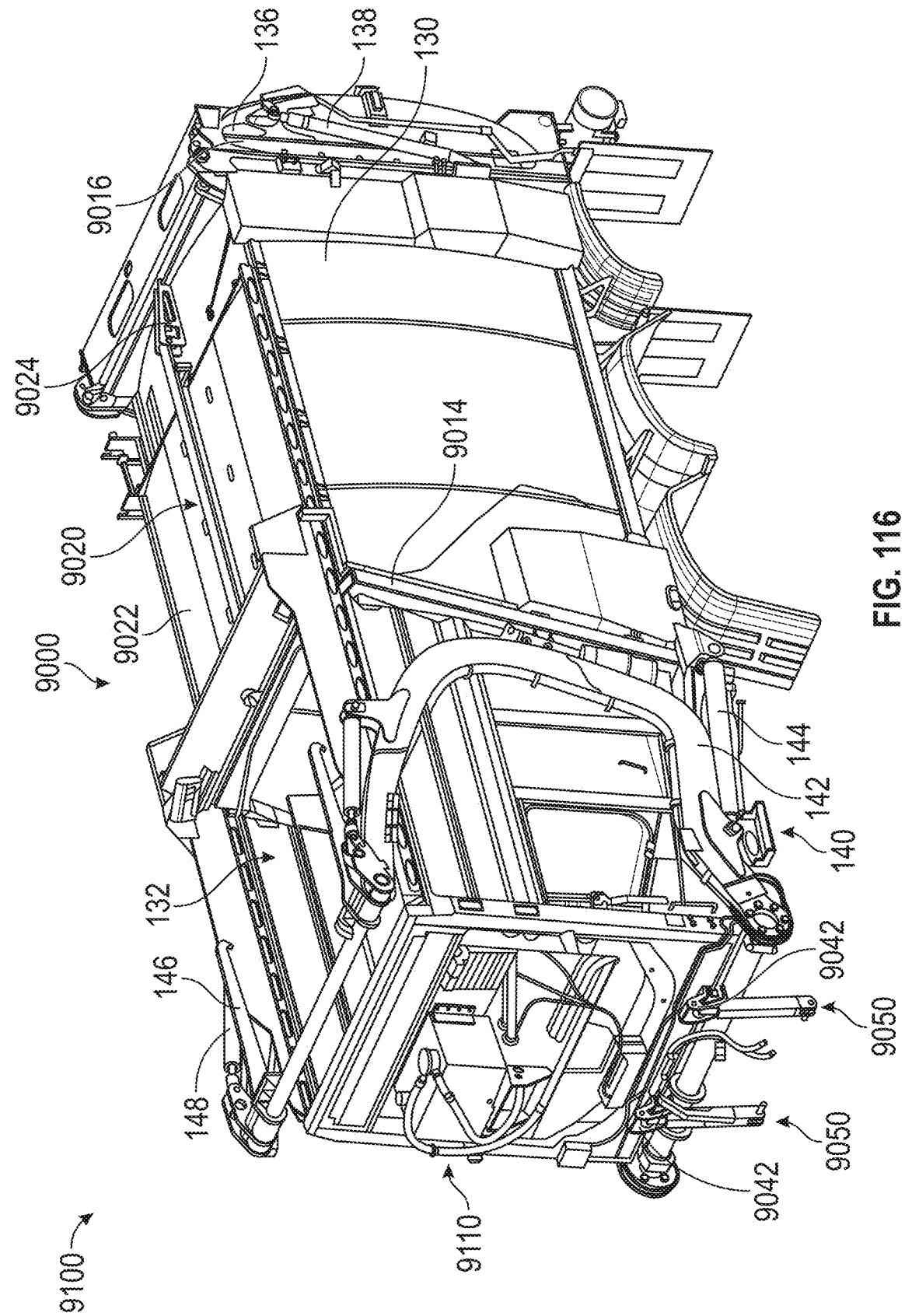
FIG. 116 is a perspective view of a body of the front-loading refuse vehicle of FIG. 3.
Figure 117:
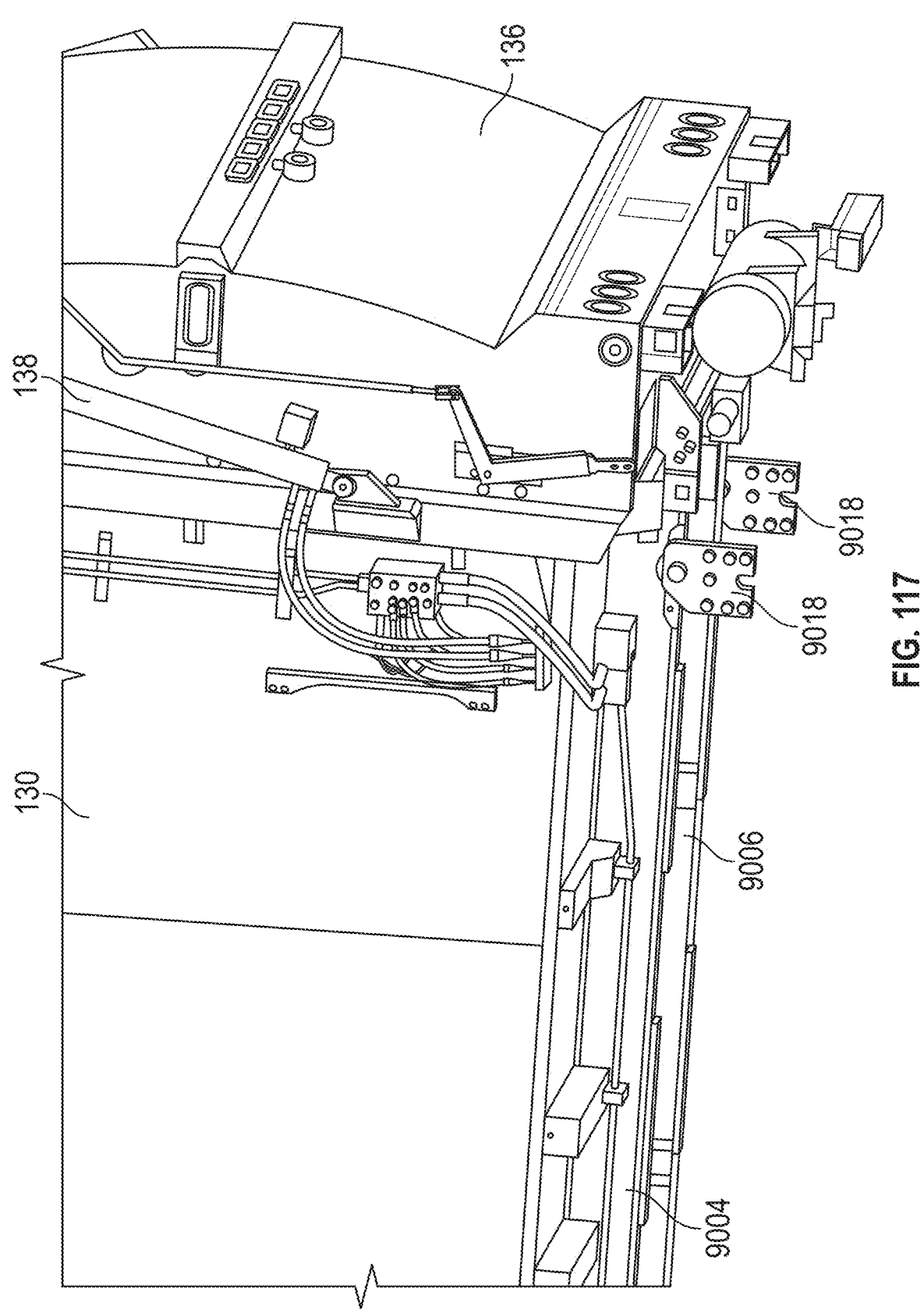
FIG. 117 is a rear perspective view of the body of the front-loading refuse vehicle of FIG. 116.
Figure 118:
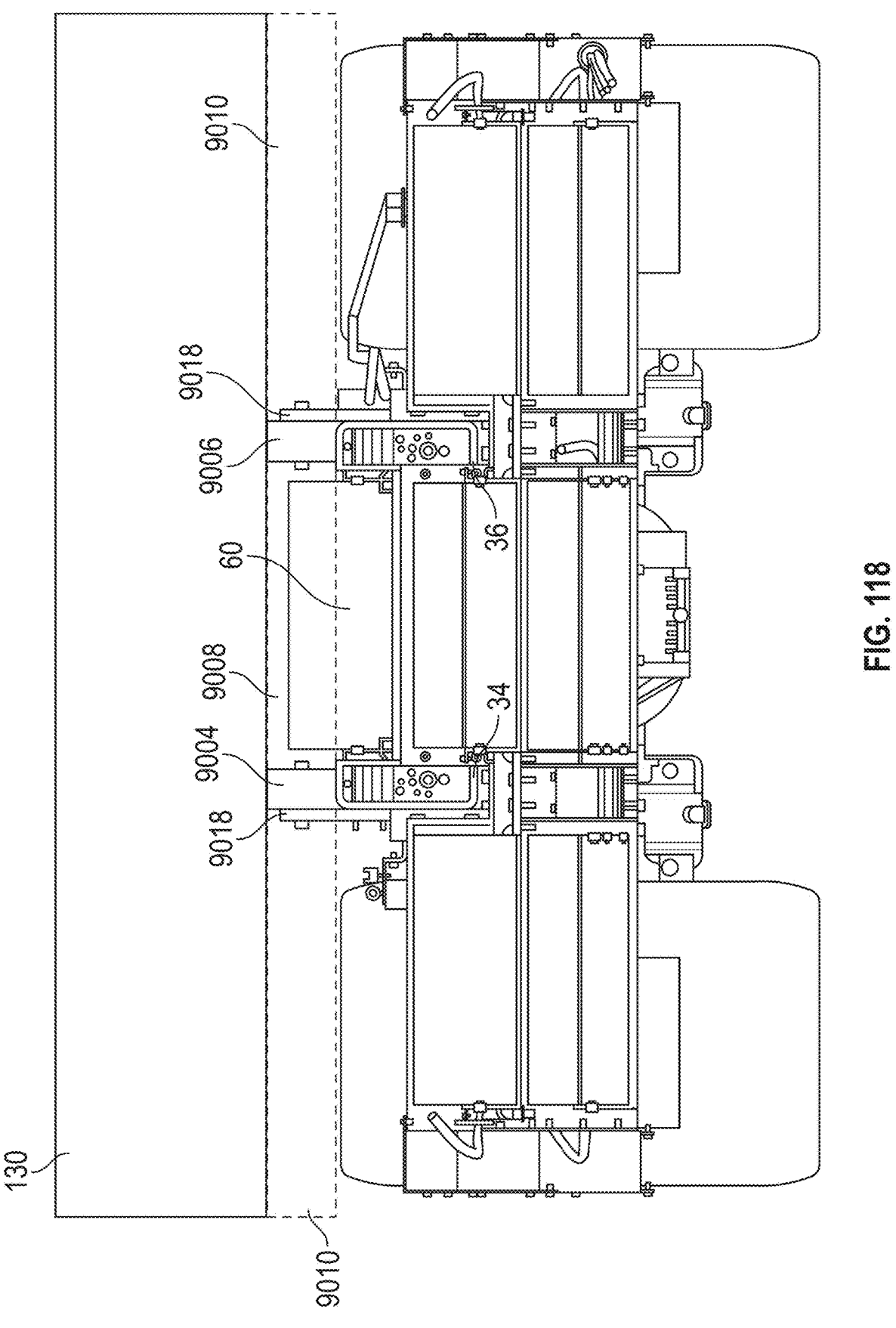
FIG. 118 is a rear view of the vehicle of FIG. 1.
Figure 120:
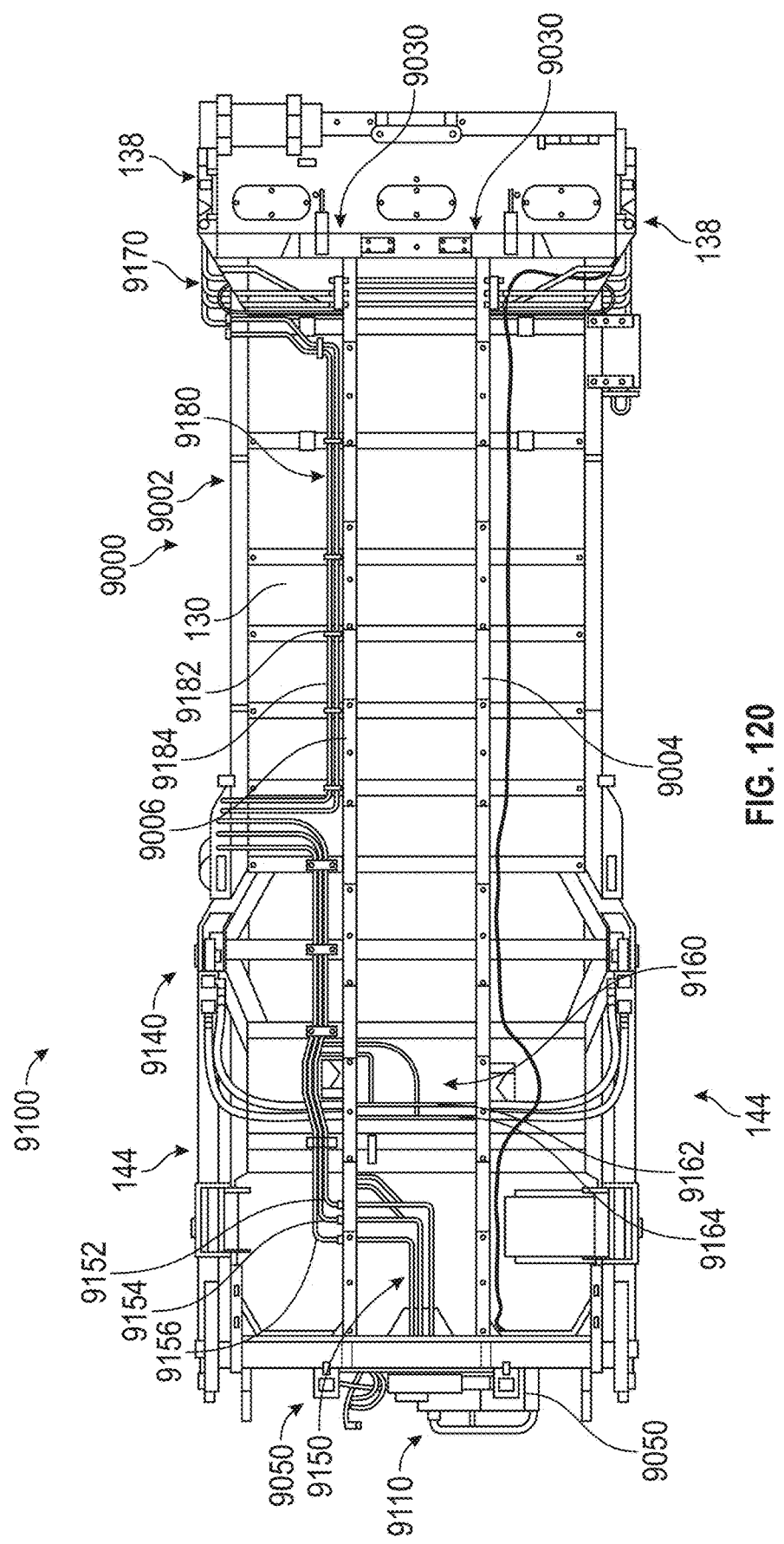
FIG. 120 is a bottom view of the body of the front-loading refuse vehicle of FIG. 116.

According to the example embodiment shown in FIGS. 116-118, the application kit 9000 includes a body 9002. Referring to FIGS. 117, 118, and 120, the body 9002 includes a pair of body rails (e.g., body portions, body members a left body rail and a right body rail, frame rails, etc.), shown as first body rail 9004 and second body rail 9006. The first body rail 9004 is laterally offset from the second body rail 9006. This spacing may provide body stiffness and space for vehicle components (e.g., batteries, conduit, etc.) between the first body rail 9004 and the second body rail 9006. In some embodiments, the first body rail

9004 and the second body rail 9006 extend longitudinally and substantially parallel to one another. The body 9002 may include additional structural elements (e.g., cross members that extend between and couple the first body rail 9004 and the second body rail 9006, etc.). In other embodiments, the body 9002 may include only one of the body rails or may include more than two of the body rails (e.g., a third body rail, a fourth body rail, etc.).

According to the example embodiment shown in FIGS. 115-131, the body 9002 further includes the series of panels that form the refuse compartment 130. The refuse compartment 130 is coupled to the first body rail 9004 and the second body rail 9006 and positioned above the first body rail 9004 and the second body rail 9006. According to the exemplary embodiment shown in FIGS. 115-131, the application kit 9000 further includes the tailgate 136, that is pivotally coupled to the refuse compartment 130. The tailgate 136 may be selectively repositionable between a closed position (e.g., a closed configuration, etc.) and an open position (e.g., an open configuration, etc.) by the tailgate actuator 138.

As shown in FIGS. 115-131, the example embodiment of the refuse vehicle 100 includes the lift assembly 140. The lift arms 142 of the lift assembly 140 are rotatably coupled to the refuse compartment 130 on each side of the refuse vehicle 100 such that the lift assembly 140 may extend forward relative to the cab 40. The lift arm actuators 144 re positioned such that extension and retraction of the lift arm actuators 144 rotates the lift arms 142 about an axis extending through the pivot. For example, the lift arm actuators 114 may rotate the lift arms 142 between a raised configuration and a lowered configuration. The lift forks 146 are each pivotally coupled to a distal end of one of the lift arms 142. The articulation actuators 148 are positioned to rotate the lift forks 146 relative to the lift arms 142 about a horizontal axis. In other embodiments, the refuse vehicle 100 is configured as a side-loading refuse vehicle and includes the lift assembly 160. In other embodiments, the refuse vehicle 100 may include the lift assembly 160 (e.g., a side-loading lift assembly, etc.) or another type of lift assembly (e.g., a rear-loading lift assembly, an intermediate container lift assembly, etc.). In still other embodiments, the vehicle 10 may not include a lift assembly.

The first body rail 9004 and the second body rail 9006 may define a body rail cavity (e.g., lower body cavity, body battery cavity, body rail volume, etc.), shown as inner volume 9008, positioned between the first body rail 9004 and the second body rail 9006. The inner volume 9008 may be configured to receive vehicle components (e.g., the batteries 60, a portion of the chassis 20, a portion of the front axle 50, a portion of the rear axles 52, etc.). The (i) first body rail 9004 and the second body rail 9006 and (ii) the body 9002 may define a pair of external cavities (e.g., outer cavities, etc.), shown as outer volumes 9010.

According to the example embodiment shown in FIG. 118, the inner volume 9008 is configured to receive at least one of the batteries 60 when the body 9002 is coupled to the chassis 20. A selection of the batteries 60 are positioned within the middle section 24 of the chassis 20 and extend above a top surface of the chassis 20, such that a portion of each of the selection of the batteries 60 may be positioned within the inner volume 9008. In some embodiments, the inner volume 9008 is configured to receive an entirety of at least one of the batteries 60 when the body 9002 is coupled to the chassis 20. For example, one of the batteries 60 may be positioned above a top surface of the chassis 20 such that the inner volume 9008 may receive the one of the batteries 60.

Figure 124:
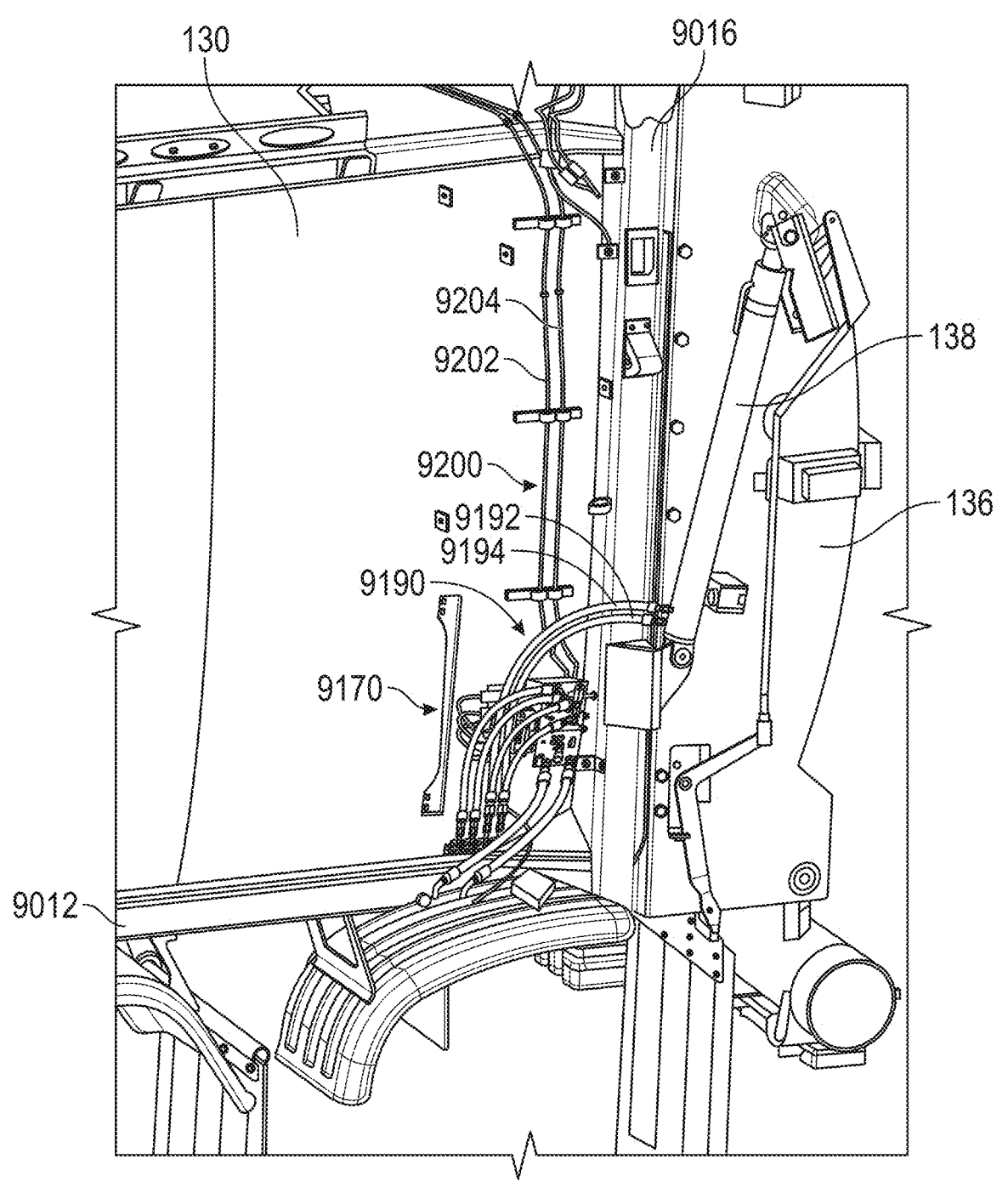
FIG. 124 is a perspective view of a portion of the hydraulic system of the front-loading refuse vehicle of FIG. 116.

Referring to FIG. 124, the body 9002 further includes a pair of external longitudinal members (e.g., outer body members, body guards, etc.) shown as outer guards 9012, according to some embodiments. The outer guards 9012 are coupled to a bottom surface of the refuse compartment 130 and positioned outside of the first body rail 9004 and the second body rail 9006. In some embodiments, the outer guards 9012 may be positioned substantially parallel to the first body rail 9004 and the second body rail 9006. The outer guards 9012 may be configured to limit an ability of objects to enter the outer volumes 9010. For example, the outer guards 9012 may prevent an object approaching from a side of the refuse vehicle 100 from entering the outer volumes 9010.

Referring to FIG. 116, the body 9002 further includes a pair of midposts (e.g., first vertical posts, center pillars, etc.), shown as midposts 9014, according to some embodiments. The midposts 9014 are each coupled to an outside surface of the refuse compartment 130. In some embodiments, the midposts 9014 are configured to support the panels of the refuse compartment 130. According to the example embodiment shown in FIG. 116, the midposts 9014 are slightly angled relative to a vertical axis. In other embodiments, the midposts 9014 are vertical or substantially vertical. In some embodiments, the midposts 9014 are positioned between the hopper volume 132 and the storage volume 134 of the compartment 130. For example, the midposts 9014 may support a separation element configured to separate the hopper volume 132 and the storage volume 134. In other embodiments, the midposts 9014 may be positioned on an outside surface of the refuse compartment 130 along an outside of the hopper volume 132 or on an outside side surface of the refuse compartment 130 along an outside of the storage volume 134. In still other embodiments, the midposts 9014 may be positioned inside of the hopper volume 132, inside of the storage volume 134, or inside of the refuse compartment 130 between the hopper volume 132 and the storage volume 134.

Still referring to FIG. 116, the application kit 9000 further includes a pair of rearposts (e.g., second vertical posts, rear pillars, etc.), shown as rearposts 9016, according to some embodiments. The rearposts 9016 are each coupled to an outside surface of the refuse compartment 130 proximate the rear side 88 of the body 9002. In some embodiments, the rearposts 9016 are configured to support the panels of the refuse compartment 130. In various embodiments, the rearposts 9016 are configured to support the tailgate 136. For example, the tailgate 136 may be pivotably coupled to the refuse compartment proximate the rearposts 9016 such that the rearposts 9016 support a portion of the load of the tailgate 136 on the refuse compartment 130. In other embodiments, the rearposts 9016 may be positioned inside of the storage volume 134.

Referring to FIGS. 117 and 118, the body 9002 further includes a pair of mounting brackets (e.g., pivot mounts, etc.), shown as pivot brackets 9018, according to some embodiments. A first of the pivot brackets 9018 is rotatably coupled to the first body rail 9004 and a second of the pivot brackets 9018 is rotatably coupled to the second body rail 9006. In some embodiments, the pivot brackets 9018 are rotatably coupled to the first body rail 9004 and the second body rail 9006 with a pin (e.g., an axle, a cylinder, etc.). Each of the pivot brackets 9018 may include a first aperture configured to receive one of the pins and each of the first body rail 9004 and the second body rail 9006 may include a second aperture configured to receive the one of the pins from the corresponding pivot brackets 9018.

According to the exemplary embodiment shown in FIGS. 115-131, the first of the pivot brackets 9018 is configured to be coupled to the rear rail portion 34 of the chassis 20 and the second of the pivot brackets 9018 is configured to be coupled to the rear rail portion 36 of the chassis 20 such that the body 9002 may be rotated relative to the chassis 20 about the pivot brackets 9018. The body 9002 may be rotated upward relative to the chassis 20 such that an underside of the body 9002 may be accessible (e.g., for maintenance, for inspection, etc.). In other embodiments, the first of the pivot brackets 9018 is configured to be coupled to the front rail portion 30 and the second of the pivot brackets 9018 is configured to be coupled to the front rail portion 32. The pivot brackets 9018 may be configured to be coupled to the chassis 20 with a plurality of fasteners. For example, the pivot brackets 9018 may include a first plurality of apertures configured to receive a plurality of fasteners and the chassis 20 may include a second plurality of apertures configured to align with the first plurality of apertures of the pivot brackets 9018 to receive the plurality of fasteners to couple the application kit 9000 to the chassis 20. In other embodiments, the pivot brackets 9018 are coupled to the first body rail 9004 and the second body rail 9006 and are configured to be rotatable coupled to the rear rail portion 34 and the rear rail portion 36 or are configured to be rotatably coupled to the front rail portion 30 and the front rail portion 32 such that the application kit 9000 may be rotated relative to the chassis 20.

Figure 128:
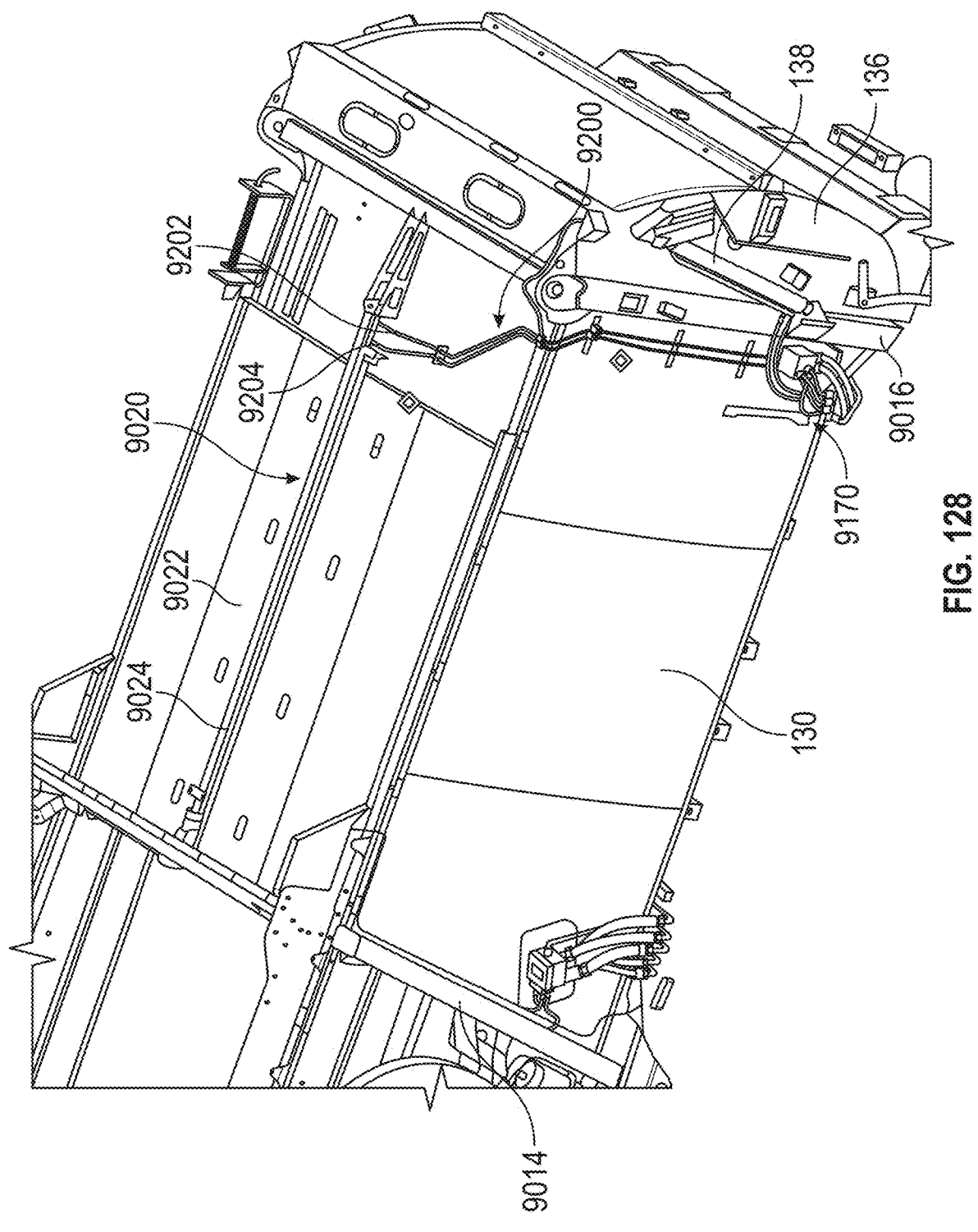
FIG. 128 is a rear perspective view of a top door assembly of the front-loading refuse vehicle of FIG. 116.

Still referring to FIGS. 116 and 128, the application kit 9000 may further include a topdoor assembly (e.g., a cover, a fourth accessory, etc.), shown as topdoor assembly 9020, according to some embodiments. The topdoor assembly 9020 is configured to selectively cover portions of the refuse compartment 130. For example, the topdoor assembly 9020 may selectively cover an opening of the refuse compartment 130 (e.g., an opening in the refuse compartment where the lift assembly 140 may deposit refuse through, etc.). By selectively covering the opening of the refuse compartment 130, refuse may be deposited into the refuse compartment 130 when the topdoor assembly 9020 is not covering the opening and refuse may not exit the refuse compartment 130 (e.g., be ejected from the refuse compartment 130, be blown out of the refuse compartment 130, etc.) when the topdoor assembly 9020 is covering the opening.

Still referring to FIGS. 116 and 128, the topdoor assembly 9020 includes a door (e.g., a roof top door, etc.), shown as topdoor 9022. The topdoor 9022 may be selectively repositionable between a closed position (e.g., a closed configuration, etc.) and an open position (e.g., an open configuration, etc.). In the closed position, the topdoor 9022 may cover an opening in the refuse compartment 130. For example, in the closed position the topdoor 9022 may cover an opening in the refuse compartment 130 that allows access to the hopper volume 132. In the open position, the topdoor 9022 may partially or fully expose the opening in the refuse compartment 130. For example, in the open position the topdoor 9022 may be positioned over one of the panels of the refuse compartment 130 such that the topdoor 9022 is not covering the opening in the refuse compartment 130. According to the example embodiment shown in FIG. 116, the topdoor 9022 is slidable coupled to the refuse compartment 130. For example, the refuse compartment 130 may include a track positioned on a top of the refuse compartment 130 and the topdoor 9022 is slidable coupled to the track. In other embodiments, the topdoor 9022 may be otherwise movable coupled to the refuse compartment 130. For example, the topdoor 9022 may be pivotably coupled to the refuse compartment 130 and may be pivoted between the open position and the closed position. The topdoor 9022 may be selectively repositionable between the closed position and the open position by an actuator (e.g., a hydraulic cylinder, an electric linear actuator, etc.), shown as topdoor actuator 9024 (e.g., to facilitate retaining refuse in the refuse compartment 130).

Referring to FIGS. 126, 127, and 129-131, the application kit 9000 may further include a tailgate locking assembly (e.g., a tailgate lock, a compactor lock, a fifth accessory, etc.), shown as locking assembly 9030, according to some embodiments. The locking assembly 9030 is configured to selectively lock the tailgate 136 to the refuse compartment 130 in the closed position such that the tailgate 136 cannot be pivoted to the open position while the locking assembly 9030 is engaged. The locking assembly 9030 may ensure that the tailgate 136 remains in the closed position while the refuse contained in the refuse compartment is compacted. For example, the refuse vehicle 100 may include a compactor configured to compact the refuse in the storage volume 134 and/or the hopper volume 132 to reduce a volume of the refuse. The compactor may be configured to compact the refuse rearward toward the tailgate 136 and may compact the refuse between a compactor plate of the compactor and the tailgate 136. The tailgate actuators 138 may not be strong enough to hold the tailgate 136 in the closed position while the compactor is compacting the refuse against the tailgate 136, so the locking assembly 9030 may be engaged to hold the tailgate 136 in the closed position while the compactor is compacting the refuse against the tailgate 136 such that the tailgate 136 does not open and allow for the refuse in the refuse compartment 130 to be ejected from the refuse vehicle 100.

Figure 129:
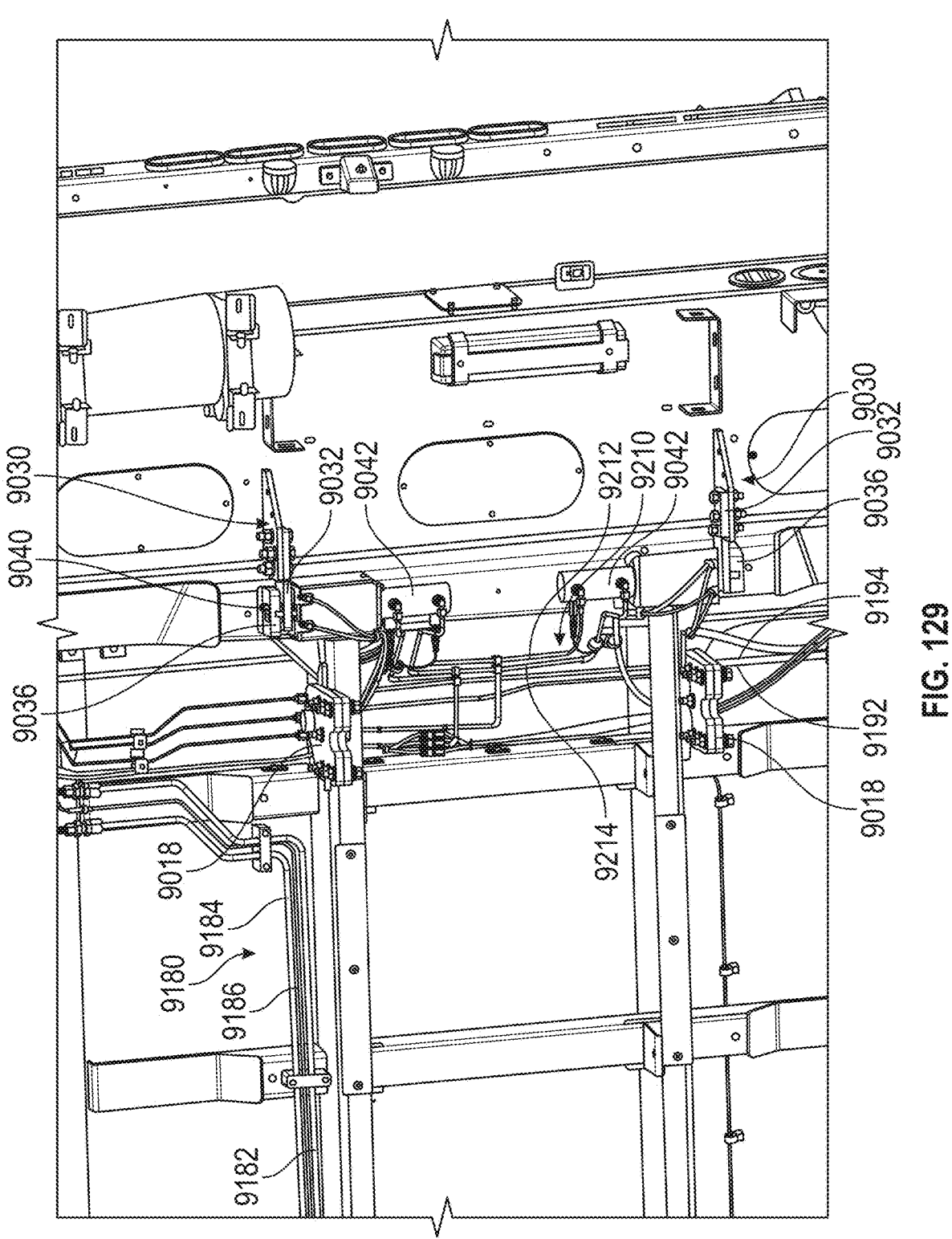
FIG. 129 is a bottom view of a tailgate locking assembly of the front-loading refuse vehicle of FIG. 116.
Figure 130:
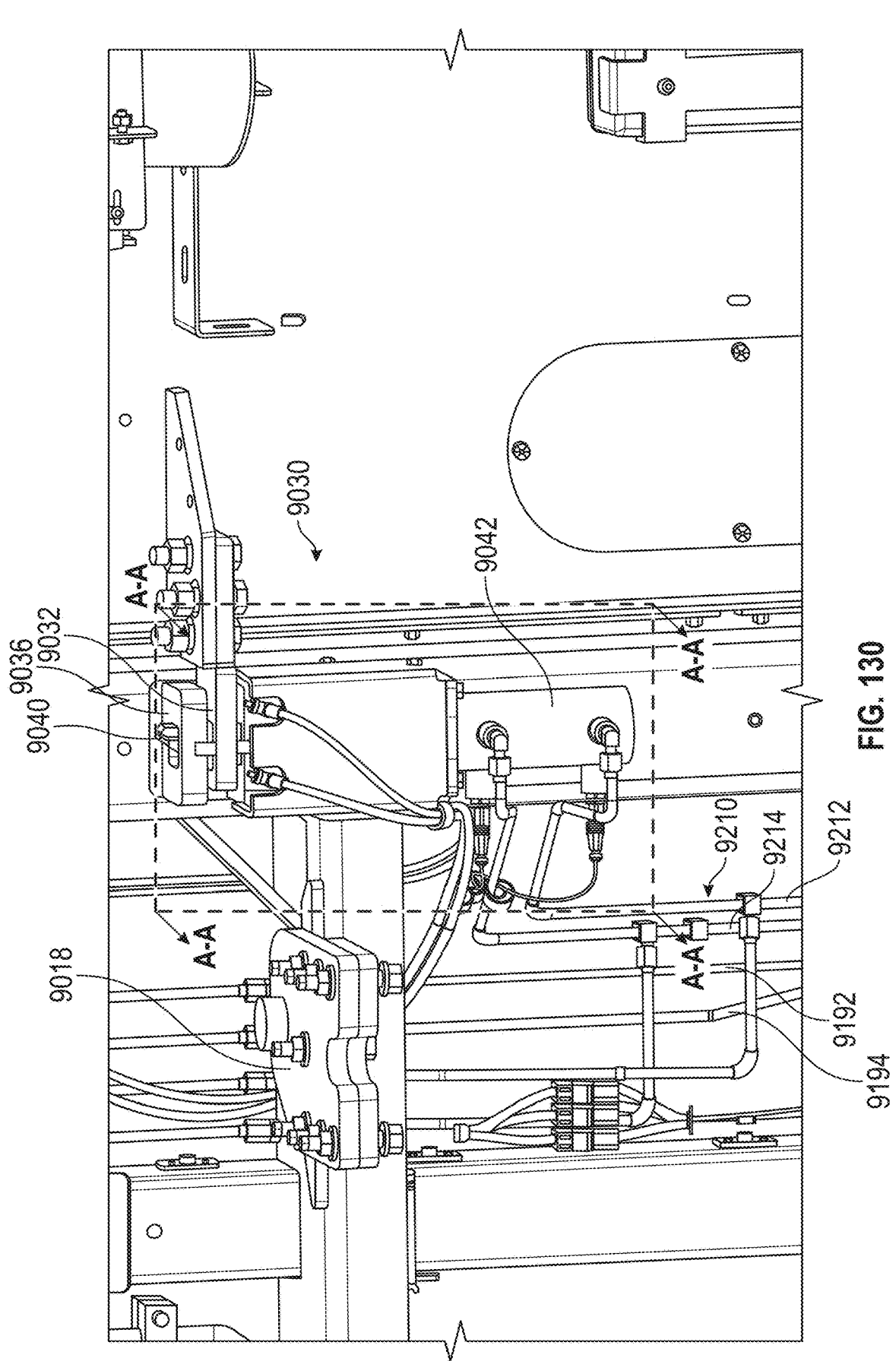
FIG. 130 is a bottom view of the tailgate locking assembly of FIG. 129.
Figure 131:
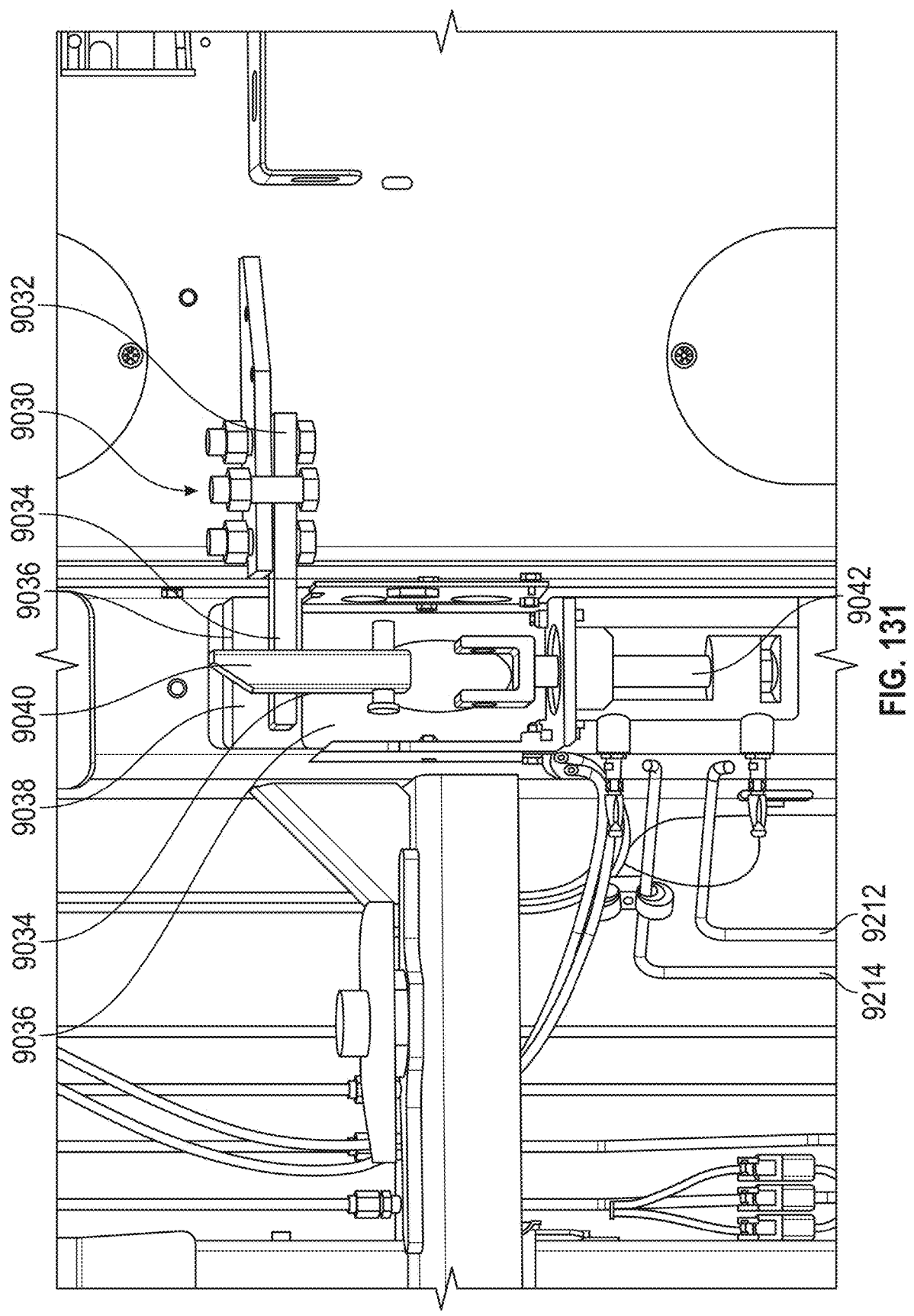
FIG. 131 is a cross-section view of the tailgate locking assembly of FIG. 129 taken along plane A-A.

Referring to FIGS. 129-131, the locking assembly 9030 includes a tailgate locking member (e.g., lock support, lock bolt receiver, etc.), shown as lock bracket 9032. The lock bracket 9032 is coupled to the tailgate 136 and defines a bolt aperture 9034. According to the exemplary embodiment shown in FIGS. 129-131, the bolt aperture 9034 is rectangular. The lock bracket 9032 may be coupled to the tailgate 136 using a plurality of fasteners. For example, a bracket may extend from the tailgate 136 that includes a first plurality of apertures and the lock bracket 9032 may include a second plurality of apertures. To couple the lock bracket 9032 to the tailgate 136, the first plurality of apertures of the tailgate 136 may selectively align with the second plurality of apertures of the lock bracket 9032 to receive the plurality of fasteners.

Still referring to FIGS. 129-131, the locking assembly 9030 also includes a locking guide (e.g., lock guide, etc.), shown as guide 9036. The guide 9036 is coupled to the body 9002 and defines a guide aperture 9038. According to the exemplary embodiment shown in FIGS. 129-131, the guide aperture 9038 is rectangular. The guide aperture 9038 of the guide 9036 may be configured to selectively align with the bolt aperture 9034 of the lock bracket 9032 when the tailgate 136 is in the closed position. In some embodiments, the locking assembly 9030 include multiple of the guides 9036. For example, the locking assembly 9030 may include a pair of the guides 9036 configured to be positioned on either side of the lock bracket 9032 when the tailgate is in the closed position. The guide apertures 9038 of each of the guides 9036 may be configured to selectively align with the bolt aperture 9034 of the lock bracket 9032 when the tailgate 136 is in the closed position. In other embodiments, the locking assembly 9030 may include multiple of the lock ports. In other embodiments, the locking assembly 9030 does not include the guide 9036.

Still referring to FIGS. 129-131, the locking assembly 9030 also includes a lock pin (e.g., a lock bolt, a locking member, etc.), shown as locking bolt 9040. The locking bolt 9040 is coupled to the body 9002 and is aligned with the guide aperture 9038 of the guide 9036. The locking bolt 9040 may be configured to be received by both the guide aperture 9038 of the guide 9036 and the bolt aperture 9034 of the lock bracket 9032. For example, the guide aperture 9038 of the guide 9036 and the bolt aperture 9034 of the lock bracket 9032 may be rectangular and the locking bolt 9040 may also be rectangular such that the locking bolt 9040 may be received by the guide aperture 9038 of the guide 9036 and the bolt aperture 9034 of the lock bracket 9032.

The locking bolt 9040 may be selectively repositionable between a locked position (e.g., a locked configuration, etc.) and an unlocked position (e.g., an unlocked configuration, etc.) by an actuator (e.g., a hydraulic cylinder, an electric linear actuator, etc.), shown as lock actuator 9042 (e.g., to facilitate retaining holding the tailgate 136 in the closed position during compaction of refuse in the refuse compartment 130). In the locked position, the locking bolt 9040 may extend through the guide aperture 9038 of the guide 9036 and through the bolt aperture 9034 of the lock bracket 9032 to lock the tailgate 136 to the body 9002. In other embodiments, the locking bolt may only extend through the bolt aperture 9034 of the lock bracket 9032 to lock the tailgate 136 to the body 9002. In some embodiments, the locking bolt may extend through the guide aperture 9038 of a first of the guides 9036, then through the bolt aperture 9034 of the lock bracket 9032, and then through the guide aperture of a second of the guides 9036 when in the lock position. In some embodiments, the locking bolt 9040 may extend through the guide aperture 9038 of the guide 9036 when in the unlocked position. In other embodiments, the locking bolt 9040 may not extend through the guide aperture 9038 of the guide 9036 when in the unlocked position. In various embodiments, the refuse vehicle 100 includes multiple of the locking assemblies 9030 configured to lock the tailgate 136 to the body 9002.

Referring to FIG. 116, the application kit 9000 further includes a pivot assembly (e.g., an access assembly, an ejection assist assembly, a sixth accessory etc.), shown as pivot assembly 9050, according to some embodiments. The pivot assembly 9050 may be coupled to the body 9002 and configured to be coupled to the chassis 20 when the application kit 9000 is coupled to the body 9002. The pivot assembly 9050 is configured to pivot the body 9002 relative to the chassis 20. For example, the pivot assembly 9050 may be configured to pivot the body 9002 about the pivot brackets 9018 such that the body 9002 pivots relative to the chassis 20. In some embodiments, the pivot assembly 9050 may be coupled to a side of the body 9002 opposite a position of the pivot brackets 9018. For example, if the pivot brackets 9018 are configured to be coupled to the rear rail portion 34 and the rear rail portion 36, the pivot assembly 9050 may be configured to be coupled to the front rail portion 30 and the front rail portion 32. As another example, if the pivot brackets 9018 are configured to be coupled to the front rail portion 30 and the front rail portion 32, the pivot assembly may be configured to be coupled to the rear rail portion 34 and the rear rail portion 36.

The pivot assembly 9050 may be selectively repositionable between the down position and the up position by an actuator (e.g., a hydraulic cylinder, an electric linear actuator, etc.), shown as pivot actuator 9052 (e.g., to facilitate ejecting refuse from the refuse compartment 130, to facilitate access to the inner volume 9008, to facilitate access to the outer volumes 9010, etc.).

Referring to FIG. 116, the refuse vehicle 100 also includes a hydraulic system (e.g., a fluid distribution system, a power distribution system, etc.), shown as hydraulic system 9100. The hydraulic system 9100 is configured to supply and distribute hydraulic fluid to components of the refuse vehicle 100. For example, the hydraulic system 9100 may be configured to supply pressurized hydraulic fluid to the tailgate actuator 138 to operate the tailgate 136 between the open position and the closed position. The hydraulic system 9100 may allow for an operator of the refuse vehicle 100 to operate the components of the refuse vehicle 100.

The hydraulic system 9100 includes an electric power takeoff (E-PTO) system (e.g., hydraulic conversion system, electric to hydraulic power converter, etc.), shown as E-PTO 9110. The E-PTO 9110 is coupled to the body 9002 of the application kit 9000 and is configured to receive electrical power from the batteries 60 and utilize the electrical power to pressurize a hydraulic fluid that can be used to power various other systems on the refuse vehicle 100. According to various embodiments, the E-PTO 9110 is self-contained within on the body 9002 of the refuse vehicle 100. For example, the E-PTO 9110 may be contained within a protective container (e.g., a fire resistant container) positioned on the refuse vehicle 100. In some examples, the E-PTO 9110 includes an electric motor 9112 driving a hydraulic pump 9114. The hydraulic pump 9114 pressurized hydraulic fluid onboard the refuse vehicle 100, which can then be supplied to various hydraulic cylinders and actuators present on the refuse vehicle 100. In some embodiments, the E-PTO 9110 also includes a tank (e.g., container, fluid storage, etc.), shown as hydraulic tank 9116. The hydraulic tank 9116 is fluidly coupled to the hydraulic pump 9114 and is configured to supply the hydraulic fluid to the hydraulic pump 9114. In some embodiments, the hydraulic tank 9116 may also be configured to receive returned hydraulic fluid from return lines of the hydraulic system 9100. For example, the hydraulic tank 9116 may receive hydraulic fluid from the tailgate actuator 138 after the hydraulic fluid has been used to actuate the tailgate actuator 138. In some embodiments, the E-PTO 9110 is coupled to a forward end of the body 9002.

In some embodiments, the E-PTO 9110 also includes an E-PTO controller 9118 configured to control and monitor the electric motor 9112 and/or the components of the various components of the refuse vehicle 100. The E-PTO controller 9118 may include a secondary battery such that the E-PTO controller 9118 may operate independently of the battery 60. The E-PTO controller 9118 may be configured to control flow rates of the hydraulic fluid supplied to the various components of the hydraulic system 9100. For example, the E-PTO controller 9118 may supply a first flow rate to the lift actuator 144 and a second flow rate to the pivot actuator 9052. As another example, the E-PTO controller 9118 may increase a speed of the electric motor 9112 to increase a flow rate of the hydraulic fluid produced by the hydraulic pump 9114 in order to increase the flow rate of the hydraulic fluid provided to the various components of the hydraulic system 9100. In some embodiments, the E-PTO controller 9118 may control the flow rate of the hydraulic fluid through the hydraulic system 9100 based on user inputs received from an operator of the refuse vehicle 100.

Figure 119:
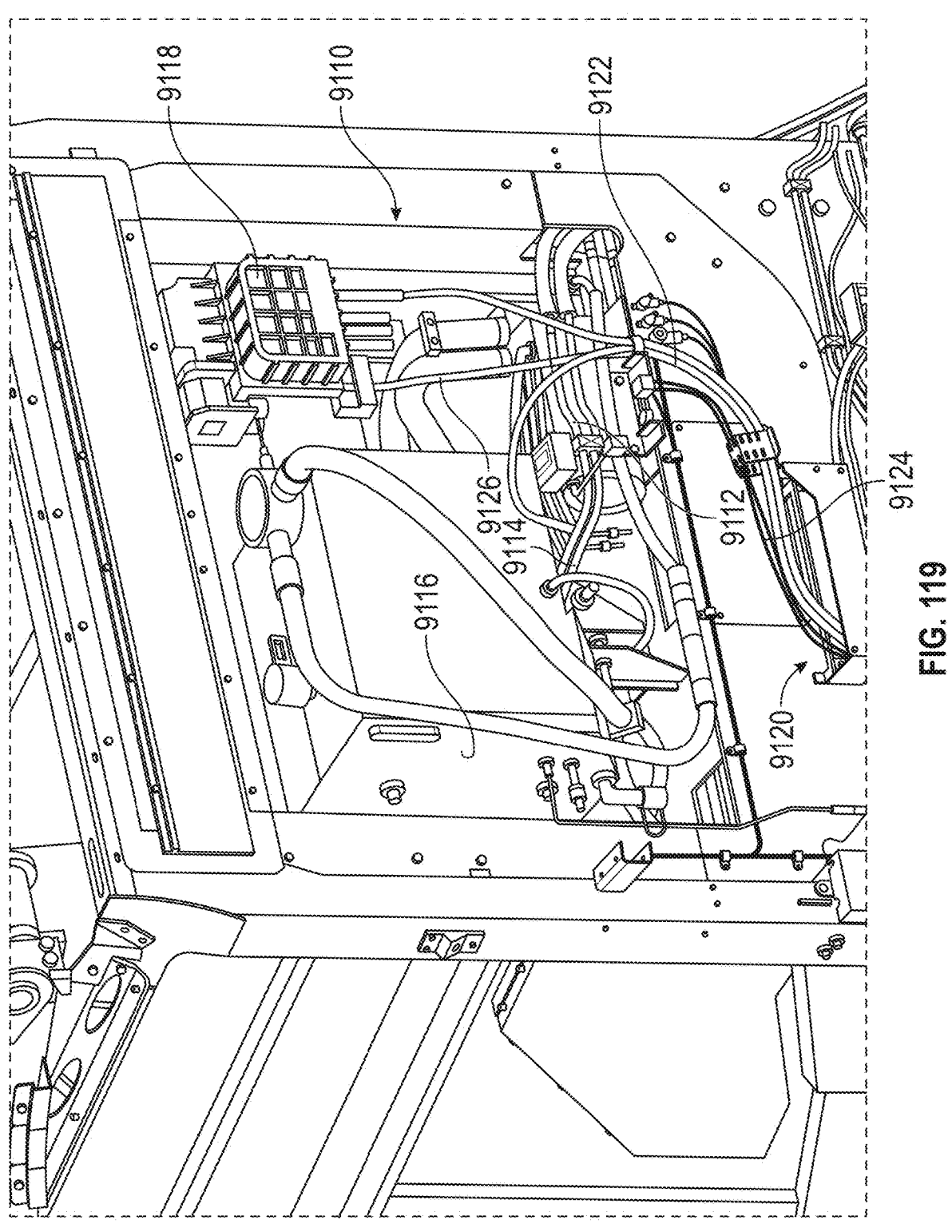
FIG. 119 is a perspective view of a portion of a hydraulic system of the front-loading refuse vehicle of FIG. 116.

Referring to FIG. 119, the hydraulic system 9100 includes pivot conduits (e.g., pivot hydraulic connectors, pivot hydraulic hoses, first conduits, etc.), shown as pivot conduits 9120, each fluidly coupled between the E-PTO 9110 and one of the pivot actuators 9052 of the pivot assembly 9050, according to some embodiments. The pivot conduits are configured to supply pressurized hydraulic fluid from the hydraulic pump 9114 of the E-PTO 9110 to the pivot actuators 9052 to selectively reposition the pivot assembly 9050 between the up position and the down position. The pivot conduits 9120 may include a pivot supply conduit, shown as pivot supply conduit 9122, fluidly coupled between the hydraulic pump 9114 and the pivot actuators 9052 configured to supply the pressurized hydraulic fluid from the hydraulic pump 9114 to the pivot actuators 9052. The pivot conduits 9120 may also include a pivot return conduit, shown as pivot return conduit 9124, fluidly coupled between the pivot actuators 9052 and the hydraulic tank 9116 configured to return hydraulic fluid from the pivot actuators 9052 to the hydraulic tank 9116. The pivot conduits 9120 may also include a pivot load sense conduit, shown as pivot load sense conduit 9126, fluidly coupled between the pivot actuators 9052 and the E-PTO controller 9118 configured to provide the E-PTO controller 9118 with a load sense of the hydraulic fluid supplied to the pivot actuators 9052 from the pivot supply conduit 9122. The E-PTO controller 9118 may utilize the load sense of the hydraulic fluid supplied to the pivot actuators 9052 from the pivot supply conduit 9122 to control a pivot flow rate of the hydraulic fluid supplied to the pivot actuators 9052.

Referring to FIG. 116, the hydraulic system 9100 includes articulation conduits (e.g., articulation hydraulic connectors, articulation hydraulic hoses, second conduits, etc.), shown as articulation conduits 9130, each fluidly coupled between the E-PTO 9110 and one of the articulation actuators 148 of the lift assembly 140, according to some embodiments. The articulation conduits 9130 are configured to supply pressurized hydraulic fluid from the hydraulic pump 9114 of the E-PTO 9110 to the articulation actuators 148 to rotate the lift forks 146 relative to the lift arms 142 about the horizontal axis. The articulation conduits 9130 may include an articulation supply conduit, shown as articulation supply conduit 9132 fluidly coupled between the hydraulic pump 9114 and the articulation actuators 148 configured to supply the pressurized hydraulic fluid from the hydraulic pump 9114 to the articulation actuators 148. The articulation conduits 9130 may also include an articulation return conduit, shown as articulation return conduit 9134, fluidly coupled between the articulation actuators 148 and the hydraulic tank 9116 configured to return hydraulic fluid from the articulation actuators 148 to the hydraulic tank 9116. The articulation conduits 9130 may also include an articulation load sense conduit, shown as articulation load sense conduit 9136, fluidly coupled between the articulation actuators 148 and the E-PTO controller 9118 configured to provide the E-PTO controller 9118 with a load sense of the hydraulic fluid supplied to the articulation actuators 148 from the articulation supply conduit 9132. The E-PTO controller 9118 may utilize the load sense of the hydraulic fluid supplied to the pivot actuators 9052 from the pivot supply conduit 9122 to control an articulation flow rate of the hydraulic fluid supplied to the articulation actuators 148.

In some embodiments, the hydraulic pump 9114 of the E-PTO 9110 is directly fluidly coupled to a compactor actuator (e.g., a hydraulic cylinder, an electric linear actuator, etc.) configured to selectively reposition a compactor in the storage volume 134 and/or the hopper volume 132 between a pack position and a relaxed position to compact the refuse in the storage volume 134 and/or the hopper volume 132 to reduce a volume of the refuse.

Figure 121:
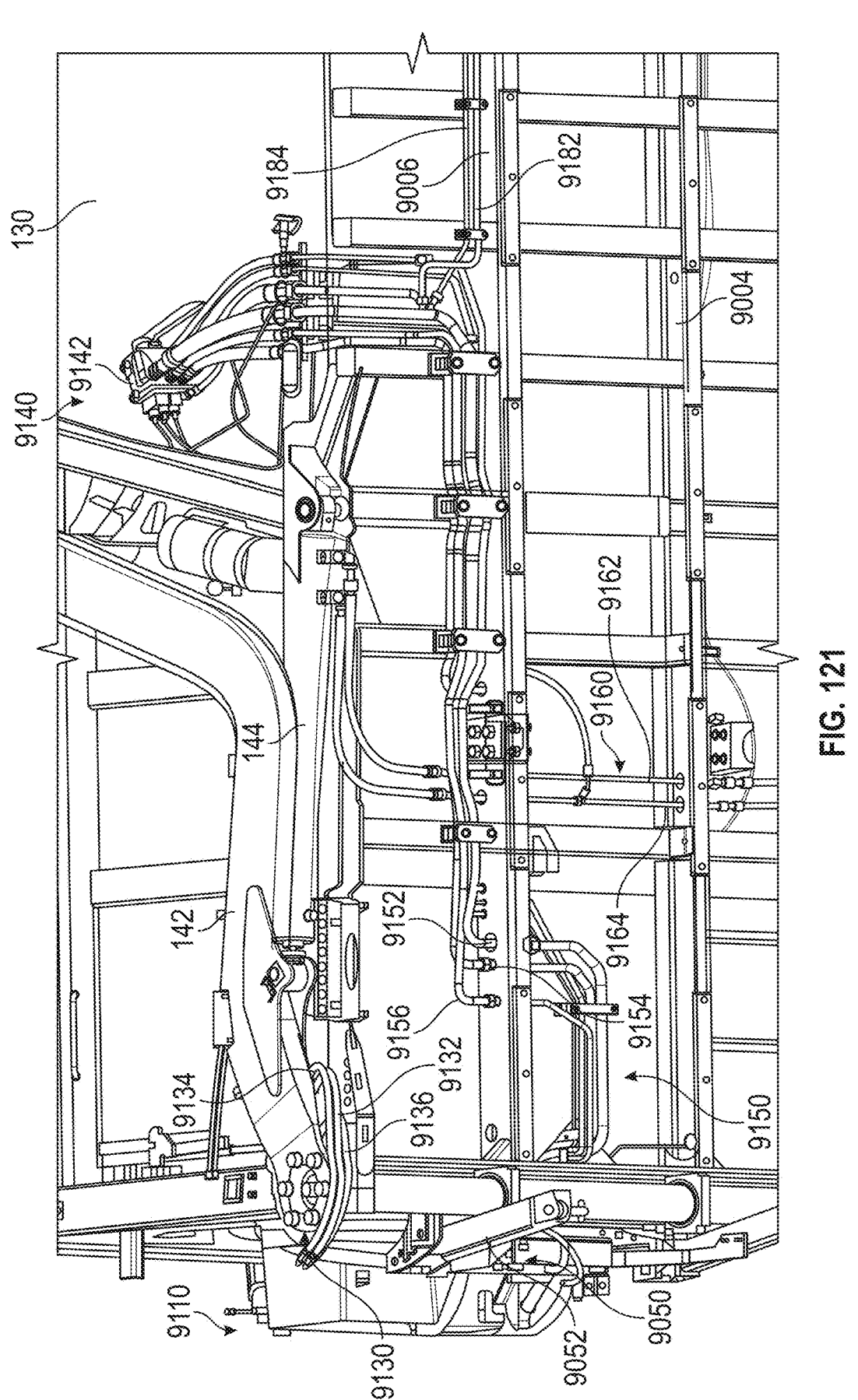
FIG. 121 is a bottom perspective view of a portion of the hydraulic system of the front loading refuse vehicle of FIG. 116.
Figure 122:
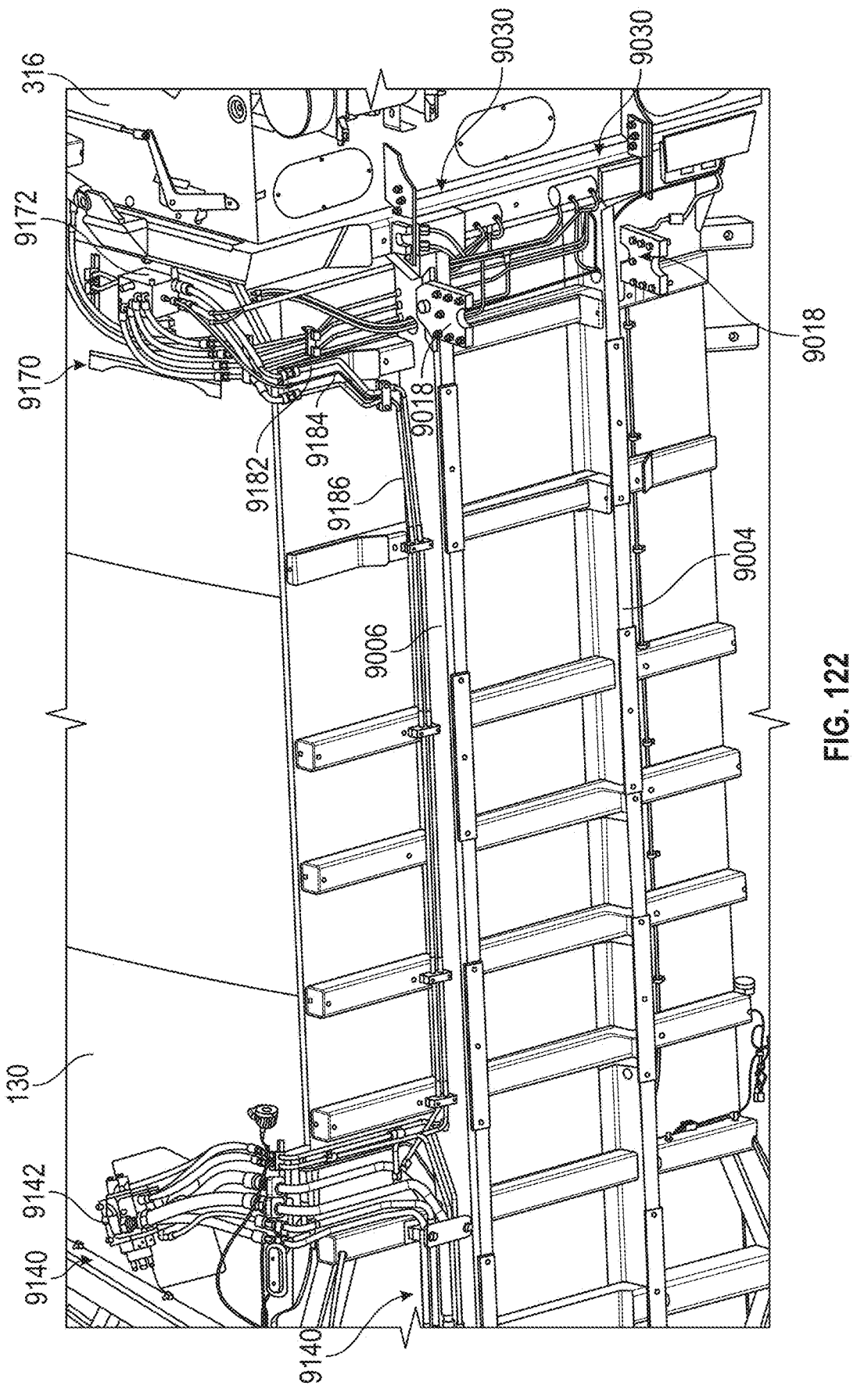
FIG. 122 is a bottom perspective view of a portion of the hydraulic system of the front-loading refuse vehicle of FIG. 116.
Figure 123:
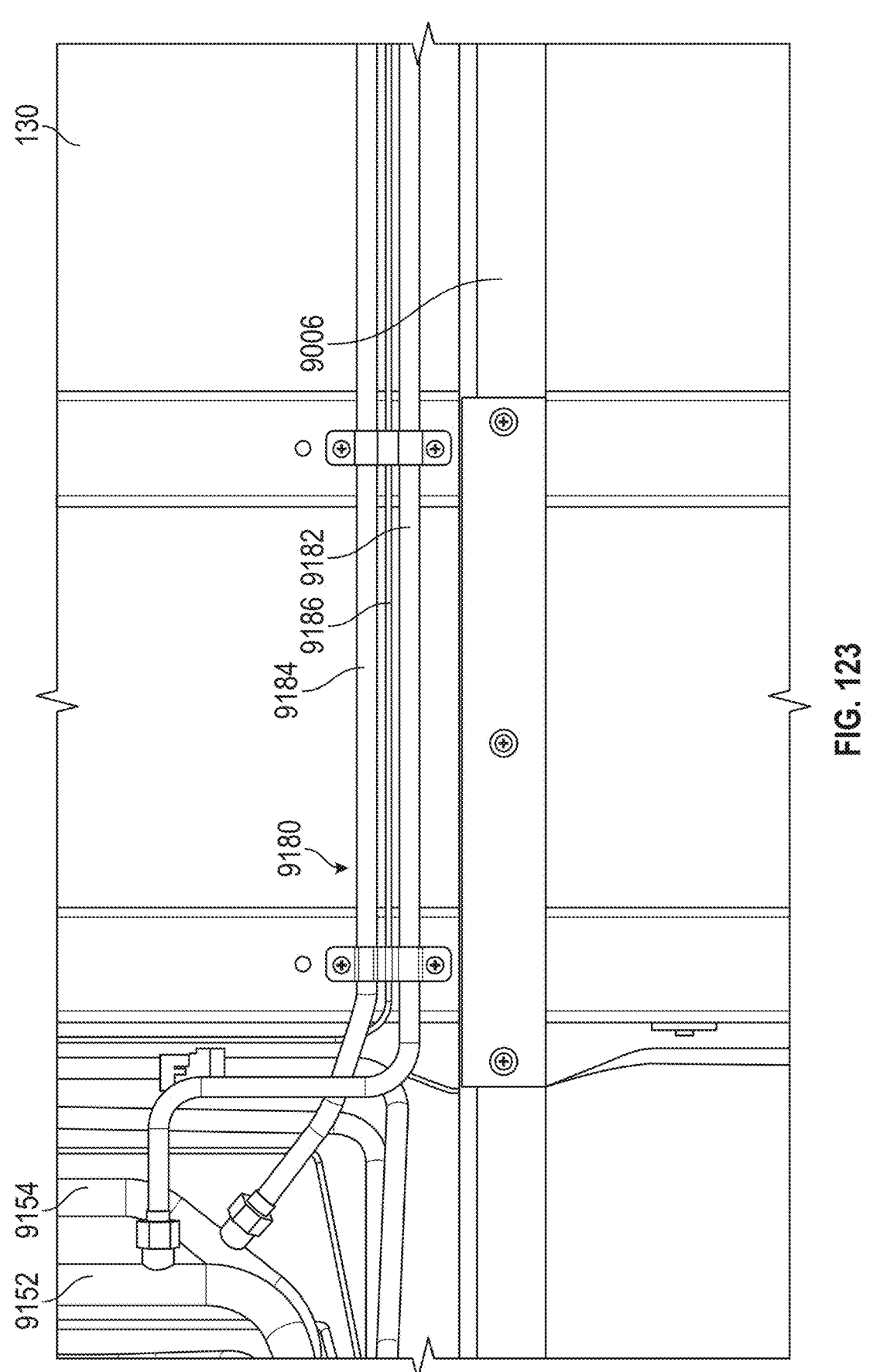
FIG. 123 is a bottom view of a portion of the hydraulic system of the front-loading refuse vehicle of FIG. 116.

Referring to FIGS. 120-122, the hydraulic system 9100 also includes an intermediate manifold (e.g., middle hydraulic manifold, a first manifold, etc.), shown as intermediate manifold 9140, coupled to the body 9002 of the application kit 9000, according to some embodiments. According to the exemplary embodiment shown in FIGS. 120-122, the intermediate manifold 9140 is coupled to the body 9002 proximate (e.g., nearby, next to, etc.) the midpost 9014. In various embodiments, the intermediate manifold 9140 is coupled to the midpost 9014. In some embodiments, the intermediate manifold 9140 is positioned rearward of the midpost 9014. In other embodiments, the intermediate manifold 9140 is position forward of the midpost 9014. In some embodiments, the intermediate manifold 9140 is positioned rearward of the lift assembly 140. In some embodiments, the intermediate manifold 9140 is positioned forward of each of the rear axles 52 when the application kit 9000 is coupled to the chassis 20. For example, the intermediate manifold 9140 may be positioned between the front axle 50 and the rear axles 52 when the application kit 9000 is coupled to the chassis 20.

The intermediate manifold 9140 is fluidly coupled to the E-PTO 9110 and is configured to supply hydraulic fluid from the E-PTO 9110 to components of the refuse vehicle 100. For example, the intermediate manifold 9140 may receive hydraulic fluid from the E-PTO 9110 and supply the hydraulic fluid to the lift arm actuator 144 to operate the lift arm 142. In some embodiments, the intermediate manifold 9140 includes an intermediate controller 9142 configured to control and monitor the intermediate manifold 9140 and/or the various components of the refuse vehicle 100 associated with the intermediate manifold 9140. The intermediate controller 9142 may include a third battery such that the intermediate controller 9142 may operate independently of the battery 60 and/or the E-PTO controller 9118. The intermediate controller 9142 may be configured to control flow rates of the hydraulic fluid supplied to various components of the hydraulic system 9100. For example, the intermediate controller 9142 may control a flow rate supplied to the lift actuator 144. In other embodiments, the intermediate manifold 9140 may be configured to supply the articulation flow rate of the hydraulic fluid to the articulator actuators 148 (e.g., each of the articulation conduits 9130 may be fluidly coupled between and extend between the intermediate manifold 9140 and one of the articulation actuators 148, etc.).

Referring to FIG. 121, the hydraulic system 9100 includes intermediate conduits (e.g., intermediate hydraulic connectors, intermediate hydraulic hoses, third conduits, etc.), shown as intermediate conduits 9150, fluidly coupled between and extending between the E-PTO 9110 and the intermediate manifold 9140. The intermediate conduits 9150 are configured to supply the pressurized hydraulic fluid from the hydraulic pump 9114 of the E-PTO 9110 to the intermediate manifold 9140. In some embodiments, the intermediate conduits 9150 may extend through at least one of the first body rail 9004 or the second body rail 9006 while extending between the E-PTO 9110 and the intermediate manifold 9140. For example, the intermediate conduits 9150 may extend through a plurality of apertures defined by the second body rail 9006. A first portion of the intermediate conduits 9150 may be positioned inside of the inner volume 9008 and a second portion of the intermediate conduits 9150 may be positioned inside one of the outer volumes 9010. For example, the intermediate conduits 9150 may extend from the E-PTO 9110 into the inner volume 9008. The intermediate conduits 9150 may then extend through the second body rail 9006 into one of the outer volumes 9010 before reaching the intermediate manifold 9140. In other embodiments, the intermediate conduits 9150 may extend through either the inner volume 9008 or the outer volume 9010.

The intermediate conduits 9150 may include an intermediate supply conduit, shown as intermediate supply conduit 9152, fluidly coupled between the hydraulic pump 9114 and the intermediate manifold 9140 configured to supply the pressurized hydraulic fluid from the hydraulic pump 9114 to the intermediate manifold 9140. The intermediate conduits 9150 may also include an intermediate return conduit, shown as intermediate return conduit 9154, fluidly coupled between the intermediate manifold 9140 and the hydraulic tank 9116 configured to return hydraulic fluid from the intermediate manifold 9140 to the hydraulic tank 9116. The intermediate conduits 9150 may also include an intermediate load sense conduit, shown as intermediate load sense conduit 9156, fluidly coupled between the intermediate manifold 9140 and the E-PTO controller 9118 configured to provide the E-PTO controller 9118 with a load sense of the hydraulic fluid supplied to the intermediate manifold 9140 from the intermediate supply conduit 9152. The E-PTO controller 9118 may utilize the load sense of the hydraulic fluid supplied to the intermediate manifold 9140 from the intermediate supply conduit 9152 to control an intermediate flow rate of the hydraulic fluid supplied to the intermediate manifold 9140. In some embodiments, the intermediate load sense conduit 9156 may be configured to provide the E-PTO controller 9118 with a load sense of the hydraulic fluid outputted by the intermediate manifold 9140 (e.g., to the lift arm actuators 144, etc.).

Referring to FIG. 116, the hydraulic system 9100 includes lift arm conduits (e.g., lift arm hydraulic connectors, lift arm hydraulic hoses, fourth conduits, etc.), shown as lift arm conduits 9160, each fluidly coupled between and extending between the intermediate manifold 9140 and one of the lift arm actuators 144, according to some embodiments. The lift arm conduits 9160 are configured to supply pressurized hydraulic fluid from the intermediate manifold 9140 to the lift arm actuators 144 to rotate the lift arms 142. In some embodiments, the lift arm conduits 9160 may extend through at least one of the first body rail 9004 or the second body rail 9006 while extending between the intermediate manifold 9140 and the lift arm actuators 144. For example, the lift arm conduits 9160 may extend through a first plurality of apertures defined by the first body rail 9004 and through a second plurality of apertures defined by the second body rail 9006. A first portion of the lift arm conduits 9160 may be positioned inside of the inner volume 9008 and a second portion of the lift arm conduits 9160 may be positioned inside of the outer volumes 9010. For example, the lift arm conduits 9160 may extend from the intermediate manifold 9140 into one of the outer volumes 9010. The lift arm conduits 9160 may then extend through the second body rail 9006 into the inner volume 9008. The lift arm conduits 9160 may then split into two branches, with a first of the two branches extending through the second body rail 9006 into a first of the outer volumes 9010 to reach a first of the lift arm actuators 144 and a second of the two branches extending through the first body rail 9004 into a second of the outer volumes 9010 to reach a second of the lift arm actuators 144.

In other embodiments, the lift arm conduits 9160 may split into two branches in one of the outer volumes 9010. For example, the lift arm conduit 9160 may extend into one of the outer volumes 9010 from the intermediate manifold 9140. The lift arm conduit 9160 may split into two branches in the one of the outer volumes 9010 and a first of the two branches may extend from the one of the outer volumes 9010 to a first of the lift arm actuator 144 and a second of the two branches may extend from the one of the outer volumes 9010, through the second body rail 9006 into the inner volume 9008, through the first body rail 9004 into the second of the outer volumes 9010, and from the second of the outer volumes 9010 to the second of the lift arm actuators 144. In still other embodiments, the lift arm conduits 9160 may be directly fluidly coupled to the E-PTO 9110 and may not be fluidly coupled to the intermediate manifold 9140.

The lift arm conduits 9160 may include a lift arm supply conduit, shown as lift arm supply conduit 9162, fluidly coupled between the intermediate manifold 9140 and the lift arm actuators 144 configured to supply the pressurized hydraulic fluid from the hydraulic pump 9114 to the lift arm actuators 144. The lift arm conduits 9160 also includes a lift arm return conduit, shown as lift arm return conduit 9164, fluidly coupled between the lift arm actuators 144 and the intermediate manifold 9140 configured to return hydraulic fluid from the lift arm actuators to the hydraulic tank 9116. In some embodiments, the lift arm conduits 9160 also includes a lift arm load sense conduit fluidly coupled between the lift arm actuator 144 and the intermediate manifold 9140 configured to provide the E-PTO controller 9118 with a load sense of the hydraulic fluid supplied to the lift arm actuator 144 from the lift arm supply conduit 9162. The E-PTO controller 9118 may utilize the load sense of the hydraulic fluid supplied to the lift arm actuators 144 from the lift arm supply conduit 9162 to control a lift arm flow rate of the hydraulic fluid supplied to the lift arm actuators 144.

Figure 125:
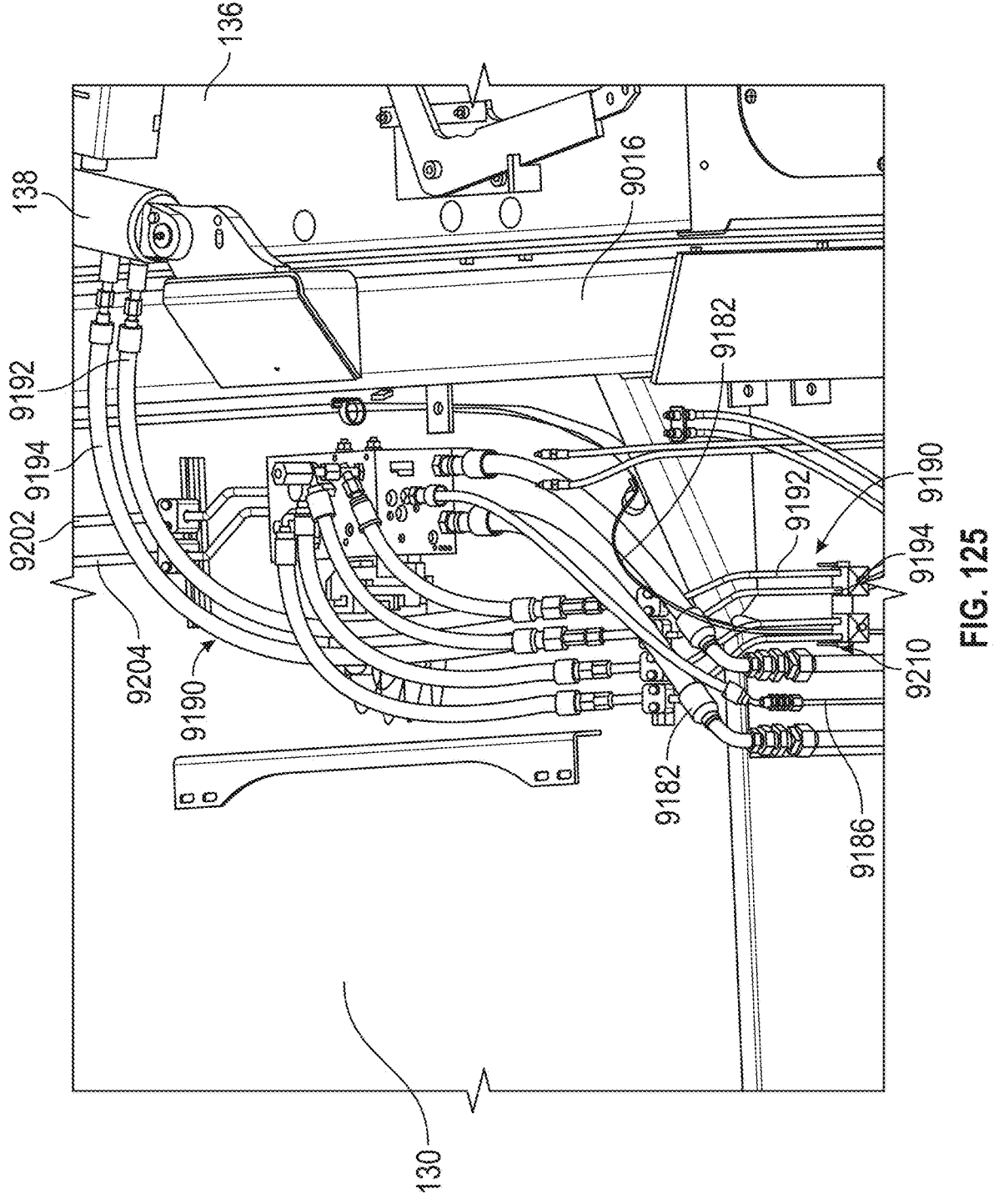
FIG. 125 is a perspective view of a portion of the hydraulic system of the front-loading refuse vehicle of FIG. 116.

Referring to FIGS. 124 and 125, the hydraulic system 9100 also includes a rear manifold (e.g., a tailgate manifold, a second manifold, etc.), shown as rear manifold 9170, coupled to the body 9002 of the application kit 9000, according to some embodiments. According to the exemplary embodiment shown in FIGS. 124 and 125, the rear manifold 9170 is coupled to the body 9002 proximate the rearpost 9016 (e.g., proximate a rearward end of the body 9002, etc.). In various embodiments, the rear manifold 9170 is coupled to the rearpost 9016. In other embodiments, the rear manifold 9170 is coupled to the tailgate 136 (e.g., such that the rear manifold 9170 moves with the tailgate 136 when the tailgate 136 is operated by the tailgate actuator 138, etc.). In some embodiments, the rear manifold 9170 is positioned forward of the rearpost 9016. In other embodiments, the rear manifold 9170 is positioned rearward of the rearpost 9016. In some embodiments, the rear manifold 9170 is positioned above one of the rear axles 52 when the application kit 9000 is coupled to the chassis 20. In other embodiments, the rear manifold 9170 is positioned between a first of the rear axles 52 and a second of the rear axles 52 when the application kit 9000 is coupled to the chassis 20. In still other embodiments, the rear manifold 9170 is positioned rearward of a rearmost of the rear axles 52 when the application kit 9000 is coupled to the chassis 20.

The rear manifold 9170 is fluidly coupled to the JE-PTO 9110 and is configured to supply hydraulic fluid from the E-PTO 9110 to components of the refuse vehicle 100. For example, the rear manifold 9170 may receive hydraulic fluid from the E-PTO 9110 and supply the hydraulic fluid to the tailgate actuator 138 to operate the tailgate 136. In some embodiments, the rear manifold 9170 includes a tailgate controller 9172 configured to control and monitor the rear manifold 9170 and/or the various components of the refuse vehicle 100 associated with the rear manifold 9170. The tailgate controller 9172 may include a fourth battery such that the tailgate controller 9172 may operate independently of the battery 60 and/or the E-PTO controller 9118. The tailgate controller 9172 may be configured to control flow rates of the hydraulic fluid supplied to various components of the hydraulic system 9100. For example, the tailgate controller 9172 may control a flow rate supplied to the tailgate actuator 138.

Referring to FIGS. 122-125, the hydraulic system 9100 includes rear conduits (e.g., tailgate manifold conduits, rear hydraulic connectors, rear hydraulic hoses, fifth conduits, etc.), shown as rear conduits 9180, fluidly coupled between and extending between the intermediate conduits 9150 and the rear manifold 9170, according to some embodiments. The rear conduits 9180 are configured to supply the pressurized hydraulic fluid from the hydraulic pump 9114 of the E-PTO 9110 to the rear manifold 9170. The rear conduits 9180 may extend from the intermediate conduits 9150 such that a portion of the rear conduits 9180 is in parallel with a portion of the intermediate conduits 9150 and such that the intermediate manifold 9140 is in parallel with the rear manifold 9170. For example, the rear conduits 9180 may branch off from the intermediate conduits 9150. In some embodiments, the rear conduits 9180 branch off from a portion of the intermediate conduits 9150 positioned in one of the outer volumes 9010. In other embodiments, the rear conduits 9180 branch off from a portion of the intermediate conduits 9150 positioned in the inner volume 9008. In still other embodiments, the rear conduits 9180 are fluidly coupled between and extending between the E-PTO 9110 and the rear manifold 9170. The rear conduits 9180 may branch off from the intermediate conduits 9150 at a location inside of the inner volume 9008 or inside one of the outer volumes 9010.

In some embodiments, the rear conduits 9180 include sheathing (e.g., armor, protective coverings, etc.) configured to protect the rear conduits 9180. For example, the rear conduits 9180 may be positioned in one of the outer volumes 9010 and the rear conduits 9180 may include sheathing to protect the rear conduits 9180 from being damaged by an external object (e.g., a second vehicle, a waste container, vegetation, etc.) that comes into contact with the refuse vehicle 100.

In some embodiment, a portion of the rear conduits 9180 may extend along one of the first body rail 9004 or the second body rail 9006. For example, the rear conduits 9180 may branch off from the intermediate conduits 9150 in one of the outer volumes 9010 and may extend along either the first body rail 9004 or the second body rail 9006 that is proximate the one of the outer volumes 9010. As another example, the rear conduits 9180 may branch off from the intermediate conduits 9150 in the inner volume 9008 and may extend between the first body rail 9004 and the second body rail 9006 before extending through either the first body rail 9004 or the second body rail 9006 to reach the rear manifold 9170. In various embodiments, the rear conduits 9180 extend through the outer guards 9012 (e.g., through a plurality of apertures in the outer guards 9012, etc.). The rear conduits 9180 may be coupled to the body 9002. For example, the rear conduits 9180 may be coupled to the first body rail 9004, the second body rail 9006, and/or additional structural elements of the body 9002 (e.g., the cross members that extend between and couple the first body rail 9004 and the second body rail 9006, etc.). For example, the rear conduits 9180 may be coupled to the cross members that extend between and couple the first body rail 9004 and the second body rail 9006 with mounting brackets configured to secure the rear conduits 9180 to the body 9002.

The rear conduits 9180 may include a rear supply conduit, shown as rear supply conduit 9182, fluidly coupled between the intermediate supply conduit 9152 and the rear manifold 9170 configured to supply the pressurized hydraulic fluid from the hydraulic pump 9114 to the rear manifold 9170. The rear conduits 9180 may also include a rear return conduit, shown as rear return conduit 9184, fluidly coupled between the rear manifold 9170 and the intermediate return conduit 9154 configured to return hydraulic fluid from the rear manifold 9170 to the hydraulic tank 9116. The rear conduits 9180 may also include a rear load sense conduit, shown as rear load sense conduit 9186, fluidly coupled between the rear manifold 9170 and the intermediate load sense conduit 9156 configured to provide the E-PTO controller 9118 with a load sense of the hydraulic fluid supplied to the rear manifold 9170 from the rear supply conduit 9182. The E-PTO controller 9118 may utilize the load sense of the hydraulic fluid supplied to the rear manifold 9170 from the rear supply conduit 9182 to control a rear flow rate of the hydraulic fluid supplied to the rear manifold 9170. In some embodiments, the rear load sense conduit 9186 may be configured to provide the E-PTO controller 9118 with a load sense of the hydraulic fluid outputted by the rear manifold 9170 (e.g., to the tailgate actuators 138, etc.).

Figure 126:
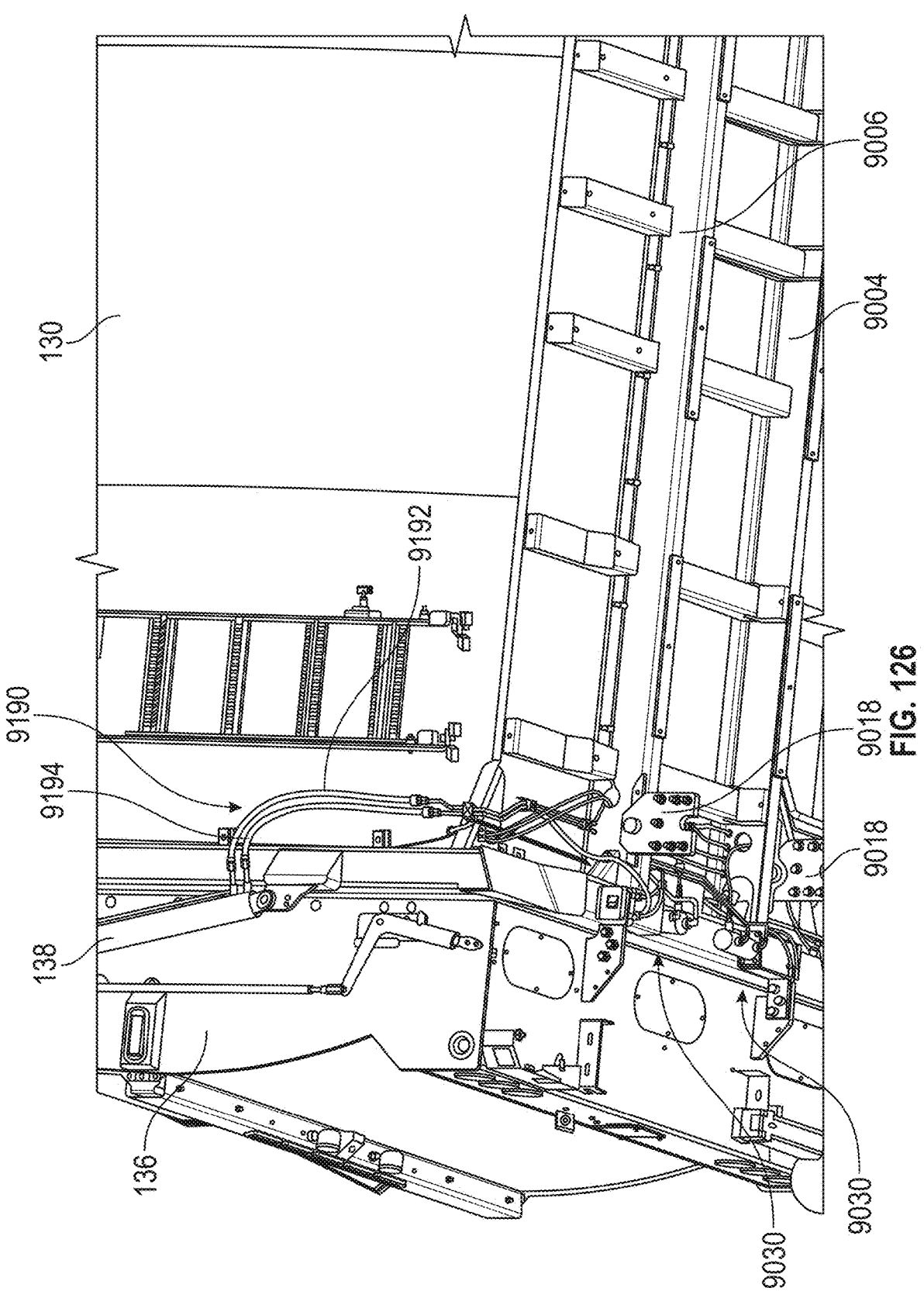
FIG. 126 is a rear bottom perspective view of a portion of the hydraulic system of the front-loading refuse vehicle of FIG. 116.
Figure 127:
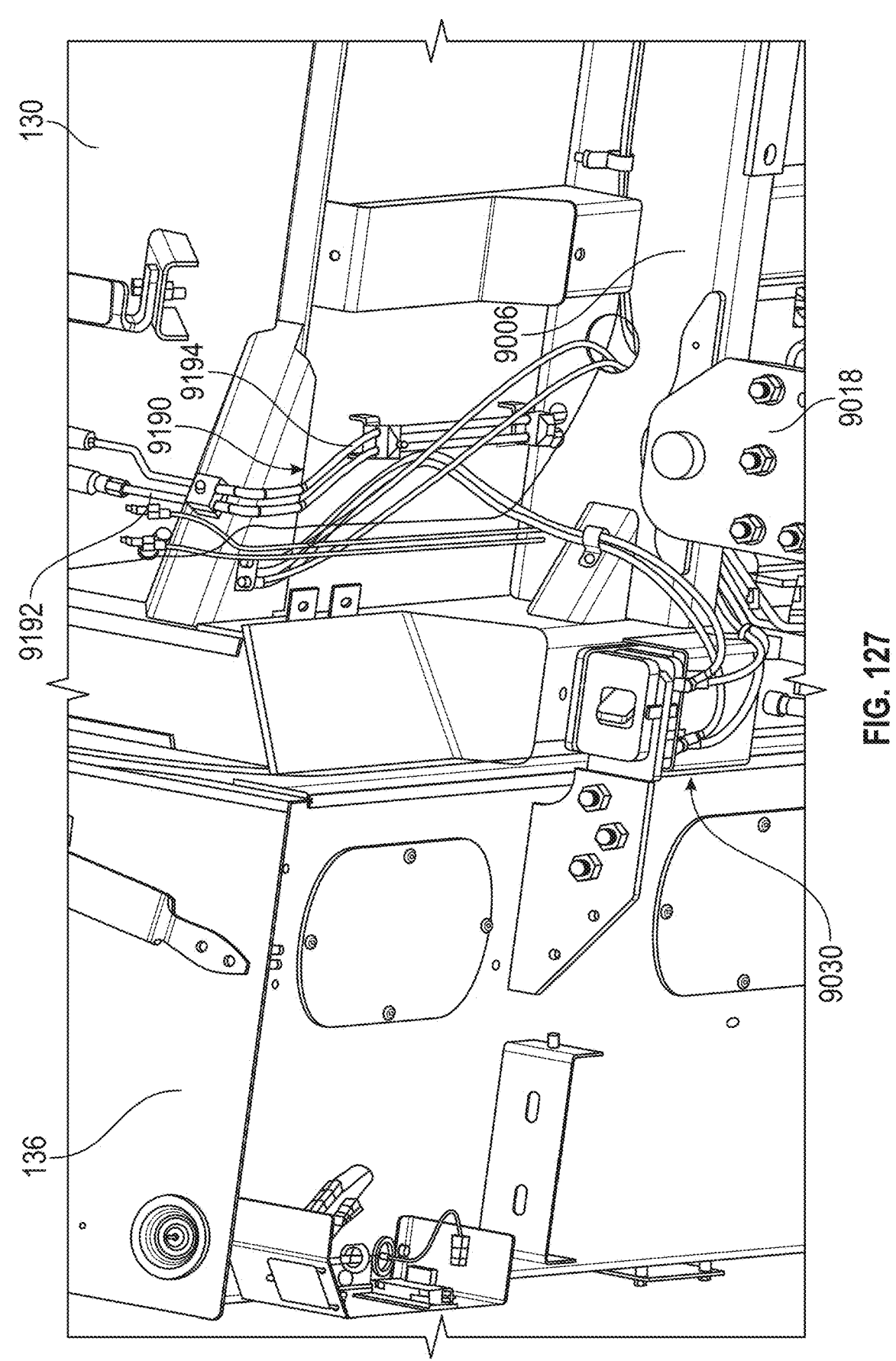
FIG. 127 is a bottom perspective view of a portion of the hydraulic system of the front-loading refuse vehicle of FIG. 116.

Referring to FIGS. 124-126, the hydraulic system 9100 includes tailgate conduits (e.g., tailgate actuator hydraulic connectors, tailgate hydraulic hoses, sixth conduits, etc.), shown as tailgate conduits 9190, each fluidly coupled between and extending between the rear manifold 9170 and one of the tailgate actuators 138, according to some embodiments. The tailgate conduits 9190 are configured to supply pressurized hydraulic fluid from the rear manifold 9170 to the tailgate actuators 138 to selectively reposition the tailgate 136 between the closed position and the open position. In some embodiments, at least one of the tailgate conduits 9190 may extend through at least one of the first body rail 9004 or the second body rail 9006 while extending between the rear manifold 9170 and the tailgate actuators 138. For example, one of the tailgate conduits 9190 may extend through a first plurality of apertures defined by the first body rail 9004 and through a second plurality of apertures defined by the second body rail 9006. A first portion of the one of the tailgate conduits 9190 may be positioned inside of the inner volume 9008 and a second portion of the one of the tailgate conduits 9190 may be positioned inside of the outer volumes 9010. For example, a first of the tailgate conduits 9190 may extend from the rear manifold 9170 on a first side of the body 9002, below the body 9002 into a first of the outer volumes 9010, through the first body rail 9004 into the inner volume 9008, through the second body rail 9006 into a second of the outer volumes 9010, and up a second side of the body 9002 to a first of the tailgate actuators 138. A second of the tailgate conduits 9190 may extend from the rear manifold 9170 to a second of the tailgate actuators 138 on a side of the body 9002 where the rear manifold 9170 is positioned, such that the second of the tailgate conduits 9190 does not extend through the inner volume 9008 or the outer volumes 9010.

The tailgate conduit 9190 may include a tailgate supply conduit, shown as tailgate supply conduit 9192, fluidly coupled between the rear manifold 9170 and the tailgate actuators 138 configured to supply the pressurized hydraulic fluid from the hydraulic pump 9114 to the tailgate actuators 138. The tailgate conduits 9190 also includes a tailgate return conduit, shown as tailgate return conduit 9194, fluidly coupled between the tailgate actuators 138 and the rear manifold 9170 configured to return hydraulic fluid from the tailgate actuators 138 to the hydraulic tank 9116. In some embodiments, the tailgate conduits 9190 also include a tailgate load sense conduit fluidly coupled between the tailgate actuator 138 and the rear manifold 9170 configured to provide the E-PTO controller 9118 with a load sense of the hydraulic fluid supplied to the tailgate actuator 138 from the tailgate supply conduit 9192. The E-PTO controller 9118 may utilize the load sense of the hydraulic fluid supplied to the tailgate actuators 138 from the tailgate supply conduit 9192 to control a tailgate flow rate of the hydraulic fluid supplied to the tailgate actuators 138.

Referring to FIG. 128, the hydraulic system 9100 includes topdoor conduits (e.g., topdoor hydraulic connectors, topdoor hydraulic hoses, seventh conduits, etc.), shown as topdoor conduits 9200, fluidly coupled between and extending between the rear manifold 9170 and the topdoor actuator 9024, according to some embodiments. The topdoor conduits 9200 are configured to supply pressurized hydraulic fluid from the rear manifold 9170 to the topdoor actuator 9024 to selectively reposition the topdoor 9022 between the open position and the closed position. In some embodiments, the topdoor conduits 9200 extend from the rear manifold 9170 along a side of the body 9002 to a top of the body 9002 in order to reach the topdoor actuator 9024. The topdoor conduits 9200 may include a topdoor supply conduit, shown as topdoor supply conduit 9202, fluidly coupled between and extending between the rear manifold 9170 and the topdoor actuator 9024 configured to supply the pressurized hydraulic fluid from the hydraulic pump 9114 to the topdoor actuator 9024. The topdoor conduits 9200 may also include a topdoor return conduit, shown as topdoor return conduit 9204, fluidly coupled between and extending between the rear manifold 9170 and the topdoor actuator 9024 configured to return hydraulic fluid from the topdoor actuator 9024 to the hydraulic tank 9116. In some embodiments, the topdoor conduits 9200 also include a topdoor load sense conduit fluidly coupled between and extending between the rear manifold 9170 and the topdoor actuator 9024 to provide the E-PTO controller 9118 with a load sense of the hydraulic fluid supplied to the topdoor actuators 9024 from the topdoor supply conduit 9202. The E-PTO controller 9118 may utilize the load sense of the hydraulic fluid supplied to the topdoor actuators 9024 from the topdoor supply conduit 9202 to control a topdoor flow rate of the hydraulic fluid supplied to the topdoor actuators 9024.

Referring to FIGS. 129-131, the hydraulic system 9100 also includes lock conduits (e.g., lock hydraulic connectors, lock hydraulic hoses, eight conduits, etc.), shown as lock conduits 9210, each fluidly coupled between and extending between the rear manifold 9170 and one of the lock actuators 9042, according to some embodiments. The lock conduits 9210 are configured to supply pressurized hydraulic fluid from the rear manifold 9170 to the lock actuators 9042 to selectively reposition the locking bolts 9040 between the unlocked position and the locked position. In some embodiments, the lock conduits 9210 may extend through at least one of the first body rail 9004 or the second body rail 9006 while extending between the rear manifold 9170 and the lock actuators 9042. For example, the lock conduits 9210 may extend through a plurality of apertures defined by the first body rail 9004 or defined by the second body rail 9006. A first portion of the lock conduits 9210 may be positioned inside of one of the outer volumes 9010 and a second portion of the lock conduits 9210 may be positioned inside of the inner volume 9008. In some embodiments, the lock conduits 9210 may be coupled to the lock actuator 9042 inside of the inner volume 9008.

The lock conduits 9210 may include a lock supply conduit, shown as lock supply conduit 9212, fluidly coupled between and extending between the rear manifold 9170 and the lock actuator 9042 configured to supply the pressurized hydraulic fluid from the hydraulic pump 9114 to the lock actuator 9042. The lock conduits 9210 may also include a lock return conduit, shown as lock return conduit 9214, fluidly coupled between and extending between the rear manifold 9170 and the lock actuator 9042 configured to return hydraulic fluid from the lock actuator 9042 to the hydraulic tank 9116. In some embodiments, the lock conduits 9210 also include a lock load sense conduit fluidly coupled between and extending between the rear manifold 9170 and the lock actuator 9042 to provide the E-PTO controller 9118 with a load sense of the hydraulic fluid supplied to the lock actuators 9042 from the lock supply conduit 9212. The E-PTO controller 9118 may utilize the load sense of the hydraulic fluid supplied to the lock actuators 9042 from the lock supply conduit 9212 to control a lock flow rate of the hydraulic fluid supplied to the lock actuators 9042.

While the hydraulic system 9100 is shown being utilized with a front-loading refuse vehicle, the hydraulic system 600 may be incorporated into any other vehicle having a chassis including batteries positioned in an inside volume. By way of example, the hydraulic system 9100 with the intermediate manifold 9140 and the rear manifold 9170 may be used with a side-loading refuse vehicle or a rear-loading refuse vehicle. In other embodiments, the hydraulic system 9100 with the intermediate manifold 9140 and the rear manifold 9170 is usable with other types of vehicles (e.g., military vehicles, delivery vehicles, fire trucks, etc.).

As utilized herein with respect to numerical ranges, the terms "approximately." "about." "substantially." and similar terms generally mean+/−10% of the disclosed values. When the terms "approximately." "about." "substantially." and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top." "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 as shown in the various exemplary embodiments is illustrative only. Additionally, any element disclosed in one embodiment may be incorporated or utilized with any other embodiment disclosed herein. For example, the carry can 150 of the exemplary embodiment shown in at least FIG. 14 may be incorporated in the refuse vehicle 100 of the exemplary embodiment shown in at least FIG. 3. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A vehicle comprising:
a chassis;
a tractive element coupled to the chassis;
a cab coupled to the chassis and configured to support an operator;
a body coupled to the chassis and offset longitudinally rearward from the cab, such that a volume is defined between the cab and the body;
an electric motor configured to drive the tractive element to propel the vehicle;
a secondary electrical load;
a battery configured to supply electrical energy; and
a power distribution unit configured to direct the electrical energy from the battery to the electric motor and the secondary electrical load, the power distribution unit being positioned in the volume defined between the cab and the body.

2. The vehicle of claim 1, wherein the secondary electrical load includes at least one of a second electric motor, a power converter, or a heater.

3. The vehicle of claim 1, wherein a longitudinal centerline of the vehicle extends through the power distribution unit.

4. The vehicle of claim 3, wherein the chassis includes a first frame rail extending longitudinally and laterally offset from the longitudinal centerline in a first direction and a second frame rail extending longitudinally and laterally offset from the longitudinal centerline in a second direction opposite the first direction.

5. The vehicle of claim 4, wherein the battery is positioned outside of the volume and rearward of the power distribution unit.

6. The vehicle of claim 5, wherein the battery extends between the first frame rail and the second frame rail.

7. The vehicle of claim 5, wherein the first frame rail extends between the battery and the second frame rail, and wherein the battery is offset from the longitudinal centerline.

8. The vehicle of claim 5, wherein the battery is a first battery, further comprising a second battery electrically coupled to the power distribution unit, wherein the first battery extends between the first frame rail and the second frame rail, and wherein the second battery is laterally offset from the first battery.

9. The vehicle of claim 8, further comprising:
a first electrical connector engaged with the power distribution unit and electrically coupling the first battery to the power distribution unit; and
a second electrical connector engaged with the power distribution unit and electrically coupling the second battery to the power distribution unit.

10. The vehicle of claim 9, wherein the second electrical connector and the second battery are removable from the vehicle while the first battery supplies the electrical energy to the power distribution unit through the first electrical connector.

11. The vehicle of claim 1, further comprising a cowl extending between the body and the cab, and wherein the volume is defined between the cab, the body, and the cowl.

12. The vehicle of claim 11, further comprising a door extending between the body and the cab, wherein the volume is defined between the cab, the body, the cowl, and the door, and wherein the door is movable to permit access to the volume.

13. The vehicle of claim 1, further comprising a battery management system controller configured to control at least one of charging or discharging the battery, wherein the battery management system controller is positioned within the volume.

14. The vehicle of claim 13, wherein the battery management system controller is positioned between the power distribution unit and the cab.

15. The vehicle of claim 1, further comprising an inverter electrically coupled to the power distribution unit and the electric motor, wherein the electric motor is positioned rearward of the power distribution unit, and wherein the inverter is positioned longitudinally between the power distribution unit and the electric motor.

16. The vehicle of claim 15, wherein a longitudinal centerline of the vehicle intersects the inverter.

17. The vehicle of claim 1, further comprising a manual service disconnect positioned within the volume, wherein the manual service disconnect is configured to selectively prevent the electrical energy from the battery from reaching the electric motor.

18. The vehicle of claim 1, further comprising at least one of a pump, a compressor, an accumulator, or a reservoir positioned within the volume.

19. A refuse vehicle comprising:
a chassis including a pair of frame rails each extending parallel to a longitudinal centerline of the refuse vehicle;
a tractive element coupled to the chassis;
a cab coupled to the chassis;

a body coupled to the chassis and offset longitudinally rearward from the cab, such that a storage volume is defined between the cab and the body, wherein the body defines a refuse compartment configured to contain a volume of refuse;

an electric motor positioned between the frame rails and configured to drive the tractive element to propel the refuse vehicle;

a secondary electrical load;

a battery positioned between the frame rails and configured to supply electrical energy; and a power distribution unit intersected by the longitudinal centerline and configured to direct the electrical energy from the battery to the electric motor and the secondary electrical load, the power distribution unit being positioned in the storage volume defined between the cab and the body.

20. A vehicle comprising:

a chassis including a pair of frame rails extending longitudinally;

a tractive element coupled to the chassis;

a cab coupled to the chassis and configured to support an operator;

a body coupled to the chassis and offset longitudinally rearward from the cab;

a first electric motor configured to drive the tractive element to propel the vehicle;

a secondary electrical load including at least one of a second electric motor, a power converter, or a heater;

a first battery positioned between the frame rails;

a second battery positioned outside of the frame rails;

a housing containing the first battery and the second battery and coupling the first battery and the second battery to the chassis;

a power distribution unit configured to direct electrical energy from the first battery and the second battery to the first electric motor and the secondary electrical load, the power distribution unit being positioned forward of the body and rearward of the cab and extending laterally between the frame rails;

an inverter electrically coupled to the power distribution unit and the first electric motor, wherein the inverter extends laterally between the frame rails, and wherein the inverter is positioned forward of the first electric motor and rearward of the power distribution unit; and a cowl extending between the body and the cab and positioned above the power distribution unit.

* * * * *